US012639139B1

(12) United States Patent
Bhat et al.

(10) Patent No.: US 12,639,139 B1
(45) Date of Patent: May 26, 2026

(54) PRELIMINARY RUNTIME EVENT GENERATION SYSTEMS

(71) Applicant: Citibank, N.A., New York, NY (US)

(72) Inventors: Ganesh Prasad Bhat, West Orange, NJ (US); James Randolph Myers, Clearwater Beach, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/376,352

(22) Filed: Oct. 31, 2025

(51) Int. Cl.
*G06F 9/54* (2006.01)
*G06F 16/903* (2019.01)

(52) U.S. Cl.
CPC ........ *G06F 9/542* (2013.01); *G06F 16/90335* (2019.01)

(58) Field of Classification Search
CPC .............. G06F 9/542; G06F 16/90335; G06F 2201/86; G06F 11/3438; G06F 9/451; G06F 11/30; G06F 16/9535; G06F 3/04847; G06F 3/04842; G06F 3/0481; H04L 67/14; H04L 65/1083; H04L 65/1094
USPC ....................................................... 707/769
See application file for complete search history.

(56) References Cited

U.S. PATENT DOCUMENTS

| | | | |
|---|---|---|---|
| 9,712,576 | B1 | 7/2017 | Gill |
| 10,210,470 | B2 | 2/2019 | Datta Ray |
| 11,501,234 | B2 | 11/2022 | Datta Ray et al. |
| 12,592,966 | B2 | 3/2026 | Taneja et al. |
| 2012/0203895 | A1* | 8/2012 | Jaudon ................ G06F 11/3438 709/224 |
| 2019/0156257 | A1 | 5/2019 | Datta Ray |
| 2023/0319154 | A1* | 10/2023 | Guo ...................... H04L 67/146 709/224 |
| 2024/0346524 | A1 | 10/2024 | Rojas Garcia |
| 2024/0348663 | A1 | 10/2024 | Crabtree et al. |
| 2024/0386015 | A1 | 11/2024 | Crabtree et al. |
| 2024/0394815 | A1 | 11/2024 | Venkataraman et al. |
| 2025/0061312 | A1* | 2/2025 | Heiler ................. G06N 3/0475 |

(Continued)

FOREIGN PATENT DOCUMENTS

| | | |
|---|---|---|
| JP | 2001510599 A | 7/2001 |
| KR | 20180105688 A | 9/2018 |

(Continued)

*Primary Examiner* — Evan Aspinwall
(74) *Attorney, Agent, or Firm* — Perkins Coie LLP; Sumedha Ahuja; Chris Chankyo Kim

(57) ABSTRACT

Systems and methods are disclosed comprising techniques for preliminary signal evaluation, such as generating a first session record for a first environment state for the user runtime session, retrieving a second session record for a second environment state for prior user runtime sessions, inputting the first and the second session records into a first generative model to generate a predicted session event set for the user runtime session, selectively determining a prioritized session event from the predicted session event set based on comparing realization parameters of the predicted session event set, inputting the prioritized session event and the first environment state into a second generative model to generate a preliminary session event for execution during the user runtime session, and when the environment state of user runtime session satisfies activation criterions of the preliminary session event, executing the preliminary session event prior to execution of the prioritized session event.

20 Claims, 21 Drawing Sheets

(56)          References Cited

U.S. PATENT DOCUMENTS

| | | | |
|---|---|---|---|
| 2025/0217428 A1* | 7/2025 | Pedersen | G06F 16/9535 |
| 2025/0258685 A1* | 8/2025 | Crabtree | A63F 13/40 |
| 2025/0259085 A1 | 8/2025 | Crabtree et al. | |
| 2025/0274139 A1 | 8/2025 | Cooper et al. | |
| 2025/0285471 A1 | 9/2025 | Sivakumar et al. | |
| 2025/0308659 A1* | 10/2025 | Guttikonda | H04L 67/535 |
| 2025/0348966 A1 | 11/2025 | Luca | |
| 2025/0351802 A1 | 11/2025 | Torres | |
| 2026/0017301 A1 | 1/2026 | Vieri | |

FOREIGN PATENT DOCUMENTS

| | | | |
|---|---|---|---|
| WO | 2017127850 A1 | 7/2017 | |
| WO | 2024201447 A2 | 10/2024 | |
| WO | 2025080963 A1 | 4/2025 | |

* cited by examiner

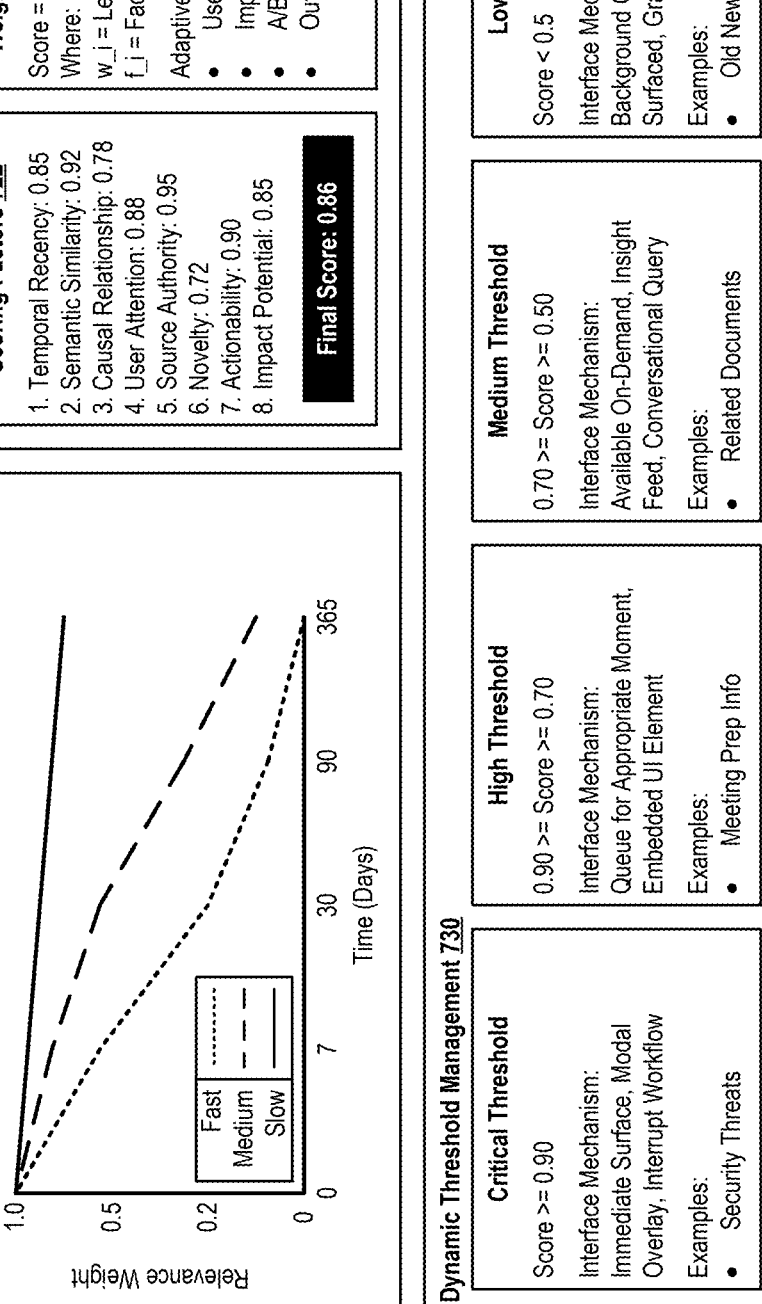

Temporal Decay Functions 710

Relevance Weight 1.0
0.5
0.2
0

Fast
Medium
Slow 0   7   30   90   365
Time (Days)

Multi-Dimensional Relevance Scoring 720

Scoring Factors 722

1. Temporal Recency: 0.85
2. Semantic Similarity: 0.92
3. Causal Relationship: 0.78
4. User Attention: 0.88
5. Source Authority: 0.95
6. Novelty: 0.72
7. Actionability: 0.90
8. Impact Potential: 0.85

Final Score: 0.86

Weighting Formula 724

Score = Σ (w_i x f_i)
Where:
w_i = Learned Weight
f_i = Factor Score

Adaptive Weights:
• User Feedback
• Implicit Signals
• A/B Testing
• Outcome Tracking

Dynamic Threshold Management 730

Critical Threshold

Score >= 0.90

Interface Mechanism:
Immediate Surface, Modal
Overlay, Interrupt Workflow

Examples:
• Security Threats

High Threshold

0.90 >= Score >= 0.70

Interface Mechanism:
Queue for Appropriate Moment,
Embedded UI Element

Examples:
• Meeting Prep Info

Medium Threshold

0.70 >= Score >= 0.50

Interface Mechanism:
Available On-Demand, Insight
Feed, Conversational Query

Examples:
• Related Documents

Low Threshold

Score < 0.5

Interface Mechanism:
Background Context, Not Actively
Surfaced, Graph-Only Storage Examples:
• Old News Items

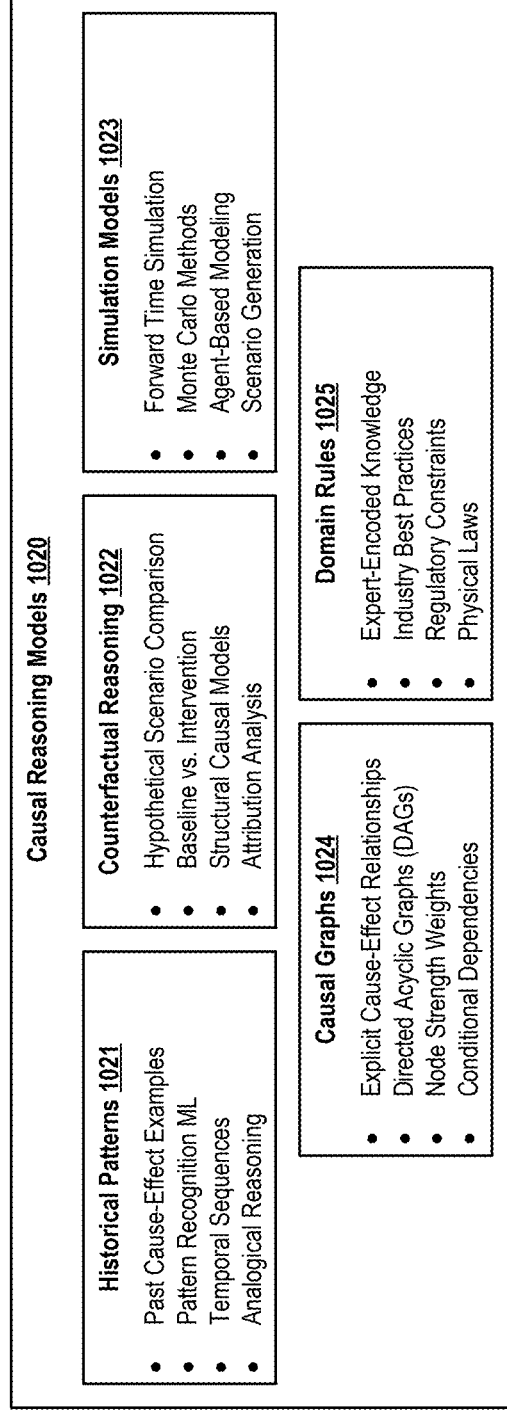

Causal Reasoning Models 1020

Historical Patterns 1021
- Past Cause-Effect Examples
- Pattern Recognition ML
- Temporal Sequences
- Analogical Reasoning

Counterfactual Reasoning 1022
- Hypothetical Scenario Comparison
- Baseline vs. Intervention
- Structural Causal Models
- Attribution Analysis

Simulation Models 1023
- Forward Time Simulation
- Monte Carlo Methods
- Agent-Based Modeling
- Scenario Generation

Causal Graphs 1024
- Explicit Cause-Effect Relationships
- Directed Acyclic Graphs (DAGs)
- Node Strength Weights
- Conditional Dependencies

Domain Rules 1025
- Expert-Encoded Knowledge
- Industry Best Practices
- Regulatory Constraints
- Physical Laws

*FIG. 10B*

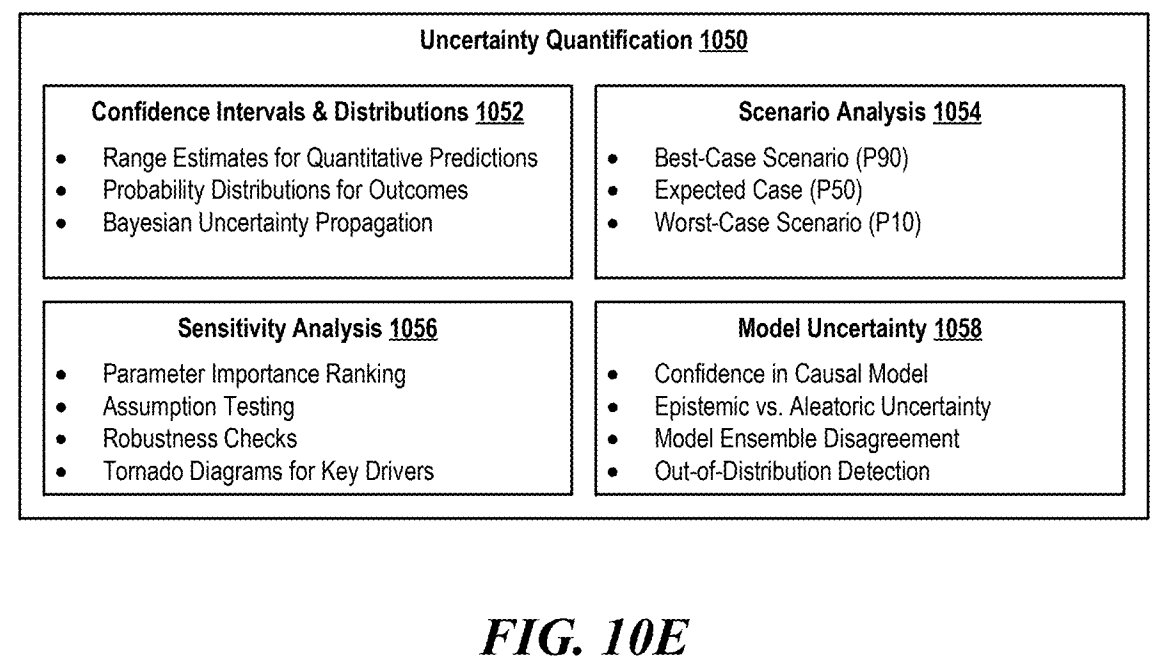

Uncertainty Quantification 1050

Confidence Intervals & Distributions 1052

- Range Estimates for Quantitative Predictions
- Probability Distributions for Outcomes
- Bayesian Uncertainty Propagation

Scenario Analysis 1054

- Best-Case Scenario (P90)
- Expected Case (P50)
- Worst-Case Scenario (P10)

Sensitivity Analysis 1056

- Parameter Importance Ranking
- Assumption Testing
- Robustness Checks
- Tornado Diagrams for Key Drivers

Model Uncertainty 1058

- Confidence in Causal Model
- Epistemic vs. Aleatoric Uncertainty
- Model Ensemble Disagreement
- Out-of-Distribution Detection

*FIG. 10E*

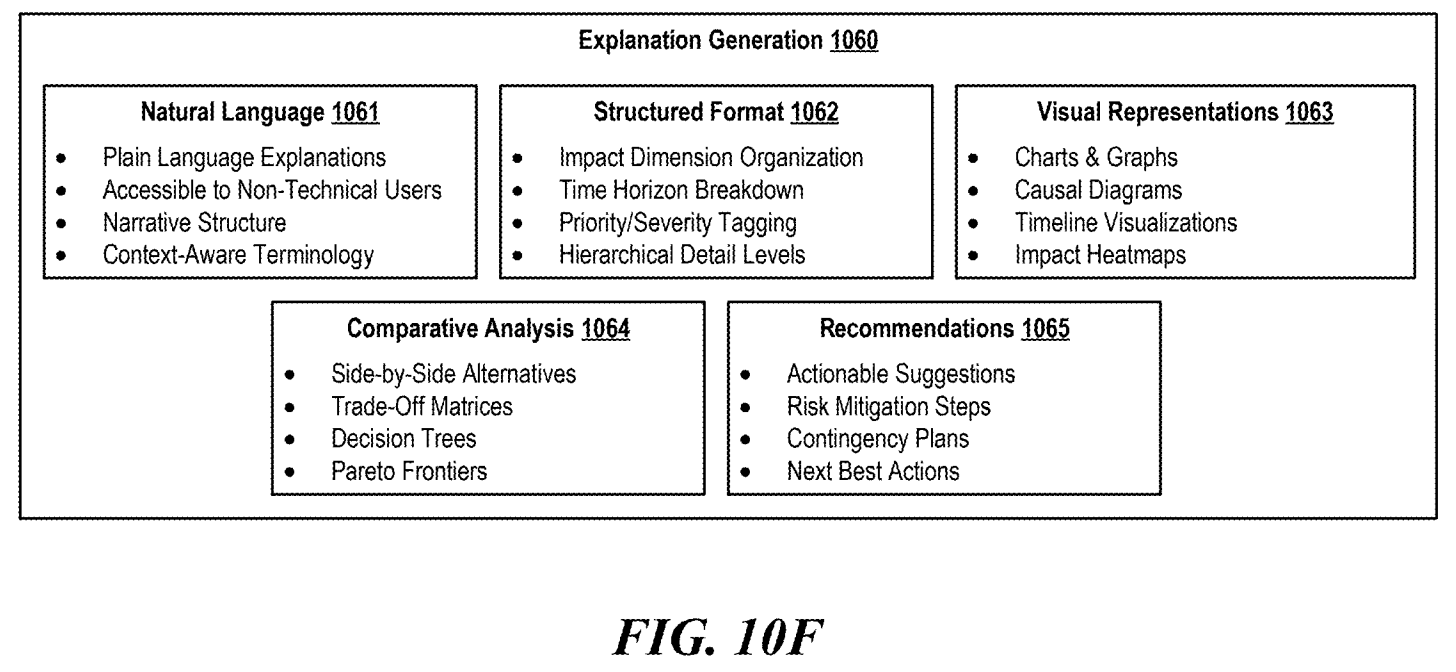

Explanation Generation 1060

Natural Language 1061
- Plain Language Explanations
- Accessible to Non-Technical Users
- Narrative Structure
- Context-Aware Terminology

Structured Format 1062
- Impact Dimension Organization
- Time Horizon Breakdown
- Priority/Severity Tagging
- Hierarchical Detail Levels

Visual Representations 1063
- Charts & Graphs
- Causal Diagrams
- Timeline Visualizations
- Impact Heatmaps

Comparative Analysis 1064
- Side-by-Side Alternatives
- Trade-Off Matrices
- Decision Trees
- Pareto Frontiers

Recommendations 1065
- Actionable Suggestions
- Risk Mitigation Steps
- Contingency Plans
- Next Best Actions

*FIG. 10F*

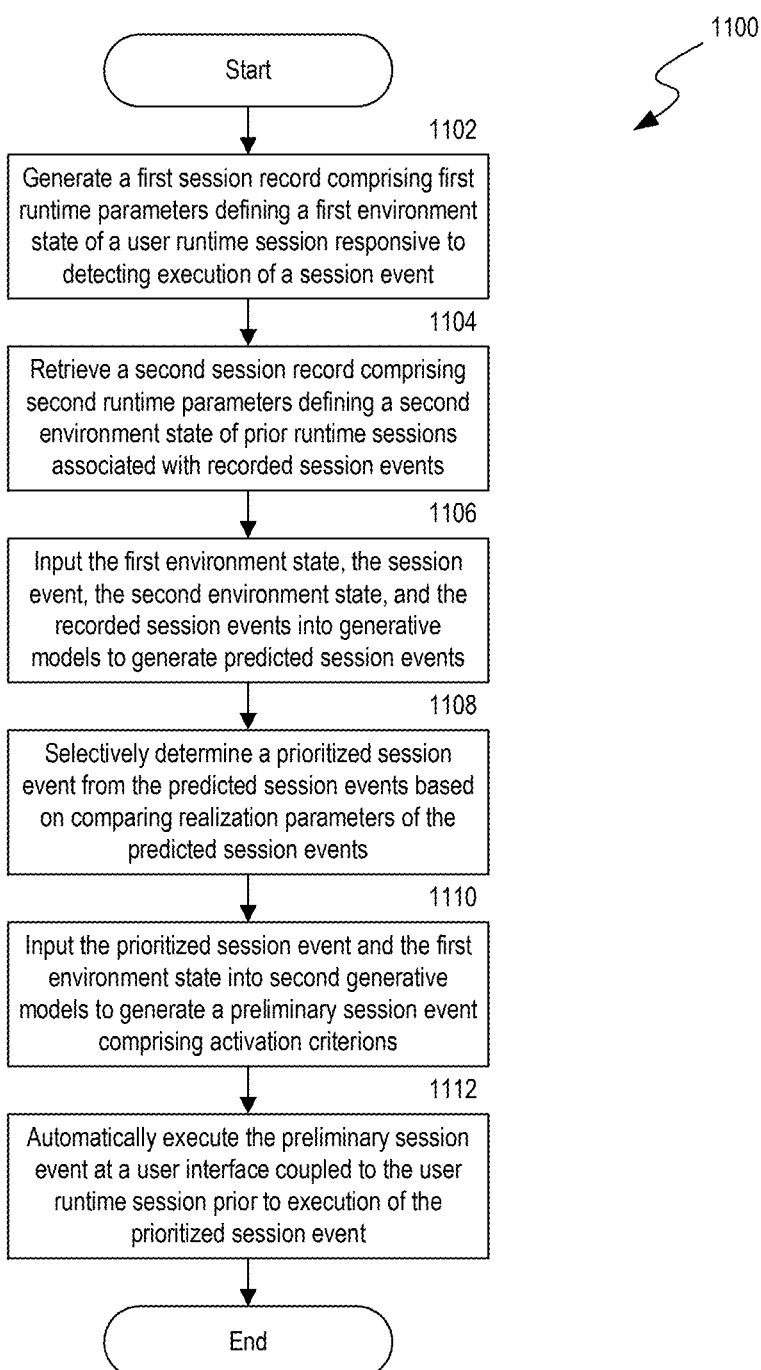

1100

Start

1102

Generate a first session record comprising first runtime parameters defining a first environment state of a user runtime session responsive to detecting execution of a session event

1104

Retrieve a second session record comprising second runtime parameters defining a second environment state of prior runtime sessions associated with recorded session events

1106

Input the first environment state, the session event, the second environment state, and the recorded session events into generative models to generate predicted session events

1108

Selectively determine a prioritized session event from the predicted session events based on comparing realization parameters of the predicted session events

1110

Input the prioritized session event and the first environment state into second generative models to generate a preliminary session event comprising activation criterions

1112

Automatically execute the preliminary session event at a user interface coupled to the user runtime session prior to execution of the prioritized session event End

*FIG. 11*

PRELIMINARY RUNTIME EVENT GENERATION SYSTEMS

BACKGROUND

A virtual assistant is a software agent that can perform a range of tasks or services for a user based on user input such as commands or questions, including verbal ones. Such technologies often incorporate chatbot capabilities to streamline task execution. The interaction may be via text, graphical interface, or voice, as some virtual assistants are able to interpret human speech and respond via synthesized voices.

In many cases, users can ask their virtual assistants questions, control home automation devices and media playback, and manage other basic tasks, such as email, to-do lists, and calendars, all with verbal commands. In recent years, prominent virtual assistants for direct consumer use have included Apple Siri™, Amazon Alexa™, Google Assistant™ (Gemini™), Microsoft Copilot™ and Samsung Bixby™. Also, companies in various industries often incorporate some kind of virtual assistant technology into their customer service or support.

Into the 2020s, the emergence of artificial intelligence based chatbots, such as ChatGPT™, has brought increased capability and interest to the field of virtual assistant products and services.

BRIEF DESCRIPTION OF THE DRAWINGS

Detailed descriptions of implementations of the present invention will be described and explained through the use of the accompanying drawings.

FIG. 7 is a block diagram that illustrates scoring mechanisms in accordance with some implementations of the present technology.

FIGS. 10A-10F are block diagrams that illustrate a causal evaluation system and in accordance with some implementations of the present technology.

FIG. 11 is a flow diagram that illustrates an example process for generating preliminary session events in accordance with some implementations of the disclosed technology.

Figure 1A:
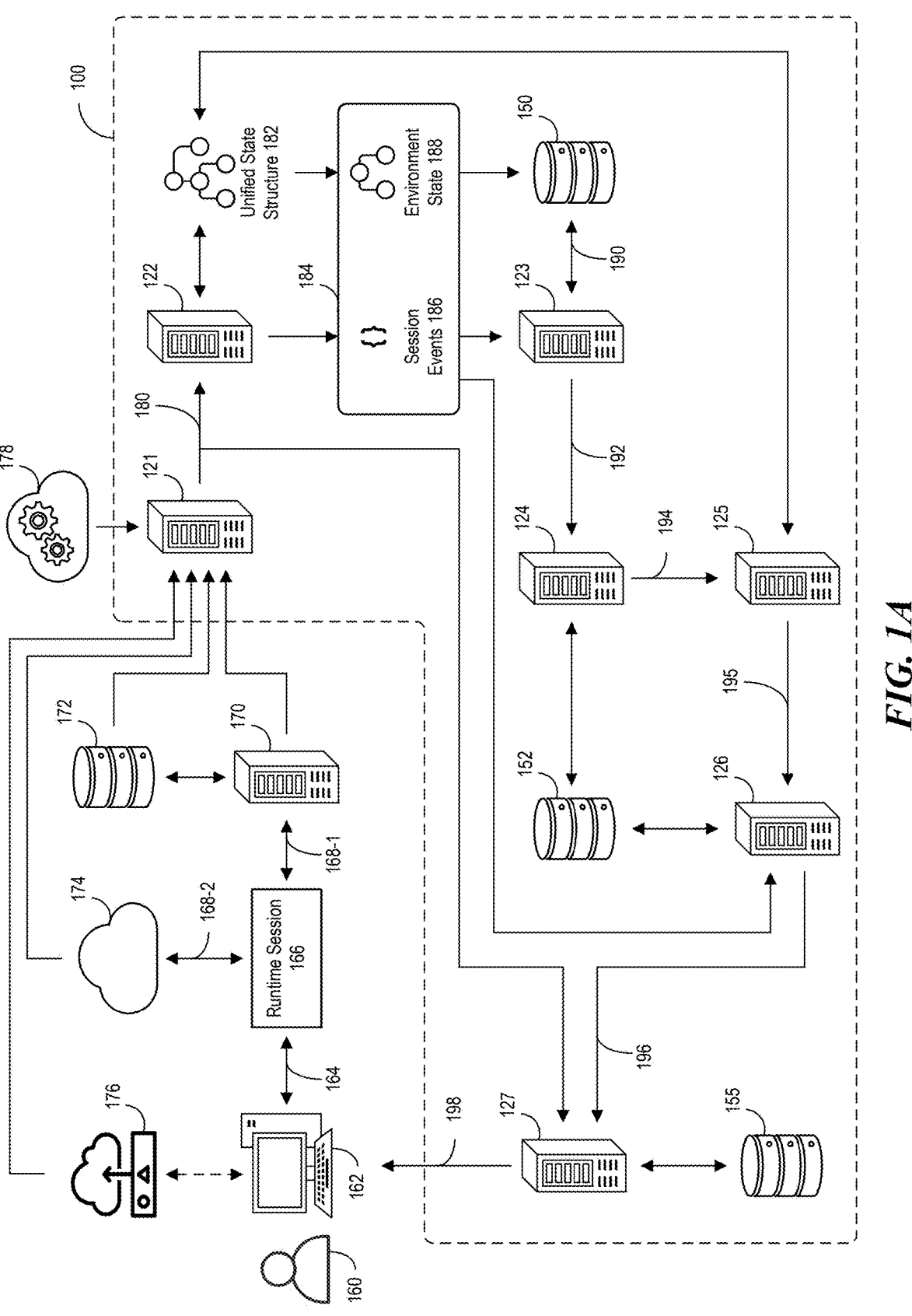
FIGS. 1A-1B are block diagrams that illustrate an event coordination system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Current artificial intelligence (AI) assistant technologies operate primarily in reactive mode, responding to explicit user queries or commands after users have already identified their information needs and formulated specific requests. These reactive systems create significant inefficiencies in user workflows because users must interrupt their primary activities to search for information, formulate queries, wait for responses, and then integrate the received information back into their ongoing work processes. The reactive nature of existing systems means that users experience delays between recognizing an information need and obtaining relevant insights, during which time the contextual relevance of the information may diminish or the user's focus may shift to other priorities. Additionally, users often struggle to anticipate what information they will need for upcoming tasks or decisions, leading to suboptimal preparation and reactive scrambling when information requirements become apparent during critical work moments.

Existing systems including Microsoft Cortana™, Google Assistant™, Amazon Alexa™, and enterprise recommendation engines suffer from fundamental limitations that prevent them from truly understanding and anticipating user needs before explicit requests are made. These systems lack comprehensive contextual awareness across multiple data sources and cannot synthesize holistic understanding of user environments, organizational conditions, and temporal patterns that would enable accurate prediction of future information requirements. Current technologies operate with limited visibility into user activities, relying primarily on direct user inputs rather than monitoring comprehensive behavioral patterns, environmental changes, and contextual evolution that could inform predictive analysis. Furthermore, existing systems cannot effectively correlate current user contexts with historical patterns from similar situations to identify recurring information needs and behavioral sequences that would enable proactive assistance. The inability of current systems to maintain unified knowledge representations across diverse data sources (e.g., emails, calendars, documents, databases, collaboration tools, internet of things (IoT) sensors, external application programming interfaces (APIs)) prevents them from developing the comprehensive situational awareness necessary for anticipatory intelligence generation.

The disclosed system can provide comprehensive context-aware anticipatory insight generation and delivery capabilities that proactively assist users by synthesizing holistic context and predicting information needs before explicit queries are formulated. The system can implement a holistic context integration engine that creates unified data structures by continuously monitoring real-time updates from diverse data sources (e.g., emails, calendars, documents, databases, collaboration tools, IoT sensors, external APIs, and/or the like) and consolidating these dynamic information streams into standardized representations that enable comprehensive contextual analysis. The system can process streaming data through distributed stream processing frameworks with event-driven microservices that update knowledge graph nodes and relationship weights as new information arrives, transforming this information into unified knowledge representations that capture relationships between entities, temporal patterns, and contextual dependencies across the entire monitored environment, creating a comprehensive knowledge graph that maintains current awareness of user activities, organizational conditions, and environmental factors that influence user behavior and information needs.

The system can implement predictive analysis capabilities that leverage the unified data structure to anticipate user information needs before explicit requests are made. The system accomplishes this through analytical algorithms that analyze current context patterns by traversing interconnected nodes within the unified knowledge graph, where these nodes represent entities, relationships, and temporal sequences. The system correlates historical user behavior sequences, which are stored as graph pathways, with emerging environmental conditions represented as dynamic node attributes. Based on this analysis, the system generates preliminary events that proactively address predicted user requirements. The system executes these predictive processes through ensemble analytical models that process contextual data streams in real-time. These data streams are extracted from the unified data structure's semantic relationships and temporal annotations, enabling the generation of preliminary session events with activation criterions derived from graph traversal patterns. These preliminary events trigger proactive assistance when specific runtime parameters that match historical node relationship patterns are detected in the user's operational environment.

To ensure optimal performance, the system can implement specialized computational architectures that balance processing efficiency with analytical capability. For example, the system can employ distributed model deployment strategies including edge computing nodes for lightweight inference tasks, regional server clusters for medium-complexity analysis, and centralized GPU farms for computationally intensive reasoning operations, optimizing resource utilization while maintaining response times suitable for real-time anticipatory assistance. Additionally, the system can implement intelligent relevance management mechanisms that dynamically adjust the importance of information based on temporal factors and contextual relationships to ensure that the most pertinent insights are prioritized for user delivery while maintaining comprehensive situational awareness across the monitored environment.

In some implementations, the system can provide blockchain-secured provenance systems that maintain immutable records of data sources, reasoning chains, and insight derivations with cryptographic proof of information sources and analytical steps. Further, the system can execute adaptive information routing mechanisms that dynamically select delivery pathways based on content classification and priority assessment. For example, the system can implement intelligent routing algorithms that analyze information urgency levels, user contextual states, and content criticality parameters to automatically direct insights through appropriate delivery channels, ensuring that high-priority information receives immediate attention while routine updates are queued for optimal timing to minimize workflow disruption.

Further, the system can analyze emerging events and potential actions to predict downstream effects across multiple dimensions including system performance metrics, processing timelines, computational resource allocation, data integrity relationships, and infrastructure constraints. The system implements causal reasoning models including causal graphs that map explicit cause-effect relationships between system components, counterfactual reasoning that compares baseline scenarios against intervention outcomes, simulation models that execute forward-time Monte Carlo analysis of potential system states, and historical pattern matching that identifies analogous situations from recorded operational data. These models trace impact chains through direct effects that immediately result from initial events, secondary effects that emerge from the direct consequences, and tertiary effects that propagate through multiple system layers while accounting for feedback loops that create self-reinforcing or self-limiting behaviors and amplification effects where small changes produce disproportionately large system impacts. The system generates natural language explanations with uncertainty quantification that provides confidence intervals and probability distributions for predicted outcomes, and comparative analysis that evaluates alternative scenarios side-by-side to enable comprehensive decision support with full awareness of potential outcomes, tradeoffs, and cascading consequences before computational operations are executed.

For illustrative purposes, examples are described herein in the context of computer systems for preliminary runtime event generation and proactive anticipatory insight delivery. However, a person skilled in the art will appreciate that the disclosed system can be applied in other contexts. For example, the disclosed system can be used within a healthcare information system to anticipate clinical decision support needs by analyzing patient data patterns and predicting required diagnostic tools or treatment recommendations before explicit physician queries are made. As another example, the disclosed system can be implemented in educational platforms to predict learning support requirements by monitoring student engagement patterns, assessment performance, and curriculum progression to preemptively generate personalized study materials and tutoring recommendations before educators request specific academic interventions. Additionally, the disclosed system can be deployed in manufacturing environments to anticipate equipment maintenance needs by analyzing sensor data, production schedules, and historical failure patterns to proactively prepare maintenance procedures and resource allocation before equipment issues manifest. The system can also be applied in cybersecurity operations centers to predict threat analysis requirements by monitoring network traffic patterns, security events, and threat intelligence feeds to preemptively generate incident response procedures and mitigation strategies before security analysts identify specific threats. Furthermore, the disclosed system can be utilized in smart city infrastructure to anticipate urban planning needs by analyzing traffic patterns, utility consumption data, and environmental sensors to proactively generate infrastructure optimization recommendations and resource allocation strategies before municipal planners identify specific urban challenges.

Attempting to create a system to generate preliminary session events for proactive user assistance through comprehensive context analysis and predictive modeling in view of the available conventional approaches created significant technological uncertainty. Creating such platform required addressing several unknowns in conventional approaches of reactive AI assistant technologies, such as the inability to synthesize holistic context across diverse data sources and predict user information needs before explicit queries are made. Similarly, conventional approaches in predictive user assistance did not provide mechanisms for real-time streaming data integration with sub-second latency while maintaining unified knowledge representations across multiple information repositories.

Conventional approaches rely on reactive query-response paradigms that operate in isolation from comprehensive contextual awareness, which do not enable anticipatory intelligence generation. For example, a conventional system may process individual user requests through large language models and fail to correlate current user activities with historical behavioral patterns and environmental conditions to predict future information needs. Conventional approaches typically involve batch processing of user interaction data and static recommendation engines, which cannot provide real-time context synthesis and dynamic priority adjustment based on evolving user environment states. Conversely, the disclosed system implements continuous monitoring of user runtime sessions through distributed stream processing frameworks that generate preliminary session events with activation criterions before users explicitly request information.

Additionally, integrating diverse data sources into unified knowledge representations while maintaining temporal relevance and semantic relationships created further technological uncertainty, since the legacy data integration approaches lacked standardized semantic mapping and real-time context decay mechanisms. Legacy batch-oriented data processing systems often failed to preserve causal relationships and temporal dependencies between entities across heterogeneous information repositories. To successfully integrate legacy enterprise data sources with real-time streaming architectures for predictive session event generation, distributed graph construction algorithms with temporal indexing and multi-dimensional relevance scoring must be taken into consideration.

To overcome the technological uncertainties, the inventors systematically evaluated multiple design alternatives. For example, the inventors experimented with different approaches for correlating current user session characteristics with historical behavioral patterns to generate accurate predicted session events. The inventors evaluated various machine learning model architectures including ensemble methods with specialized small language models versus single large general-purpose models, which allowed the inventors to optimize inference latency while maintaining prediction accuracy for real-time preliminary event generation.

The use of traditional batch processing approaches for session record alignment and pattern recognition, proved to be inadequate for real-time predictive analysis as it failed to maintain current awareness of evolving user environment states and contextual changes, leading to stale predictions that did not reflect dynamic user information needs. Similarly, relying solely on large general-purpose language models for all inference tasks did not provide the sub-second response times required for proactive preliminary event execution before users recognize information needs. Further, implementing static priority scoring without temporal decay and multi-dimensional relevance factors ignored the potential benefits of adaptive context-aware prioritization that accounts for changing user attention patterns and environmental conditions.

Thus, the inventors experimented with different methods for generating unified data structures that preserve semantic relationships and temporal dependencies across diverse information sources while enabling real-time query processing. For example, the inventors evaluated various graph construction algorithms, semantic extraction pipelines, and distributed caching strategies to identify the most efficient and effective approaches for maintaining comprehensive contextual awareness. Additionally, the inventors systematically evaluated different strategies for implementing activation criterions that trigger preliminary session event execution based on runtime parameter changes in user environment states. The inventors evaluated, for example, different methods of correlating session events with historical patterns through similarity analysis and record alignment techniques, such as graph matching algorithms that compare current session characteristics with stored behavioral sequences to generate realization parameters for predicted events.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Event Coordination System

Figure 1B:
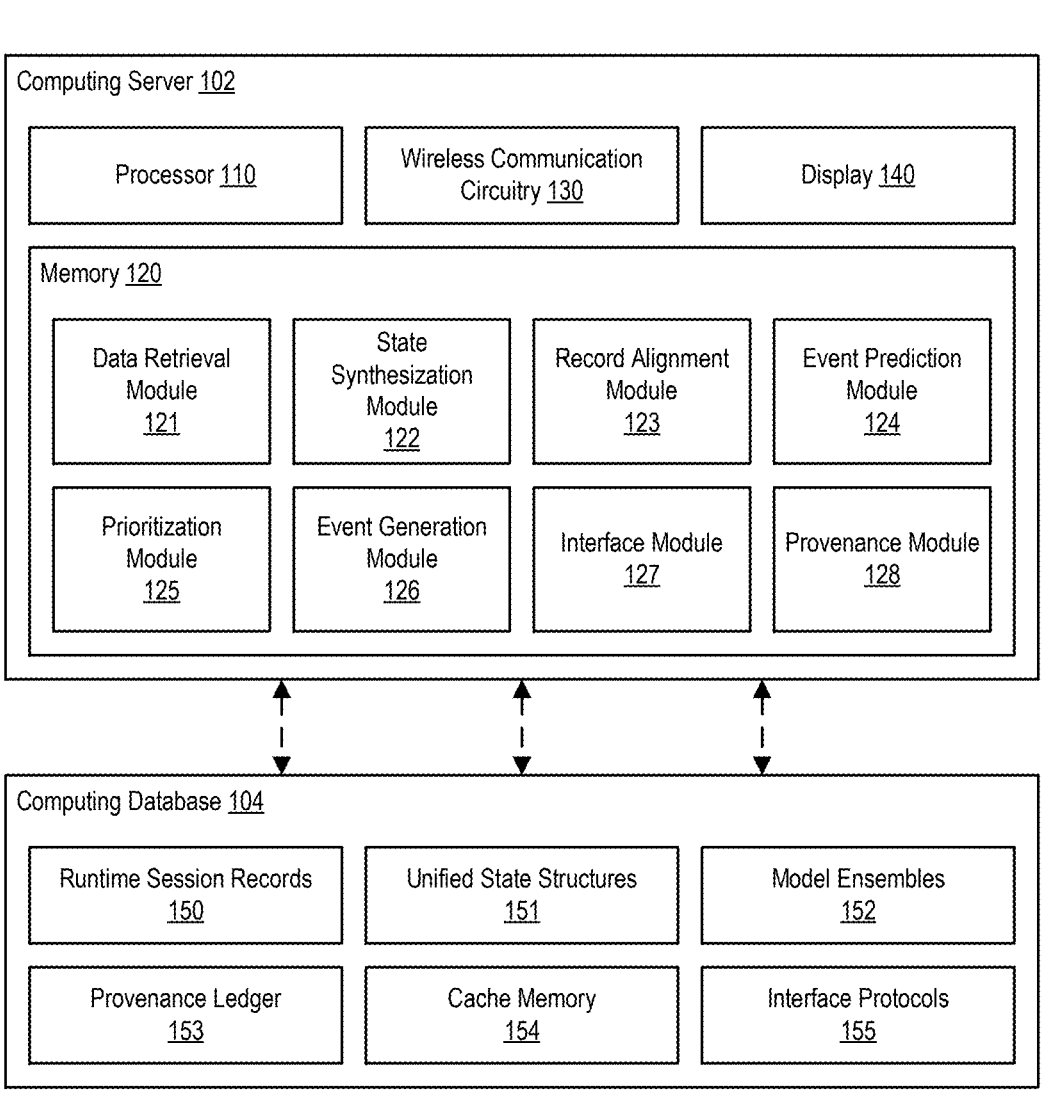

FIGS. 1A-1B are block diagrams that illustrate an event coordination system 100 ("system 100") that can implement aspects of the present technology. Referring to FIG. 1A, in some implementations, an event coordination system 100 can facilitate proactive intelligence generation through comprehensive monitoring and prediction of user activities within computing environments. The event coordination system 100 can be implemented as a distributed computing architecture that includes multiple interconnected components working together to analyze user behavior patterns (e.g., application usage, document access, communication activities, and/or the like), predict future information needs (e.g., anticipated questions, required data access, workflow continuations, and/or the like), and automatically execute preliminary actions before users explicitly request such actions. The event coordination system 100 can operate by continuously monitoring user interactions through various communication channels (e.g., application programming interfaces, message queues, database change streams, and/or the like) to detect session events that indicate changes in user context or environment state. For example, the event coordination system 100 can monitor when a user opens a specific document, joins a meeting, receives an email, or accesses a database record, with each of these activities representing a session event that contributes to understanding the user's current working context. As another example, the event coordination system 100 can track environmental changes such as calendar updates, project milestone completions, or external data feeds that can influence the user's information needs. Additionally, the event coordination system 100 can maintain historical records of similar user sessions to identify patterns and correlations that enable accurate prediction of future user actions and information requirements.

In some implementations, a user 160 can interact with the event coordination system 100 through direct engagement with computing interfaces and applications that generate observable activity patterns for analysis and prediction. The user 160 can represent an individual person operating within a computing environment who performs various tasks (e.g., document editing, email communication, database queries, and/or the like) that generate detectable signals indicating current context and potential future information needs. The user 160 can engage with multiple software applications simultaneously (e.g., email clients, calendar applications, document editors, and/or the like), with each interaction creating data points that contribute to understanding the user's working patterns and behavioral tendencies. For example, the user 160 can begin working on a quarterly budget document, which generates session events indicating document access, editing activities, and related data queries that suggest the user will subsequently need information about previous quarter performance, competitor analysis, or resource allocation data. As another example, the user 160 can join a client meeting through a video conferencing application, which creates session events that indicate the user will likely need access to client history, project status updates, or relevant presentation materials. Additionally, the user 160 can receive notifications or alerts from various systems, with each notification representing a potential trigger for subsequent information gathering or decision-making activities that the event coordination system 100 can anticipate and prepare for in advance.

In some implementations, a user interface 162 can serve as the primary interaction mechanism through which the user 160 engages with computing systems and generates observable activity data for the event coordination system 100. The user interface 162 can include various input and output mechanisms (e.g., graphical user interfaces, command line interfaces, voice interfaces, and/or the like) that capture user actions and present information back to the user 160 in contextually appropriate formats. The user interface 162 can be implemented across multiple devices and applications (e.g., desktop computers, mobile devices, web browsers, and/or the like) to provide comprehensive coverage of user activities regardless of the specific computing platform being used. For example, the user interface 162 can include a web-based dashboard that displays real-time insights and recommendations based on the user's current activities, with interactive elements that allow the user 160 to explore related information or take suggested actions. As another example, the user interface 162 can include embedded interface elements within existing applications (e.g., contextual tooltips in document editors, sidebar panels in email clients, overlay notifications in calendar applications, and/or the like) that surface relevant insights without disrupting the user's primary workflow. Additionally, the user interface 162 can include conversational interfaces that enable natural language interaction, allowing the user 160 to ask follow-up questions about generated insights or request additional information through voice or text-based communication channels.

In some implementations, recorded activities 164 can represent the comprehensive collection of user actions and interactions that are captured and stored by the event coordination system 100 for analysis and pattern recognition. The recorded activities 164 can include detailed logs of user interactions with various software applications (e.g., file access timestamps, editing durations, communication patterns, and/or the like) that provide insights into user behavior patterns and working preferences. The recorded activities 164 can be structured as time-series data that preserves the temporal relationships between different user actions (e.g., sequential document access, meeting attendance followed by email composition, database queries preceding report generation, and/or the like) to enable accurate prediction of future user needs. For example, the recorded activities 164 can include a sequence showing that the user 160 typically accesses competitor analysis reports after reviewing quarterly sales data, which enables the event coordination system 100 to preemptively prepare competitor information when sales data access is detected. As another example, the recorded activities 164 can capture patterns where the user 160 consistently requests budget variance reports following monthly financial reviews, allowing the system to automatically generate these reports before they are explicitly requested. Additionally, the recorded activities 164 can include contextual metadata such as the duration of activities, the frequency of specific action sequences, and the outcomes of previous predictions, which enables continuous refinement of the prediction algorithms and improvement of anticipatory accuracy over time.

In some implementations, a runtime session 166 can represent the active computing environment and context within which the user 160 is currently operating, serving as the foundation for real-time analysis and prediction generation. The runtime session 166 can include the current state of all active applications (e.g., open documents, active database connections, running processes, and/or the like), environmental conditions (e.g., time of day, calendar events, system resources, and/or the like), and user context information that collectively define the present working situation. The runtime session 166 can be continuously updated as new user actions occur (e.g., opening files, sending emails, joining meetings, and/or the like) to maintain an accurate representation of the evolving user context and enable responsive prediction adjustments. For example, the runtime session 166 can track that the user 160 is currently editing a project proposal document while having a client database query running in the background and a team meeting scheduled in thirty minutes, which collectively suggests the user will soon need access to project timeline information and team member availability data. As another example, the runtime session 166 can monitor that the user 160 has multiple financial reports open simultaneously while receiving notifications about budget deadline reminders, indicating a high probability that budget analysis tools and historical spending data will be needed shortly. Additionally, the runtime session 166 can maintain session continuity across different devices and applications, ensuring that context is preserved when the user 160 switches between computing platforms or temporarily suspends and resumes work activities.

In some implementations, session events 168-1 and 168-2 can represent discrete, observable actions or state changes that occur within the runtime session 166 and serve as input signals for the event prediction and analysis processes. The session events 168-1 and 168-2 can include specific user actions (e.g., file opening, email sending, database querying, and/or the like), system-generated events (e.g., calendar notifications, automated backups, scheduled reports, and/or the like), and external triggers (e.g., incoming messages, data updates, environmental changes, and/or the like) that collectively contribute to understanding the current session context. The session events 168-1 and 168-2 can be time-stamped and categorized according to their type and significance (e.g., high-impact events that indicate major context changes, routine events that follow predictable patterns, anomalous events that suggest unusual circumstances, and/or the like) to enable appropriate weighting in prediction algorithms. For example, session events 168-1 can represent the user 160 opening a quarterly budget spreadsheet and accessing historical financial data, while session events 168-2 can represent the user receiving calendar notifications about an upcoming board meeting, with both events collectively suggesting the user will need budget presentation materials and variance analysis reports. As another example, session events 168-1 can include the user 160 joining a client video conference and accessing project documentation, while session events 168-2 can include incoming email notifications about project delays, indicating the user will likely need updated timeline information and risk assessment data. Additionally, the session events 168-1 and 168-2 can be correlated with historical patterns to identify recurring sequences that enable accurate prediction of subsequent user actions and information needs.

In some implementations, a computing service 170 can provide specialized computational capabilities and data processing functions that contribute to the overall data ecosystem monitored by the event coordination system 100. The computing service 170 can include various enterprise applications and software systems (e.g., customer relationship management platforms, enterprise resource planning systems, business intelligence tools, and/or the like) that generate relevant data streams and user interaction events for analysis and prediction. The computing service 170 can be implemented as cloud-based services, on-premises applications, or hybrid deployments that provide specific business functions while generating observable user activity patterns and data access events. For example, the computing service 170 can include a customer relationship management system that tracks user interactions with client records, sales pipeline updates, and communication history, generating session events when users access specific customer data or update opportunity statuses. As another example, the computing service 170 can include a project management platform that monitors task completions, milestone updates, and resource allocation changes, creating data streams that indicate project progress and potential information needs for project stakeholders. Additionally, the computing service 170 can include collaboration tools that track document sharing, meeting participation, and communication patterns, providing insights into team dynamics and workflow dependencies that can inform predictive analysis and anticipatory insight generation.

In some implementations, a service database 172 can store and manage the data generated by the computing service 170, serving as a structured repository of information that can be accessed and analyzed by the event coordination system 100. The service database 172 can include relational databases, document stores, or other data management systems (e.g., SQL databases, NoSQL repositories, data warehouses, and/or the like) that maintain historical records, current state information, and metadata about user interactions with the computing service 170. The service database 172 can be configured with change data capture mechanisms (e.g., database triggers, transaction log monitoring, event streaming, and/or the like) that automatically notify the event coordination system 100 when data modifications occur, enabling real-time awareness of changing business conditions and user activities. For example, the service database 172 can store customer interaction history, sales pipeline data, and communication records, with change notifications sent to the event coordination system 100 whenever users update customer information, modify sales forecasts, or log new client communications. As another example, the service database 172 can maintain project timelines, resource allocations, and task dependencies, generating update signals when project managers modify schedules, reassign resources, or mark milestones as complete. Additionally, the service database 172 can include audit trails and access logs that provide insights into user behavior patterns, data usage frequency, and information access sequences that contribute to understanding user working patterns and predicting future information needs.

In some implementations, a network service 174 can provide external data feeds and communication capabilities that expand the information context available to the event coordination system 100 beyond internal organizational data sources. The network service 174 can include various internet-based services and APIs (e.g., news feeds, market data providers, weather services, and/or the like) that deliver real-time information about external conditions and events that can influence user information needs and decision-making processes. The network service 174 can be configured to push notifications or provide polling-based access to external data sources (e.g., RSS feeds, REST APIs, webhook notifications, and/or the like) that enable the event coordination system 100 to incorporate external context into its analysis and prediction algorithms. For example, the network service 174 can include financial market data feeds that provide real-time stock prices, economic indicators, and industry news, enabling the event coordination system 100 to anticipate when users working on investment analysis or financial planning will need updated market information. As another example, the network service 174 can include weather services that provide forecasts and alerts, allowing the system to predict when users in logistics or event planning roles will need weather-related information for decision-making purposes. Additionally, the network service 174 can include social media monitoring, competitor analysis feeds, or industry-specific data sources that provide external intelligence relevant to organizational decision-making and strategic planning activities.

In some implementations, an IoT device 176 can provide environmental sensing and monitoring capabilities that contribute physical world context to the event coordination system 100's understanding of user working conditions and environmental factors. The IoT device 176 can include various sensors and connected devices (e.g., environmental sensors, equipment monitors, location trackers, and/or the like) that track physical conditions such as temperature, humidity, occupancy, equipment status, and other real-world parameters that can influence user activities and information needs. The IoT device 176 can be deployed throughout office environments, manufacturing facilities, or other physical locations (e.g., conference rooms, production floors, remote work locations, and/or the like) to provide comprehensive environmental awareness that complements digital activity monitoring. For example, the IoT device 176 can include occupancy sensors in conference rooms that detect when meetings are starting or ending, enabling the event coordination system 100 to anticipate when meeting participants will need follow-up information, action item summaries, or related project documentation. As another example, the IoT device 176 can include equipment status monitors in manufacturing environments that track machine performance and maintenance schedules, allowing the system to predict when operators will need maintenance procedures, spare parts information, or production scheduling updates. Additionally, the IoT device 176 can include environmental sensors that monitor working conditions such as temperature, lighting, or noise levels, providing context that can influence user productivity patterns and information access behaviors that contribute to more accurate prediction of user needs and optimal timing for information delivery.

In some implementations, an external data source 178 can provide additional information streams from third-party systems and services that are not directly controlled by the organization but comprise relevant data for user context analysis and prediction generation. The external data source 178 can include various external systems (e.g., partner databases, vendor platforms, government data feeds, and/or the like) that provide information relevant to organizational decision-making and user activities but are maintained by external entities. The external data source 178 can be accessed through various integration mechanisms (e.g., API connections, data syndication feeds, batch file transfers, and/or the like) that enable the event coordination system 100 to incorporate external information into its comprehensive context analysis. For example, the external data source 178 can include supplier databases that provide inventory levels, pricing information, and delivery schedules, enabling the event coordination system 100 to anticipate when procurement professionals will need updated supplier information or alternative sourcing options. As another example, the external data source 178 can include regulatory databases that provide compliance requirements, policy updates, and industry standards, allowing the system to predict when compliance officers or legal professionals will need updated regulatory information for decision-making purposes. Additionally, the external data source 178 can include partner systems that provide collaborative project information, shared customer data, or joint venture metrics that contribute to understanding cross-organizational workflows and information dependencies that influence user information needs and timing requirements.

In some implementations, a data stream 180 can represent the continuous flow of information from all connected data sources that feeds into the event coordination system 100 for real-time analysis and processing. The data stream 180 can aggregate information from multiple sources (e.g., computing service 170, network service 174, IoT device 176, external data source 178, and/or the like) into a unified flow of events and data updates that can be processed by the system's analysis and prediction components. The data stream 180 can be implemented using streaming data technologies (e.g., Apache Kafka™, Apache Pulsar™, message queues, and/or the like) that provide high-throughput, low-latency data processing capabilities to ensure real-time responsiveness to changing conditions and user activities. For example, the data stream 180 can include real-time updates from customer relationship management systems, project management tools, and external market data feeds, all flowing together to provide comprehensive context about current business conditions and user working environments. As another example, the data stream 180 can combine user activity logs, environmental sensor readings, and external news feeds to create a holistic view of both digital and physical context that influences user information needs and decision-making processes. Additionally, the data stream 180 can include metadata and quality indicators that help the event coordination system 100 assess the reliability and relevance of different information sources, enabling appropriate weighting and filtering of data inputs to ensure accurate analysis and prediction generation.

In some implementations, a unified data structure 182 can serve as the central repository and organizational framework that combines and standardizes information from the data stream 180 into a coherent, queryable format for analysis by the event coordination system 100. The unified data structure 182 can implement graph-based data models, relational schemas, or hybrid approaches (e.g., property graphs, knowledge graphs, multi-dimensional arrays, and/or the like) that preserve relationships between different data elements while enabling efficient querying and analysis operations. The unified data structure 182 can include semantic mapping and normalization processes (e.g., entity resolution, schema alignment, data type conversion, and/or the like) that transform diverse data formats from different sources into standardized representations that can be consistently processed by analysis algorithms. For example, the unified data structure 182 can combine user activity logs from multiple applications, calendar events, email metadata, and project management updates into a single graph structure that shows relationships between people, projects, documents, and time-based events. As another example, the unified data structure 182 can integrate customer data from sales systems, support tickets from service platforms, and external market intelligence into a comprehensive customer knowledge graph that enables holistic analysis of customer relationships and business opportunities. Additionally, the unified data structure 182 can maintain temporal indexing and versioning capabilities that preserve the historical evolution of data relationships and enable time-based queries that support pattern recognition and trend analysis for improved prediction accuracy.

In some implementations, a session record 184 can represent a structured data representation that captures the complete context and state information for a specific user runtime session, serving as the foundation for analysis and prediction generation. The session record 184 can include comprehensive information about the user's current activities (e.g., active applications, open documents, running queries, and/or the like), environmental conditions (e.g., time context, calendar events, system resources, and/or the like), and historical context that collectively define the session's characteristics and potential future directions. The session record 184 can be dynamically updated as new session events occur (e.g., user actions, system notifications, external triggers, and/or the like) to maintain an accurate and current representation of the evolving session context. For example, the session record 184 can include information showing that the user is currently editing a budget proposal document, has financial databases queried in background processes, has a stakeholder meeting scheduled in one hour, and has previously followed similar patterns that led to requests for variance analysis reports. As another example, the session record 184 can capture that the user is participating in a client video conference, has project documentation open, has received recent notifications about project delays, and has historically needed updated timeline information in similar contexts. Additionally, the session record 184 can include confidence scores and probability assessments that indicate the reliability of different context elements and the likelihood of various predicted outcomes, enabling the event coordination system 100 to make informed decisions about which predictions to prioritize and which preliminary actions to execute.

In some implementations, session events 186 can represent the specific, discrete actions and occurrences that are recorded within the session record 184 and serve as the primary input signals for pattern recognition and prediction algorithms. The session events 186 can include user-initiated actions (e.g., file operations, communication activities, data queries, and/or the like), system-generated events (e.g., notifications, automated processes, scheduled tasks, and/or the like), and external triggers (e.g., incoming data, environmental changes, third-party notifications, and/or the like) that collectively contribute to understanding session dynamics and future trajectories. The session events 186 can be categorized and weighted according to their significance and predictive value (e.g., high-impact events that indicate major context shifts, routine events that follow established patterns, anomalous events that suggest unusual circumstances, and/or the like) to enable appropriate processing by analysis algorithms. For example, the session events 186 can include a sequence showing the user opening quarterly financial reports, accessing competitor analysis databases, and receiving calendar reminders about board presentations, which collectively suggest the user will soon need comparative performance metrics and presentation-ready visualizations. As another example, the session events 186 can capture the user joining a crisis management meeting, accessing incident response procedures, and receiving real-time alerts about system outages, indicating the user will likely need escalation procedures, communication templates, and recovery timeline information. Additionally, the session events 186 can be correlated with historical patterns from similar sessions to identify recurring sequences and behavioral tendencies that enable accurate prediction of subsequent user actions and information requirements.

In some implementations, an environment state 188 can represent the comprehensive contextual conditions and parameters that characterize the current situation within the runtime session 166, providing the foundational context for prediction and analysis algorithms. The environment state 188 can include various contextual dimensions (e.g., temporal context, user activity patterns, system resource availability, and/or the like) that collectively define the current working situation and influence the likelihood of different future scenarios and user information needs. The environment state 188 can be continuously updated as new information becomes available (e.g., user actions, system changes, external events, and/or the like) to maintain an accurate representation of the evolving context that enables responsive prediction adjustments and timely preliminary action execution. For example, the environment state 188 can indicate that the user is in a high-focus work period based on calendar blocking, has multiple financial analysis tools active, has approaching deadline pressures based on project timelines, and has historically requested budget variance reports in similar contexts. As another example, the environment state 188 can show that the user is in a collaborative meeting context, has project documentation actively accessed, has received recent notifications about resource constraints, and has previously needed alternative solution proposals when similar conditions occurred. Additionally, the environment state 188 can include confidence metrics and uncertainty quantification that indicate the reliability of different contextual assessments and the stability of current conditions, enabling the event coordination system 100 to make informed decisions about prediction confidence levels and the appropriate timing for preliminary action execution.

In some implementations, historical records 190 can provide the foundational dataset of past user sessions, activities, and outcomes that enable pattern recognition and predictive modeling within the event coordination system 100. The historical records 190 can include comprehensive archives of previous runtime sessions (e.g., session records, event sequences, environment states, and/or the like) along with their associated outcomes and user feedback that collectively form the training data for machine learning algorithms and pattern recognition systems. The historical records 190 can be organized and indexed according to various criteria (e.g., user profiles, activity types, temporal patterns, and/or the like) to enable efficient retrieval of relevant historical examples that match current session characteristics and context conditions. For example, the historical records 190 can include thousands of previous sessions where users worked on quarterly budget analysis, showing common patterns such as the typical sequence of accessing financial data followed by competitor analysis, then presentation preparation, with specific timing patterns and information needs at each stage. As another example, the historical records 190 can comprise records of crisis management sessions showing how users typically progress from initial incident detection through escalation procedures to resolution activities, with documented information needs and successful intervention points throughout the process. Additionally, the historical records 190 can include outcome tracking and feedback data that indicate which predictions were accurate, which preliminary actions were helpful, and which interventions were poorly timed, enabling continuous learning and improvement of the prediction algorithms and action generation processes.

In some implementations, a data retrieval module 121 can serve as the primary interface component responsible for collecting, normalizing, and ingesting information from all connected data sources into the event coordination system 100 for subsequent processing and analysis. The data retrieval module 121 can implement various data collection mechanisms (e.g., API polling, webhook receivers, database change data capture, and/or the like) that enable real-time monitoring of user activities, system events, and environmental changes across diverse computing platforms and external services. The data retrieval module 121 can include data normalization and transformation capabilities (e.g., schema mapping, format conversion, semantic enrichment, and/or the like) that standardize diverse data formats from different sources into consistent representations that can be processed by downstream analysis components. For example, the data retrieval module 121 can simultaneously monitor user email activities through IMAP connections, track document editing through application APIs, capture database queries through transaction log monitoring, and collect environmental sensor readings through IoT device interfaces, normalizing all these diverse data streams into standardized event formats. As another example, the data retrieval module 121 can retrieve customer interaction data from CRM systems, project status updates from management platforms, and external market intelligence from third-party services, transforming all this information into unified data structures that preserve semantic relationships and temporal sequences. Additionally, the data retrieval module 121 can implement intelligent caching and buffering mechanisms that optimize data collection performance while ensuring data consistency and minimizing the impact on source systems, enabling scalable monitoring of large numbers of data sources without degrading system performance.

In some implementations, a state synthesization module 122 can process the normalized data from the data retrieval module 121 to create comprehensive, unified representations of user context and environmental conditions that serve as the foundation for prediction and analysis algorithms. The state synthesization module 122 can implement graph construction algorithms, semantic processing techniques, and contextual analysis methods (e.g., entity resolution, relationship extraction, temporal correlation, and/or the like) that combine disparate data elements into coherent knowledge structures that capture the full complexity of user working environments. The state synthesization module 122 can maintain dynamic knowledge graphs or similar structured representations (e.g., property graphs, semantic networks, multi-dimensional state spaces, and/or the like) that preserve relationships between users, activities, resources, and environmental factors while enabling efficient querying and analysis operations. For example, the state synthesization module 122 can combine user calendar events, document access patterns, email communications, and project management updates into a unified graph structure that shows how the user's current budget analysis work relates to upcoming board presentations, recent competitor activities, and historical performance patterns. As another example, the state synthesization module 122 can integrate customer service tickets, sales pipeline updates, product development milestones, and market intelligence into a comprehensive business context graph that enables holistic analysis of customer relationships and business opportunities. Additionally, the state synthesization module 122 can implement temporal indexing and versioning capabilities that track how context evolves over time, enabling analysis of trends, patterns, and causal relationships that improve the accuracy of prediction algorithms and the relevance of generated insights.

In some implementations, a record alignment module 123 can analyze current session characteristics against historical records 190 to identify similar past sessions and behavioral patterns that inform prediction algorithms and enable accurate forecasting of user information needs. The record alignment module 123 can implement similarity matching algorithms, pattern recognition techniques, and correlation analysis methods (e.g., sequence alignment, graph matching, statistical correlation, and/or the like) that compare current session features with historical examples to identify relevant precedents and analogous situations. The record alignment module 123 can evaluate multiple dimensions of similarity (e.g., activity sequences, temporal patterns, environmental conditions, and/or the like) to generate comprehensive similarity scores and confidence metrics that indicate the relevance and reliability of historical matches for prediction purposes. For example, the record alignment module 123 can identify that the current session involving budget document editing, competitor database queries, and upcoming board meeting scheduling closely matches fifteen historical sessions where users subsequently requested variance analysis reports and presentation templates within specific time windows. As another example, the record alignment module 123 can determine that the current crisis management session with incident detection, team notification, and escalation procedures matches historical patterns where users needed communication templates, recovery procedures, and stakeholder update formats at predictable intervals. Additionally, the record alignment module 123 can implement adaptive learning mechanisms that continuously refine similarity matching criteria based on prediction outcomes and user feedback, improving the accuracy of historical pattern identification and the relevance of aligned records for future prediction tasks.

In some implementations, an event prediction module 124 can utilize the aligned historical records and current session context to generate predicted events 194 that anticipate future user actions and information needs within the runtime session 166. The event prediction module 124 can implement machine learning algorithms, statistical modeling techniques, and causal reasoning methods (e.g., sequence prediction models, probabilistic graphical models, neural networks, and/or the like) that analyze patterns in historical data and current context to forecast likely future events and user behaviors. The event prediction module 124 can generate multiple prediction scenarios with associated probability scores (e.g., realization parameters indicating likelihood of occurrence, confidence intervals for timing predictions, alternative scenario probabilities, and/or the like) that enable informed decision-making about which predictions to prioritize and which preliminary actions to prepare. For example, the event prediction module 124 can predict that based on current budget analysis activities and historical patterns, the user has an 85% probability of requesting competitor pricing comparisons within the next 30 minutes, a 70% probability of needing variance analysis reports within one hour, and a 60% probability of requesting presentation templates before the end of the current session. As another example, the event prediction module 124 can forecast that given current project meeting participation and recent delay notifications, the user will likely need updated timeline information with 90% probability, alternative resource allocation options with 75% probability, and risk mitigation strategies with 65% probability within the next session period. Additionally, the event prediction module 124 can incorporate uncertainty quantification and sensitivity analysis that assess how prediction confidence varies with different assumptions and contextual changes, enabling robust prediction generation that accounts for environmental variability and user behavior uncertainty.

In some implementations, a prioritization module 125 can evaluate the predicted events 194 generated by the event prediction module 124 to selectively determine prioritized events 195 that represent the most likely and impactful predictions worthy of preliminary action preparation. The prioritization module 125 can implement multi-criteria decision analysis, utility optimization algorithms, and resource allocation methods (e.g., weighted scoring models, Pareto optimization, constraint satisfaction, and/or the like) that consider various factors such as prediction confidence, potential impact, resource requirements, and timing constraints to rank predicted events according to their priority for preliminary action generation. The prioritization module 125 can dynamically adjust prioritization criteria based on current context conditions (e.g., user workload, system resources, deadline pressures, and/or the like) and historical feedback about the effectiveness of different types of preliminary actions in similar situations. For example, the prioritization module 125 can determine that among multiple predicted events, the request for competitor pricing analysis should receive highest priority due to its 85% probability, high business impact, and moderate resource requirements, while presentation template requests receive lower priority despite reasonable probability due to lower immediate impact and higher resource costs. As another example, the prioritization module 125 can prioritize timeline update requests over alternative resource options based on higher prediction confidence, greater user urgency indicators, and lower computational complexity for preliminary preparation. Additionally, the prioritization module 125 can implement dynamic re-prioritization capabilities that adjust priority rankings as new information becomes available or as session context evolves, ensuring that preliminary action resources are allocated to the most valuable and timely predictions throughout the session duration.

In some implementations, an event generation module 126 can process the prioritized events 195 to create preliminary events 196 that include specific activation criterions and executable actions designed to proactively address predicted user information needs before explicit requests occur. The event generation module 126 can implement action planning algorithms, template generation systems, and execution orchestration methods (e.g., workflow engines, rule-based systems, generative models, and/or the like) that translate high-level predictions into concrete, executable preliminary actions with appropriate timing and delivery mechanisms. The event generation module 126 can generate various types of preliminary events (e.g., information pre-computation, interface preparation, notification scheduling, and/or the like) that are tailored to specific prediction types and user preferences while incorporating activation criterions that ensure appropriate timing and context-sensitive execution. For example, the event generation module 126 can create a preliminary event that pre-computes competitor pricing analysis reports and prepares them for delivery when the user's session context indicates active budget comparison activities, with activation criterions that trigger delivery when specific budget documents are accessed or when competitor-related queries are detected. As another example, the event generation module 126 can generate a preliminary event that prepares updated project timeline visualizations and stakeholder communication templates, with activation criterions that trigger presentation when meeting participation is detected or when timeline-related keywords appear in user communications. Additionally, the event generation module 126 can incorporate user preference learning and feedback mechanisms that customize preliminary event characteristics based on individual user working styles, preferred information formats, and historical response patterns to generated preliminary actions.

In some implementations, an interface module 127 can coordinate the execution of preliminary events 196 through appropriate user interface mechanisms and manage the delivery of proactive insights and information to the user 160 through contextually appropriate channels and timing. The interface module 127 can implement multi-modal delivery systems, notification management algorithms, and user experience optimization methods (e.g., adaptive interfaces, intelligent notification scheduling, context-aware presentation, and/or the like) that ensure preliminary events are delivered in ways that enhance rather than disrupt user productivity and workflow continuity. The interface module 127 can manage various delivery mechanisms (e.g., embedded interface elements, conversational interfaces, overlay notifications, and/or the like) and dynamically select appropriate presentation methods based on current user context, preliminary event characteristics, and historical user preferences for different types of information delivery. For example, the interface module 127 can execute event execution 198 by presenting competitor analysis results through embedded sidebar panels in the user's budget application when budget comparison activities are detected, while delivering timeline updates through modal overlays when urgent project delays are identified. As another example, the interface module 127 can coordinate delivery of preliminary insights through conversational interfaces when users are in exploratory information-gathering modes, while using subtle notification indicators when users are in focused work periods that should not be interrupted. Additionally, the interface module 127 can implement feedback collection and user interaction tracking that monitors how users respond to different types of preliminary event delivery, enabling continuous optimization of delivery timing, presentation formats, and interaction mechanisms to maximize user satisfaction and preliminary event effectiveness.

The components shown in FIGS. 1A-1B are merely illustrative, and well-known components are omitted for brevity. As shown in FIG. 1B, the computing server 102 includes a processor 110, a memory 120, a wireless communication circuitry 130 to establish wireless communication and/or information channels (e.g., Wi-Fi, internet, APIs, communication standards) with other computing devices and/or services (e.g., servers, databases, cloud infrastructure), and a display 140 (e.g., user interface). The processor 110 can have generic characteristics similar to general-purpose processors, or the processor 110 can be an application-specific integrated circuit (ASIC) that provides arithmetic and control functions to the computing server 102. While not shown, the processor 110 can include a dedicated cache memory. The processor 110 can be coupled to all components of the computing server 102, either directly or indirectly, for data communication. Further, the processor 110 of the computing server 102 can be communicatively coupled to a computing database 104 that is hosted alongside the computing server 102 on the core network 1206 described in reference to FIG. 12. As shown, the computing database 104 can include runtime session records 150, unified state structures 151, model ensembles 152, provenance ledgers 153, cache memory 154, and/or interface protocols 155.

The memory 120 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 110, the memory 120 can also store data generated by the processor 110 (e.g., when executing the modules of an optimization platform). In additional, or alternative, embodiments, the processor 110 can store temporary information onto the memory 120 and store long-term data onto the computing database 104. The memory 120 is merely an abstract representation of a storage environment. Hence, in some embodiments, the memory 120 comprises one or more actual memory chips or modules.

As shown in FIG. 1B, modules of the memory 120 can include a data retrieval module 121, a state synthesization module 122, a record alignment module 123, an event prediction module 124, a prioritization module 125, an event generation module 126, an interface module 127, and/or a provenance module 128. Other implementations of the computing server 102 include additional, fewer, or different modules, or distribute functionality differently between the modules. As used herein, the term "module" and/or "engine" refers broadly to software components, firmware components, and/or hardware components. Accordingly, the modules 121-128 could each comprise software, firmware, and/ or hardware components implemented in, or accessible to, the computing server 102.

In some implementations, the processor 110 can execute computational instructions and perform data processing operations that enable the event coordination system 100 to analyze user activities and generate predictive insights. The processor 110 can include central processing units (e.g., Intel x86 processors, AMD processors, ARM-based processors, application-specific integrated circuits, and/or the like) that provide arithmetic logic units for mathematical computations, control units for instruction execution sequencing, and register sets for temporary data storage during processing operations. The processor 110 can implement instruction pipelines that enable parallel execution of multiple operations, branch prediction mechanisms that optimize conditional logic processing, and cache hierarchies that provide high-speed access to frequently used data and instructions. The processor 110 can coordinate with other system components by executing software instructions stored in the memory 120, processing data retrieved from the computing database 104, and managing communication protocols through the wireless communication circuitry 130. The processor 110 can implement multi-threading capabilities that enable concurrent execution of multiple processing tasks, allowing the system to simultaneously handle data retrieval operations, state analysis computations, and user interface updates without performance degradation. For example, the processor 110 can execute machine learning inference algorithms within the event prediction module 124 while simultaneously processing real-time data streams from external sources and updating the unified state structures 151 in the computing database 104, enabling the system to maintain current awareness of user context while generating predictive insights about future information needs. The processor 110 can also coordinate the execution of similarity analysis algorithms within the record alignment module 123, performing complex graph matching computations that compare current user session patterns with historical records 190 to identify relevant precedents for predictive modeling.

In some implementations, the memory 120 can store software modules and runtime data that enable the event coordination system 100 to maintain operational state and execute analytical processes. The memory 120 can include volatile storage systems (e.g., static random-access memory, dynamic random-access memory, cache memory, buffer memory, and/or the like) that provide high-speed access to actively used program instructions and temporary data structures during system operation. The memory 120 can implement memory management systems that allocate storage space for different software modules, manage data lifecycle operations, and optimize memory utilization to prevent resource conflicts and performance bottlenecks. The memory 120 can maintain program execution contexts that preserve the operational state of each software module, enabling seamless coordination between different system components and ensuring data consistency across concurrent processing operations. The memory 120 can also include memory protection mechanisms that isolate different software modules and prevent unauthorized access to sensitive data structures and program instructions. The memory 120 can store intermediate processing results generated by analytical modules, enabling complex multi-stage computations that build upon previous analysis outcomes to generate comprehensive predictive insights. For example, the memory 120 can maintain runtime data structures that store partially processed session records 184 while the state synthesization module 122 builds unified context representations, allowing the system to incrementally construct comprehensive user environment states 188 as new information becomes available from various data sources. The memory 120 can also store machine learning model parameters and inference results generated by the event prediction module 124, enabling the system to maintain predictive state information that can be quickly accessed when generating preliminary events 196 for proactive user assistance.

In some implementations, the wireless communication circuitry 130 can establish network connections and data exchange channels that enable the event coordination system 100 to access external information sources and communicate with remote services. The wireless communication circuitry 130 can include network interface controllers (e.g., Wi-Fi adapters, Ethernet controllers, cellular modems, Bluetooth transceivers, and/or the like) that implement communication protocols for different types of network connections and data transmission requirements. The wireless communication circuitry 130 can manage authentication and encryption processes that ensure secure data transmission while maintaining compliance with network security policies and regulatory requirements. The wireless communication circuitry 130 can implement connection management algorithms that monitor network availability, handle connection failures, and optimize data transmission performance based on network conditions and bandwidth availability. The wireless communication circuitry 130 can coordinate with the data retrieval module 121 to establish connections with external data sources 178, enabling the system to access real-time information from third-party services, government databases, and commercial data providers. The wireless communication circuitry 130 can also facilitate communication with the computing service 170 and network service 174 to access distributed computing resources and external API endpoints that provide specialized data processing capabilities. For example, the wireless communication circuitry 130 can establish secure HTTPS connections with financial market data providers to retrieve real-time stock prices and economic indicators that inform the context analysis performed by the state synthesization module 122, enabling the system to incorporate external market conditions into user environment state representations. The wireless communication circuitry 130 can also manage Web-Socket connections with real-time collaboration platforms to monitor team communication activities and project updates that influence the predictive analysis performed by the event prediction module 124.

In some implementations, the display 140 can provide visual output capabilities that enable the event coordination system 100 to present information and interactive interfaces to users. The display 140 can include visual presentation systems (e.g., liquid crystal displays, organic light-emitting diode screens, electronic paper displays, projection systems, and/or the like) that render graphical user interfaces, data visualizations, and textual information for user consumption. The display 140 can implement graphics processing capabilities that handle rendering operations for complex visual elements including charts, graphs, interactive widgets, and multimedia content that present analytical insights and system recommendations. The display 140 can coordinate with the interface module 127 to present preliminary events 196 through various visual presentation modes including embedded interface elements, modal overlays, notification banners, and contextual tooltips that deliver proactive assistance without disrupting user workflows. The display 140 can also implement adaptive presentation mechanisms that adjust visual layouts, color schemes, and information density based on user preferences, viewing conditions, and content requirements. The display 140 can support multi-window and multi-application display modes that enable users to simultaneously view different types of information and interact with multiple system components concurrently. For example, the display 140 can present financial analysis dashboards that show real-time market data alongside predictive insights generated by the event prediction module 124, enabling users to see both current conditions and anticipated future developments in a unified visual interface. The display 140 can also render conversational interfaces that allow users to interact with the system through natural language queries, displaying both user inputs and system responses in a chat-like format that facilitates exploratory analysis of the unified state structures 151 maintained in the computing database 104.

In some implementations, the data retrieval module 121 can obtain information from diverse sources and transform the data into standardized formats that support analytical processing within the event coordination system 100. The data retrieval module 121 can include connector frameworks (e.g., database drivers, API clients, file system interfaces, message queue consumers, and/or the like) that implement source-specific communication protocols and handle the technical complexities of accessing different types of data repositories. The data retrieval module 121 can execute data extraction algorithms that identify relevant information based on query parameters, filtering criteria, and contextual requirements specified by other system modules, ensuring that only pertinent data is retrieved and processed. The data retrieval module 121 can implement data transformation pipelines that convert retrieved information from source-specific formats into standardized data structures that can be processed by the state synthesization module 122 and stored in the unified state structures 151. The data retrieval module 121 can also include caching mechanisms that store frequently accessed data in the cache memory 154 to optimize performance and reduce redundant network operations. The data retrieval module 121 can coordinate with the wireless communication circuitry 130 to establish connections with external data sources 178 and retrieve information that enhances the contextual awareness of user environment states 188. For example, the data retrieval module 121 can connect to customer relationship management systems using REST API protocols to extract client interaction histories, contact information, and transaction records, then transform this information into standardized entity-relationship structures that can be integrated into the unified data structure 182 for comprehensive customer context analysis. The data retrieval module 121 can also interface with project management platforms to retrieve task assignments, timeline information, and resource allocation data, converting this information into temporal data structures that support the pattern recognition algorithms used by the record alignment module 123 to identify similar historical project contexts.

In some implementations, the state synthesization module 122 can create comprehensive context representations by combining information from multiple sources into unified knowledge structures within the event coordination system 100. The state synthesization module 122 can include semantic processing engines (e.g., natural language processing systems, entity recognition algorithms, relationship extraction models, knowledge graph construction tools, and/or the like) that analyze textual and structured data to identify meaningful entities, relationships, and concepts that define user operational contexts. The state synthesization module 122 can implement graph construction algorithms that build interconnected data structures by linking related information elements and maintaining referential integrity across diverse data sources accessed through the data retrieval module 121. The state synthesization module 122 can execute temporal analysis processes that track how information and relationships evolve over time, enabling the system to understand the dynamic nature of user environment states 188 and their influence on future user activities. The state synthesization module 122 can generate unified state structures 151 that serve as comprehensive representations of user contexts, organizational conditions, and environmental factors that influence user behavior and information needs. The state synthesization module 122 can also implement context aggregation functions that combine current session information with historical patterns stored in the runtime session records 150 to create comprehensive situational awareness for predictive analysis. For example, the state synthesization module 122 can analyze email communications retrieved by the data retrieval module 121, extract entity mentions and relationship indicators using natural language processing algorithms, and construct knowledge graph representations that connect people, organizations, projects, and topics mentioned in the communications, creating unified context representations that inform the predictive analysis performed by the event prediction module 124. The state synthesization module 122 can also process calendar data, document access logs, and application usage patterns to build temporal activity models that capture user work rhythms and project engagement patterns, enabling the system to understand when users are likely to need specific types of information or assistance.

In some implementations, the record alignment module 123 can identify and match similar patterns between current user sessions and historical data to support predictive analysis within the event coordination system 100. The record alignment module 123 can include similarity analysis algorithms (e.g., cosine similarity calculations, edit distance measurements, graph matching techniques, machine learning-based similarity models, and/or the like) that compare session records across multiple dimensions including temporal patterns, entity relationships, and contextual attributes derived from the unified state structures 151. The record alignment module 123 can implement pattern matching processes that analyze current user activities against historical records 190 to identify past sessions with similar characteristics, enabling the system to leverage previous experiences for predicting future user needs and behaviors. The record alignment module 123 can execute alignment scoring mechanisms that quantify the degree of similarity between different session records and rank historical matches based on relevance and predictive value for current user contexts. The record alignment module 123 can generate aligned records 192 that represent collections of historical sessions sharing similar patterns with current user activities, providing the foundation for pattern-based prediction algorithms used by the event prediction module 124. The record alignment module 123 can also implement dynamic similarity thresholds that adapt based on the availability of historical data and the specificity of current user contexts, ensuring that alignment processes identify the most relevant historical precedents. For example, the record alignment module 123 can compare a current financial analysis session characterized by specific market conditions, client interactions, and data access patterns with historical sessions stored in the runtime session records 150, using graph matching algorithms to identify past sessions where users engaged in similar analytical activities under comparable circumstances, enabling the system to predict what information sources, analytical tools, and communication activities the user can need based on successful patterns from similar historical contexts. The record alignment module 123 can also analyze project management sessions by comparing team composition, project scope, timeline constraints, and resource availability patterns with historical project records, identifying precedents that inform predictions about potential challenges, resource requirements, and stakeholder communication needs.

In some implementations, the event prediction module 124 can analyze current user context and historical patterns to generate predicted events 194 that represent likely future activities and information needs within the event coordination system 100. The event prediction module 124 can include machine learning models (e.g., recurrent neural networks, transformer architectures, decision trees, ensemble methods, and/or the like) stored in the model ensembles 152 that process sequential data and contextual information to identify patterns that precede specific types of user activities. The event prediction module 124 can implement predictive algorithms that consider multiple factors including current user activities captured in session events 186, environmental conditions represented in the unified state structures 151, historical patterns identified by the record alignment module 123, and external events accessed through the data retrieval module 121 to generate probabilistic forecasts of future user actions and information requirements. The event prediction module 124 can execute confidence scoring mechanisms that assess the likelihood of predicted events occurring and provide uncertainty estimates that inform the prioritization processes performed by the prioritization module 125. The event prediction module 124 can generate predicted events 194 that include structured predictions specifying event types, probability scores, timing estimates, and associated parameters that define what actions users are likely to take and what information they can need in future interactions with the system. The event prediction module 124 can also implement continuous learning capabilities that update prediction models based on observed user behaviors and prediction accuracy metrics. For example, the event prediction module 124 can analyze a user's current document review activities combined with calendar information and communication patterns to predict that the user can need to schedule stakeholder meetings, request additional financial data from specific sources, and prepare executive summary reports, generating these predictions with associated probability scores and timing estimates based on similar patterns observed in the aligned records 192 identified by the record alignment module 123. The event prediction module 124 can also process customer service contexts by analyzing current case information, customer history, and product data to predict that users can need to access technical documentation, consult with subject matter experts, and prepare follow-up communications, enabling the system to proactively prepare relevant information and resources.

In some implementations, the prioritization module 125 can evaluate and rank predicted events 194 to identify prioritized events 195 that represent the most likely and impactful future activities within the event coordination system 100. The prioritization module 125 can include multi-criteria decision analysis algorithms (e.g., weighted scoring models, analytic hierarchy processes, utility functions, machine learning-based ranking systems, and/or the like) that assess predicted events across multiple dimensions including probability of occurrence, potential impact on user productivity, time sensitivity, and resource requirements for proactive assistance. The prioritization module 125 can implement scoring mechanisms that combine quantitative metrics derived from the event prediction module 124 with contextual factors extracted from the unified state structures 151 to generate comprehensive priority rankings that guide system resource allocation and proactive assistance strategies. The prioritization module 125 can execute dynamic adjustment processes that update priority scores based on changing conditions, user feedback collected through the interface module 127, and real-time context evolution captured in the runtime session records 150. The prioritization module 125 can generate prioritized events 195 that include ranked lists of predicted activities with priority scores, confidence intervals, timing estimates, and resource requirements that enable the system to focus computational resources on the most valuable predictive assistance opportunities. The prioritization module 125 can also implement threshold management mechanisms that determine which predicted events warrant proactive assistance based on available system resources and user attention management considerations. For example, the prioritization module 125 can rank predicted events for a financial analyst by assigning higher priority scores to time-sensitive market analysis tasks that can impact investment decisions while assigning lower priority scores to routine reporting activities that have flexible deadlines, using weighted scoring algorithms that consider factors such as market volatility, client importance, and regulatory deadlines extracted from the unified state structures 151. The prioritization module 125 can also evaluate customer service predictions by emphasizing high-value customer interactions and urgent issue resolution needs over routine administrative tasks, incorporating customer relationship data and service level agreements into the priority scoring calculations.

In some implementations, the event generation module 126 can create preliminary events 196 that represent proactive system actions designed to assist users before they explicitly request help within the event coordination system 100. The event generation module 126 can include generative algorithms (e.g., template-based generation systems, neural language models, rule-based composition engines, hybrid generation approaches, and/or the like) that create actionable system responses based on prioritized events 195 received from the prioritization module 125 and current user context information stored in the unified state structures 151. The event generation module 126 can implement content generation processes that produce user-facing outputs including information summaries, question suggestions, action recommendations, and interactive interface elements that anticipate user needs based on predictive analysis results. The event generation module 126 can execute activation criterion definition processes that specify the runtime parameter conditions under which preliminary events should be executed, ensuring that proactive assistance is delivered at appropriate times and contexts when users can benefit most from the assistance. The event generation module 126 can generate preliminary events 196 that include executable system actions such as information retrieval operations, interface modifications, notification generation, and data preprocessing tasks that prepare resources and present information to users before explicit requests are made. The event generation module 126 can also implement personalization mechanisms that adapt generated content and recommendations based on user preferences, historical interaction patterns, and current work contexts. For example, the event generation module 126 can create preliminary events that precompute financial analysis summaries when the prioritization module 125 identifies high-priority predictions indicating that a user can need quarterly performance data, generating interactive charts, key performance indicators, and comparative analysis reports that can be immediately available when the user begins their analysis work, with activation criterions defined to trigger these preliminary events when the user accesses financial applications or opens related documents. The event generation module 126 can also generate preliminary events that prepare customer interaction histories, product recommendations, and pricing information when prioritized predictions indicate that a user can engage in sales activities with specific clients, creating comprehensive customer profiles and sales support materials that can be presented through the interface module 127 when the user initiates customer-related activities.

In some implementations, the interface module 127 can coordinate the delivery and execution of preliminary events 196 through various user interface mechanisms to provide seamless proactive assistance within the event coordination system 100. The interface module 127 can include multi-modal presentation systems (e.g., graphical user interfaces, conversational interfaces, notification systems, embedded interface elements, and/or the like) that deliver information and recommendations through appropriate channels based on user preferences and contextual factors stored in the interface protocols 155. The interface module 127 can implement adaptive delivery mechanisms that select optimal presentation methods based on the urgency of information, user attention state, and interface availability, coordinating with the display 140 to render appropriate visual presentations. The interface module 127 can execute feedback collection processes that monitor user responses to proactive assistance and adjust future delivery strategies based on user acceptance and effectiveness metrics, storing this feedback information in the runtime session records 150 for continuous system improvement. The interface module 127 can coordinate event execution 198 that represents the actual delivery of proactive assistance to users through various interface channels, completing the cycle of predictive analysis and proactive support initiated by other system modules. The interface module 127 can also implement interruption management algorithms that balance the goal of providing timely information against avoiding user workflow disruption, using contextual awareness to determine appropriate timing for proactive assistance delivery. For example, the interface module 127 can deliver financial analysis insights generated by the event generation module 126 through embedded dashboard widgets that appear contextually when users access financial applications, providing immediate access to relevant data and analysis without interrupting user workflows, while also enabling users to explore additional details through conversational interfaces that allow natural language queries about the presented information. The interface module 127 can also coordinate the delivery of project management insights through notification systems that alert users to potential issues and opportunities while providing direct links to relevant tools and information resources stored in the computing database 104, ensuring that users can quickly access detailed information when proactive assistance identifies actionable opportunities.

In some implementations, a provenance module 128 can track data sources and reasoning chains to maintain accountability and transparency for insights generated within the event coordination system 100. The provenance module 128 can include data lineage tracking systems (e.g., blockchain-based ledgers, cryptographic verification mechanisms, audit trail generators, metadata management systems, and/or the like) that record the origin and processing history of information used in predictive analysis and insight generation processes. The provenance module 128 can implement source attribution algorithms that identify and document the original sources of data elements used by the state synthesization module 122, record alignment module 123, and event prediction module 124 in their analytical processes. The provenance module 128 can execute reasoning chain documentation processes that capture the logical steps and computational operations performed by various system modules when generating predicted events 194 and preliminary events 196, enabling users to understand how specific insights and recommendations were derived. The provenance module 128 can maintain a provenance ledger 153 in the computing database 104 that stores immutable records of data ingestion events, source attribution information, processing history, and reasoning chains that connect evidence to conclusions. The provenance module 128 can also implement cryptographic verification mechanisms that provide tamper-evident records of data sources and analytical processes, ensuring the integrity and authenticity of provenance information. For example, the provenance module 128 can track when the data retrieval module 121 accesses customer relationship management systems, recording the specific data sources, access timestamps, and data elements retrieved, then documenting how this information is processed by the state synthesization module 122 to create unified customer context representations, and finally recording how these context representations influence the predictions generated by the event prediction module 124, creating a complete audit trail that enables users to verify the basis for customer-related insights and recommendations. The provenance module 128 can also maintain records of external data sources 178 accessed during analysis processes, documenting the reliability and authority of information sources to help users assess the credibility of insights and make informed decisions about acting on system recommendations.

In some implementations, the runtime session records 150 can store comprehensive information about user activities and system states during active computational sessions within the event coordination system 100. The runtime session records 150 can include session data structures (e.g., timestamped activity logs, state snapshots, event sequences, context parameters, and/or the like) that capture the complete operational context and user interactions that occur during specific time periods or work sessions. The runtime session records 150 can implement data serialization mechanisms that preserve session information in structured formats suitable for analysis by the record alignment module 123 and pattern recognition by the event prediction module 124. The runtime session records 150 can maintain temporal indexing systems that enable efficient retrieval of session information based on time ranges, user identifiers, and contextual attributes, supporting the historical analysis processes performed by various system modules. The runtime session records 150 can also include session state management capabilities that track the evolution of user environment states 188 over time, enabling the system to understand how user contexts change and influence subsequent activities. The runtime session records 150 can store both current session information and historical session data, providing the foundation for pattern-based prediction and similarity analysis processes. For example, the runtime session records 150 can store detailed information about a financial analysis session including the sequence of applications accessed, data sources queried, reports generated, and stakeholder communications initiated, along with contextual information such as market conditions, project deadlines, and team assignments that influenced the user's activities, enabling the record alignment module 123 to identify similar historical sessions and the event prediction module 124 to generate accurate predictions about future user needs based on established patterns. The runtime session records 150 can also maintain project management session data that documents task assignments, status updates, resource allocation decisions, and team coordination activities, providing comprehensive historical context that informs predictive analysis for similar future project scenarios.

In some implementations, the unified state structures 151 can maintain comprehensive representations of user contexts, organizational conditions, and environmental factors that influence user behavior within the event coordination system 100. The unified state structures 151 can include graph-based data models (e.g., property graphs, knowledge graphs, semantic networks, entity-relationship structures, and/or the like) that capture relationships between different data elements and enable complex queries across interconnected information processed by the state synthesization module 122. The unified state structures 151 can implement data integration mechanisms that combine information from multiple sources accessed through the data retrieval module 121, resolving entity relationships, eliminating duplicate information, and maintaining referential integrity across diverse data types. The unified state structures 151 can provide indexing and caching capabilities that enable efficient data retrieval and support real-time query processing for interactive user applications coordinated through the interface module 127. The unified state structures 151 can also include temporal data management systems that track how information and relationships change over time, maintaining historical versions of context data for trend analysis and pattern recognition processes. The unified state structures 151 can serve as the primary source of contextual information for predictive analysis performed by the event prediction module 124 and priority assessment conducted by the prioritization module 125. For example, the unified state structures 151 can maintain comprehensive customer relationship graphs that connect contact information, communication history, transaction records, and social media interactions to create holistic customer profiles that inform sales and support activities, with these structures being continuously updated as new information becomes available through the data retrieval module 121 and processed by the state synthesization module 122. The unified state structures 151 can also store project knowledge representations that link task assignments, team member profiles, resource allocations, timeline information, and deliverable specifications to provide comprehensive project visibility that supports planning and risk assessment processes performed by various system modules.

In some implementations, the model ensembles 152 can house collections of machine learning models that provide specialized analytical capabilities for different aspects of predictive analysis within the event coordination system 100. The model ensembles 152 can include diverse model types (e.g., neural networks, decision trees, ensemble methods, natural language processing models, and/or the like) that are optimized for specific tasks such as pattern recognition, similarity analysis, event prediction, and content generation. The model ensembles 152 can implement model management systems that handle model versioning, performance monitoring, and automated model selection based on task requirements and computational constraints. The model ensembles 152 can provide model serving capabilities that enable the event prediction module 124, record alignment module 123, and event generation module 126 to access appropriate models for their analytical processes. The model ensembles 152 can also include model optimization mechanisms that implement techniques such as quantization, pruning, and knowledge distillation to reduce computational requirements while maintaining prediction accuracy. The model ensembles 152 can support both large general-purpose models for complex reasoning tasks and small specialized models for fast inference operations that require low latency responses. For example, the model ensembles 152 can store transformer-based language models that the event generation module 126 uses to generate natural language summaries and recommendations, along with lightweight classification models that the event prediction module 124 uses for real-time activity categorization and pattern recognition, enabling the system to balance computational efficiency with analytical capability based on specific task requirements. The model ensembles 152 can also maintain similarity analysis models that the record alignment module 123 uses to compare current user sessions with historical records 190, including both graph-based similarity models for structural pattern matching and sequence-based models for temporal pattern analysis.

In some implementations, the cache memory 154 can provide high-performance data storage that optimizes system responsiveness and reduces computational overhead within the event coordination system 100. The cache memory 154 can include multi-tier caching systems (e.g., in-memory caches, distributed caches, application-level caches, database query caches, and/or the like) that store frequently accessed data at different levels of the system architecture to minimize data retrieval latency. The cache memory 154 can implement cache management algorithms that determine what information to store, when to refresh cached data, and how to handle cache invalidation when underlying data sources are updated through the data retrieval module 121. The cache memory 154 can provide caching services for various system components including the unified state structures 151, model inference results from the model ensembles 152, and processed data from the runtime session records 150. The cache memory 154 can also implement predictive caching mechanisms that preload information likely to be needed based on user patterns and predictive analysis results from the event prediction module 124. The cache memory 154 can coordinate with other system components to ensure data consistency while maximizing performance benefits through strategic data placement and retrieval optimization. For example, the cache memory 154 can store frequently accessed customer relationship data in high-speed memory to enable rapid retrieval when the state synthesization module 122 builds customer context representations, while also caching machine learning model parameters and inference results to accelerate the predictive analysis performed by the event prediction module 124 when generating predicted events 194 for similar user contexts. The cache memory 154 can also maintain cached copies of external data retrieved through the data retrieval module 121, reducing the need for repeated network operations when accessing market data, news feeds, and other external information sources that inform the contextual analysis processes.

In some implementations, the interface protocols 155 can manage communication standards and interaction mechanisms that enable seamless coordination between system components and user interfaces within the event coordination system 100. The interface protocols 155 can include communication protocol definitions (e.g., API specifications, message formats, data exchange standards, authentication mechanisms, and/or the like) that govern how different system modules interact with each other and with external systems accessed through the wireless communication circuitry 130. The interface protocols 155 can implement protocol management systems that handle version compatibility, error handling, and performance optimization for inter-component communication within the computing server 102 and between the computing server 102 and computing database 104. The interface protocols 155 can provide standardized interfaces that enable the interface module 127 to coordinate with the display 140 for presenting preliminary events 196 through various user interface mechanisms. The interface protocols 155 can also include user interaction protocols that define how users can engage with proactive assistance features, specify feedback collection mechanisms, and establish preferences for different types of interface presentations. The interface protocols 155 can coordinate with the provenance module 128 to ensure that communication activities are properly documented and tracked for accountability and transparency purposes. For example, the interface protocols 155 can define standardized message formats that the interface module 127 uses to coordinate with the display 140 when presenting financial analysis insights, specifying how interactive dashboard elements should be rendered, how user interactions should be captured and processed, and how feedback should be collected and stored in the runtime session records 150 for continuous system improvement. The interface protocols 155 can also establish communication standards for the conversational interfaces that enable users to explore the unified state structures 151 through natural language queries, defining how user questions should be parsed, how relevant information should be retrieved and formatted, and how responses should be presented to maintain conversational context and user engagement.

Figure 2:
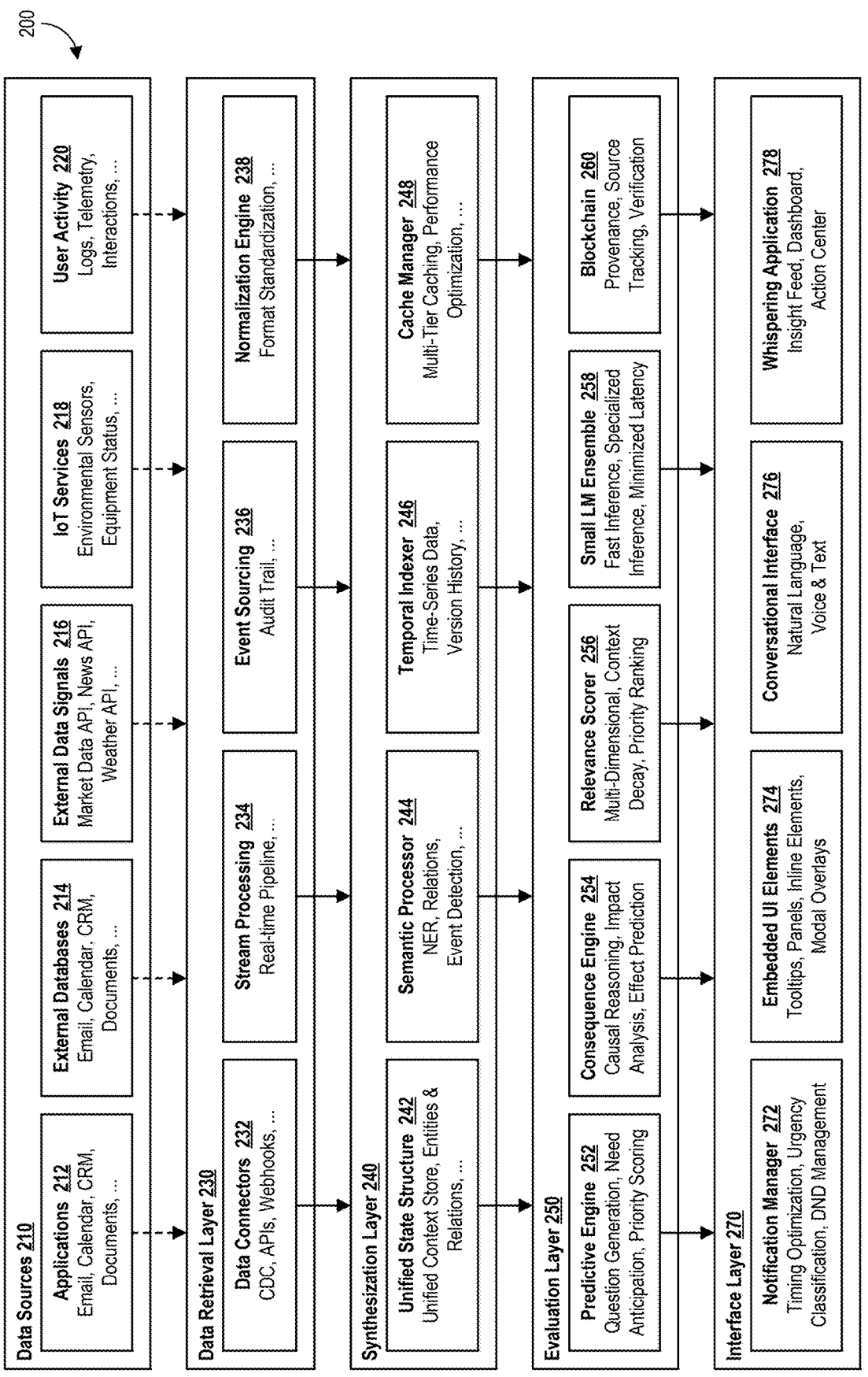
FIG. 2 is a block diagram that illustrates a system architecture comprising multiple interconnected layers for data processing and insight generation in accordance with some implementations of the present technology.

FIG. 2 is a block diagram that illustrates a system architecture comprising multiple interconnected layers for data processing and insight generation in accordance with some implementations of the present technology. In some implementations, the system architecture 200 can provide a comprehensive framework for organizing and coordinating the various computational components that enable predictive analysis and proactive assistance within the event coordination system 100. The system architecture 200 can include layered design principles (e.g., separation of concerns, modular organization, hierarchical data flow, interface abstraction, and/or the like) that organize system functionality into distinct operational tiers, each responsible for specific aspects of data processing and insight generation. The system architecture 200 can implement architectural patterns that enable scalable processing of large-volume data streams while maintaining system responsiveness and reliability through distributed computing approaches. The system architecture 200 can coordinate data flow between different processing layers through standardized interfaces and communication protocols that ensure data consistency and enable efficient resource utilization across the computing server 102 and computing database 104. The system architecture 200 can also include fault tolerance mechanisms that maintain system operation even when individual components experience failures or performance degradation. For example, the system architecture 200 can organize the processing of customer relationship management data by routing raw customer interaction records through data source collection layers, then processing this information through data transformation and analysis layers, and finally presenting insights through user interface layers, with each layer implementing specific functions such as data validation, entity recognition, relationship mapping, and presentation formatting that collectively enable comprehensive customer context analysis and predictive assistance for sales and support activities.

In some implementations, a data source layer 210 can provide comprehensive access to diverse information repositories that supply the raw data needed for contextual analysis and predictive modeling within the system architecture 200. The data source layer 210 can include data source abstraction mechanisms (e.g., connector interfaces, protocol adapters, authentication systems, data format handlers, and/or the like) that enable uniform access to heterogeneous data sources while hiding the technical complexities of different data access methods from higher-level processing components. The data source layer 210 can implement data source monitoring capabilities that track the availability, performance, and data quality characteristics of connected information sources, enabling the system to adapt to changing data source conditions and maintain reliable data access. The data source layer 210 can coordinate with the wireless communication circuitry 130 to establish and maintain connections with external systems, while also interfacing with local data repositories and real-time data streams that provide current operational information. The data source layer 210 can also include data source prioritization mechanisms that manage access to limited-bandwidth or rate-limited data sources to ensure that the most important information is retrieved first when system resources are constrained. For example, the data source layer 210 can coordinate access to multiple customer data repositories including CRM systems, email servers, social media monitoring platforms, and transaction databases, implementing connection pooling and request queuing mechanisms that optimize data retrieval performance while respecting API rate limits and authentication requirements, enabling the system to build comprehensive customer context representations that inform predictive analysis about customer service needs, sales opportunities, and relationship management activities.

In some implementations, an application module 212 can provide access to enterprise software systems that comprise structured business data and user activity information within the data source layer 210. The application module 212 can include enterprise application connectors (e.g., email system interfaces, calendar service APIs, CRM platform integrations, project management tool connections, and/or the like) that implement application-specific communication protocols and data extraction methods for accessing information stored in business software systems. The application module 212 can execute data extraction processes that retrieve user communications, scheduling information, customer relationship data, task assignments, and document access patterns from enterprise applications, transforming this information into standardized data structures suitable for processing by higher-level system components. The application module 212 can implement authentication and authorization mechanisms that ensure secure access to enterprise applications while maintaining compliance with organizational security policies and data governance requirements.

The application module 212 can also include data synchronization capabilities that monitor enterprise applications for changes and updates, enabling real-time data retrieval that keeps the system current with evolving business conditions and user activities. The application module 212 can coordinate with the data retrieval module 121 to provide structured access to enterprise data sources that inform the contextual analysis performed by the state synthesization module 122. For example, the application module 212 can connect to Microsoft Exchange™ email servers using Exchange Web Services™ protocols to extract email communications, meeting invitations, and calendar appointments, then parse message content to identify project references, stakeholder relationships, and decision points that contribute to the unified state structures 151, enabling the event prediction module 124 to anticipate when users can need to access related project documents, schedule follow-up meetings, or prepare status reports based on communication patterns and calendar commitments observed in similar historical contexts.

In some implementations, an external database module 214 can provide access to third-party data repositories and specialized information sources that enhance the contextual awareness of the system architecture 200. The external database module 214 can include database connectivity frameworks (e.g., ODBC drivers, database-specific APIs, cloud database connectors, data warehouse interfaces, and/or the like) that establish connections with external data sources 178 and handle the technical complexities of accessing different database systems and data formats. The external database module 214 can implement query optimization mechanisms that generate efficient database queries based on information requirements specified by other system components, minimizing data retrieval time and network bandwidth consumption while ensuring that relevant information is obtained. The external database module 214 can execute data validation processes that verify the accuracy and completeness of information retrieved from external sources, implementing data quality checks that identify and handle inconsistent or missing data elements. The external database module 214 can also include data caching strategies that store frequently accessed external data in the cache memory 154 to reduce redundant database queries and improve system responsiveness. The external database module 214 can coordinate with the data retrieval module 121 to provide access to specialized databases that comprise industry-specific information, regulatory data, and market intelligence that inform predictive analysis processes. For example, the external database module 214 can connect to financial market data providers such as Bloomberg or Reuters to retrieve real-time stock prices, economic indicators, and market news that provide context for financial analysis activities, implementing data normalization processes that convert different data formats into standardized financial data structures that can be integrated into the unified state structures 151, enabling the event prediction module 124 to anticipate when users engaged in investment analysis can need access to specific market sectors, comparative company data, or regulatory filings based on current market conditions and historical analysis patterns.

In some implementations, an external signal module 216 can capture and process real-time information feeds from external services that provide market data, news updates, and environmental information within the data source layer 210. The external signal module 216 can include API client implementations (e.g., REST API consumers, WebSocket connections, RSS feed readers, social media API integrations, and/or the like) that establish connections with external information services and handle real-time data streaming from diverse signal sources. The external signal module 216 can implement signal processing algorithms that analyze incoming data streams to identify relevant events, trends, and conditions that can influence user activities and business operations, filtering out noise and irrelevant information to focus on signals that provide actionable intelligence. The external signal module 216 can execute data enrichment processes that combine signals from multiple sources to create comprehensive situational awareness, correlating market movements with news events, weather conditions with operational impacts, and social media sentiment with business performance indicators. The external signal module 216 can also include signal prioritization mechanisms that assess the importance and urgency of different types of external signals based on their potential impact on user activities and organizational objectives. The external signal module 216 can coordinate with the network service 174 to access external APIs and data feeds that provide contextual information for predictive analysis. For example, the external signal module 216 can monitor financial news APIs such as Reuters News API and social media sentiment analysis services to detect breaking news about companies, industries, or economic conditions that can affect investment decisions, implementing natural language processing algorithms that extract key entities, sentiment indicators, and impact assessments from news articles and social media posts, then correlating this information with user portfolio holdings and analysis activities stored in the unified state structures 151 to enable the event prediction module 124 to predict when users can need to review specific investments, adjust portfolio allocations, or prepare client communications in response to market-moving events.

In some implementations, an IoT service module 218 can collect and process sensor data from connected devices that monitor physical environments and equipment status within the data source layer 210. The IoT service module 218 can include IoT connectivity frameworks (e.g., MQTT brokers, CoAP servers, LoRaWAN gateways, industrial protocol adapters, and/or the like) that establish communication channels with the IoT device 176 and other sensor networks that provide real-time monitoring of environmental conditions, equipment performance, and operational status. The IoT service module 218 can implement sensor data processing algorithms that analyze incoming telemetry data to identify patterns, anomalies, and threshold violations that can indicate equipment failures, environmental changes, or operational issues requiring attention. The IoT service module 218 can execute data aggregation processes that combine sensor readings from multiple devices to create comprehensive environmental and operational awareness, implementing statistical analysis and trend detection algorithms that identify emerging conditions before they become critical issues. The IoT service module 218 can also include device management capabilities that monitor sensor health, battery levels, and communication status to ensure reliable data collection and alert operators when maintenance or replacement is needed. The IoT service module 218 can coordinate with the data stream 180 to provide real-time sensor data that enhances the contextual analysis performed by the state synthesization module 122. For example, the IoT service module 218 can collect temperature, humidity, and power consumption data from sensors deployed in server rooms and manufacturing facilities, implementing threshold monitoring algorithms that detect when environmental conditions approach critical limits, then correlating this sensor data with user activities and system usage patterns stored in the runtime session records 150 to enable the event prediction module 124 to predict when users can need to review equipment status, schedule maintenance activities, or adjust operational parameters based on environmental conditions and historical patterns of equipment performance and user response to similar situations.

In some implementations, a user activity module 220 can capture and analyze user interaction patterns and behavioral data that provide insights into user preferences and work habits within the data source layer 210. The user activity module 220 can include activity monitoring systems (e.g., application usage trackers, keystroke loggers, mouse movement analyzers, screen time monitors, and/or the like) that collect detailed information about how users interact with software applications, access information resources, and perform work-related tasks. The user activity module 220 can implement behavioral analysis algorithms that identify patterns in user activities, including application usage sequences, document access patterns, communication rhythms, and task completion behaviors that reveal user preferences and work styles. The user activity module 220 can execute privacy protection mechanisms that anonymize and aggregate user activity data while preserving the analytical value needed for pattern recognition and predictive modeling, ensuring compliance with privacy regulations and organizational policies. The user activity module 220 can also include activity correlation processes that link user behaviors with outcomes and performance metrics, enabling the system to understand which activity patterns lead to successful task completion and user satisfaction. The user activity module 220 can coordinate with the runtime session 166 to provide detailed user activity information that informs the contextual analysis performed by the state synthesization module 122. For example, the user activity module 220 can monitor how users navigate through financial analysis applications, tracking which data sources they access first, how long they spend reviewing different types of information, and which analytical tools they use most frequently, implementing sequence analysis algorithms that identify common workflow patterns and decision-making processes, then storing this behavioral information in the runtime session records 150 to enable the record alignment module 123 to identify similar historical user sessions and the event prediction module 124 to predict what information and tools users can need based on their current activity patterns and established behavioral preferences.

In some implementations, a data retrieval layer 230 can coordinate the extraction, transformation, and initial processing of information from diverse data sources within the system architecture 200. The data retrieval layer 230 can include data processing orchestration systems (e.g., workflow engines, task schedulers, resource managers, load balancers, and/or the like) that coordinate data extraction activities across multiple source types while managing system resources and ensuring optimal performance. The data retrieval layer 230 can implement data quality assurance mechanisms that validate incoming data for completeness, accuracy, and consistency, implementing error handling and data cleansing processes that address data quality issues before information is passed to higher-level processing components. The data retrieval layer 230 can execute data transformation pipelines that convert information from source-specific formats into standardized data structures suitable for analysis by the synthesization layer 240, implementing schema mapping and data normalization processes that ensure consistent data representation across diverse source types. The data retrieval layer 230 can also include performance monitoring capabilities that track data retrieval metrics including latency, throughput, and error rates, enabling the system to optimize data access strategies and identify performance bottlenecks. The data retrieval layer 230 can coordinate with the data retrieval module 121 to provide systematic access to information from the data source layer 210. For example, the data retrieval layer 230 can orchestrate the simultaneous extraction of customer data from CRM systems, email communications from messaging platforms, and market data from external APIs, implementing parallel processing workflows that optimize data retrieval performance while ensuring that related information elements are properly correlated and synchronized, then applying data validation rules that verify customer identifiers match across different systems and temporal alignment processes that ensure all data elements represent consistent time periods, enabling the synthesization layer 240 to build accurate and comprehensive customer context representations that support predictive analysis about customer needs and business opportunities.

In some implementations, a data connector module 232 can establish and manage connections with diverse data sources while handling the technical complexities of different data access protocols within the data retrieval layer 230. The data connector module 232 can include connector framework implementations (e.g., database drivers, API clients, message queue consumers, file system watchers, and/or the like) that provide standardized interfaces for accessing different types of data sources while abstracting the underlying technical details from other system components. The data connector module 232 can implement change data capture mechanisms that monitor databases and other data sources for modifications, enabling real-time detection of data updates that trigger downstream processing activities. The data connector module 232 can execute connection management processes that handle authentication, connection pooling, retry logic, and error recovery to ensure reliable data access even when source systems experience temporary failures or performance issues. The data connector module 232 can also include protocol adaptation capabilities that translate between different data access methods and communication standards, enabling uniform data access across heterogeneous source environments. The data connector module 232 can coordinate with the wireless communication circuitry 130 to establish network connections with external data sources 178 and the network service 174. For example, the data connector module 232 can implement IMAP connectors for accessing email systems, REST API clients for connecting to CRM platforms, JDBC drivers for database access, and webhook receivers for real-time event notifications, implementing connection pooling strategies that maintain persistent connections to frequently accessed data sources while managing authentication tokens and session management across different systems, enabling efficient data retrieval that supports the real-time processing requirements of the stream processing module 234 and ensures that the unified state structures 151 are continuously updated with current information from all connected data sources.

In some implementations, a stream processing module 234 can handle high-volume, real-time data processing that enables sub-second analysis of incoming information within the data retrieval layer 230. The stream processing module 234 can include distributed stream processing frameworks (e.g., Apache Kafka™, Apache Flink™, Apache Storm™, Amazon Kinesis™, and/or the like) that provide scalable, fault-tolerant processing of continuous data streams from multiple sources simultaneously. The stream processing module 234 can implement real-time pipeline processing algorithms that apply transformations, filtering, and enrichment operations to streaming data as it flows through the system, enabling immediate analysis and response to changing conditions without the delays associated with batch processing approaches. The stream processing module 234 can execute windowing operations that group streaming data into time-based or count-based windows for aggregation and analysis, implementing tumbling windows for non-overlapping time periods and sliding windows for continuous analysis with overlapping time intervals. The stream processing module 234 can also include backpressure handling mechanisms that automatically adjust processing rates when downstream components cannot keep pace with incoming data volumes, preventing system overload and ensuring stable operation under varying load conditions. The stream processing module 234 can coordinate with the data stream 180 to process real-time information flows from the data source layer 210. For example, the stream processing module 234 can process real-time streams of customer interaction data, financial market updates, and IoT sensor readings simultaneously, implementing stream joining operations that correlate related events occurring within specified time windows, such as linking customer service inquiries with recent transaction activities and account status changes, then applying real-time analytics that detect patterns and anomalies in the combined data streams, enabling the event prediction module 124 to generate immediate predictions about customer needs and potential issues based on current activity patterns and historical correlation analysis stored in the runtime session records 150.

In some implementations, an event sourcing module 236 can maintain comprehensive audit trails and historical records of all data processing activities within the data retrieval layer 230. The event sourcing module 236 can include event logging systems (e.g., append-only event stores, distributed ledgers, immutable log structures, event replay mechanisms, and/or the like) that capture every data modification, processing operation, and system state change as immutable event records that provide complete traceability of system behavior. The event sourcing module 236 can implement event serialization processes that convert system events into structured data formats suitable for storage and analysis, including event metadata such as timestamps, source identifiers, user contexts, and processing parameters that enable comprehensive audit trail functionality. The event sourcing module 236 can execute event replay capabilities that reconstruct historical system states by replaying sequences of stored events, enabling the system to analyze how different conditions and inputs led to specific outcomes and supporting debugging and performance analysis activities. The event sourcing module 236 can also include event compaction mechanisms that optimize storage utilization by removing redundant or obsolete event records while preserving the essential information needed for audit and analysis purposes. The event sourcing module 236 can coordinate with the provenance module 128 to maintain detailed records of data processing activities that support accountability and transparency requirements. For example, the event sourcing module 236 can record every data retrieval operation performed by the data connector module 232, including source system identifiers, query parameters, retrieved data volumes, and processing timestamps, then store these event records in immutable log structures that enable the provenance module 128 to trace the complete lineage of information used in predictive analysis, allowing users to verify that insights generated by the event prediction module 124 are based on accurate and authorized data sources, and enabling system administrators to analyze processing patterns and optimize system performance based on historical event data.

In some implementations, a normalization module 238 can standardize data formats and structures to ensure consistent processing across diverse information sources within the data retrieval layer 230. The normalization module 238 can include data transformation engines (e.g., schema mapping tools, format converters, data type standardizers, encoding normalizers, and/or the like) that convert information from source-specific formats into unified data structures that can be processed consistently by higher-level system components. The normalization module 238 can implement schema mapping processes that identify corresponding data elements across different source systems and apply transformation rules that align field names, data types, and value formats to create consistent data representations. The normalization module 238 can execute data cleansing operations that identify and correct data quality issues including missing values, inconsistent formatting, duplicate records, and invalid data entries, implementing validation rules and correction algorithms that improve data accuracy and completeness. The normalization module 238 can also include data enrichment capabilities that augment normalized data with additional context information, computed fields, and derived attributes that enhance the analytical value of the processed information. The normalization module 238 can coordinate with the unified data structure 182 to provide standardized data that supports consistent analysis across the system architecture 200. For example, the normalization module 238 can process customer contact information retrieved from multiple CRM systems, email platforms, and social media sources, implementing field mapping algorithms that identify equivalent data elements such as customer names, contact details, and company affiliations across different systems, then applying data standardization rules that convert phone numbers to consistent formats, normalize address information using postal standards, and resolve entity duplicates using fuzzy matching algorithms, enabling the state synthesization module 122 to build accurate unified customer profiles in the unified state structures 151 that support reliable predictive analysis about customer relationships and communication needs.

In some implementations, a synthesization layer 240 can create comprehensive contextual representations by combining and analyzing normalized data from multiple sources within the system architecture 200. The synthesization layer 240 can include knowledge integration systems (e.g., semantic processing engines, graph construction algorithms, relationship extraction models, context aggregation frameworks, and/or the like) that analyze processed data to identify meaningful entities, relationships, and patterns that define user operational contexts and environmental conditions. The synthesization layer 240 can implement graph-based data modeling approaches that represent complex relationships between different information elements, enabling sophisticated queries and analysis operations that reveal insights not apparent in individual data sources. The synthesization layer 240 can execute temporal analysis processes that track how information and relationships evolve over time, maintaining historical context that enables trend analysis and pattern recognition across extended time periods. The synthesization layer 240 can also include context optimization mechanisms that balance the comprehensiveness of contextual representations with processing efficiency and storage requirements, implementing intelligent caching and indexing strategies that enable real-time access to complex contextual information. The synthesization layer 240 can coordinate with the state synthesization module 122 to create the unified state structures 151 that serve as the foundation for predictive analysis. For example, the synthesization layer 240 can analyze normalized customer data, communication records, and transaction histories to construct comprehensive customer relationship graphs that connect individual contacts with organizational hierarchies, project involvements, and interaction patterns, implementing semantic analysis algorithms that identify implicit relationships and contextual connections not explicitly recorded in source systems, then maintaining temporal versions of these relationship structures that enable the record alignment module 123 to identify how customer relationships have evolved over time and the event prediction module 124 to predict future customer engagement opportunities based on relationship dynamics and historical interaction patterns.

In some implementations, a unified state module 242 can maintain comprehensive, integrated representations of user contexts and environmental conditions within the synthesization layer 240. The unified state module 242 can include graph database systems (e.g., Neo4j, Amazon Neptune, Azure Cosmos DB, property graph models, and/or the like) that store and manage complex relationship structures representing entities, concepts, events, and their interconnections across different domains and time periods. The unified state module 242 can implement context integration algorithms that combine information from multiple sources to create holistic representations of user operational environments, resolving entity references and maintaining referential integrity across diverse data types and sources. The unified state module 242 can execute relationship inference processes that identify implicit connections between entities based on co-occurrence patterns, temporal correlations, and semantic similarities, expanding the contextual awareness beyond explicitly recorded relationships. The unified state module 242 can also include state versioning capabilities that maintain historical snapshots of contextual information, enabling analysis of how user contexts and environmental conditions change over time and supporting temporal pattern recognition. The unified state module 242 can coordinate with the unified state structures 151 in the computing database 104 to provide persistent storage and efficient access to contextual information. For example, the unified state module 242 can maintain comprehensive project context graphs that connect team members, tasks, deadlines, resources, stakeholders, and deliverables into integrated representations that capture the complete project ecosystem, implementing graph traversal algorithms that enable efficient queries for related information such as finding all team members working on tasks that depend on a specific deliverable or identifying stakeholders who should be notified about project timeline changes, enabling the event prediction module 124 to predict when users can need to communicate with specific team members, access particular resources, or adjust project plans based on current project state and historical patterns of project evolution and user behavior in similar contexts.

In some implementations, a semantic processor module 244 can analyze textual and structured data to extract meaningful entities, relationships, and concepts within the synthesization layer 240. The semantic processor module 244 can include natural language processing systems (e.g., named entity recognition models, relationship extraction algorithms, sentiment analysis engines, topic modeling frameworks, and/or the like) that process textual content from emails, documents, communications, and other unstructured data sources to identify semantic elements that contribute to contextual understanding. The semantic processor module 244 can implement entity recognition algorithms that identify people, organizations, locations, dates, products, and domain-specific entities within textual content, linking these entities to existing knowledge structures and creating new entity records when previously unknown entities are encountered. The semantic processor module 244 can execute relationship extraction processes that analyze textual patterns to identify connections between entities, including organizational relationships, causal relationships, temporal relationships, and domain-specific associations that enhance the contextual representations maintained by the unified state module 242. The semantic processor module 244 can also include event detection capabilities that identify significant occurrences mentioned in textual content, such as meetings, decisions, milestones, and incidents that represent important contextual events for predictive analysis. The semantic processor module 244 can coordinate with the model ensembles 152 to access specialized natural language processing models for different types of semantic analysis. For example, the semantic processor module 244 can analyze email communications between team members working on financial analysis projects, implementing named entity recognition algorithms that identify mentions of companies, financial instruments, market events, and regulatory requirements, then applying relationship extraction models that determine how these entities are connected through the communication content, such as identifying that a specific company is being analyzed for potential investment in response to a particular market event, enabling the unified state module 242 to build comprehensive project context representations that connect financial analysis activities with market conditions, regulatory considerations, and stakeholder communications, supporting the event prediction module 124 in predicting when users can need access to additional financial data, regulatory filings, or stakeholder input based on the semantic content of their current communications and similar historical analysis patterns.

In some implementations, a temporal indexer module 246 can manage time-series data and maintain version history for all information elements within the synthesization layer 240. The temporal indexer module 246 can include time-series database systems (e.g., InfluxDB™, TimescaleDB™, Apache Druid™, time-series indexing structures, and/or the like) that efficiently store and query temporal data across different time scales and granularities, enabling analysis of both short-term patterns and long-term trends in user activities and environmental conditions. The temporal indexer module 246 can implement temporal data modeling approaches that capture not only when events occurred but also the duration of activities, the sequence of related events, and the temporal relationships between different types of information. The temporal indexer module 246 can execute version history management processes that maintain multiple versions of data elements as they change over time, enabling the system to analyze how information has evolved and to reconstruct historical states for pattern analysis and comparison purposes. The temporal indexer module 246 can also include temporal query optimization mechanisms that enable efficient retrieval of time-based information, implementing indexing strategies that support both point-in-time queries and time-range analysis operations. The temporal indexer module 246 can coordinate with the runtime session records 150 to provide temporal context for user activities and system states. For example, the temporal indexer module 246 can maintain detailed time-series records of customer interaction patterns, tracking when customers contact support, how long interactions last, what issues are discussed, and how problems are resolved over time, implementing temporal correlation analysis that identifies seasonal patterns, cyclical behaviors, and trend changes in customer engagement, then providing this temporal context to the record alignment module 123 to identify historical periods with similar customer activity patterns and to the event prediction module 124 to predict when customers can need proactive support or when support volume can increase based on temporal patterns and current customer activity trends observed in the time-series data.

In some implementations, a cache manager module 248 can optimize system performance through intelligent data caching and storage management within the synthesization layer 240. The cache manager module 248 can include multi-tier caching systems (e.g., in-memory caches, distributed cache clusters, application-level caches, database query result caches, and/or the like) that store frequently accessed data at different levels of the system hierarchy to minimize data retrieval latency and reduce computational overhead. The cache manager module 248 can implement cache optimization algorithms that determine what information to cache based on access patterns, data update frequencies, and computational cost considerations, implementing least-recently-used eviction policies and predictive cache warming strategies that anticipate future data access needs. The cache manager module 248 can execute cache coherence mechanisms that ensure cached data remains consistent with underlying data sources when information is updated, implementing cache invalidation strategies that remove or refresh cached data when source information changes. The cache manager module 248 can also include performance monitoring capabilities that track cache hit rates, access patterns, and performance improvements to optimize caching strategies and identify opportunities for further performance enhancement. The cache manager module 248 can coordinate with the cache memory 154 to provide high-performance data access across the system architecture 200. For example, the cache manager module 248 can maintain cached copies of frequently accessed customer relationship graphs, project context structures, and market data summaries in high-speed memory tiers, implementing intelligent cache warming algorithms that preload information likely to be needed based on user activity patterns and predictive analysis results from the event prediction module 124, such as caching customer interaction histories when the system predicts that users can engage in customer service activities, or preloading project resource information when project planning activities are anticipated, enabling the unified state module 242 to provide immediate access to complex contextual information and supporting real-time responsiveness for the interface module 127 when delivering proactive assistance through the display 140.

In some implementations, an evaluation layer 250 can analyze synthesized contextual information to generate predictions, assess consequences, and determine the relevance of potential insights within the system architecture 200. The evaluation layer 250 can include analytical processing systems (e.g., machine learning inference engines, statistical analysis frameworks, decision support algorithms, predictive modeling platforms, and/or the like) that process contextual information from the synthesization layer 240 to generate actionable insights and recommendations for proactive user assistance. The evaluation layer 250 can implement multi-dimensional analysis approaches that consider various factors including user behavior patterns, environmental conditions, historical precedents, and external influences when generating predictions and assessments. The evaluation layer 250 can execute model orchestration processes that coordinate different types of analytical models to provide comprehensive evaluation capabilities, including predictive models for forecasting future events, causal models for understanding consequence chains, and relevance models for prioritizing information and recommendations. The evaluation layer 250 can also include continuous learning mechanisms that update analytical models based on observed outcomes and user feedback, improving prediction accuracy and relevance over time. The evaluation layer 250 can coordinate with the event prediction module 124, prioritization module 125, and event generation module 126 to provide analytical capabilities that support proactive assistance. For example, the evaluation layer 250 can analyze comprehensive customer context information maintained by the unified state module 242, including customer interaction histories, product usage patterns, support case records, and market conditions, implementing ensemble prediction models that forecast customer needs, identify potential issues, and assess the likelihood of different customer behaviors, then applying consequence analysis algorithms that evaluate the potential impact of different response strategies, enabling the prioritization module 125 to rank potential customer service actions based on predicted outcomes and the event generation module 126 to create preliminary events 196 that prepare appropriate customer support resources and information before customers explicitly request assistance.

In some implementations, a predictive engine module 252 can generate forecasts of future user activities and information needs through advanced pattern analysis within the evaluation layer 250. The predictive engine module 252 can include machine learning model implementations (e.g., recurrent neural networks, transformer architectures, time-series forecasting models, sequence prediction algorithms, and/or the like) that analyze temporal patterns in user activities and contextual conditions to predict likely future events and user requirements. The predictive engine module 252 can implement question generation algorithms that anticipate what information users can need by analyzing current contexts and historical patterns of information seeking behavior, creating predictive question sets that enable proactive information preparation. The predictive engine module 252 can execute need anticipation processes that identify emerging information requirements before users explicitly express them, analyzing contextual cues and activity patterns to predict when users can benefit from specific types of assistance or information access. The predictive engine module 252 can also include confidence assessment mechanisms that evaluate the reliability of predictions and provide uncertainty estimates that inform decision-making about proactive assistance strategies. The predictive engine module 252 can coordinate with the model ensembles 152 to access specialized prediction models for different types of forecasting tasks. For example, the predictive engine module 252 can analyze a user's current financial analysis activities combined with market conditions and historical analysis patterns stored in the runtime session records 150, implementing sequence prediction models that forecast the likely progression of analysis tasks, such as predicting that a user currently reviewing quarterly earnings data can need to access competitor analysis reports, regulatory filings, and market trend data based on similar historical analysis sequences, then generating specific questions that the user can ask such as "How do our margins compare to industry averages?" or "What regulatory changes can affect our market position?", enabling the event generation module 126 to precompute answers to these predicted questions and prepare relevant information for immediate delivery when the user reaches the anticipated analysis stages.

In some implementations, a consequence engine module 254 can analyze potential outcomes and downstream effects of predicted events and user actions within the evaluation layer 250. The consequence engine module 254 can include causal reasoning systems (e.g., causal graph models, counterfactual analysis algorithms, simulation frameworks, impact assessment tools, and/or the like) that trace the potential effects of different actions and decisions across multiple dimensions including business metrics, project timelines, team dynamics, and customer relationships. The consequence engine module 254 can implement causal reasoning algorithms that identify cause-effect relationships within the contextual information maintained by the unified state module 242, enabling the system to predict how specific actions can influence future conditions and outcomes. The consequence engine module 254 can execute effect prediction processes that analyze cascading consequences through multiple levels of impact, identifying both direct effects and indirect consequences that can result from predicted user actions or environmental changes. The consequence engine module 254 can also include uncertainty quantification mechanisms that assess the reliability of consequence predictions and provide confidence intervals for different outcome scenarios. The consequence engine module 254 can coordinate with the prioritization module 125 to provide consequence analysis that informs priority assessment for predicted events 194. For example, the consequence engine module 254 can analyze a predicted decision to adjust project timelines by evaluating the potential effects on team workload distribution, stakeholder expectations, resource allocation, and deliverable quality, implementing causal chain analysis that traces how timeline changes can affect dependent tasks, team member availability, client satisfaction, and project success metrics, then quantifying these effects with probability estimates and impact assessments that enable the prioritization module 125 to rank timeline adjustment recommendations based on their predicted consequences, and the event generation module 126 to create preliminary events 196 that prepare stakeholder communications, resource reallocation plans, and risk mitigation strategies before users make timeline decisions.

In some implementations, the relevance scorer module 256 can evaluate the importance and applicability of information and insights for specific user contexts within the evaluation layer 250. The relevance scorer module 256 can include multi-dimensional scoring algorithms (e.g., weighted relevance models, contextual similarity measures, user preference learning systems, temporal relevance functions, and/or the like) that assess information relevance across multiple criteria including semantic similarity to current activities, temporal proximity to user needs, causal relationships to user goals, and historical patterns of user interest and engagement. The relevance scorer module 256 can implement context analysis processes that evaluate how well potential insights align with current user activities, environmental conditions, and stated or inferred user objectives, generating relevance scores that guide information prioritization and presentation decisions. The relevance scorer module 256 can execute user attention modeling algorithms that consider user cognitive load, current focus areas, and interruption tolerance when assessing the appropriateness of delivering specific information or recommendations at particular times, while coordinating with the prioritization module 125 to provide relevance assessments that inform the ranking of predicted events 194. For example, the relevance scorer module 256 can analyze a user currently engaged in quarterly financial review activities and score potential insights based on their direct relevance to financial analysis tasks, temporal alignment with quarterly reporting deadlines, causal relationships to budget planning objectives, and historical patterns showing the user's typical information consumption during similar review periods, implementing multi-factor scoring algorithms that weight semantic similarity between current document content and potential insights at 0.4, temporal urgency based on approaching deadlines at 0.3, causal relevance to stated objectives at 0.2, and historical user preference patterns at 0.1, enabling the prioritization module 125 to rank insights such that budget variance analysis receives higher priority than general market news, and quarterly performance comparisons receive higher priority than annual strategic planning information, ensuring that the most contextually relevant insights are delivered through the interface module 127 when users can benefit most from the information.

In some implementations, the model ensemble module 258 can provide specialized machine learning capabilities for different types of analytical tasks within the evaluation layer 250. The model ensemble module 258 can include collections of optimized models (e.g., lightweight classification models, compact summarization models, efficient question-answering models, fast generation models, specialized reasoning models, and/or the like) that are specifically trained and optimized for particular inference tasks rather than relying on large general-purpose models with high computational overhead. The model ensemble module 258 can implement intelligent routing algorithms that direct analytical tasks to the most appropriate models based on task complexity, latency requirements, quality thresholds, and available computational resources. The model ensemble module 258 can execute model optimization processes including quantization, pruning, knowledge distillation, and compilation techniques that reduce model size and inference time while maintaining acceptable accuracy levels for specific use cases, while coordinating with the model ensembles 152 to provide persistent storage and version management for the specialized models. For example, the model ensemble module 258 can maintain a 50M parameter classification model optimized for intent detection and sentiment analysis that processes user communications in under 200 ms, a 350M parameter summarization model that extracts key points from documents and generates abstracts with 95% of full-size model performance, a 500M parameter question-answering model that performs fact extraction and context-based analysis, a 1.5B parameter generation model that composes insights and explanations, and a 3B parameter reasoning model that performs causal logic and consequence predictions, implementing dynamic routing logic that directs simple categorization tasks to the lightweight classification model, document summarization requests to the specialized summarization model, and complex causal analysis tasks to the reasoning model, enabling the evaluation layer 250 to provide sub-300 ms response times for most analytical tasks while maintaining 90-95% of full-size model performance at 10× reduction in computational cost.

In some implementations, the blockchain module 260 can provide cryptographic verification and immutable record-keeping capabilities for maintaining data provenance and ensuring accountability within the evaluation layer 250. The blockchain module 260 can include distributed ledger systems (e.g., blockchain networks, hash-linked data structures, cryptographic verification mechanisms, smart contract platforms, and/or the like) that create tamper-evident records of data sources, processing operations, reasoning chains, and insight derivations. The blockchain module 260 can implement cryptographic proof generation processes that create verifiable evidence of information lineage, including content hashing of source documents, digital signatures from data providers, merkle proofs for efficient verification, and time-stamp proofs that establish when information entered the system. The blockchain module 260 can execute smart contract enforcement mechanisms that automatically validate data quality, enforce access control policies, manage retention requirements, and trigger alerts when specific conditions are met, while coordinating with the provenance ledger 153 to maintain comprehensive audit trails and the provenance module 128 to provide user-accessible provenance information. For example, the blockchain module 260 can create immutable records when the predictive engine module 252 generates predictions about user information needs, documenting the specific data sources used in the analysis, the model versions that processed the information, the reasoning steps that led to the predictions, and the confidence scores associated with each prediction, implementing cryptographic hashing that creates unique fingerprints for each piece of source data and chaining these hashes together to create verifiable proof that predictions are based on authentic, unmodified information, enabling users to verify that insights delivered through the interface module 127 are derived from authorized data sources and have not been tampered with during processing, while smart contracts automatically enforce policies such as restricting access to sensitive customer data based on user roles and generating audit alerts when predictions depend on data sources that have been flagged as potentially unreliable.

In some implementations, the interface layer 270 can manage the delivery and presentation of insights and recommendations to users through multiple interaction modalities within the system architecture 200. The interface layer 270 can include user experience orchestration systems (e.g., notification management engines, interface adaptation algorithms, user attention modeling systems, interruption optimization frameworks, and/or the like) that coordinate the delivery of proactive insights through appropriate channels based on user context, insight urgency, and interaction preferences. The interface layer 270 can implement adaptive presentation mechanisms that select optimal delivery methods based on factors such as user cognitive load, current activity state, information complexity, and time sensitivity of insights. The interface layer 270 can execute user feedback collection processes that monitor user responses to different presentation approaches and adjust delivery strategies based on observed user acceptance patterns and effectiveness metrics, while coordinating with the interface module 127 to provide comprehensive user interaction capabilities and the display 140 to render visual presentations. For example, the interface layer 270 can analyze that a user is currently focused on financial analysis tasks with high cognitive load and determine that complex market insights should be delivered through a dedicated whispering application interface rather than interrupting the user's workflow with modal overlays, while simple contextual information such as relevant document suggestions can be presented through embedded tooltips within the user's current application, implementing adaptive timing algorithms that queue non-urgent insights for delivery during natural break points in the user's workflow while immediately surfacing critical information such as security alerts or time-sensitive market changes through high-priority notification channels.

In some implementations, the notification module 272 can optimize the timing and delivery of proactive insights to maximize user value while minimizing workflow disruption within the interface layer 270. The notification module 272 can include intelligent scheduling systems (e.g., user attention modeling algorithms, interruption cost assessment frameworks, urgency classification engines, timing optimization models, and/or the like) that analyze user activity patterns, cognitive load indicators, and task priorities to determine optimal moments for delivering different types of information. The notification module 272 can implement urgency classification processes that categorize insights based on time sensitivity, potential impact, and user relevance, creating priority hierarchies that guide delivery timing and presentation methods. The notification module 272 can execute adaptive batching mechanisms that group related non-urgent insights for periodic delivery while ensuring critical information reaches users immediately regardless of current activity state. The notification module 272 can also include user preference learning capabilities that adapt notification strategies based on observed user responses and explicit feedback about notification timing and frequency, while coordinating with the interface protocols 155 to manage communication standards across different delivery channels. For example, the notification module 272 can analyze that a user typically reviews financial reports between 9-11 AM and has historically responded positively to market insights delivered during this window, implementing timing optimization algorithms that queue relevant financial analysis insights for delivery at 9:15 AM when the user typically begins their daily market review, while immediately delivering critical alerts such as significant portfolio value changes or regulatory announcements that require immediate attention, and batching lower-priority insights such as industry news summaries and research report recommendations for delivery during the user's typical afternoon information consumption period around 2 PM, ensuring that high-value insights reach users when they can most effectively act on the information.

In some implementations, the embedded interface module 274 can integrate proactive insights seamlessly within existing applications and user workflows within the interface layer 270. The embedded interface module 274 can include contextual presentation systems (e.g., tooltip generators, sidebar panel controllers, inline annotation engines, banner notification systems, and/or the like) that surface relevant information within native application interfaces without requiring users to switch contexts or interrupt their current activities. The embedded interface module 274 can implement context-aware positioning algorithms that determine optimal placement of interface elements based on current application layout, user attention patterns, and information relevance to displayed content. The embedded interface module 274 can execute seamless integration processes that make embedded elements appear as natural extensions of existing applications rather than external interruptions, maintaining visual consistency and interaction patterns that align with user expectations. The embedded interface module 274 can also include progressive disclosure mechanisms that present information at appropriate levels of detail, allowing users to access additional context through hover actions or click interactions without disrupting their primary workflow, while coordinating with the display 140 to render embedded interface elements and the user interface 162 to capture user interactions with embedded content. For example, the embedded interface module 274 can detect when a user opens a customer relationship management application and display contextual tooltips next to customer records that highlight recent interaction patterns, upcoming renewal dates, and predicted customer needs based on analysis from the predictive engine module 252, implementing hover-activated detail panels that provide comprehensive customer insights including communication history, product usage trends, and recommended next actions, while maintaining the native look and feel of the CRM interface and enabling users to access detailed customer analysis without leaving their current workflow or opening additional applications.

In some implementations, the conversational interface module 276 can enable natural language interactions for exploring insights and accessing contextual information within the interface layer 270. The conversational interface module 276 can include dialogue management systems (e.g., natural language understanding engines, context maintenance frameworks, response generation models, conversation state tracking systems, and/or the like) that support multi-turn conversations where users can ask follow-up questions, request clarifications, and explore related information through natural language queries. The conversational interface module 276 can implement context preservation mechanisms that maintain conversation history and user intent across multiple interaction turns, enabling coherent dialogue that builds upon previous exchanges and maintains awareness of user goals and information needs. The conversational interface module 276 can execute query interpretation processes that understand user questions in the context of current activities and available information, translating natural language queries into structured requests that can be processed by the evaluation layer 250 and synthesization layer 240. The conversational interface module 276 can also include response personalization capabilities that adapt communication style, technical detail level, and information presentation based on user preferences and expertise levels, while coordinating with the model ensemble module 258 to access specialized language models for natural language processing tasks. For example, the conversational interface module 276 can enable a user to ask "What were our last interactions with this client?" when viewing a customer record, implementing natural language understanding that identifies the customer entity from the current context and retrieves relevant interaction history from the unified state structures 151, then generating a conversational response that summarizes recent communications, meetings, and transaction activities, while maintaining conversation context so that follow-up questions like "What issues did they raise?" or "When is their contract renewal?" can be answered with appropriate context awareness, enabling users to explore customer information through natural dialogue rather than navigating complex database queries or multiple application interfaces.

In some implementations, the whispering application module 278 can provide a dedicated interface environment for comprehensive insight management and exploration within the interface layer 270. The whispering application module 278 can include specialized interface components (e.g., insight feed displays, priority dashboards, categorized view organizers, search and filter systems, and/or the like) that present proactive insights in a focused environment designed specifically for information consumption and decision-making activities. The whispering application module 278 can implement priority-based organization systems that arrange insights according to urgency, relevance, and potential impact, enabling users to quickly identify and focus on the most important information requiring their attention. The whispering application module 278 can execute comprehensive insight management processes that allow users to review, categorize, act upon, and track the outcomes of proactive recommendations, maintaining records of user decisions and their effectiveness for continuous system improvement. The whispering application module 278 can also include action center capabilities that enable users to initiate tasks, schedule activities, and coordinate with team members directly from insight presentations, creating seamless workflows from information consumption to action execution, while coordinating with the runtime session records 150 to maintain comprehensive records of user interactions and decisions. For example, the whispering application module 278 can present a prioritized dashboard showing critical insights such as budget variance alerts with 95% urgency scores, high-priority customer relationship opportunities with 85% relevance scores, and medium-priority market trend analyses with 70% impact scores, implementing categorized views that organize insights by functional area such as financial analysis, customer management, and strategic planning, while providing search and filter capabilities that enable users to find specific types of insights or information related to particular projects, customers, or time periods, and including action buttons that allow users to schedule meetings, assign tasks, or generate reports directly from insight presentations, creating a comprehensive command center for proactive information management and decision-making activities.

Figure 3:
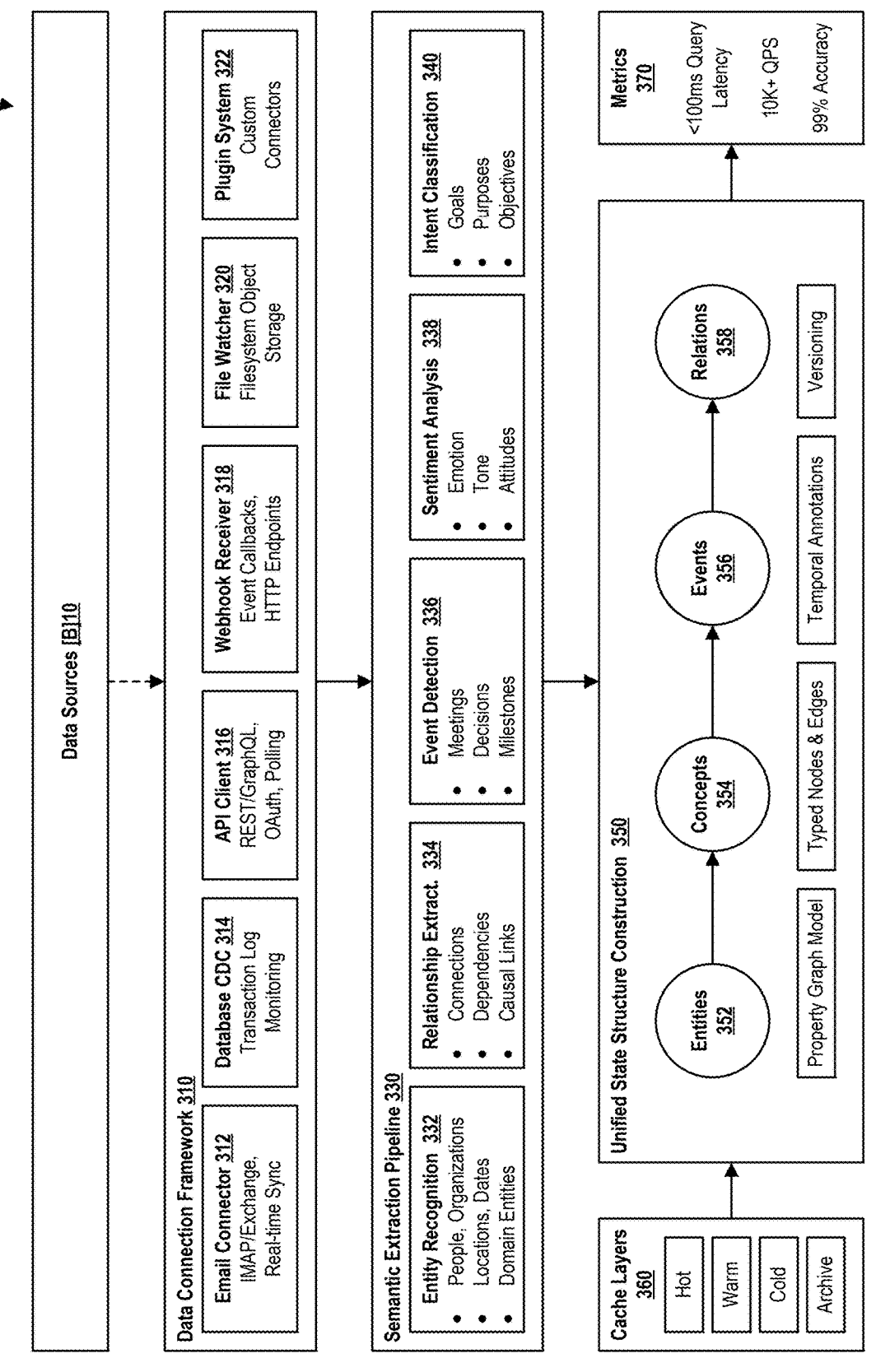
FIG. 3 is a block diagram that illustrates a state synthesization architecture in accordance with some implementations of the present technology.

FIG. 3 is a block diagram that illustrates a state synthesization architecture in accordance with some implementations of the present technology. In some implementations, the state synthesization architecture 300 can provide comprehensive data integration and contextual analysis capabilities that enable the event coordination system 100 to build unified representations of user environments and operational contexts. The state synthesization architecture 300 can include systematic data processing frameworks (e.g., multi-source integration systems, semantic analysis pipelines, graph construction engines, temporal data management platforms, and/or the like) that coordinate the collection, transformation, and synthesis of information from diverse sources into coherent knowledge structures that support predictive analysis and proactive assistance. The state synthesization architecture 300 can implement layered processing approaches that organize data integration activities into distinct functional stages, each responsible for specific aspects of data handling including source connectivity, semantic extraction, knowledge representation, and performance optimization. The state synthesization architecture 300 can coordinate with the state synthesization module 122 within the memory 120 to provide the computational infrastructure needed for building and maintaining the unified state structures 151 stored in the computing database 104. The state synthesization architecture 300 can also include monitoring and optimization capabilities that track processing performance, data quality metrics, and system resource utilization to ensure efficient operation under varying data volumes and processing demands. For example, the state synthesization architecture 300 can process customer relationship management data by systematically connecting to CRM databases through specialized connectors, extracting customer entities and interaction relationships through semantic analysis algorithms, constructing comprehensive customer knowledge graphs that link contact information with communication histories and transaction patterns, and maintaining these knowledge structures in multi-tier cache systems that enable real-time access for predictive analysis, with performance monitoring systems tracking processing latency, data accuracy, and cache hit rates to optimize the overall data integration workflow and ensure that customer context information is available within milliseconds when needed by the event prediction module 124 for generating proactive customer service recommendations.

In some implementations, a data connection framework 310 can establish and manage connections with diverse data sources while handling the technical complexities of different data access protocols within the state synthesization architecture 300. The data connection framework 310 can include connector abstraction systems (e.g., protocol adapters, authentication managers, connection poolers, error recovery mechanisms, and/or the like) that provide standardized interfaces for accessing heterogeneous data sources while isolating the complexity of source-specific communication requirements from higher-level processing components. The data connection framework 310 can implement connection lifecycle management processes that handle connection establishment, authentication, session maintenance, error detection, and automatic reconnection when source systems experience temporary failures or network interruptions. The data connection framework 310 can execute load balancing algorithms that distribute data access requests across multiple connection instances to optimize performance and prevent overloading individual data sources, while implementing rate limiting mechanisms that respect API quotas and usage restrictions imposed by external systems. The data connection framework 310 can also include connection monitoring capabilities that track connection health, response times, and error rates to identify performance issues and optimize connection strategies based on observed source system characteristics. The data connection framework 310 can coordinate with the data retrieval module 121 to provide systematic access to information sources that feed the semantic extraction and knowledge construction processes. For example, the data connection framework 310 can manage simultaneous connections to multiple enterprise systems including email servers, database systems, cloud APIs, and file storage platforms, implementing connection pooling strategies that maintain persistent connections to frequently accessed sources while establishing on-demand connections for less frequently used systems, with authentication management systems that handle OAuth tokens, API keys, and database credentials across different security protocols, enabling the state synthesization architecture 300 to access comprehensive organizational data including employee communications, project documents, customer records, and operational metrics that collectively provide the raw information needed for building unified contextual representations of user environments and business operations.

In some implementations, an email connector 312 can provide specialized connectivity to email systems and messaging platforms to extract communication data within the data connection framework 310. The email connector 312 can include email protocol implementations (e.g., IMAP clients, Exchange Web Services™ interfaces, POP3 connections, SMTP monitoring systems, and/or the like) that establish connections with various email server types and handle the technical requirements of different messaging platforms including authentication, folder navigation, and message retrieval operations. The email connector 312 can implement real-time synchronization mechanisms that monitor email systems for new messages, folder changes, and status updates, enabling immediate detection of communication events that can influence user contexts and trigger predictive analysis processes. The email connector 312 can execute message parsing algorithms that extract structured information from email content including sender and recipient details, subject lines, message bodies, attachments, and metadata such as timestamps and message threading information. The email connector 312 can also include content filtering capabilities that identify relevant business communications while excluding personal messages, spam, and automated system notifications that do not contribute to meaningful contextual analysis. The email connector 312 can coordinate with the semantic extraction pipeline 330 to provide communication data that informs relationship mapping and context construction processes. For example, the email connector 312 can connect to Microsoft Exchange™ servers using Exchange Web Services™ protocols to retrieve email communications from user mailboxes, implementing incremental synchronization that monitors for new messages every 30 seconds and immediately processes business-related communications to extract project references, client mentions, and decision points, while parsing email thread structures to understand conversation flows and stakeholder relationships, then feeding this communication data to entity recognition algorithms that identify people, organizations, and topics mentioned in the messages, enabling the state synthesization architecture 300 to build comprehensive communication context graphs that connect users with their professional networks, active projects, and ongoing business discussions, supporting the event prediction module 124 in anticipating when users can need to follow up on communications, schedule meetings with mentioned stakeholders, or access information related to topics discussed in recent email exchanges.

In some implementations, a database connector 314 can provide systematic access to database systems and data repositories through transaction log monitoring and change detection mechanisms within the data connection framework 310. The database connector 314 can include database connectivity implementations (e.g., JDBC drivers, ODBC interfaces, NoSQL database clients, change data capture systems, and/or the like) that establish connections with various database types including relational databases, document stores, key-value systems, and graph databases that comprise organizational data and operational information. The database connector 314 can implement transaction log monitoring processes that track database modifications in real-time by analyzing transaction logs, binary logs, and change streams to detect when records are inserted, updated, or deleted, enabling immediate awareness of data changes that can affect user contexts and business conditions. The database connector 314 can execute change data capture algorithms that identify relevant data modifications based on table schemas, field types, and business logic rules, filtering out system-level changes and focusing on business-significant updates that contribute to contextual understanding. The database connector 314 can also include data validation mechanisms that verify the integrity and consistency of retrieved data, implementing checks for referential integrity, data type compliance, and business rule adherence to ensure high-quality information feeds into the knowledge construction processes. The database connector 314 can coordinate with the unified state structures 151 to provide current and historical data that supports comprehensive context analysis. For example, the database connector 314 can monitor customer relationship management databases by analyzing transaction logs to detect when new customer records are created, existing customer information is updated, or interaction records are added, implementing change detection algorithms that identify business-significant modifications such as customer status changes, contact information updates, and new interaction entries, then immediately retrieving the modified data and associated related records to provide complete context for the changes, enabling the state synthesization architecture 300 to maintain current awareness of customer relationship dynamics and trigger predictive analysis when customer data changes suggest emerging service needs, sales opportunities, or relationship management requirements that can benefit from proactive user assistance.

In some implementations, an API client 316 can establish connections with external services and third-party platforms through REST and GraphQL interfaces within the data connection framework 310. The API client 316 can include API communication implementations (e.g., HTTP clients, GraphQL query engines, OAuth authentication systems, webhook subscription managers, and/or the like) that handle the technical requirements of different API types including request formatting, response parsing, authentication token management, and error handling for various external service providers. The API client 316 can implement OAuth polling mechanisms that manage authentication flows with external services, automatically refreshing access tokens, handling authorization callbacks, and maintaining secure access to protected resources while complying with API security requirements and rate limiting policies. The API client 316 can execute intelligent polling strategies that optimize data retrieval frequency based on data update patterns, API rate limits, and information criticality, implementing adaptive polling intervals that increase frequency when important events are detected and reduce polling during periods of low activity. The API client 316 can also include response caching mechanisms that store API responses in the cache memory 154 to reduce redundant requests and improve system responsiveness while ensuring data freshness through cache invalidation strategies based on data update frequencies and business requirements. The API client 316 can coordinate with the external data source 178 and network service 174 to access specialized information that enhances contextual analysis capabilities. For example, the API client 316 can connect to financial market data APIs such as Alpha Vantage or IEX Cloud using REST protocols to retrieve real-time stock prices, economic indicators, and market news, implementing OAuth 2.0 authentication flows that securely access protected financial data while managing API rate limits of 500 requests per minute, with intelligent polling algorithms that increase data retrieval frequency to every 15 seconds during market hours when users are actively engaged in financial analysis activities and reduce polling to hourly intervals during off-market periods, enabling the state synthesization architecture 300 to maintain current market context that informs predictive analysis about user information needs related to investment decisions, portfolio management, and financial reporting activities.

In some implementations, a webhook receiver 318 can capture real-time event notifications from external systems through HTTP callback mechanisms within the data connection framework 310. The webhook receiver 318 can include HTTP server implementations (e.g., web server endpoints, request handlers, payload parsers, authentication validators, and/or the like) that accept incoming webhook notifications from external services and process event data in real-time as changes occur in connected systems. The webhook receiver 318 can implement event callback processing algorithms that parse incoming webhook payloads to extract relevant event information including event types, affected entities, timestamps, and associated metadata that describe what changes occurred in external systems. The webhook receiver 318 can execute HTTP endpoint management processes that handle webhook registration with external services, manage callback URLs, validate incoming requests through signature verification and authentication tokens, and ensure secure processing of event notifications while preventing unauthorized access and malicious requests. The webhook receiver 318 can also include event queuing mechanisms that buffer incoming webhook events during high-volume periods and ensure reliable processing even when downstream components experience temporary performance issues or processing delays. The webhook receiver 318 can coordinate with the stream processing module 234 to provide real-time event data that triggers immediate context updates and predictive analysis processes. For example, the webhook receiver 318 can register webhook endpoints with project management platforms such as Asana or Jira to receive immediate notifications when tasks are created, updated, or completed, implementing HTTP request handlers that process incoming webhook payloads comprising task information, project identifiers, and team member assignments, with signature validation algorithms that verify webhook authenticity using HMAC-SHA256 signatures to ensure event notifications originate from authorized sources, enabling the state synthesization architecture 300 to immediately update project context representations when task status changes occur, triggering predictive analysis that can anticipate when users can need to review project progress, communicate with team members about task dependencies, or adjust project timelines based on completed work and emerging bottlenecks.

In some implementations, a file watcher 320 can monitor filesystem and object storage systems to detect file modifications and document changes within the data connection framework 310. The file watcher 320 can include filesystem monitoring implementations (e.g., inotify systems, file system event APIs, directory polling mechanisms, cloud storage webhooks, and/or the like) that track changes to files and directories in local filesystems, network storage systems, and cloud-based object storage platforms including file creation, modification, deletion, and movement operations. The file watcher 320 can implement object storage monitoring processes that connect with cloud storage services such as Amazon S3™, Google Cloud Storage™, and Microsoft Azure Blob Storage™ to receive notifications when documents are uploaded, modified, or accessed, enabling real-time awareness of document lifecycle events that can influence user contexts and information needs. The file watcher 320 can execute content change detection algorithms that analyze file modifications to determine the significance of changes, distinguishing between minor edits and substantial content updates that warrant contextual analysis and potential predictive responses. The file watcher 320 can also include file type filtering mechanisms that focus monitoring on business-relevant document types such as spreadsheets, presentations, reports, and project documents while excluding system files, temporary files, and personal documents that do not contribute to professional context analysis. The file watcher 320 can coordinate with the semantic extraction pipeline 330 to provide document change information that triggers content analysis and knowledge graph updates. For example, the file watcher 320 can monitor shared network drives and cloud storage folders used for project collaboration, implementing filesystem event monitoring that detects when team members upload new project documents, modify existing reports, or create presentation files, with content analysis algorithms that determine when document changes represent significant updates such as new financial data, revised project timelines, or updated client requirements, enabling the state synthesization architecture 300 to immediately analyze modified documents for new entities, relationships, and contextual information that can influence user activities, triggering predictive analysis that anticipates when users can need to review updated documents, incorporate new information into their current work, or communicate with team members about document changes and their implications for ongoing projects.

In some implementations, a plugin system 322 can provide extensible connectivity capabilities for integrating custom data sources and specialized systems within the data connection framework 310. The plugin system 322 can include plugin architecture implementations (e.g., plugin loading frameworks, API specification systems, configuration management tools, security sandboxing mechanisms, and/or the like) that enable the development and deployment of custom connectors for proprietary systems, industry-specific platforms, and specialized data sources that are not supported by standard connector types. The plugin system 322 can implement plugin lifecycle management processes that handle plugin installation, configuration, activation, monitoring, and updates while ensuring system stability and security through plugin isolation and resource management mechanisms. The plugin system 322 can execute plugin API frameworks that provide standardized interfaces for custom connector development, including data extraction APIs, authentication handling, error reporting, and performance monitoring capabilities that enable consistent integration regardless of the underlying data source characteristics. The plugin system 322 can also include plugin validation mechanisms that verify plugin compatibility, security compliance, and performance characteristics before deployment, implementing code review processes and automated testing that ensure custom connectors meet system requirements and do not compromise overall system stability. The plugin system 322 can coordinate with the computing server 102 to provide flexible data integration capabilities that can adapt to diverse organizational environments and specialized data requirements. For example, the plugin system 322 can support the development of custom connectors for industry-specific systems such as electronic health record platforms in healthcare organizations, manufacturing execution systems in industrial environments, or trading platforms in financial services, implementing plugin APIs that enable custom connectors to extract relevant business data while adhering to security protocols and data governance requirements, with plugin management systems that monitor custom connector performance and automatically disable problematic plugins to maintain system stability, enabling the state synthesization architecture 300 to integrate with specialized organizational systems and build comprehensive contextual representations that include industry-specific information and business processes that inform predictive analysis about user needs in specialized professional domains.

In some implementations, a semantic extraction pipeline 330 can analyze textual and structured data to identify meaningful entities, relationships, and concepts that contribute to contextual understanding within the state synthesization architecture 300. The semantic extraction pipeline 330 can include natural language processing implementations (e.g., tokenization engines, part-of-speech taggers, dependency parsers, named entity recognition models, and/or the like) that process textual content from various sources including documents, communications, and database records to extract semantic elements that define user operational contexts and business environments. The semantic extraction pipeline 330 can implement multi-stage processing workflows that systematically analyze incoming data through sequential processing steps including text preprocessing, entity identification, relationship extraction, event detection, and concept classification, with each stage building upon the results of previous stages to create comprehensive semantic understanding. The semantic extraction pipeline 330 can execute parallel processing mechanisms that handle multiple data streams simultaneously while maintaining processing efficiency and ensuring that semantic analysis keeps pace with real-time data ingestion from the data connection framework 310. The semantic extraction pipeline 330 can also include quality assurance processes that validate extraction results through confidence scoring, cross-validation, and consistency checking to ensure high-quality semantic information feeds into knowledge construction processes. The semantic extraction pipeline 330 can coordinate with the model ensembles 152 to access specialized natural language processing models optimized for different types of semantic analysis tasks. For example, the semantic extraction pipeline 330 can process email communications retrieved by the email connector 312 by first applying tokenization algorithms that segment message text into individual words and phrases, then using named entity recognition models to identify people, organizations, and locations mentioned in the communications, followed by relationship extraction algorithms that determine how identified entities are connected through the communication content, such as identifying that a specific client is associated with a particular project based on email subject lines and message content, enabling the state synthesization architecture 300 to build comprehensive communication context graphs that connect users with their professional networks, active projects, and business relationships, supporting the event prediction module 124 in anticipating when users can need to follow up on communications or access information related to entities and relationships identified in their recent email exchanges.

In some implementations, an entity recognition module 332 can identify and classify meaningful entities within textual content to support knowledge construction processes within the semantic extraction pipeline 330. The entity recognition module 332 can include named entity recognition implementations (e.g., conditional random field models, bidirectional LSTM networks, transformer-based entity recognition systems, rule-based entity extractors, and/or the like) that analyze text to identify people, organizations, locations, dates, and domain-specific entities that represent important contextual elements for user environment understanding. The entity recognition module 332 can implement multi-domain entity classification processes that recognize both general entity types such as person names and company names, as well as specialized domain entities including financial instruments, project codes, product names, and technical terminology specific to particular industries or organizational contexts. The entity recognition module 332 can execute entity linking algorithms that connect identified entities to existing knowledge bases and entity databases, resolving entity references to canonical forms and maintaining consistent entity representations across different data sources and textual contexts. The entity recognition module 332 can also include entity confidence scoring mechanisms that assess the reliability of entity identifications and provide uncertainty estimates that inform downstream processing decisions and knowledge construction quality assurance processes. The entity recognition module 332 can coordinate with the unified state structures 151 to provide entity information that populates knowledge graph nodes and supports relationship mapping processes. For example, the entity recognition module 332 can analyze project management communications to identify entities such as team member names like "Sarah Johnson" and "Michael Chen," project identifiers such as "Project Alpha" and "Q4-Initiative-2024," client organizations including "Acme Corporation" and "Global Industries," and timeline references such as "December 15th deadline" and "Q1 2024 launch," implementing entity classification algorithms that distinguish between person entities, project entities, organization entities, and temporal entities, with entity linking processes that connect identified entities to existing records in the unified state structures 151, enabling the state synthesization architecture 300 to build comprehensive project context representations that link team members with their assigned projects, associated clients, and relevant timelines, supporting the event prediction module 124 in predicting when users can need to communicate with specific team members, access client information, or review project timelines based on entity relationships identified in their current activities and communications.

In some implementations, a relationship extraction module 334 can analyze textual content to identify connections, dependencies, and associations between entities within the semantic extraction pipeline 330. The relationship extraction module 334 can include relationship identification implementations (e.g., dependency parsing algorithms, semantic role labeling systems, pattern matching engines, machine learning-based relation classifiers, and/or the like) that analyze sentence structures and semantic patterns to determine how entities are connected through various types of relationships including organizational hierarchies, project assignments, causal dependencies, and temporal sequences. The relationship extraction module 334 can implement relationship classification processes that categorize identified connections into specific relationship types such as employment relationships, collaboration relationships, dependency relationships, and ownership relationships, enabling structured representation of complex organizational and operational contexts. The relationship extraction module 334 can execute relationship confidence assessment algorithms that evaluate the strength and reliability of identified relationships based on textual evidence, frequency of co-occurrence, and consistency across multiple data sources, providing quality metrics that inform knowledge construction and graph building processes. The relationship extraction module 334 can also include temporal relationship tracking capabilities that identify when relationships are established, modified, or terminated based on temporal indicators in textual content, enabling dynamic relationship management that reflects changing organizational and project conditions. The relationship extraction module 334 can coordinate with the state structure construct 350 to provide relationship information that defines connections between entities in knowledge graph representations. For example, the relationship extraction module 334 can analyze email communications and project documents to identify relationships such as "Sarah Johnson reports to Michael Chen" based on organizational communication patterns, "Project Alpha depends on Project Beta completion" based on project planning documents, "Acme Corporation is the client for Project Alpha" based on contract references and communication content, and "Q4 budget review requires financial data from Q3 analysis" based on process documentation and email discussions, implementing relationship classification algorithms that categorize these connections as reporting relationships, dependency relationships, client relationships, and process relationships respectively, with confidence scoring that assesses relationship strength based on frequency of mention and consistency across multiple documents, enabling the state synthesization architecture 300 to build comprehensive organizational and project relationship networks that support the record alignment module 123 in identifying similar historical contexts and the event prediction module 124 in predicting when users can need to interact with related entities or access information about connected projects and processes.

In some implementations, an event detection module 336 can identify significant occurrences and activities within textual content to support temporal context understanding within the semantic extraction pipeline 330. The event detection module 336 can include event identification implementations (e.g., temporal expression recognition systems, activity classification models, milestone detection algorithms, decision point identification engines, and/or the like) that analyze textual content to identify meetings, decisions, milestones, deadlines, and other significant events that represent important contextual markers for user activities and business processes. The event detection module 336 can implement event classification processes that categorize identified events into specific types such as scheduled meetings, completed tasks, made decisions, reached milestones, and approaching deadlines, enabling structured representation of temporal business contexts and activity sequences. The event detection module 336 can execute event temporal analysis algorithms that extract timing information associated with identified events including event dates, durations, frequencies, and temporal relationships between related events, providing comprehensive temporal context that supports pattern recognition and predictive analysis processes. The event detection module 336 can also include event significance assessment mechanisms that evaluate the importance and impact of identified events based on contextual factors such as participant involvement, organizational impact, and relationship to ongoing projects and objectives. The event detection module 336 can coordinate with the runtime session records 150 to provide event information that contributes to session context analysis and historical pattern recognition. For example, the event detection module 336 can analyze calendar data and email communications to identify events such as "quarterly budget review meeting scheduled for December 15th with finance team," "Project Alpha milestone completed on November 30th," "decision made to extend Project Beta deadline to January 15th," and "client presentation scheduled for December 20th with Acme Corporation," implementing event classification algorithms that categorize these as meeting events, milestone events, decision events, and presentation events respectively, with temporal analysis that extracts specific dates, participant lists, and event dependencies, enabling the state synthesization architecture 300 to build comprehensive temporal context representations that track important business activities and their timing, supporting the event prediction module 124 in predicting when users can need to prepare for upcoming meetings, follow up on completed milestones, implement made decisions, or access information related to scheduled events based on temporal patterns and event relationships identified in their current context.

In some implementations, a sentiment analysis module 338 can evaluate emotional tone and attitudes expressed in textual communications to enhance contextual understanding within the semantic extraction pipeline 330. The sentiment analysis module 338 can include sentiment classification implementations (e.g., lexicon-based sentiment analyzers, machine learning sentiment models, aspect-based sentiment analysis systems, emotion detection algorithms, and/or the like) that analyze textual content to identify positive, negative, and neutral sentiments as well as specific emotions such as satisfaction, frustration, urgency, and confidence that provide insights into user states and relationship dynamics. The sentiment analysis module 338 can implement multi-level sentiment analysis processes that evaluate sentiment at different granularities including document-level sentiment for overall communication tone, sentence-level sentiment for specific statements and opinions, and aspect-based sentiment that identifies attitudes toward particular topics, entities, or issues mentioned in the content. The sentiment analysis module 338 can execute sentiment temporal tracking algorithms that monitor how sentiment changes over time within ongoing communications and relationships, identifying sentiment trends that can indicate improving or deteriorating conditions in projects, customer relationships, or team dynamics. The sentiment analysis module 338 can also include sentiment confidence scoring mechanisms that assess the reliability of sentiment classifications and provide uncertainty estimates that inform contextual analysis and decision-making processes about the significance of identified emotional indicators. The sentiment analysis module 338 can coordinate with the prioritization module 125 to provide sentiment information that influences priority assessment for predicted events and proactive assistance strategies. For example, the sentiment analysis module 338 can analyze customer service email communications to identify sentiment indicators such as "frustrated tone in client email about project delays," "positive feedback about team performance in stakeholder communication," "urgent concern expressed about budget overruns in finance meeting notes," and "satisfied customer response to product delivery confirmation," implementing aspect-based sentiment analysis that associates specific sentiments with particular topics such as project timelines, team performance, budget management, and product quality, with temporal sentiment tracking that identifies when customer satisfaction is declining or when team morale is improving based on communication patterns over time, enabling the state synthesization architecture 300 to build comprehensive relationship context representations that include emotional and attitudinal dimensions, supporting the event prediction module 124 in predicting when users can need to address customer concerns, recognize team achievements, investigate budget issues, or follow up on positive customer interactions based on sentiment patterns and their implications for relationship management and business outcomes.

In some implementations, an intent classification module 340 can analyze textual content to determine underlying goals, purposes, and objectives expressed in communications and documents within the semantic extraction pipeline 330. The intent classification module 340 can include intent recognition implementations (e.g., text classification models, purpose detection algorithms, goal identification systems, action intent analyzers, and/or the like) that process textual content to identify what users and stakeholders are trying to accomplish through their communications and activities, including information seeking intents, decision-making intents, collaboration intents, and task execution intents. The intent classification module 340 can implement multi-category intent classification processes that recognize various types of intentions including requests for information, proposals for actions, expressions of concerns, announcements of decisions, and invitations for collaboration, enabling comprehensive understanding of communication purposes and stakeholder objectives. The intent classification module 340 can execute intent confidence assessment algorithms that evaluate the clarity and certainty of identified intentions based on linguistic indicators, contextual evidence, and consistency with established communication patterns, providing reliability metrics that inform contextual analysis and response prioritization processes. The intent classification module 340 can also include intent temporal analysis capabilities that track how intentions evolve over time within ongoing communications and projects, identifying when initial requests develop into formal requirements, when concerns escalate into urgent issues, or when proposals progress toward implementation decisions. The intent classification module 340 can coordinate with the event generation module 126 to provide intent information that guides the creation of preliminary events and proactive assistance strategies. For example, the intent classification module 340 can analyze project management communications to identify intents such as "request for budget information to support project planning decision," "proposal to extend project timeline due to resource constraints," "concern about client satisfaction with current deliverable quality," and "invitation to collaborate on risk mitigation strategy development," implementing intent classification algorithms that categorize these as information-seeking intent, proposal intent, concern-expression intent, and collaboration-invitation intent respectively, with confidence scoring that assesses intent clarity based on linguistic markers and contextual evidence, enabling the state synthesization architecture 300 to build comprehensive communication context representations that capture not only what is being discussed but also what stakeholders are trying to accomplish, supporting the event prediction module 124 in predicting when users can need to provide requested information, respond to proposals, address expressed concerns, or participate in collaborative activities based on identified intentions and their implications for user responsibilities and stakeholder expectations.

In some implementations, a state structure construct 350 can organize and represent extracted semantic information through comprehensive knowledge structures within the state synthesization architecture 300. The state structure construct 350 can include graph-based data modeling implementations (e.g., property graph databases, semantic network representations, entity-relationship models, knowledge graph frameworks, and/or the like) that organize entities, concepts, events, and relationships into interconnected structures that enable complex queries and sophisticated analysis operations across diverse information domains. The state structure construct 350 can implement property graph model architectures that use typed nodes and edges to represent different categories of information elements, where nodes represent distinct entities, concepts, and events while edges capture relationships with attributes that describe relationship types, strengths, and temporal characteristics. The state structure construct 350 can execute temporal annotation processes that associate time-based metadata with all graph elements, enabling tracking of when information entered the system, when relationships were established, and how contexts have evolved over time to support historical analysis and pattern recognition. The state structure construct 350 can also include versioning capabilities that maintain multiple versions of graph structures as they change over time, enabling comparison of different contextual states and analysis of how user environments and business conditions have developed through various stages. The state structure construct 350 can coordinate with the unified state structures 151 to provide persistent storage and efficient access to comprehensive contextual representations. For example, the state structure construct 350 can organize customer relationship information by creating customer entity nodes that comprise attributes such as company name, contact details, and account status, connected through relationship edges to project entity nodes representing active engagements, team member entity nodes indicating assigned personnel, and event entity nodes documenting interaction history, with temporal annotations that track when relationships were established and how they have evolved, implementing property graph structures where customer nodes have properties like "industry: technology," "tier: enterprise," and "status: active," while relationship edges have properties such as "relationship_type: client," "strength: 0.85," and "established_date: 2024-01-15," enabling the state synthesization architecture 300 to support complex queries such as finding all enterprise clients in the technology industry with active projects assigned to specific team members, supporting the record alignment module 123 in identifying similar historical customer contexts and the event prediction module 124 in predicting when users can need to access customer information, review project status, or communicate with stakeholders based on comprehensive relationship and temporal context analysis.

In some implementations, entities 352 can represent distinct objects, people, organizations, and concepts within the state structure construct 350. The entities 352 can include entity node implementations (e.g., typed entity records, attribute collections, unique identifiers, entity metadata structures, and/or the like) that store structured information about specific real-world objects including people, organizations, locations, products, projects, and abstract concepts that are relevant to user contexts and business operations. The entities 352 can implement entity attribute management systems that maintain comprehensive property sets for each entity including identifying information, descriptive attributes, status indicators, and contextual metadata that provide complete entity profiles for analysis and relationship mapping processes. The entities 352 can execute entity lifecycle management processes that track entity creation, modification, and deactivation over time, maintaining historical records of entity changes and enabling analysis of how entities have evolved within organizational and operational contexts. The entities 352 can also include entity linking mechanisms that connect related entities through various relationship types and maintain referential integrity across complex entity networks that span multiple domains and information sources. The entities 352 can coordinate with the entity recognition module 332 to provide structured storage for identified entities and support entity resolution processes that maintain consistent entity representations. For example, the entities 352 can include person entities representing team members with attributes such as "name: Sarah Johnson," "role: Senior Analyst," "department: Finance," "email: sarah.johnson@company.com," and "hire_date: 2022-03-15," organization entities representing clients with attributes including "name: Acme Corporation," "industry: Manufacturing," "size: Enterprise," "location: Chicago, IL," and "contract_value: $2.5M," project entities with attributes such as "name: Q4 Budget Analysis," "status: In Progress," "start_date: 2024-10-01," "deadline: 2024-12-15," and "priority: High," and concept entities representing business processes with attributes including "name: Quarterly Review Process," "frequency: Quarterly," "participants: Finance Team," and "deliverables: Budget Report, Variance Analysis," enabling the state structure construct 350 to maintain comprehensive entity catalogs that support complex contextual queries and relationship analysis, allowing the event prediction module 124 to predict when users can need to access specific entity information, communicate with particular people, or engage with certain projects based on entity attributes and their relationships to current user activities and environmental conditions.

In some implementations, concepts 354 can represent abstract ideas, processes, and categorical knowledge within the state structure construct 350. The concepts 354 can include conceptual node implementations (e.g., taxonomy structures, semantic categories, process definitions, knowledge classifications, and/or the like) that organize abstract information including business processes, methodologies, policies, standards, and domain-specific knowledge that provide contextual understanding for user activities and organizational operations. The concepts 354 can implement concept hierarchy management systems that organize conceptual information into taxonomic structures with parent-child relationships, enabling inheritance of properties and systematic navigation through related conceptual domains that support comprehensive knowledge representation. The concepts 354 can execute concept association processes that link conceptual knowledge with specific entities and events, creating semantic connections that enable understanding of how abstract concepts apply to concrete situations and operational contexts within user environments. The concepts 354 can also include concept evolution tracking capabilities that monitor how conceptual understanding changes over time as new information becomes available and organizational knowledge develops through experience and learning processes. The concepts 354 can coordinate with the intent classification module 340 to provide conceptual context that informs understanding of user goals and stakeholder objectives within broader organizational and domain frameworks. For example, the concepts 354 can include business process concepts such as "Budget Planning Process" with attributes including "description: Annual financial planning methodology," "phases: Data Collection, Analysis, Forecasting, Approval," "stakeholders: Finance Team, Department Heads, Executive Leadership," and "timeline: October-December," methodology concepts such as "Risk Assessment Framework" with attributes including "approach: Quantitative and Qualitative Analysis," "criteria: Probability, Impact, Mitigation Cost," "frequency: Quarterly," and "reporting: Risk Dashboard, Executive Summary," and policy concepts such as "Data Governance Policy" with attributes including "scope: All Business Data," "requirements: Classification, Access Control, Retention," "compliance: GDPR, SOX," and "review_cycle: Annual," enabling the state structure construct 350 to provide comprehensive conceptual context that helps the event prediction module 124 understand when users can need to follow specific processes, apply particular methodologies, or comply with relevant policies based on their current activities and the conceptual frameworks that govern their work domains and organizational responsibilities.

In some implementations, events 356 can represent significant occurrences, activities, and temporal markers within the state structure construct 350. The events 356 can include event node implementations (e.g., timestamped occurrence records, activity classifications, milestone markers, decision point indicators, and/or the like) that capture discrete happenings including meetings, decisions, communications, system changes, and business activities that influence user contexts and organizational states. The events 356 can implement event attribute management systems that maintain comprehensive metadata for each event including occurrence timestamps, duration information, participant lists, outcome descriptions, and contextual significance indicators that provide complete event profiles for temporal analysis and pattern recognition processes. The events 356 can execute event sequencing algorithms that establish temporal relationships between related events, enabling chronological ordering and causal chain analysis that supports understanding of how events influence subsequent activities and environmental conditions. The events 356 can also include event impact assessment mechanisms that evaluate the significance and consequences of recorded events based on participant involvement, organizational scope, and relationship to ongoing projects and objectives. The events 356 can coordinate with the event detection module 336 to provide structured storage for identified events and support event correlation processes that link related occurrences across different information sources and temporal contexts. For example, the events 356 can include meeting events with attributes such as "title: Q4 Budget Review," "date: 2024-12-15," "participants: Finance Team, Department Heads," "duration: 2 hours," and "outcomes: Budget Approved, Timeline Extended," decision events with attributes including "decision: Extend Project Alpha Deadline," "date: 2024-11-30," "decision_maker: Project Manager," "rationale: Resource Constraints," and "impact: Timeline Shift, Budget Reallocation," communication events with attributes such as "type: Client Email," "sender: client@acme.com," "recipient: account_manager@company.com," "subject: Deliverable Feedback," and "sentiment: Concerned," and milestone events with attributes including "milestone: Phase 1 Completion," "project: Digital Transformation," "completion_date: 2024-11-25," "status: Achieved," and "next_phase: Implementation Planning," enabling the state structure construct 350 to maintain comprehensive event histories that support temporal pattern analysis and enable the event prediction module 124 to predict when users can need to prepare for upcoming events, follow up on completed activities, or respond to emerging situations based on event patterns and their relationships to current user contexts and organizational dynamics.

In some implementations, relations 358 can represent connections, dependencies, and associations between different elements within the state structure construct 350. The relations 358 can include relationship edge implementations (e.g., typed connection records, weighted association indicators, directional dependency markers, temporal relationship descriptors, and/or the like) that define how entities, concepts, and events are interconnected through various types of relationships including hierarchical structures, causal dependencies, collaborative associations, and temporal sequences. The relations 358 can implement relationship attribute management systems that maintain comprehensive metadata for each connection including relationship types, strength indicators, confidence scores, temporal validity periods, and contextual conditions that provide complete relationship profiles for graph traversal and analysis operations. The relations 358 can execute relationship inference algorithms that identify implicit connections between elements based on co-occurrence patterns, semantic similarities, and contextual associations, expanding the relationship network beyond explicitly recorded connections to support comprehensive contextual understanding. The relations 358 can also include relationship evolution tracking capabilities that monitor how connections change over time, including relationship strengthening, weakening, creation, and dissolution, enabling analysis of dynamic relationship patterns and their influence on user contexts and organizational conditions. The relations 358 can coordinate with the relationship extraction module 334 to provide structured storage for identified relationships and support relationship validation processes that ensure consistency and accuracy across the interconnected knowledge structure. For example, the relations 358 can include reporting relationships with attributes such as "type: reports_to," "source: Sarah Johnson," "target: Michael Chen," "strength: 0.95," and "established: 2022-03-15," project relationships with attributes including "type: assigned_to," "source: Q4 Budget Analysis," "target: Finance Team," "role: Primary Analyst," and "duration: 2024-10-01 to 2024-12-15," client relationships with attributes such as "type: serves," "source: Account Manager," "target: Acme Corporation," "relationship_value: $2.5M," and "satisfaction_score: 0.85," and dependency relationships with attributes including "type: depends_on," "source: Project Alpha," "target: Project Beta," "dependency_type: Sequential," and "criticality: High," enabling the state structure construct 350 to support complex relationship queries and traversal operations that allow the record alignment module 123 to identify similar relationship patterns in historical contexts and enable the event prediction module 124 to predict when users can need to interact with related entities, manage relationship dynamics, or address dependency issues based on comprehensive relationship analysis and their implications for user responsibilities and stakeholder collaboration requirements.

In some implementations, cache layers 360 can provide multi-tier storage optimization that enables high-performance access to contextual information within the state synthesization architecture 300. The cache layers 360 can include hierarchical storage implementations (e.g., in-memory cache systems, distributed cache clusters, solid-state storage tiers, magnetic storage archives, and/or the like) that organize contextual data across different performance and capacity tiers based on access frequency, temporal relevance, and computational cost considerations. The cache layers 360 can implement intelligent cache management algorithms that automatically promote frequently accessed information to higher-performance tiers while demoting stale or rarely used data to lower-cost storage levels, optimizing both response times and resource utilization across the storage hierarchy. The cache layers 360 can execute predictive cache warming strategies that preload information likely to be needed based on user activity patterns, contextual changes, and predictive analysis results from the event prediction module 124, ensuring that relevant data is immediately available when users require contextual insights. The cache layers 360 can also include cache coherence mechanisms that maintain data consistency across different storage tiers when underlying information is updated, implementing invalidation strategies and refresh protocols that ensure users always access current and accurate contextual representations. The cache layers 360 can coordinate with the cache manager module 248 to provide systematic cache optimization and performance monitoring across the storage hierarchy. For example, the cache layers 360 can implement a hot cache tier using high-speed RAM that stores the most frequently accessed customer relationship data, project status information, and recent communication contexts with sub-millisecond access times, a warm cache tier using SSD storage that maintains commonly queried historical patterns, entity relationship networks, and temporal context data with access times under 10 milliseconds, a cold cache tier using traditional disk storage that preserves complete historical records, archived session data, and comprehensive knowledge graph structures with access times under 100 milliseconds, and an archive tier using distributed object storage that maintains long-term historical data, compliance records, and backup copies of knowledge structures with access times measured in seconds, enabling the state synthesization architecture 300 to provide immediate access to current contextual information while maintaining comprehensive historical context for pattern analysis and supporting the event prediction module 124 in generating accurate predictions based on both current conditions and historical precedents stored across the multi-tier cache hierarchy.

In some implementations, metrics module 370 can provide comprehensive performance monitoring and system optimization capabilities within the state synthesization architecture 300. The metrics module 370 can include performance measurement implementations (e.g., latency analyzers, throughput monitors, accuracy assessments, resource utilization trackers, and/or the like) that continuously evaluate system performance across multiple dimensions including query response times, data processing throughput, semantic extraction accuracy, and storage efficiency metrics. The metrics module 370 can implement real-time monitoring systems that track key performance indicators including query latency measurements showing sub-100 millisecond response times for contextual queries, processing throughput metrics demonstrating over 10,000 queries per second capacity, and semantic extraction accuracy scores maintaining 99% precision in entity recognition and relationship extraction tasks. The metrics module 370 can execute performance optimization algorithms that automatically adjust system parameters based on observed performance patterns, implementing dynamic resource allocation strategies that scale processing capacity during high-demand periods and optimize resource utilization during normal operations. The metrics module 370 can also include alerting mechanisms that notify system administrators when performance metrics exceed acceptable thresholds, enabling proactive system maintenance and optimization to prevent performance degradation that could impact user experience and predictive accuracy. The metrics module 370 can coordinate with various system components including the cache layers 360, semantic extraction pipeline 330, and state structure construct 350 to provide comprehensive performance visibility and optimization guidance. For example, the metrics module 370 can monitor query latency across the cache layers 360 by measuring average response times of 0.5 milliseconds for hot cache access, 8 milliseconds for warm cache retrieval, 75 milliseconds for cold cache queries, and 2.3 seconds for archive tier access, while tracking cache hit rates showing 85% hot cache utilization, 12% warm cache access, and 3% cold cache queries, enabling automatic cache optimization that promotes frequently accessed customer relationship data and project context information to higher-performance tiers, simultaneously monitoring semantic extraction pipeline 330 performance by measuring entity recognition accuracy at 99.2% precision with 98.8% recall, relationship extraction accuracy at 97.5% precision with 96.9% recall, and event detection accuracy at 98.1% precision with 97.3% recall, while tracking processing throughput at 15,000 documents per hour and maintaining extraction latency under 200 milliseconds per document, providing comprehensive performance visibility that enables the state synthesization architecture 300 to maintain optimal performance levels and support the event prediction module 124 with high-quality contextual information delivered within the response time requirements necessary for effective anticipatory intelligence generation and delivery.

Figure 4:
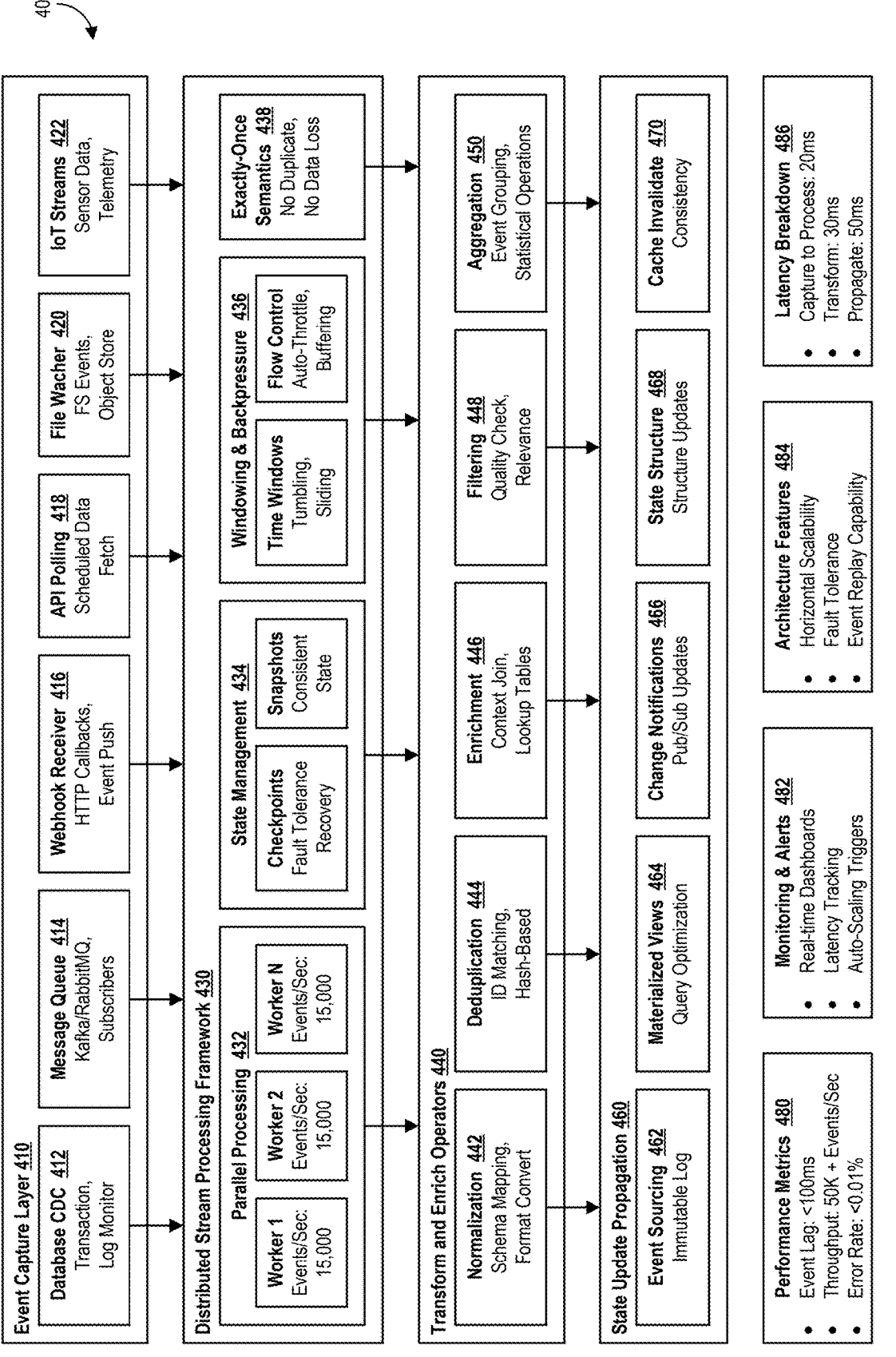
FIG. 4 is a block diagram that illustrates a data streaming system in accordance with some implementations of the present technology.

FIG. 4 is a block diagram that illustrates a data streaming system in accordance with some implementations of the present technology. In some implementations, the data streaming system 400 can provide comprehensive real-time data processing capabilities that enable the event coordination system 100 to handle high-volume information flows with sub-second latency requirements. The data streaming system 400 can include distributed processing architectures (e.g., Apache Kafka™ clusters, Apache Flink™ frameworks, Apache Storm™ topologies, Amazon Kinesis™ streams, and/or the like) that coordinate multiple processing components to ingest, transform, and propagate data changes across the system architecture 200 while maintaining fault tolerance and exactly-once processing guarantees. The data streaming system 400 can implement scalable processing mechanisms that automatically distribute workloads across multiple computing nodes, enabling horizontal scaling that accommodates varying data volumes and processing demands without compromising response time requirements. The data streaming system 400 can execute comprehensive monitoring and optimization processes that track processing performance, resource utilization, and data quality metrics to ensure reliable operation under diverse operational conditions. The data streaming system 400 can also include integration capabilities that coordinate with the data retrieval layer 230 to receive incoming data streams and with the synthesization layer 240 to deliver processed information for contextual analysis and knowledge construction. The data streaming system 400 can coordinate with the processor 110 and memory 120 to provide computational resources needed for real-time stream processing operations. For example, the data streaming system 400 can process simultaneous data streams from customer relationship management systems, financial market feeds, and IoT sensor networks by implementing distributed processing topologies that handle over 15,000 events per second across multiple data types, with automatic load balancing algorithms that distribute processing tasks across available computing resources while maintaining processing latency under 100 milliseconds from data ingestion to context update completion, enabling the event prediction module 124 to generate predictions based on current information and the interface module 127 to deliver proactive insights while conditions are still relevant to user activities and decision-making processes.

In some implementations, an event capture layer 410 can provide comprehensive data ingestion capabilities that monitor diverse information sources for changes and new data within the data streaming system 400. The event capture layer 410 can include multi-source monitoring implementations (e.g., database change detection systems, message queue subscribers, HTTP callback receivers, scheduled polling mechanisms, and/or the like) that establish connections with various data sources and implement source-specific protocols for detecting and capturing data modification events as they occur in real-time. The event capture layer 410 can implement event standardization processes that convert diverse event formats from different source systems into unified event structures suitable for downstream processing, including event metadata extraction, timestamp normalization, and payload standardization that enable consistent processing regardless of source system characteristics. The event capture layer 410 can execute event validation mechanisms that verify the integrity and authenticity of captured events through checksum validation, source authentication, and data quality assessments that ensure only valid events enter the processing pipeline. The event capture layer 410 can also include event buffering capabilities that temporarily store captured events during high-volume periods to prevent data loss when downstream processing components experience temporary capacity limitations or performance issues. The event capture layer 410 can coordinate with the data connection framework 310 to leverage established connections with various data sources and provide systematic event capture across the organizational data ecosystem. For example, the event capture layer 410 can simultaneously monitor customer relationship management databases for record modifications, email servers for new message arrivals, project management systems for task status changes, and financial systems for transaction updates, implementing event capture protocols that detect database record insertions within 50 milliseconds of occurrence, email message arrivals within 30 milliseconds of delivery, task status modifications within 100 milliseconds of user updates, and financial transaction completions within 200 milliseconds of processing, enabling the data streaming system 400 to maintain comprehensive awareness of organizational data changes and trigger immediate processing workflows that update the unified state structures 151 and inform the event prediction module 124 about emerging conditions that can influence user information needs and proactive assistance opportunities.

In some implementations, a database monitor 412 can provide specialized database change detection capabilities through transaction log analysis and real-time monitoring within the event capture layer 410. The database monitor 412 can include change data capture implementations (e.g., transaction log readers, binary log parsers, database trigger systems, replication stream monitors, and/or the like) that connect to database systems and monitor transaction logs, write-ahead logs, and replication streams to detect data modifications including record insertions, updates, deletions, and schema changes as they occur within database systems. The database monitor 412 can implement log parsing algorithms that analyze database-specific log formats to extract relevant change information including affected tables, modified columns, old and new values, transaction identifiers, and timestamp information that provide complete context for database modifications. The database monitor 412 can execute change filtering processes that identify business-significant database changes while excluding system-level modifications, maintenance operations, and irrelevant data updates that do not contribute to meaningful contextual analysis or user environment understanding. The database monitor 412 can also include change correlation mechanisms that group related database modifications into logical change sets, enabling understanding of complex business transactions that span multiple database tables and operations. The database monitor 412 can coordinate with the database connector 314 to leverage established database connections and provide systematic monitoring of organizational database systems that comprise customer information, project data, and operational records. For example, the database monitor 412 can monitor customer relationship management databases by analyzing PostgreSQL write-ahead logs to detect when customer contact records are updated with new phone numbers or email addresses, when interaction records are inserted documenting customer service calls or sales meetings, when opportunity records are modified to reflect changing deal stages or probability assessments, and when account records are updated with new contract values or renewal dates, implementing log parsing algorithms that extract change details including customer identifiers, field modifications, timestamp information, and user context, enabling the data streaming system 400 to immediately detect customer-related data changes and trigger processing workflows that update customer context representations in the unified state structures 151, informing the event prediction module 124 about emerging customer relationship dynamics that can require proactive user assistance such as follow-up communications, account reviews, or relationship management activities based on the nature and timing of detected database modifications.

In some implementations, a message queue 414 can provide reliable message-based event capture through subscription to distributed messaging systems within the event capture layer 410. The message queue 414 can include message broker integrations (e.g., Apache Kafka™ consumers, RabbitMQ subscribers, Amazon SQS receivers, Azure Service Bus clients, and/or the like) that connect to organizational messaging infrastructure and subscribe to message topics, queues, and channels that carry business event notifications from various applications and systems throughout the organization. The message queue 414 can implement message consumption algorithms that process incoming messages according to messaging patterns including publish-subscribe models for broadcast events, point-to-point queuing for directed communications, and request-response patterns for interactive message exchanges, while maintaining message ordering and delivery guarantees. The message queue 414 can execute message deserialization processes that convert message payloads from various formats including JSON, XML, Apache Avro, and Protocol Buffers into standardized event structures suitable for downstream processing, including payload validation and schema compliance verification. The message queue 414 can also include consumer group management capabilities that coordinate multiple message consumers to achieve parallel processing and fault tolerance, implementing load balancing strategies that distribute message processing across available consumer instances while maintaining message ordering requirements. The message queue 414 can coordinate with the stream processing module 234 to provide message-based event streams that feed real-time processing pipelines and contribute to comprehensive organizational event awareness. For example, the message queue 414 can subscribe to Apache Kafka™ topics that carry project management events from collaboration platforms, receiving messages when team members create new tasks, update task statuses, modify project timelines, or complete deliverables, implementing Kafka consumer configurations that process messages with at-least-once delivery guarantees while maintaining partition ordering for project-specific event sequences, with message deserialization algorithms that extract project identifiers, task details, team member information, and time-stamp data from JSON message payloads, enabling the data streaming system 400 to immediately process project-related events and update project context representations in the unified state structures 151, informing the event prediction module 124 about project progress and team activities that can trigger proactive assistance such as status report preparation, stakeholder communications, or resource allocation adjustments based on detected project events and their implications for user responsibilities and project coordination requirements.

In some implementations, a webhook receiver 416 can capture real-time event notifications through HTTP callback mechanisms from external systems within the event capture layer 410. The webhook receiver 416 can include HTTP server implementations (e.g., REST API endpoints, webhook handlers, payload processors, authentication validators, and/or the like) that accept incoming HTTP POST requests from external services and applications that send event notifications when significant changes or activities occur in connected systems. The webhook receiver 416 can implement webhook authentication processes that validate incoming requests through signature verification, API key validation, and IP address filtering to ensure that webhook notifications originate from authorized sources and prevent malicious or unauthorized event injection into the processing pipeline. The webhook receiver 416 can execute payload processing algorithms that parse incoming webhook payloads to extract event information including event types, affected entities, modification details, and contextual metadata, while handling various payload formats and webhook schemas used by different external service providers. The webhook receiver 416 can also include webhook reliability mechanisms that implement retry handling, duplicate detection, and acknowledgment responses to ensure reliable event capture even when network conditions or external system behaviors create delivery challenges. The webhook receiver 416 can coordinate with the network service 174 to receive webhook notifications from external platforms and provide immediate event processing that maintains real-time awareness of external system changes. For example, the webhook receiver 416 can register webhook endpoints with customer support platforms such as Zendesk or Salesforce Service Cloud to receive immediate notifications when customers submit new support tickets, update existing cases, or provide feedback on resolved issues, implementing HMAC-SHA256 signature validation that verifies webhook authenticity using shared secret keys, with payload processing algorithms that extract customer identifiers, case details, priority levels, and issue categories from incoming webhook notifications, enabling the data streaming system 400 to immediately process customer service events and update customer relationship contexts in the unified state structures 151, informing the event prediction module 124 about emerging customer service situations that can require proactive user assistance such as case assignment, escalation procedures, or customer communication preparation based on detected support events and their implications for customer satisfaction and service delivery requirements.

In some implementations, a polling interface 418 can provide systematic data retrieval through scheduled queries to systems that do not support real-time event notifications within the event capture layer 410. The polling interface 418 can include scheduled query implementations (e.g., cron-based schedulers, interval timers, adaptive polling algorithms, batch query processors, and/or the like) that execute periodic data retrieval operations against external systems and databases to detect changes and new information that occurred since the previous polling cycle. The polling interface 418 can implement adaptive polling strategies that adjust query frequencies based on data update patterns, system availability, and information criticality, increasing polling rates when important events are detected and reducing frequencies during periods of low activity to optimize resource utilization and minimize system load. The polling interface 418 can execute change detection algorithms that compare current query results with previously retrieved data to identify modifications, additions, and deletions, implementing efficient comparison mechanisms that minimize computational overhead while ensuring accurate change identification. The polling interface 418 can also include polling optimization mechanisms that implement incremental queries using timestamp-based filtering, cursor-based pagination, and delta synchronization techniques to retrieve only changed data rather than complete datasets, reducing network bandwidth and processing requirements. The polling interface 418 can coordinate with the external data source 178 to access systems that require polling-based data retrieval and provide systematic monitoring of information sources that lack real-time notification capabilities. For example, the polling interface 418 can implement scheduled queries against financial market data APIs that provide stock prices, economic indicators, and market news updates, executing REST API calls every 60 seconds during market hours to retrieve current market data and compare results with previously cached values to identify price changes, volume fluctuations, and news updates, implementing incremental query strategies that use timestamp parameters to retrieve only data modified since the last polling cycle, enabling the data streaming system 400 to maintain current market awareness despite API limitations that prevent real-time data streaming, updating market context information in the unified state structures 151 and informing the event prediction module 124 about market conditions that can influence user financial analysis activities and trigger proactive assistance such as portfolio reviews, risk assessments, or client communications based on detected market changes and their potential impact on user investment responsibilities and decision-making requirements.

In some implementations, a file watcher 420 can monitor filesystem and document storage systems to detect file modifications and document changes within the event capture layer 410. The file watcher 420 can include filesystem monitoring implementations (e.g., inotify systems, file system event APIs, directory polling mechanisms, cloud storage event subscriptions, and/or the like) that track changes to files and directories in local filesystems, network storage systems, and cloud-based document repositories including file creation, modification, deletion, movement, and permission changes. The file watcher 420 can implement file change analysis algorithms that evaluate the significance of detected file modifications by analyzing file types, modification timestamps, file sizes, and content checksums to distinguish between meaningful document updates and trivial changes such as temporary file creation or metadata modifications. The file watcher 420 can execute content change detection processes that analyze modified documents to determine the extent and nature of changes, implementing document comparison algorithms that identify added content, deleted sections, and modified text to assess whether changes warrant contextual analysis and knowledge graph updates. The file watcher 420 can also include file filtering mechanisms that focus monitoring on business-relevant document types and storage locations while excluding system files, temporary directories, and personal document areas that do not contribute to organizational context understanding. The file watcher 420 can coordinate with the data connection framework 310 to monitor document repositories and shared storage systems that comprise project documents, reports, and collaborative content. For example, the file watcher 420 can monitor shared network drives and cloud storage folders used for project collaboration by implementing filesystem event monitoring that detects when team members upload new project documents such as requirements specifications, design documents, or status reports, when existing documents are modified with updated content such as revised timelines, changed specifications, or new analysis results, and when documents are moved between project folders indicating workflow progression or organizational changes, implementing content analysis algorithms that calculate document similarity scores to determine when modifications represent substantial updates rather than minor formatting changes, enabling the data streaming system 400 to immediately process document-related events and trigger semantic analysis through the semantic extraction pipeline 330 to extract new entities, relationships, and contextual information from modified documents, updating project and document contexts in the unified state structures 151 and informing the event prediction module 124 about document changes that can require user attention such as document reviews, stakeholder notifications, or workflow adjustments based on detected document modifications and their implications for project coordination and information management requirements.

In some implementations, a stream processor 422 can handle specialized data streams from sensor networks and telemetry systems within the event capture layer 410. The stream processor 422 can include sensor data ingestion implementations (e.g., IoT protocol handlers, telemetry data parsers, time-series processors, sensor network gateways, and/or the like) that connect to IoT devices, sensor networks, and monitoring systems to capture continuous streams of measurement data, status updates, and environmental readings that provide real-world context for business operations and user activities. The stream processor 422 can implement sensor data processing algorithms that handle high-frequency data streams by applying sampling techniques, data aggregation methods, and anomaly detection algorithms to identify significant sensor events and filter out routine measurements that do not indicate meaningful changes in monitored conditions. The stream processor 422 can execute sensor data correlation processes that combine readings from multiple sensors to create comprehensive environmental and operational awareness, implementing statistical analysis and pattern recognition algorithms that identify trends, anomalies, and threshold violations across sensor networks. The stream processor 422 can also include sensor data quality assurance mechanisms that validate sensor readings through range checking, consistency verification, and sensor health monitoring to ensure reliable data feeds into contextual analysis processes. The stream processor 422 can coordinate with the IoT device 176 and IoT service module 218 to provide systematic processing of sensor-based information that enhances environmental context understanding. For example, the stream processor 422 can process continuous data streams from environmental sensors deployed in office buildings and manufacturing facilities, receiving temperature, humidity, air quality, and occupancy measurements every 30 seconds from distributed sensor networks, implementing data aggregation algorithms that calculate rolling averages, detect threshold violations, and identify environmental trends that can affect business operations, with anomaly detection processes that flag unusual sensor readings such as temperature spikes indicating equipment failures, humidity changes suggesting HVAC issues, or occupancy patterns indicating space utilization changes, enabling the data streaming system 400 to maintain comprehensive environmental awareness and update facility context information in the unified state structures 151, informing the event prediction module 124 about environmental conditions that can influence user activities such as facility management tasks, equipment maintenance scheduling, or workspace optimization decisions based on detected sensor patterns and their implications for operational efficiency and user comfort requirements.

In some implementations, a processing framework 430 can coordinate distributed stream processing operations that enable scalable, fault-tolerant analysis of captured events within the data streaming system 400. The processing framework 430 can include distributed computing implementations (e.g., Apache Flink™ clusters, Apache Spark Streaming deployments, Apache Storm™ topologies, Amazon Kinesis™ Analytics applications, and/or the like) that provide scalable processing infrastructure capable of handling high-volume event streams while maintaining low-latency processing requirements and exactly-once processing guarantees. The processing framework 430 can implement stream processing orchestration mechanisms that coordinate multiple processing stages including event ingestion, transformation, enrichment, and output generation, while managing resource allocation, task scheduling, and failure recovery across distributed computing nodes. The processing framework 430 can execute processing pipeline management algorithms that optimize data flow through processing stages by implementing backpressure handling, load balancing, and dynamic scaling strategies that adapt to varying event volumes and processing demands. The processing framework 430 can also include fault tolerance mechanisms that ensure continuous processing operation even when individual processing nodes experience failures, implementing checkpoint-based recovery, state replication, and automatic failover capabilities that maintain processing continuity and data consistency. The processing framework 430 can coordinate with the processor 110 and memory 120 to provide distributed processing capabilities that extend beyond single-node computational resources. For example, the processing framework 430 can implement Apache Flink™ processing clusters that distribute event processing across multiple computing nodes, with each node handling specific processing tasks such as event deserialization, transformation operations, and state updates, implementing exactly-once processing semantics that ensure each captured event is processed exactly once despite node failures or network partitions, with automatic scaling algorithms that add processing capacity when event volumes exceed 10,000 events per second and reduce capacity during low-activity periods, enabling the data streaming system 400 to maintain consistent processing performance under varying operational conditions while ensuring that all captured events contribute to contextual analysis and knowledge graph updates in the unified state structures 151, supporting the event prediction module 124 with reliable, current information needed for accurate predictive analysis and proactive assistance generation.

In some implementations, a parallel processor 432 can distribute event processing operations across multiple worker nodes to achieve high-throughput processing within the processing framework 430. The parallel processor 432 can include distributed processing implementations (e.g., worker node managers, task distribution algorithms, load balancing systems, resource allocation frameworks, and/or the like) that coordinate the execution of processing tasks across multiple computing nodes while maintaining processing efficiency and ensuring that event processing keeps pace with data ingestion rates. The parallel processor 432 can implement workload distribution algorithms that analyze processing requirements for different event types and assign tasks to worker nodes based on computational capacity, current workload, and processing specialization, optimizing resource utilization while maintaining processing latency requirements. The parallel processor 432 can execute processing coordination mechanisms that manage inter-node communication, data sharing, and result aggregation across distributed processing operations, implementing efficient data serialization and network communication protocols that minimize overhead while enabling collaborative processing. The parallel processor 432 can also include dynamic scaling capabilities that automatically adjust the number of active worker nodes based on processing demand, implementing auto-scaling algorithms that add processing capacity during high-volume periods and reduce resource usage during normal operations to optimize cost and performance. The parallel processor 432 can coordinate with the computing server 102 to leverage distributed computing resources and provide scalable processing capabilities that exceed single-node limitations. For example, the parallel processor 432 can distribute event processing across 15 worker nodes, with each node capable of processing 1,000 events per second, enabling aggregate processing throughput of 15,000 events per second across the distributed processing cluster, implementing task distribution algorithms that assign customer relationship management events to nodes specialized in entity recognition and relationship extraction, financial market events to nodes optimized for numerical analysis and trend detection, and project management events to nodes configured for temporal analysis and workflow processing, with load balancing mechanisms that monitor node utilization and redistribute processing tasks when individual nodes approach capacity limits, enabling the data streaming system 400 to maintain consistent processing performance even during peak activity periods when multiple data sources generate simultaneous event streams, ensuring that all captured events are processed within target latency requirements and contribute to timely updates of contextual information in the unified state structures 151 that support accurate predictive analysis by the event prediction module 124.

In some implementations, a state manager 434 can maintain processing state and implement fault tolerance mechanisms within the processing framework 430. The state manager 434 can include state persistence implementations (e.g., checkpoint systems, state snapshots, distributed state stores, recovery mechanisms, and/or the like) that maintain comprehensive records of processing progress, intermediate results, and system state information that enable recovery from failures and ensure processing continuity despite node failures or system interruptions. The state manager 434 can implement checkpoint algorithms that periodically save processing state to persistent storage, including processed event counts, intermediate computation results, and processing pipeline positions, enabling recovery to known good states when failures occur. The state manager 434 can execute state replication processes that maintain multiple copies of critical state information across different storage locations and computing nodes, implementing consistency protocols that ensure state replicas remain synchronized while providing fault tolerance through redundancy. The state manager 434 can also include recovery orchestration capabilities that detect processing failures and automatically restore processing operations from the most recent valid checkpoint, implementing failure detection algorithms and recovery procedures that minimize processing interruption and prevent data loss. The state manager 434 can coordinate with the runtime session records 150 to maintain persistent state information and provide reliable processing state management across system restarts and failures. For example, the state manager 434 can implement checkpoint-based state persistence that saves processing state every 30 seconds to distributed storage systems, including records of which events have been processed, current aggregation values for windowed computations, and processing pipeline positions for each event stream, with state replication algorithms that maintain three copies of checkpoint data across different storage nodes to ensure availability during storage failures, implementing automatic recovery procedures that detect processing node failures within 10 seconds and restore processing operations from the most recent checkpoint within 60 seconds, enabling the data streaming system 400 to maintain processing continuity even when individual processing nodes experience hardware failures, network interruptions, or software issues, ensuring that event processing operations continue without data loss and that contextual information updates in the unified state structures 151 remain consistent and current, supporting reliable predictive analysis by the event prediction module 124 that depends on complete and accurate processing of all captured organizational events.

In some implementations, a window controller 436 can manage temporal grouping and aggregation of event streams through time-based and count-based windowing operations within the processing framework 430. The window controller 436 can include windowing implementations (e.g., tumbling window processors, sliding window managers, session window controllers, count-based window systems, and/or the like) that group streaming events into discrete time intervals or count-based collections for aggregation analysis, enabling statistical computations and pattern recognition across event sequences while maintaining real-time processing capabilities. The window controller 436 can implement tumbling window algorithms that create non-overlapping time intervals for aggregating events, enabling analysis of discrete time periods such as hourly activity summaries, daily transaction counts, and weekly trend calculations that provide temporal context for user activities and business operations. The window controller 436 can execute sliding window processes that create overlapping time intervals for continuous analysis, implementing moving averages, trend detection, and anomaly identification algorithms that provide smooth temporal analysis and early detection of emerging patterns or unusual conditions. The window controller 436 can also include auto-throttle buffering mechanisms that automatically adjust window sizes and processing rates based on event volumes and processing capacity, implementing adaptive algorithms that maintain processing performance while preventing system overload during high-volume periods. The window controller 436 can coordinate with the temporal indexer module 246 to provide temporal analysis capabilities that enhance contextual understanding and support time-based pattern recognition. For example, the window controller 436 can implement 5-minute tumbling windows for aggregating customer service events, calculating metrics such as average response times, case resolution rates, and customer satisfaction scores within discrete time intervals, while simultaneously maintaining 30-minute sliding windows that provide continuous monitoring of customer service trends and early detection of service quality issues, with adaptive buffering algorithms that increase window processing frequency to every 2 minutes when customer service event volumes exceed 100 events per hour and reduce processing to 10-minute intervals during low-activity periods, enabling the data streaming system 400 to provide comprehensive temporal analysis of customer service patterns that inform customer relationship contexts in the unified state structures 151, supporting the event prediction module 124 in predicting when users can need to address customer service issues, review service performance metrics, or implement service improvement initiatives based on temporal patterns and trends identified through windowed event analysis.

In some implementations, an event sequencer 438 can ensure exactly-once processing semantics and maintain event ordering across distributed processing operations within the processing framework 430. The event sequencer 438 can include event ordering implementations (e.g., sequence number generators, ordering buffers, duplicate detection systems, idempotency controllers, and/or the like) that assign unique sequence identifiers to captured events and maintain processing order to ensure that events are processed in the correct temporal sequence and that no events are processed multiple times or lost during processing operations. The event sequencer 438 can implement duplicate detection algorithms that identify and eliminate duplicate events that can arise from network retransmissions, system failures, or source system behaviors, using event identifiers, content hashing, and temporal analysis to recognize duplicate events while preserving legitimate event sequences. The event sequencer 438 can execute idempotency enforcement processes that ensure processing operations produce consistent results regardless of how many times they are executed, implementing idempotent processing logic that prevents duplicate state updates and maintains data consistency even when events are reprocessed during failure recovery operations. The event sequencer 438 can also include ordering buffer mechanisms that temporarily store out-of-order events and resequence them according to their original temporal order before processing, implementing buffering strategies that balance ordering accuracy with processing latency requirements. The event sequencer 438 can coordinate with the event sourcing module 236 to maintain comprehensive event processing records and ensure audit trail completeness and accuracy. For example, the event sequencer 438 can assign monotonically increasing sequence numbers to all captured events within each event stream, implementing sequence tracking algorithms that detect when events arrive out of order due to network delays or processing variations, with reordering buffers that hold events for up to 10 seconds to allow late-arriving events to be processed in correct temporal sequence, while implementing SHA-256 content hashing that identifies duplicate events based on event content and source identifiers, ensuring that customer relationship management events such as contact updates, interaction records, and opportunity modifications are processed exactly once in the correct temporal order, enabling the data streaming system 400 to maintain accurate chronological records of customer relationship evolution in the unified state structures 151, supporting the record alignment module 123 in identifying accurate historical patterns and the event prediction module 124 in generating reliable predictions based on correctly sequenced event histories that reflect actual temporal relationships between customer activities and business outcomes.

In some implementations, a transform operator 440 can apply data transformation and enrichment operations to captured events within the processing framework 430. The transform operator 440 can include data processing implementations (e.g., schema transformation engines, data enrichment systems, format conversion tools, validation processors, and/or the like) that modify, enhance, and standardize event data as it flows through the processing pipeline, ensuring that events are properly formatted, validated, and enriched with additional context before being used for knowledge graph updates and contextual analysis. The transform operator 440 can implement transformation pipeline orchestration that coordinates multiple transformation stages including normalization, deduplication, enrichment, filtering, and aggregation operations, managing data flow between transformation components while maintaining processing efficiency and data quality standards. The transform operator 440 can execute transformation rule management processes that apply business logic, data validation rules, and enrichment policies to incoming events, implementing configurable transformation workflows that can be adapted to different event types and organizational requirements. The transform operator 440 can also include transformation monitoring capabilities that track transformation performance, data quality metrics, and processing errors to ensure reliable transformation operations and identify opportunities for optimization and improvement. The transform operator 440 can coordinate with the normalization module 238 to provide systematic data transformation that supports consistent processing across diverse event sources and formats. For example, the transform operator 440 can process customer service events by applying transformation workflows that first normalize event timestamps to UTC format, then enrich events with customer profile information retrieved from the unified state structures 151, followed by validation processes that verify customer identifiers and case categories, and finally aggregation operations that group related events into customer interaction sequences, implementing transformation rules that convert various customer service platform event formats into standardized event structures comprising customer identifiers, case details, agent assignments, and resolution outcomes, enabling the data streaming system 400 to provide consistent, enriched event data that supports accurate contextual analysis and knowledge graph construction, informing the event prediction module 124 about customer service patterns and enabling proactive assistance such as case escalation recommendations, customer communication preparation, or service quality improvement initiatives based on transformed and enriched customer service event data.

In some implementations, a normalization module 442 can provide systematic schema mapping and format standardization operations within the transform operator 440 to ensure consistent data representation across diverse event sources. The normalization module 442 can include schema transformation implementations (e.g., field mapping engines, data type converters, format standardizers, encoding normalizers, and/or the like) that convert incoming event data from source-specific formats into unified data structures that can be processed consistently by downstream system components. The normalization module 442 can implement schema mapping algorithms that identify corresponding data elements across different source systems and apply transformation rules that align field names, data types, and value formats to create consistent data representations, enabling the system to process events from heterogeneous sources through standardized processing pipelines. The normalization module 442 can execute data type standardization processes that convert various data representations including timestamps, numerical values, text encodings, and categorical values into consistent formats that support reliable comparison and analysis operations across different event sources. The normalization module 442 can also include format validation mechanisms that verify the correctness and completeness of normalized data structures, implementing validation rules that ensure transformed events meet quality standards and comprise all required fields for downstream processing. The normalization module 442 can coordinate with the semantic extraction pipeline 330 to provide standardized event data that supports consistent entity recognition and relationship extraction across diverse information sources. For example, the normalization module 442 can process financial transaction events from multiple banking systems by implementing schema mapping algorithms that convert different timestamp formats such as Unix timestamps, ISO 8601 strings, and proprietary date formats into standardized UTC timestamps, while applying field mapping rules that translate various account identifier formats including IBAN numbers, routing numbers, and internal account codes into unified account reference structures, and implementing data type standardization that converts transaction amounts from different currency representations and decimal precision formats into standardized monetary values with consistent precision and currency coding, enabling the data streaming system 400 to process financial events from diverse banking platforms through unified processing workflows that support accurate financial analysis and enable the event prediction module 124 to generate reliable predictions about financial activities and transaction patterns based on consistently formatted and standardized financial event data.

In some implementations, a deduplication module 444 can eliminate duplicate events and redundant data entries within the transform operator 440 to ensure data quality and prevent processing inefficiencies. The deduplication module 444 can include duplicate detection implementations (e.g., content hashing systems, identifier matching algorithms, temporal correlation analyzers, similarity detection engines, and/or the like) that identify and remove duplicate events that can arise from multiple data sources, network retransmissions, system failures, or overlapping data collection mechanisms. The deduplication module 444 can implement content-based deduplication algorithms that generate cryptographic hashes of event content and compare hash values to identify events with identical or substantially similar content, using hash comparison techniques that enable efficient duplicate detection across large event volumes while maintaining processing performance. The deduplication module 444 can execute identifier-based matching processes that compare event identifiers, source references, and temporal markers to identify duplicate events that represent the same underlying occurrence but can have been captured through different collection mechanisms or at different processing stages. The deduplication module 444 can also include fuzzy matching capabilities that identify near-duplicate events with minor variations in content or formatting, implementing similarity analysis algorithms that detect events representing the same occurrence despite differences in data representation or source-specific formatting variations. The deduplication module 444 can coordinate with the event sequencer 438 to ensure that duplicate elimination processes maintain event ordering and processing consistency while removing redundant data. For example, the deduplication module 444 can process customer communication events by implementing SHA-256 content hashing that generates unique fingerprints for email messages, chat conversations, and phone call records, comparing hash values to identify duplicate communications that can have been captured through multiple monitoring systems such as email servers, CRM platforms, and communication logging tools, while implementing identifier-based matching that compares message IDs, conversation threads, and participant lists to detect duplicate entries representing the same customer interaction, and applying fuzzy matching algorithms that identify near-duplicate communications with minorformatting differences such as HTML versus plain text versions of the same email message, enabling the data streaming system 400 to maintain clean, deduplicated customer communication records in the unified state structures 151 that support accurate customer relationship analysis and enable the event prediction module 124 to generate reliable predictions about customer communication needs without being influenced by duplicate or redundant communication data.

In some implementations, an enrichment module 446 can augment captured events with additional contextual information and related data within the transform operator 440 to enhance the analytical value of processed events. The enrichment module 446 can include data augmentation implementations (e.g., lookup table systems, context joining engines, reference data integrators, semantic enhancement processors, and/or the like) that retrieve and append relevant information from the unified state structures 151, external databases, and knowledge repositories to provide comprehensive context for each processed event. The enrichment module 446 can implement context joining algorithms that identify relationships between incoming events and existing data entities, executing join operations that link events with related customer profiles, project information, organizational data, and historical context to create enriched event records that comprise comprehensive situational information. The enrichment module 446 can execute reference data integration processes that append standardized codes, classifications, and categorical information to events, implementing lookup operations against reference databases that provide industry codes, geographic identifiers, product classifications, and other standardized metadata that enhance event categorization and analysis capabilities. The enrichment module 446 can also include semantic enhancement capabilities that analyze event content to extract additional meaning and context, implementing natural language processing algorithms that identify entities, relationships, and concepts within event data and append semantic annotations that support advanced analytical processing. The enrichment module 446 can coordinate with the unified state module 242 to access comprehensive contextual information that enhances event processing and supports sophisticated analytical operations. For example, the enrichment module 446 can process project management events by implementing context joining algorithms that retrieve comprehensive project information including team member profiles, project timelines, budget allocations, and stakeholder relationships from the unified state structures 151, appending this contextual information to task creation events, status update events, and milestone completion events to create enriched event records that comprise complete project context, while implementing reference data integration that adds standardized project classification codes, priority levels, and risk categories based on lookup operations against organizational project taxonomies, and applying semantic enhancement processes that analyze task descriptions and project communications to extract skill requirements, resource needs, and dependency relationships that are appended as semantic annotations, enabling the data streaming system 400 to provide comprehensive project event data that supports sophisticated project analysis and enables the event prediction module 124 to generate accurate predictions about project resource needs, timeline risks, and coordination requirements based on enriched project event information that includes complete contextual and semantic details.

In some implementations, a filtering module 448 can apply quality checks and relevance filtering to processed events within the transform operator 440 to ensure that only high-quality, relevant events proceed to downstream processing and analysis systems. The filtering module 448 can include event filtering implementations (e.g., quality assessment engines, relevance scoring systems, business rule processors, anomaly detection algorithms, and/or the like) that evaluate events against multiple criteria including data quality standards, business relevance requirements, and organizational policies to determine which events should be retained for further processing. The filtering module 448 can implement data quality assessment algorithms that evaluate events for completeness, accuracy, consistency, and validity, applying quality checks that verify required fields are present, data values fall within expected ranges, and event structures conform to defined schemas and business rules. The filtering module 448 can execute relevance filtering processes that assess the business significance and analytical value of events, implementing scoring algorithms that evaluate events based on their relationship to organizational objectives, user activities, and strategic priorities to identify events that contribute meaningful information to contextual analysis and predictive modeling. The filtering module 448 can also include anomaly detection capabilities that identify unusual or suspicious events that can indicate data quality issues, system errors, or security concerns, implementing statistical analysis and pattern recognition algorithms that flag events with characteristics that deviate significantly from normal patterns or expected behaviors. The filtering module 448 can coordinate with the relevance scorer module 256 to apply sophisticated relevance assessment that ensures filtered events contribute valuable information to contextual understanding and predictive analysis. For example, the filtering module 448 can process customer service events by implementing data quality assessment algorithms that verify customer service tickets comprise required fields such as customer identifiers, issue categories, priority levels, and agent assignments, while checking that timestamp values fall within reasonable ranges and that status transitions follow valid workflow sequences, implementing relevance filtering that evaluates customer service events based on their impact on customer satisfaction, business operations, and service quality metrics, retaining high-impact events such as escalations, complaints, and service failures while filtering out routine administrative events that do not contribute significant analytical value, and applying anomaly detection algorithms that identify suspicious patterns such as unusually high ticket volumes from specific customers, abnormal resolution times, or unexpected status transitions that can indicate system issues or data quality problems, enabling the data streaming system 400 to maintain high-quality, relevant customer service event data that supports accurate customer relationship analysis and enables the event prediction module 124 to generate reliable predictions about customer service needs and quality improvement opportunities based on filtered event data that meets established quality and relevance standards.

In some implementations, an aggregation module 450 can perform event grouping and statistical operations within the transform operator 440 to create higher-level abstractions and summary information from individual events. The aggregation module 450 can include event grouping implementations (e.g., temporal aggregators, categorical grouping systems, statistical computation engines, summary generation processors, and/or the like) that combine related events into meaningful collections and generate aggregate metrics that provide insights into patterns, trends, and behaviors across event sequences. The aggregation module 450 can implement temporal aggregation algorithms that group events by time periods such as hours, days, weeks, or months, calculating statistical measures including counts, averages, sums, minimums, maximums, and standard deviations that reveal temporal patterns and trends in user activities and business operations. The aggregation module 450 can execute categorical grouping processes that organize events by attributes such as event types, source systems, user identifiers, or business categories, generating aggregate statistics that provide insights into the distribution and characteristics of different event categories and their relationships to organizational activities. The aggregation module 450 can also include multi-dimensional aggregation capabilities that combine temporal and categorical grouping to create comprehensive summary views that reveal complex patterns and relationships across multiple dimensions of event data. The aggregation module 450 can coordinate with the window controller 436 to leverage temporal windowing capabilities that support sophisticated aggregation operations across different time scales and overlapping time periods. For example, the aggregation module 450 can process email communication events by implementing temporal aggregation algorithms that group email messages by daily, weekly, and monthly time periods, calculating aggregate metrics such as total message counts, average message lengths, response time statistics, and participant distribution patterns that reveal communication trends and collaboration patterns within the organization, while implementing categorical grouping that organizes emails by sender departments, recipient roles, subject categories, and priority levels to generate aggregate statistics that show communication patterns between different organizational units and functional areas, and applying multi-dimensional aggregation that combines temporal and categorical grouping to create comprehensive communication summary reports that reveal how communication patterns vary across time periods, organizational hierarchies, and project contexts, enabling the data streaming system 400 to provide sophisticated communication analytics that inform organizational communication contexts in the unified state structures 151 and support the event prediction module 124 in predicting communication needs, collaboration opportunities, and information sharing requirements based on aggregated communication patterns and trends.

In some implementations, a state update propagator 460 can manage the distribution and coordination of processed event information to downstream systems and data structures within the data streaming system 400. The state update propagator 460 can include update distribution implementations (e.g., change notification systems, state synchronization engines, update routing mechanisms, consistency management processors, and/or the like) that ensure processed events trigger appropriate updates to the unified state structures 151, cache systems, and dependent analytical components while maintaining data consistency and system coherence. The state update propagator 460 can implement change propagation algorithms that analyze processed events to determine which system components and data structures require updates, executing routing logic that directs update notifications to relevant modules including the unified state module 242, cache manager module 248, and event prediction module 124 based on the content and implications of processed events. The state update propagator 460 can execute state synchronization processes that coordinate updates across multiple system components to ensure consistency and prevent conflicts, implementing transaction management and coordination protocols that maintain data integrity while enabling concurrent updates from multiple processing streams. The state update propagator 460 can also include update optimization mechanisms that batch related updates, eliminate redundant notifications, and prioritize critical updates to optimize system performance while ensuring timely propagation of important state changes. The state update propagator 460 can coordinate with multiple downstream components to ensure comprehensive and consistent state management across the entire system architecture. For example, the state update propagator 460 can process customer relationship events by implementing change propagation algorithms that analyze customer contact updates, interaction records, and opportunity modifications to determine which components of the unified state structures 151 require updates, routing customer profile changes to the customer entity nodes, interaction records to the relationship edges, and opportunity updates to the project context graphs, while implementing state synchronization processes that coordinate these updates through transaction management protocols that ensure all related data structures are updated consistently, and applying update optimization that batches related customer updates within 100-millisecond windows to reduce system overhead while ensuring that customer relationship changes are propagated to the event prediction module 124 within target latency requirements, enabling the data streaming system 400 to maintain current and consistent customer relationship information across all system components and supporting accurate predictive analysis about customer needs and relationship management opportunities.

In some implementations, an event logger 462 can maintain comprehensive immutable logs of all processed events and state changes within the state update propagator 460 to provide complete audit trails and support system accountability. The event logger 462 can include logging implementations (e.g., append-only log systems, immutable record stores, cryptographic verification mechanisms, distributed logging frameworks, and/or the like) that capture detailed records of every event processing operation, state modification, and system interaction to create comprehensive audit trails that support compliance, debugging, and system analysis requirements. The event logger 462 can implement append-only logging algorithms that record events in chronological order without allowing modifications or deletions, ensuring that historical records remain intact and tamper-evident while providing complete visibility into system behavior and event processing history. The event logger 462 can execute structured logging processes that capture event metadata including timestamps, source identifiers, processing stages, transformation operations, and outcome status, creating detailed log records that enable comprehensive analysis of system performance, data quality, and processing effectiveness. The event logger 462 can also include log integrity mechanisms that implement cryptographic hashing and digital signatures to ensure log records cannot be modified or corrupted, providing verifiable proof of system operations and supporting regulatory compliance and security audit requirements. The event logger 462 can coordinate with the provenance module 128 to provide comprehensive logging information that supports provenance tracking and accountability throughout the system. For example, the event logger 462 can process financial transaction events by implementing append-only logging that records every transaction processing step including event ingestion timestamps, normalization operations, enrichment additions, validation results, and final processing outcomes, creating immutable log records that capture complete transaction processing history with cryptographic hash chains that ensure log integrity and prevent tampering, while implementing structured logging that captures detailed metadata including transaction amounts, account identifiers, processing latencies, validation status, and error conditions, enabling comprehensive audit trails that support financial compliance requirements and provide detailed visibility into transaction processing operations, and coordinating with the provenance module 128 to ensure that financial transaction logs contribute to comprehensive provenance tracking that enables users to verify the complete processing history of financial events and understand how transaction data influences predictive analysis and business intelligence generation within the event coordination system 100.

In some implementations, a view optimizer 464 can enhance query performance and data access efficiency within the state update propagator 460 by maintaining optimized data structures and access patterns for downstream analytical operations. The view optimizer 464 can include query optimization implementations (e.g., materialized view generators, index management systems, query plan optimizers, cache coordination mechanisms, and/or the like) that create and maintain optimized data representations that enable efficient access to processed event information and support high-performance analytical queries across the unified state structures 151. The view optimizer 464 can implement materialized view generation algorithms that pre-compute and store frequently accessed data combinations, aggregations, and join operations, creating optimized data structures that eliminate the need for expensive real-time computations during query execution and enable sub-millisecond response times for common analytical operations. The view optimizer 464 can execute index management processes that create and maintain database indexes, search structures, and access paths that optimize query performance for different types of analytical operations, implementing adaptive indexing strategies that adjust index configurations based on observed query patterns and performance metrics. The view optimizer 464 can also include query plan optimization capabilities that analyze query patterns and execution statistics to identify opportunities for performance improvement, implementing query rewriting and execution plan optimization that reduces computational overhead and improves response times for analytical operations. The view optimizer 464 can coordinate with the cache manager module 248 to ensure optimal coordination between materialized views, cached data, and real-time query processing to maximize overall system performance. For example, the view optimizer 464 can process customer relationship queries by implementing materialized view generation that pre-computes customer interaction summaries, relationship strength metrics, and communication frequency statistics, storing these optimized views in high-performance data structures that enable immediate access to customer analytics without requiring real-time aggregation of individual interaction events, while implementing adaptive indexing that creates specialized indexes on customer identifiers, interaction timestamps, and relationship types based on observed query patterns from the event prediction module 124 and other analytical components, and applying query plan optimization that rewrites complex customer relationship queries to leverage materialized views and optimized indexes, reducing query execution times from seconds to milliseconds and enabling the event prediction module 124 to access comprehensive customer relationship analytics within the response time requirements necessary for real-time predictive analysis and proactive customer service recommendations.

In some implementations, a notification handler 466 can manage publish-subscribe communication patterns and event-driven notifications within the state update propagator 460 to ensure timely delivery of state change information to interested system components. The notification handler 466 can include notification distribution implementations (e.g., publish-subscribe systems, event broadcasting mechanisms, subscription management frameworks, message routing engines, and/or the like) that coordinate the delivery of state change notifications to downstream components that have registered interest in specific types of events or data modifications. The notification handler 466 can implement subscription management algorithms that allow system components to register interest in specific event types, data entities, or state changes, maintaining subscription registries that track which components should receive notifications when relevant events occur or state modifications are processed. The notification handler 466 can execute event broadcasting processes that analyze processed events and state changes to determine which subscribed components should receive notifications, implementing message routing logic that delivers appropriate notifications to interested parties while filtering out irrelevant information to prevent notification overload. The notification handler 466 can also include notification optimization mechanisms that batch related notifications, implement delivery guarantees, and manage notification priorities to ensure critical updates are delivered promptly while maintaining system performance and preventing notification bottlenecks. The notification handler 466 can coordinate with multiple system components including the event prediction module 124, interface module 127, and cache manager module 248 to provide comprehensive event-driven communication throughout the system architecture. For example, the notification handler 466 can process project management state changes by implementing subscription management that allows the event prediction module 124 to register interest in project timeline modifications, resource allocation changes, and team assignment updates, maintaining subscription records that specify which types of project events should trigger predictive analysis updates, while implementing event broadcasting that analyzes project state changes to identify relevant subscribers and delivers targeted notifications that include project identifiers, change descriptions, and contextual metadata, and applying notification optimization that batches related project notifications within 50-millisecond windows to reduce communication overhead while ensuring that critical project changes such as deadline modifications or resource conflicts are delivered immediately to enable timely predictive analysis and proactive project management assistance, enabling the data streaming system 400 to maintain responsive event-driven communication that supports real-time coordination between data processing and analytical components.

In some implementations, a structure updater 468 can coordinate modifications to the unified state structures 151 and knowledge graph representations within the state update propagator 460 to ensure that processed events result in appropriate updates to the system's contextual knowledge base. The structure updater 468 can include graph modification implementations (e.g., node update processors, edge modification systems, relationship management engines, schema evolution handlers, and/or the like) that analyze processed events to determine required changes to entities, relationships, concepts, and temporal annotations within the knowledge graph structures that represent organizational context and user environments. The structure updater 468 can implement node update algorithms that modify entity properties, create new entity records, and update existing entity attributes based on processed event information, ensuring that the knowledge graph maintains current and accurate representations of people, organizations, projects, and other entities that influence user activities and business operations. The structure updater 468 can execute relationship modification processes that create, update, or remove edges between entities based on event information that indicates changing relationships, new connections, or dissolved associations, implementing relationship strength calculations and temporal validity management that reflect the dynamic nature of organizational and operational relationships. The structure updater 468 can also include schema evolution capabilities that adapt knowledge graph structures to accommodate new types of entities, relationships, and attributes as the system encounters novel event types and organizational changes, implementing flexible schema management that maintains backward compatibility while enabling structural evolution. The structure updater 468 can coordinate with the state structure construct 350 to ensure that knowledge graph modifications maintain consistency and integrity across the comprehensive contextual representation. For example, the structure updater 468 can process employee organizational events by implementing node update algorithms that modify person entity records when employees change roles, departments, or reporting relationships, updating entity attributes such as job titles, department affiliations, and skill sets based on human resources events and organizational announcements, while implementing relationship modification processes that create new reporting relationship edges when management changes occur, update collaboration relationship strengths based on project assignment events, and remove outdated relationship connections when employees leave the organization, and applying schema evolution capabilities that introduce new entity types such as remote work locations or project methodologies when organizational changes require expanded contextual representation, enabling the data streaming system 400 to maintain current and comprehensive organizational knowledge graphs that support accurate contextual analysis and enable the event prediction module 124 to generate reliable predictions about organizational dynamics, collaboration needs, and resource allocation requirements based on up-to-date structural representations of organizational relationships and contexts.

In some implementations, a cache manager 470 can maintain data consistency and optimize performance across distributed cache systems within the state update propagator 460 to ensure that cached information remains synchronized with processed events and state changes. The cache manager 470 can include cache coordination implementations (e.g., cache invalidation systems, consistency management protocols, distributed cache synchronization mechanisms, performance optimization engines, and/or the like) that coordinate cache updates across multiple cache tiers and ensure that cached data accurately reflects the current state of processed information while maintaining optimal query performance. The cache manager 470 can implement cache invalidation algorithms that identify which cached data items are affected by processed events and state changes, executing selective invalidation processes that remove or update outdated cache entries while preserving valid cached information to maintain cache effectiveness and system performance. The cache manager 470 can execute consistency management processes that coordinate cache updates across distributed cache systems, implementing synchronization protocols that ensure cache coherence across multiple cache nodes and prevent inconsistencies that could lead to incorrect analytical results or user confusion. The cache manager 470 can also include performance optimization mechanisms that analyze cache usage patterns and hit rates to optimize cache configurations, implementing adaptive caching strategies that adjust cache sizes, eviction policies, and data placement based on observed access patterns and performance metrics. The cache manager 470 can coordinate with the cache layers 360 and cache memory 154 to provide comprehensive cache management that spans multiple system components and storage tiers. For example, the cache manager 470 can process customer relationship updates by implementing cache invalidation algorithms that identify cached customer profiles, interaction summaries, and relationship analytics that are affected by new customer events, executing selective invalidation that removes outdated customer cache entries from hot cache tiers while preserving unaffected customer data to maintain cache performance, while implementing consistency management protocols that coordinate cache updates across distributed cache nodes to ensure that all cache instances reflect current customer relationship information, and applying performance optimization that analyzes customer data access patterns to optimize cache placement strategies, moving frequently accessed customer profiles to faster cache tiers and adjusting cache sizes based on customer relationship query volumes, enabling the data streaming system 400 to maintain high-performance cached access to customer relationship information while ensuring cache consistency that supports accurate customer analytics and enables the event prediction module 124 to access current customer relationship data within the response time requirements necessary for real-time predictive analysis and proactive customer relationship management.

In some implementations, a performance monitor 480 can track comprehensive system metrics and operational statistics within the data streaming system 400 to provide visibility into processing performance, resource utilization, and system health across all components of the distributed processing framework. The performance monitor 480 can include metrics collection implementations (e.g., performance measurement systems, resource utilization trackers, latency analyzers, throughput monitors, and/or the like) that continuously gather quantitative data about system operations including processing speeds, resource consumption, error rates, and quality metrics that enable comprehensive assessment of system performance and identification of optimization opportunities. The performance monitor 480 can implement real-time metrics aggregation algorithms that collect performance data from all system components including the event capture layer 410, processing framework 430, transform operator 440, and state update propagator 460, calculating aggregate statistics and performance indicators that provide holistic views of system operation and enable identification of performance bottlenecks or degradation patterns. The performance monitor 480 can execute performance trend analysis processes that track metrics over time to identify patterns, trends, and anomalies in system behavior, implementing statistical analysis and pattern recognition algorithms that detect performance degradation, capacity limitations, and optimization opportunities before they impact system operation or user experience. The performance monitor 480 can also include performance reporting capabilities that generate comprehensive performance dashboards, alerts, and reports that enable system administrators and operators to understand system behavior and make informed decisions about capacity planning, optimization, and maintenance activities. The performance monitor 480 can coordinate with multiple system components to provide comprehensive performance visibility across the entire data streaming architecture. For example, the performance monitor 480 can track event processing metrics by implementing metrics collection that gathers processing latency measurements from the database monitor 412 showing average event capture times of 20 milliseconds, from the transform operator 440 showing transformation processing times of 30 milliseconds, and from the state update propagator 460 showing state update propagation times of 50 milliseconds, while implementing real-time aggregation that calculates end-to-end processing latency statistics showing 95th percentile processing times under 100 milliseconds and throughput measurements demonstrating processing capacity of 15,000 events per second across the distributed processing framework 430, and executing trend analysis that identifies performance patterns such as increased processing latency during peak business hours or reduced throughput when specific event types require complex transformation operations, enabling comprehensive performance visibility that supports system optimization and capacity planning decisions to maintain target performance levels for real-time event processing that supports timely contextual analysis and predictive intelligence generation.

In some implementations, an alert system 482 can provide automated monitoring and notification capabilities within the performance monitor 480 to ensure that system administrators and operators receive immediate alerts when performance metrics exceed acceptable thresholds or when system conditions require attention. The alert system 482 can include alerting implementations (e.g., threshold monitoring engines, notification delivery systems, escalation management frameworks, alert correlation processors, and/or the like) that continuously evaluate performance metrics against predefined thresholds and trigger appropriate notifications when conditions warrant administrative intervention or system optimization actions. The alert system 482 can implement threshold monitoring algorithms that compare real-time performance metrics including processing latency, throughput rates, error frequencies, and resource utilization levels against configurable threshold values, executing alert generation processes when metrics exceed warning levels or critical limits that indicate potential system degradation or capacity constraints. The alert system 482 can execute notification delivery mechanisms that distribute alerts through multiple communication channels including email notifications, SMS messages, dashboard displays, and integration with incident management systems, implementing priority-based routing that ensures critical alerts reach appropriate personnel immediately while lower-priority notifications are delivered through standard channels. The alert system 482 can also include alert correlation capabilities that analyze multiple related metrics to identify systemic issues and prevent alert fatigue by grouping related notifications into coherent incident reports that provide comprehensive context for troubleshooting and resolution activities. The alert system 482 can coordinate with the performance monitor 480 to provide comprehensive alerting coverage across all monitored system components and performance dimensions. For example, the alert system 482 can monitor event processing performance by implementing threshold monitoring that compares end-to-end processing latency against a configured threshold of 150 milliseconds, triggering warning alerts when 95th percentile latency exceeds 120 milliseconds and critical alerts when latency exceeds 200 milliseconds, while monitoring throughput metrics that generate alerts when event processing rates drop below 12,000 events per second indicating potential capacity issues, and implementing notification delivery that sends immediate email and SMS alerts to system administrators when critical thresholds are breached while posting warning notifications to monitoring dashboards for routine review, with alert correlation algorithms that identify when multiple related metrics such as high latency, reduced throughput, and increased error rates occur simultaneously, generating consolidated incident reports that indicate potential infrastructure issues requiring immediate investigation and resolution to maintain the target performance levels necessary for real-time event processing and predictive analysis capabilities.

In some implementations, an architecture monitor 484 can provide comprehensive oversight of distributed system architecture health and operational characteristics within the performance monitor 480 to ensure that the data streaming system 400 maintains optimal configuration and resource allocation across all processing components. The architecture monitor 484 can include architecture monitoring implementations (e.g., topology analyzers, resource allocation trackers, component health assessors, scalability monitors, and/or the like) that continuously evaluate the structural and operational aspects of the distributed processing framework including node availability, network connectivity, resource distribution, and component coordination effectiveness. The architecture monitor 484 can implement topology analysis algorithms that monitor the health and connectivity of distributed processing nodes within the parallel processor 432, tracking node availability, network latency between nodes, and load distribution patterns to identify potential single points of failure or suboptimal resource allocation that could impact system resilience and performance. The architecture monitor 484 can execute resource allocation assessment processes that analyze how computational resources including CPU utilization, memory consumption, and network bandwidth are distributed across the processing framework 430, implementing optimization recommendations that suggest resource reallocation or scaling adjustments to improve overall system efficiency and capacity utilization. The architecture monitor 484 can also include scalability monitoring capabilities that track system behavior under varying load conditions and identify when additional processing capacity is needed or when resources can be scaled down during low-activity periods, implementing predictive scaling recommendations based on observed usage patterns and performance trends. The architecture monitor 484 can coordinate with multiple system components including the parallel processor 432, state manager 434, and processing framework 430 to provide comprehensive architectural oversight and optimization guidance. For example, the architecture monitor 484 can assess distributed processing topology by implementing topology analysis that monitors the health of 15 worker nodes within the parallel processor 432, tracking individual node CPU utilization averaging 75% during peak processing periods and identifying when specific nodes approach 90% utilization indicating potential bottlenecks, while monitoring network connectivity between nodes showing average inter-node latency of 2 milliseconds and detecting when network delays exceed 10 milliseconds indicating potential infrastructure issues, and executing resource allocation assessment that analyzes how event processing workloads are distributed across nodes, identifying when certain event types such as complex financial analysis tasks consume disproportionate resources on specific nodes, enabling optimization recommendations that suggest workload rebalancing or specialized node configurations to improve processing efficiency and maintain consistent performance across the distributed architecture that supports reliable real-time event processing and contextual analysis capabilities.

In some implementations, a latency analyzer 486 can provide detailed measurement and analysis of processing delays across all stages of the data streaming system 400 to identify performance bottlenecks and optimize response times for real-time event processing and predictive analysis operations. The latency analyzer 486 can include latency measurement implementations (e.g., timestamp tracking systems, processing stage analyzers, end-to-end latency calculators, bottleneck identification engines, and/or the like) that instrument all processing stages from initial event capture through final state propagation to measure precise timing characteristics and identify optimization opportunities for reducing overall system response times. The latency analyzer 486 can implement timestamp tracking algorithms that record precise timing information at each processing stage including event capture timestamps from the database monitor 412, transformation completion times from the normalization module 442, and state update completion times from the structure updater 468, enabling detailed analysis of where processing delays occur and which components contribute most significantly to overall latency. The latency analyzer 486 can execute processing stage analysis processes that break down end-to-end latency into component-specific measurements, calculating average, median, 95th percentile, and maximum latency values for each processing stage to identify consistent bottlenecks and intermittent performance issues that impact system responsiveness. The latency analyzer 486 can also include bottleneck identification capabilities that correlate latency measurements with system load conditions, resource utilization patterns, and event characteristics to determine root causes of performance degradation and recommend specific optimization strategies for improving processing speed. The latency analyzer 486 can coordinate with all major system components to provide comprehensive latency visibility and optimization guidance across the entire processing pipeline. For example, the latency analyzer 486 can measure event processing latency by implementing timestamp tracking that records when customer relationship management events are first detected by the database monitor 412 at time T0, when transformation processing begins in the normalization module 442 at time T1, when enrichment operations complete in the enrichment module 446 at time T2, and when final state updates are propagated by the structure updater 468 at time T3, calculating component-specific latencies showing database capture averaging 20 milliseconds (T1−T0), transformation processing averaging 30 milliseconds (T2−T1), and state propagation averaging 50 milliseconds (T3−T2), while executing processing stage analysis that identifies the enrichment module 446 as contributing the highest latency variance with 95th percentile processing times of 75 milliseconds compared to average times of 25 milliseconds, and implementing bottleneck identification that correlates high enrichment latency with complex customer relationship queries requiring multiple knowledge graph traversals, enabling optimization recommendations such as implementing specialized caching for frequently accessed customer relationship data or optimizing graph query algorithms to reduce enrichment processing time and maintain target end-to-end latency of under 100 milliseconds necessary for real-time predictive analysis and proactive customer service recommendations.

In some implementations, the data streaming system 400 can serve as the comprehensive framework that orchestrates all distributed processing components to enable sub-second latency event processing and real-time contextual analysis within the event coordination system 100. The data streaming system 400 can include distributed processing implementations (e.g., event-driven architectures, stream processing pipelines, fault-tolerant processing frameworks, scalable computing infrastructures, and/or the like) that coordinate the event capture layer 410, processing framework 430, transform operator 440, state update propagator 460, and performance monitoring components to provide end-to-end event processing capabilities that support predictive analysis and proactive user assistance. The data streaming system 400 can implement comprehensive event processing workflows that begin with multi-source event capture through the database monitor 412, message queue 414, webhook receiver 416, polling interface 418, file watcher 420, and stream processor 422, continue through distributed processing via the parallel processor 432, state manager 434, window controller 436, and event sequencer 438, proceed through data transformation using the normalization module 442, deduplication module 444, enrichment module 446, filtering module 448, and aggregation module 450, and conclude with state propagation through the event logger 462, view optimizer 464, notification handler 466, structure updater 468, and cache manager 470. The data streaming system 400 can execute performance optimization processes that leverage continuous monitoring from the performance monitor 480, alert system 482, architecture monitor 484, and latency analyzer 486 to maintain target processing performance including sub-100 millisecond end-to-end latency, 15,000+ events per second throughput capacity, and 99.9% processing reliability across all system components. The data streaming system 400 can also include integration capabilities that coordinate with the unified state structures 151, model ensembles 152, and event prediction module 124 to ensure that processed events contribute to comprehensive contextual analysis and enable accurate predictive intelligence generation. The data streaming system 400 can coordinate with the broader event coordination system 100 to provide the real-time data processing foundation necessary for anticipatory user assistance and proactive insight delivery. For example, the data streaming system 400 can process a comprehensive customer service scenario by implementing event processing workflows that begin when the database monitor 412 detects new customer support ticket creation in a CRM system, triggering immediate event capture and routing through the message queue 414 to the parallel processor 432 for distributed processing, while the normalization module 442 standardizes ticket data formats and the enrichment module 446 augments tickets with comprehensive customer history retrieved from the unified state structures 151, followed by the filtering module 448 identifying high-priority tickets based on customer tier and issue severity, and the structure updater 468 updating customer relationship graphs with new interaction records, while the notification handler 466 triggers immediate alerts to the event prediction module 124 indicating emerging customer service situations that can require proactive assistance such as escalation procedures or customer communication preparation, with the entire processing workflow completing within 85 milliseconds from initial event detection to final state propagation, enabling the event coordination system 100 to generate predictive insights about customer service needs and deliver proactive assistance recommendations to users before customer satisfaction issues escalate, demonstrating how the data streaming system 400 provides the high-performance, real-time processing foundation necessary for effective anticipatory intelligence and proactive user support across diverse organizational scenarios and business contexts.

Figure 5:
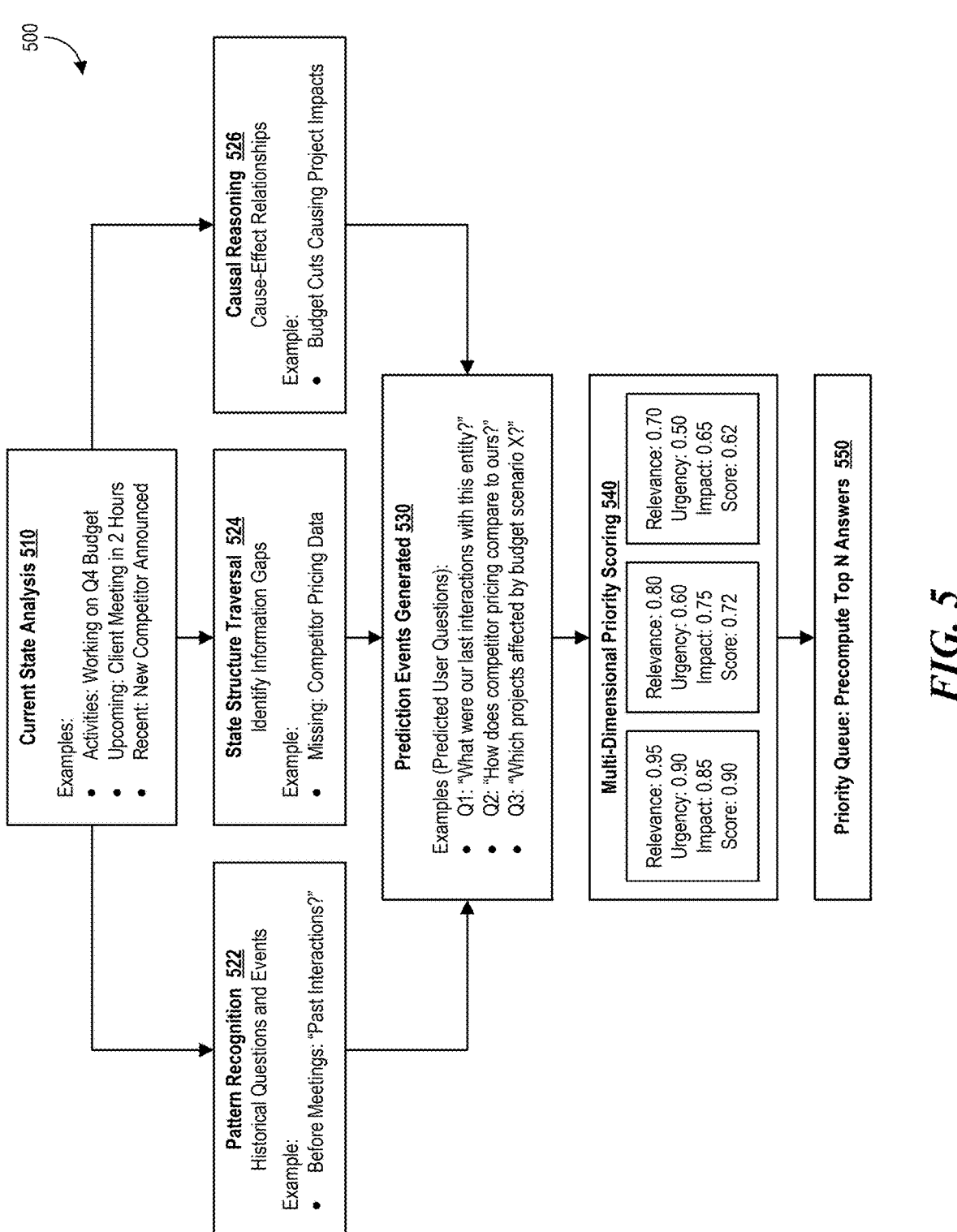
FIG. 5 is a block diagram that illustrates an event prediction system in accordance with some implementations of the present technology.

FIG. 5 is a block diagram that illustrates an event prediction system in accordance with some implementations of the present technology. In some implementations, the event prediction system 500 can provide comprehensive forecasting capabilities that analyze current user contexts and historical patterns to generate predicted session events within the event coordination system 100. The event prediction system 500 can include predictive analysis implementations (e.g., machine learning inference engines, pattern recognition frameworks, contextual analysis systems, probabilistic forecasting models, and/or the like) that process information from the unified state structures 151 and runtime session records 150 to identify likely future user activities and information needs based on current environmental conditions and established behavioral patterns. The event prediction system 500 can implement multi-stage prediction workflows that systematically analyze current user states, recognize historical patterns, traverse knowledge structures, apply causal reasoning, and generate probabilistic forecasts of future session events that enable proactive assistance and resource preparation. The event prediction system 500 can execute continuous prediction updating processes that monitor changing user contexts and environmental conditions to refine prediction accuracy and maintain current awareness of evolving user needs and information requirements. The event prediction system 500 can also include prediction confidence assessment mechanisms that evaluate the reliability of generated forecasts and provide uncertainty estimates that inform downstream prioritization and resource allocation decisions. The event prediction system 500 can coordinate with the event prediction module 124 within the memory 120 to provide specialized prediction capabilities that enhance the broader predictive analysis framework of the event coordination system 100. For example, the event prediction system 500 can analyze a financial analyst's current activities including reviewing quarterly earnings reports, accessing market data, and communicating with investment team members, implementing predictive analysis workflows that process this current context through pattern recognition algorithms that identify similar historical analysis sessions, knowledge graph traversal processes that explore related financial entities and market conditions, and causal reasoning models that predict likely information needs such as competitor analysis data, regulatory filing requirements, and stakeholder communication templates, generating probabilistic forecasts indicating 85% likelihood that the analyst can need comparative industry analysis within the next 30 minutes and 72% probability that regulatory compliance documentation can be required within the next hour, enabling the event coordination system 100 to prepare relevant information and resources before explicit requests are made, demonstrating how the event prediction system 500 provides sophisticated forecasting capabilities that support proactive user assistance across diverse professional contexts and analytical workflows.

In some implementations, a state analysis module 510 can process current user activities, upcoming events, and recent changes to establish comprehensive contextual foundations for predictive analysis within the event prediction system 500. The state analysis module 510 can include contextual processing implementations (e.g., activity analyzers, event processors, change detection systems, context aggregation engines, and/or the like) that examine current user runtime sessions to identify active work contexts, scheduled commitments, and emerging environmental conditions that influence future information needs and activity patterns. The state analysis module 510 can implement current activity analysis algorithms that process ongoing user interactions including application usage patterns, document access sequences, communication activities, and task execution behaviors to understand what users are currently working on and how their activities relate to broader organizational objectives and project requirements. The state analysis module 510 can execute upcoming event processing mechanisms that analyze calendar data, scheduled meetings, project deadlines, and planned activities to identify future commitments that can influence user information needs and create predictable contexts for proactive assistance opportunities. The state analysis module 510 can also include recent change detection capabilities that monitor modifications to user environments including new project assignments, organizational changes, system updates, and external events that can alter user contexts and create new information requirements or workflow adjustments. The state analysis module 510 can coordinate with the unified state structures 151 to access comprehensive contextual information and with the runtime session records 150 to analyze current session characteristics and user behavior patterns. For example, the state analysis module 510 can process a project manager's current state by implementing activity analysis algorithms that identify ongoing activities such as reviewing project status reports, updating task assignments, and preparing stakeholder communications, while executing upcoming event processing that analyzes scheduled activities including client presentations next week, budget review meetings, and project milestone deadlines, and applying recent change detection that identifies new team member assignments, updated project requirements, and revised timeline constraints, creating comprehensive contextual representations that show the project manager is currently focused on project coordination activities with upcoming presentation requirements and recent scope changes that can influence future information needs such as updated project metrics, presentation materials, and stakeholder communication templates, enabling the event prediction system 500 to generate accurate predictions about likely user activities and information requirements based on complete understanding of current contexts, scheduled commitments, and environmental changes that shape user operational environments and decision-making processes.

In some implementations, a pattern recognition module 522 can analyze historical questions and events to identify recurring behavioral patterns and information-seeking sequences that inform predictive modeling within the event prediction system 500. The pattern recognition module 522 can include pattern analysis implementations (e.g., sequence mining algorithms, behavioral pattern detectors, temporal correlation analyzers, similarity matching systems, and/or the like) that process historical data from the runtime session records 150 to identify consistent patterns in user activities, information requests, and decision-making sequences that can be used to predict similar future behaviors and information needs. The pattern recognition module 522 can implement sequential pattern mining algorithms that analyze historical user sessions to identify common sequences of activities, information access patterns, and task execution workflows that reveal how users typically approach different types of work and what information they consistently need at various stages of their processes. The pattern recognition module 522 can execute behavioral pattern detection processes that recognize recurring user behaviors including preferred information sources, typical analysis approaches, communication patterns, and decision-making styles that provide insights into how users can behave in similar future contexts and what support they can require. The pattern recognition module 522 can also include temporal correlation analysis capabilities that identify time-based relationships between user activities and information needs, recognizing patterns such as information requests that typically follow specific activities or decision points that consistently occur at particular stages of project workflows. The pattern recognition module 522 can coordinate with the record alignment module 123 to access aligned historical records and with the model ensembles 152 to leverage specialized pattern recognition models for different types of behavioral analysis. For example, the pattern recognition module 522 can analyze historical financial analysis sessions by implementing sequence mining algorithms that identify common patterns such as users typically accessing market data first, followed by competitor analysis, then regulatory filings, and finally stakeholder communications, while executing behavioral pattern detection that recognizes individual user preferences such as specific data visualization tools, preferred analysis methodologies, and typical communication formats, and applying temporal correlation analysis that identifies timing patterns such as users typically requesting additional data sources 45 minutes into analysis sessions and generating summary reports 90 minutes after beginning analysis activities, enabling the event prediction system 500 to predict that a user currently beginning financial analysis can need competitor data in approximately 30 minutes and summary report templates in about 75 minutes based on established historical patterns, demonstrating how pattern recognition capabilities enable accurate prediction of user information needs and optimal timing for proactive assistance delivery based on comprehensive analysis of historical behavioral patterns and established workflow sequences.

In some implementations, a state traversal module 524 can identify information gaps through systematic graph traversal operations that explore knowledge structures to discover missing or incomplete contextual information within the event prediction system 500. The state traversal module 524 can include graph exploration implementations (e.g., breadth-first search algorithms, depth-first traversal systems, shortest path calculators, relationship strength analyzers, and/or the like) that navigate the unified state structures 151 to identify areas where additional information can enhance user contexts or where missing relationships can indicate potential information needs and assistance opportunities. The state traversal module 524 can implement systematic graph traversal algorithms that begin from current user context nodes and explore connected entities, relationships, and concepts to identify incomplete information sets, missing data elements, and potential knowledge gaps that can limit user effectiveness or decision-making capabilities. The state traversal module 524 can execute relationship strength analysis processes that evaluate the completeness and currency of connections between entities in user contexts, identifying weak or outdated relationships that can indicate areas where updated information can be valuable and where proactive information gathering can benefit user activities. The state traversal module 524 can also include contextual completeness assessment capabilities that analyze user environment representations to identify missing contextual elements such as absent stakeholder information, incomplete project data, or outdated market conditions that can affect user decision-making and performance. The state traversal module 524 can coordinate with the state structure construct 350 to access comprehensive knowledge graph representations and with the semantic extraction pipeline 330 to identify semantic relationships that guide traversal operations. For example, the state traversal module 524 can analyze a customer relationship management context by implementing graph traversal algorithms that begin from a current customer entity node and explore connected relationships including recent interactions, project involvements, and organizational connections, identifying information gaps such as missing contact information for key stakeholders, incomplete interaction histories for recent communications, and absent competitive analysis data for the customer's industry sector, while executing relationship strength analysis that identifies weak connections between the customer and internal team members indicating potential communication gaps, and applying contextual completeness assessment that recognizes missing market intelligence about the customer's business challenges and growth opportunities, enabling the event prediction system 500 to predict that users working with this customer can need updated stakeholder contact information, comprehensive interaction summaries, competitive landscape analysis, and market opportunity assessments, demonstrating how systematic graph traversal capabilities enable identification of information gaps and prediction of user information needs based on comprehensive analysis of knowledge structure completeness and contextual adequacy for supporting effective user decision-making and relationship management activities.

In some implementations, a causal reasoning module 526 can analyze cause-effect relationships within user contexts and environmental conditions to predict downstream consequences and information needs within the event prediction system 500. The causal reasoning module 526 can include causal analysis implementations (e.g., causal graph models, counterfactual reasoning systems, impact propagation analyzers, dependency tracking mechanisms, and/or the like) that examine relationships between current events, user actions, and environmental conditions to predict how current situations can evolve and what information users can need to address emerging consequences and decision requirements. The causal reasoning module 526 can implement causal chain analysis algorithms that trace potential cause-effect sequences from current conditions through multiple levels of impact, identifying how current user activities and environmental changes can influence future conditions and create new information requirements or decision-making opportunities. The causal reasoning module 526 can execute impact propagation processes that analyze how changes in one area of user context can affect related areas, identifying cascading effects that can create information needs across multiple domains including project management, stakeholder relationships, resource allocation, and strategic planning activities. The causal reasoning module 526 can also include counterfactual reasoning capabilities that evaluate alternative scenarios and potential outcomes based on different user actions or environmental changes, enabling prediction of information needs that can arise from various decision paths and helping users prepare for multiple possible futures. The causal reasoning module 526 can coordinate with the consequence engine module 254 to access specialized causal analysis capabilities and with the unified state structures 151 to analyze causal relationships within comprehensive contextual representations. For example, the causal reasoning module 526 can analyze a project timeline delay situation by implementing causal chain analysis that traces how the delay can affect downstream activities including stakeholder expectations, resource allocation, budget requirements, and deliverable quality, while executing impact propagation processes that identify how timeline changes can influence team workload distribution, client satisfaction levels, and organizational reputation, and applying counterfactual reasoning that evaluates alternative scenarios such as accelerated development approaches, scope reductions, or resource augmentation strategies, enabling the event prediction system 500 to predict that users managing this project delay can need stakeholder communication templates, resource reallocation plans, budget impact analyses, and risk mitigation strategies, with specific timing predictions indicating immediate need for stakeholder notifications, resource planning information within 24 hours, and comprehensive impact assessments within 48 hours, demonstrating how causal reasoning capabilities enable prediction of complex information needs that arise from understanding cause-effect relationships and potential consequence chains that influence user decision-making requirements and proactive assistance opportunities.

In some implementations, an event prediction module 530 can generate predicted user questions and information needs by synthesizing analysis results from contextual processing, pattern recognition, knowledge traversal, and causal reasoning components within the event prediction system 500. The event prediction module 530 can include prediction synthesis implementations (e.g., multi-modal fusion algorithms, probabilistic inference engines, question generation models, need anticipation systems, and/or the like) that combine insights from the state analysis module 510, pattern recognition module 522, state traversal module 524, and causal reasoning module 526 to create comprehensive predictions about future user activities and information requirements. The event prediction module 530 can implement question generation algorithms that analyze current user contexts and historical patterns to anticipate specific questions users can ask, creating predicted question sets that enable proactive answer preparation and information resource allocation before explicit user requests are made. The event prediction module 530 can execute need anticipation processes that identify emerging information requirements based on contextual analysis and causal reasoning, predicting when users can need access to specific data sources, analytical tools, communication templates, or decision support resources based on their current activities and environmental conditions. The event prediction module 530 can also include prediction confidence assessment mechanisms that evaluate the reliability of generated predictions based on pattern strength, contextual clarity, and historical accuracy metrics, providing confidence scores that inform downstream prioritization and resource allocation decisions. The event prediction module 530 can coordinate with the model ensembles 152 to access specialized prediction models and maintain a dynamic priority queue of anticipated questions that continuously updates probabilities based on contextual changes and emerging conditions. For example, the event prediction module 530 can process analysis results from a financial planning context where the state analysis module 510 identified current budget review activities, the pattern recognition module 522 recognized historical patterns of quarterly analysis workflows, the state traversal module 524 discovered missing competitive benchmarking data, and the causal reasoning module 526 predicted potential budget reallocation needs, synthesizing these inputs to generate predicted user questions including "What were our last interactions with this entity?" with 78% confidence, "How does competitor pricing compare to ours?" with 85% confidence, and "Which projects affected by budget scenario X?" with 72% confidence, while implementing need anticipation that predicts requirements for competitive analysis reports within 45 minutes, stakeholder communication templates within 60 minutes, and budget scenario modeling tools within 90 minutes, demonstrating how the event prediction module 530 provides comprehensive prediction synthesis that enables accurate forecasting of user information needs and optimal timing for proactive assistance delivery based on multi-dimensional analysis of user contexts, behavioral patterns, knowledge gaps, and causal relationships.

In some implementations, a scoring module 540 can evaluate predicted session events based on relevance, urgency, and impact scores with specific parameter ranges to prioritize prediction accuracy and resource allocation within the event prediction system 500. The scoring module 540 can include multi-dimensional scoring implementations (e.g., weighted scoring algorithms, relevance assessment engines, urgency classification systems, impact evaluation frameworks, and/or the like) that analyze predicted events generated by the event prediction module 530 to assign quantitative scores across multiple evaluation criteria that guide prioritization and resource allocation decisions for proactive assistance delivery. The scoring module 540 can implement relevance scoring algorithms that evaluate how closely predicted events align with current user activities, environmental conditions, and stated objectives, calculating relevance scores that can range, for example, from 0.70 to 0.95 based on semantic similarity between predicted needs and current contexts, temporal proximity to user activities, and historical patterns of user interest and engagement with similar information types. The scoring module 540 can execute urgency classification processes that assess the time-sensitivity of predicted events based on approaching deadlines, emerging conditions, and potential consequences of delayed response, generating urgency scores that can range, for example, from 0.50 to 0.90 that reflect the criticality of timing for proactive assistance delivery and the potential impact of delayed information access on user productivity and decision-making effectiveness. The scoring module 540 can also include impact evaluation mechanisms that analyze the potential consequences and benefits of addressing predicted events, calculating impact scores that can range, for example, from 0.65 to 0.85 based on factors such as decision importance, stakeholder involvement, resource implications, and organizational significance of the predicted information needs. The scoring module 540 can coordinate with the prioritization module 125 to provide comprehensive scoring information that guides priority assessment and with the relevance scorer module 256 to leverage sophisticated relevance analysis capabilities. For example, the scoring module 540 can evaluate predicted events for a project management scenario by implementing relevance scoring that assigns an example score of 0.87 to a predicted need for team performance metrics based on high semantic similarity to current project review activities and strong historical patterns of similar information requests during project evaluation phases, while executing urgency classification that assigns an example score of 0.78 to a predicted need for stakeholder communication templates based on an approaching client presentation deadline and potential consequences of inadequate preparation, and applying impact evaluation that assigns an example score of 0.82 to a predicted need for budget reallocation analysis based on significant resource implications and high organizational importance of budget decisions, enabling the scoring module 540 to generate comprehensive multi-dimensional scores that prioritize the stakeholder communication template prediction as highest priority due to combined high relevance, urgency, and impact scores, demonstrating how sophisticated scoring mechanisms enable accurate prioritization of predicted events and optimal allocation of proactive assistance resources based on quantitative assessment of prediction value and timing requirements.

In some implementations, a preliminary processing module 550 can precompute top N answers based on scoring results to enable immediate delivery of proactive assistance when predicted events are realized within the event prediction system 500. The preliminary processing module 550 can include answer preparation implementations (e.g., precomputation engines, response generation systems, resource allocation frameworks, cache optimization mechanisms, and/or the like) that process high-priority predicted events from the scoring module 540 to generate comprehensive answers, compile relevant information, and prepare interactive resources before users explicitly request assistance or information access. The preliminary processing module 550 can implement precomputation algorithms that analyze top-ranked predicted events and execute information gathering, analysis, and synthesis operations to create complete responses including data summaries, analytical insights, recommendation sets, and interactive tools that can be immediately delivered when predicted user needs are confirmed through actual user activities or environmental triggers. The preliminary processing module 550 can execute resource preparation processes that compile relevant documents, data sources, communication templates, and analytical tools based on predicted information needs, organizing these resources in readily accessible formats that enable instant delivery through the interface module 127 when activation criterions are satisfied. The preliminary processing module 550 can also include answer quality assurance mechanisms that validate precomputed responses for accuracy, completeness, and relevance, implementing quality checks that ensure prepared answers meet user requirements and provide valuable assistance when delivered through proactive assistance workflows. The preliminary processing module 550 can coordinate with the cache memory 154 to store precomputed answers and with the event generation module 126 to create preliminary events that deliver prepared responses at optimal timing. For example, the preliminary processing module 550 can process top-ranked predictions for a financial analysis scenario by implementing precomputation algorithms that generate comprehensive competitor pricing analysis reports based on a predicted question "How does competitor pricing compare to ours?" with 85% confidence and 0.78 urgency score, executing information gathering operations that compile current market data, competitor product specifications, and pricing trend analyses into interactive dashboards and summary reports, while applying resource preparation processes that organize relevant financial databases, analytical tools, and presentation templates in immediately accessible formats, and implementing quality assurance validation that verifies data accuracy, analysis completeness, and presentation clarity, enabling the preliminary processing module 550 to create comprehensive precomputed responses that can be delivered within milliseconds when the user begins competitor analysis activities, demonstrating how sophisticated answer preparation capabilities enable immediate delivery of high-quality proactive assistance that enhances user productivity and decision-making effectiveness through anticipatory resource preparation and optimal timing of information delivery based on accurate prediction and comprehensive preparation of user information needs and support requirements.

In some implementations, the event prediction system 500 can access a relational graph structure comprising interconnected nodes indicating monitored runtime parameters of the user runtime session, enabling comprehensive analysis of user contexts and environmental conditions for accurate prediction generation. The event prediction system 500 can implement graph access mechanisms that retrieve and analyze relational graph structures from the unified state structures 151, where session events correspond to first subgraphs that include first node subsets indicating first runtime parameter sets for first environment states of user runtime sessions. The event prediction system 500 can execute graph traversal operations that navigate from first node subsets of first subgraphs to generate second subgraphs comprising second node subsets indicating second runtime parameter sets for first environment states, enabling comprehensive context expansion and relationship discovery that enhances prediction accuracy. The event prediction system 500 can also include parameter integration processes that input first runtime parameter sets and second runtime parameter sets into first generative models within the model ensembles 152 to generate predicted session events for user runtime sessions, leveraging comprehensive contextual information obtained through systematic graph exploration and relationship analysis. For example, the event prediction system 500 can access relational graph structures representing customer relationship contexts where a current customer service session event corresponds to a first subgraph comprising customer entity nodes, interaction history nodes, and service case nodes that indicate first runtime parameters including customer tier, recent interaction frequency, and current case priority, then execute graph traversal operations that explore connected nodes including related team members, similar customer cases, and relevant product information to generate second subgraphs comprising expanded contextual information such as team expertise areas, successful resolution patterns, and product knowledge resources, enabling the system to input both initial customer context parameters and expanded relationship parameters into generative models that predict likely user information needs such as technical documentation access, expert consultation requirements, and customer communication templates, demonstrating how comprehensive graph-based context analysis enables accurate prediction of user support needs and optimal preparation of proactive assistance resources based on systematic exploration of relational knowledge structures and comprehensive integration of contextual parameters that inform sophisticated predictive modeling and anticipatory user assistance capabilities.

Figure 6:
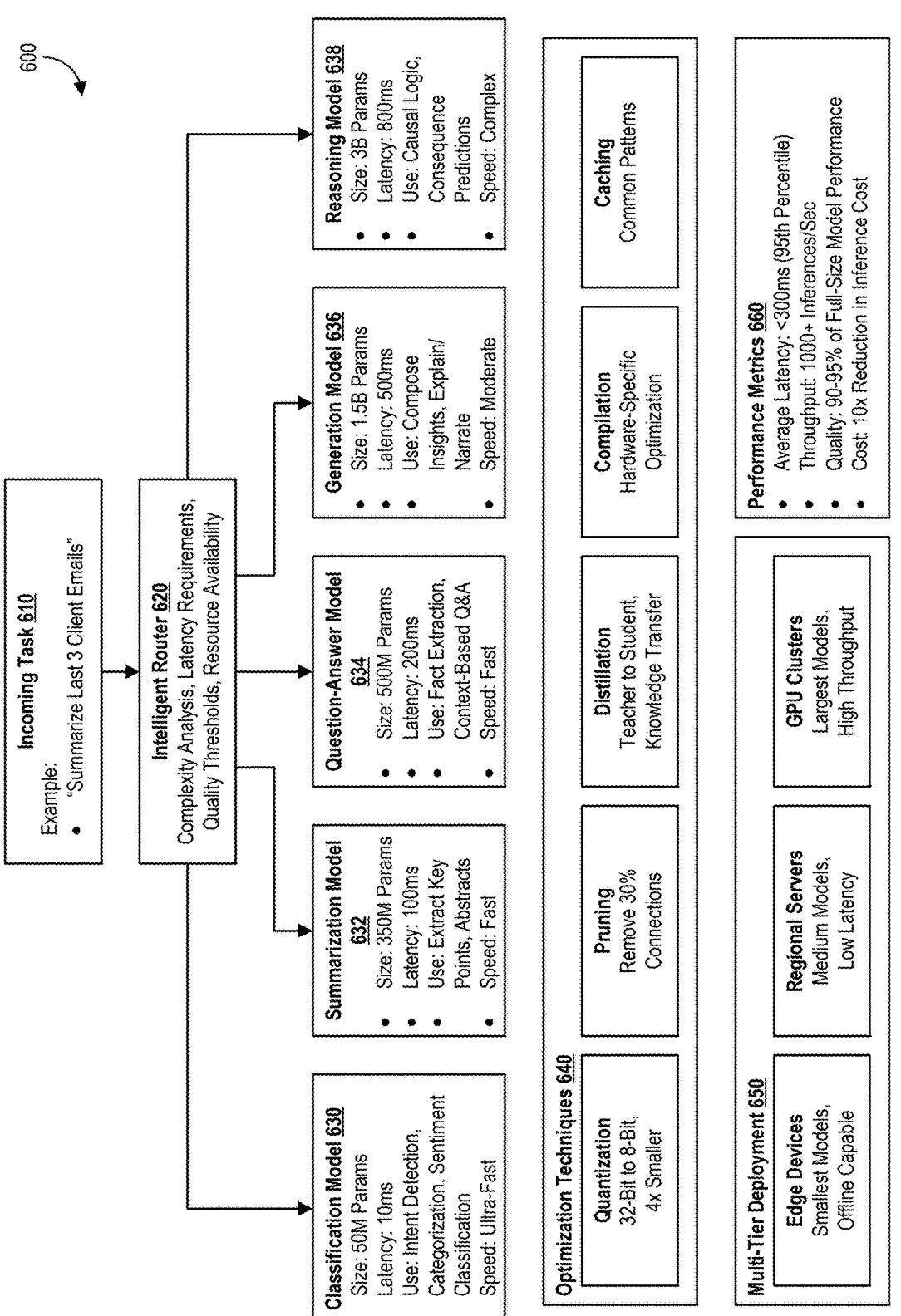
FIG. 6 is a block diagram that illustrates a model ensemble system in accordance with some implementations of the present technology.

FIG. 6 is a block diagram that illustrates a model ensemble system in accordance with some implementations of the present technology. In some implementations, a model ensemble system 600 can provide specialized machine learning capabilities through collections of optimized models that deliver efficient inference for different types of analytical tasks within the event coordination system 100. The model ensemble system 600 can include model orchestration implementations (e.g., model serving frameworks, inference routing systems, resource allocation engines, performance optimization platforms, and/or the like) that coordinate multiple specialized models rather than relying on large general-purpose models with high computational overhead and latency requirements. The model ensemble system 600 can implement model specialization strategies that deploy different model types optimized for specific functions including classification tasks for intent detection and categorization, summarization operations for extracting key points from documents, question-answering processes for fact retrieval and context-based analysis, content generation for composing insights and explanations, and reasoning operations for causal logic and consequence predictions. The model ensemble system 600 can execute intelligent model selection processes that analyze incoming tasks and route them to appropriate specialized models based on task complexity, latency requirements, quality thresholds, and available computational resources, enabling optimal balance between processing speed and analytical accuracy. The model ensemble system 600 can also include comprehensive optimization mechanisms that implement techniques such as quantization for reducing model precision, pruning for removing unnecessary connections, knowledge distillation for transferring capabilities from large models to smaller ones, and compilation for hardware-specific optimization that collectively reduce computational requirements while maintaining acceptable accuracy levels. The model ensemble system 600 can coordinate with the model ensembles 152 to provide persistent storage and version management for specialized models and with the processor 110 to leverage computational resources for distributed model inference operations. For example, the model ensemble system 600 can process a financial analysis request by implementing model orchestration that routes intent classification to a 50M parameter classification model 630 that identifies the request as financial analysis with 95% confidence within 50 milliseconds, then directs document summarization tasks to a 350M parameter summarization model 632 that extracts key financial metrics and trends from quarterly reports within 200 milliseconds, followed by routing complex causal reasoning about market impacts to a 3B parameter reasoning model 638 that analyzes cause-effect relationships and generates consequence predictions within 800 milliseconds, while applying optimization techniques that reduce overall computational cost by 10× compared to using large general-purpose models while maintaining 90-95% of full-size model performance, demonstrating how the model ensemble system 600 provides efficient, specialized analytical capabilities that support real-time predictive analysis and proactive assistance generation within the broader event coordination system 100 framework.

In some implementations, an incoming task module 610 can receive and process analytical requests that require specialized model inference within the model ensemble system 600. The incoming task module 610 can include task reception implementations (e.g., request handlers, task parsers, priority queues, load balancers, and/or the like) that accept analytical requests from various system components including the event prediction module 124, event generation module 126, and interface module 127 that require specialized processing capabilities for different types of inference operations. The incoming task module 610 can implement task classification algorithms that analyze incoming requests to determine task types, complexity levels, and processing requirements, enabling appropriate routing to specialized models and optimal resource allocation for efficient task completion. The incoming task module 610 can execute task preprocessing operations that standardize request formats, validate input parameters, and prepare data structures suitable for processing by downstream specialized models, ensuring consistent input handling regardless of the originating system component or request characteristics. The incoming task module 610 can also include task queuing mechanisms that manage request priorities, implement load balancing across available processing resources, and coordinate task scheduling to optimize overall system throughput while maintaining response time requirements for real-time analytical operations. The incoming task module 610 can coordinate with the intelligent router 620 to provide systematic task distribution and with the performance metrics module 660 to track task processing statistics and system utilization patterns. For example, the incoming task module 610 can receive diverse analytical requests including "Summarize Last 3 Client Emails" from the interface module 127 requiring document summarization capabilities, "Classify User Intent from Communication" from the event prediction module 124 requiring intent detection processing, and "Generate Risk Assessment Report" from the event generation module 126 requiring complex reasoning and content generation, implementing task classification algorithms that identify the first request as a summarization task with medium complexity and 500 ms latency requirement, the second request as a classification task with low complexity and 100 ms latency requirement, and the third request as a generation task with high complexity and 2000 ms latency tolerance, while executing task preprocessing that converts email content into standardized text formats, normalizes communication data into structured inputs, and prepares risk assessment parameters into model-compatible data structures, enabling the incoming task module 610 to provide systematic task reception and preparation that supports efficient routing and processing by specialized models within the model ensemble system 600 framework.

In some implementations, an intelligent router 620 can perform comprehensive task analysis and model selection to optimize processing efficiency within the model ensemble system 600. The intelligent router 620 can include routing decision implementations (e.g., complexity analyzers, latency assessors, quality evaluators, resource monitors, and/or the like) that evaluate incoming tasks from the incoming task module 610 across multiple criteria to determine optimal model assignments that balance processing speed, analytical quality, and resource utilization requirements. The intelligent router 620 can implement complexity analysis algorithms that assess task difficulty levels based on input data characteristics, required analytical depth, and computational requirements, enabling selection of appropriately sized models that provide sufficient analytical capability without unnecessary computational overhead. The intelligent router 620 can execute latency requirements assessment processes that evaluate time-sensitivity constraints for different tasks, implementing routing logic that prioritizes fast, lightweight models for time-critical operations while directing complex analytical tasks to more capable models when processing time allows for deeper analysis. The intelligent router 620 can also include quality threshold evaluation mechanisms that determine minimum accuracy requirements for different task types, ensuring that selected models meet quality standards while optimizing for efficiency, and resource availability assessment capabilities that monitor current system load and computational capacity to make informed routing decisions that prevent resource conflicts and maintain consistent performance. The intelligent router 620 can coordinate with all specialized models within the model ensemble system 600 to provide comprehensive routing capabilities and with the optimization module 640 to leverage model performance characteristics for routing decisions. For example, the intelligent router 620 can process task routing decisions by implementing complexity analysis that evaluates a customer service email classification task as low complexity requiring basic intent detection capabilities, leading to routing selection of the classification model 630 with 50M parameters that provides 95% accuracy within 100 ms response time, while analyzing a comprehensive market analysis request as high complexity requiring sophisticated reasoning capabilities, resulting in routing selection of the reasoning model 638 with 3B parameters that provides detailed causal analysis within 1500 ms processing time, and executing latency requirements assessment that prioritizes the classification model 630 for real-time user interface responses while accepting longer processing times for the reasoning model 638 when generating comprehensive analytical reports, with resource availability assessment ensuring that multiple concurrent tasks are distributed across available computational resources to maintain target performance levels, demonstrating how the intelligent router 620 provides sophisticated task analysis and model selection that optimizes processing efficiency and analytical quality within the distributed model ensemble architecture.

In some implementations, a classification model 630 can provide specialized intent detection and categorization capabilities with optimized 50M parameter architecture within the model ensemble system 600. The classification model 630 can include lightweight neural network implementations (e.g., distilled transformer architectures, efficient attention mechanisms, compressed embedding layers, optimized classification heads, and/or the like) that process textual inputs and user communications to identify underlying intentions, categorize content types, and classify user behaviors with high accuracy while maintaining minimal computational overhead and fast inference times. The classification model 630 can implement intent detection algorithms that analyze user communications, system interactions, and behavioral patterns to determine what users are trying to accomplish, enabling the event coordination system 100 to understand user goals and provide appropriate proactive assistance based on identified intentions and classified activities. The classification model 630 can execute categorization processes that organize information, events, and user activities into structured taxonomies and classification schemes, implementing multi-class classification algorithms that assign appropriate categories to diverse inputs while providing confidence scores that indicate classification reliability and support downstream decision-making processes. The classification model 630 can also include sentiment classification capabilities that analyze emotional tone and attitudes expressed in communications, enabling understanding of user states and relationship dynamics that inform contextual analysis and predictive modeling within the broader system architecture. The classification model 630 can coordinate with the intelligent router 620 to receive appropriate classification tasks and with the semantic extraction pipeline 330 to provide classification capabilities that enhance entity recognition and relationship extraction processes. For example, the classification model 630 can process user communication analysis by implementing intent detection algorithms that analyze email content such as "Can you provide the latest budget variance report for Q4?" and classify the intent as "information_request" with 92% confidence, "budget_analysis" category with 88% confidence, and "urgent" priority level with 76% confidence within 85 milliseconds processing time, while executing categorization processes that classify project management communications into categories such as "status_update," "resource_ request," "timeline_change," and "stakeholder_communication" based on content analysis and contextual indicators, and applying sentiment classification that analyzes customer service communications to identify sentiment indicators such as "frustrated" with 0.78 confidence, "urgent_concern" with 0.82 confidence, and "escalation_required" with 0.71 confidence, enabling the classification model 630 to provide rapid, accurate classification results that inform the event prediction module 124 about user intentions and enable the event generation module 126 to create appropriate preliminary events based on classified user needs and communication characteristics, demonstrating how the specialized classification model 630 delivers efficient intent detection and categorization capabilities that support real-time understanding of user goals and contextual conditions within the event coordination system 100 framework.

In some implementations, a summarization model 632 can extract key points and generate abstracts from documents and communications using optimized 350M parameter architecture within the model ensemble system 600. The summarization model 632 can include document processing implementations (e.g., encoder-decoder architectures, attention-based summarization systems, extractive summarization algorithms, abstractive generation models, and/or the like) that analyze lengthy documents, email threads, meeting transcripts, and other textual content to identify essential information and generate concise summaries that preserve critical details while reducing information volume for efficient consumption. The summarization model 632 can implement extractive summarization algorithms that identify and select the most important sentences, paragraphs, and information segments from source documents, using relevance scoring and importance ranking mechanisms that preserve key facts, decisions, and actionable items while eliminating redundant or less significant content. The summarization model 632 can execute abstractive summarization processes that generate new textual content that captures the essence of source materials in more concise forms, implementing natural language generation capabilities that create coherent summaries that can include information synthesis and paraphrasing while maintaining accuracy and completeness of essential information. The summarization model 632 can also include multi-document summarization capabilities that process multiple related documents simultaneously to create comprehensive summaries that integrate information from diverse sources while identifying common themes, conflicting information, and complementary details that provide holistic understanding of complex topics or situations. The summarization model 632 can coordinate with the intelligent router 620 to receive summarization tasks and with the interface module 127 to provide summary content that enhances user information consumption and decision-making processes. For example, the summarization model 632 can process document summarization requests by implementing extractive algorithms that analyze a 15-page quarterly financial report and identify key sentences comprising critical metrics such as "Revenue increased 12% year-over-year to $2.4M," "Operating expenses rose 8% due to expanded marketing initiatives," and "Net profit margin improved from 15.2% to 16.8%," then executing abstractive generation that creates a coherent 200-word summary stating "04 financial performance exceeded expectations with strong revenue growth driven by successful marketing expansion, resulting in improved profitability despite increased operational costs," while applying multi-document summarization that processes related documents including budget reports, market analysis, and stakeholder communications to generate comprehensive executive summaries that integrate financial performance with market conditions and strategic implications, enabling the summarization model 632 to provide concise, accurate summaries within 300 milliseconds that support rapid information consumption and enable the event prediction module 124 to anticipate when users can need detailed analysis of summarized topics and the interface module 127 to deliver summary information through appropriate presentation channels, demonstrating how the specialized summarization model 632 delivers efficient document processing capabilities that enhance information accessibility and support informed decision-making within the event coordination system 100 framework.

In some implementations, a question answer model 634 can perform fact extraction and context-based analysis using optimized 500M parameter architecture within the model ensemble system 600. The question answer model 634 can include information retrieval implementations (e.g., reading comprehension systems, fact extraction engines, context-aware query processors, knowledge-grounded response generators, and/or the like) that process natural language questions and retrieve accurate answers from available context including documents, knowledge bases, and structured information sources maintained within the unified state structures 151. The question answer model 634 can implement reading comprehension algorithms that analyze textual contexts to locate relevant information that answers specific questions, using attention mechanisms and semantic understanding capabilities that identify answer spans, extract factual information, and provide contextually appropriate responses based on available evidence and supporting documentation. The question answer model 634 can execute fact extraction processes that identify and retrieve specific data points, metrics, dates, names, and other factual information from structured and unstructured sources, implementing entity linking and relationship traversal capabilities that connect questions with relevant information stored across diverse data repositories and knowledge structures. The question answer model 634 can also include context-based reasoning capabilities that analyze questions in relation to current user activities and environmental conditions, enabling generation of answers that are not only factually accurate but also contextually relevant to user needs and decision-making requirements within their current operational situations. The question answer model 634 can coordinate with the intelligent router 620 to receive question-answering tasks and with the unified state structures 151 to access comprehensive contextual information that supports accurate and relevant response generation. For example, the question answer model 634 can process question-answering requests by implementing reading comprehension algorithms that analyze the question "What were our last inter-actions with Acme Corporation?" and traverse customer relationship contexts within the unified state structures 151 to identify recent communications including "Email exchange on November 15th regarding contract renewal," "Phone call on November 20th discussing technical require-ments," and "Meeting on November 25th for project kickoff planning," then executing fact extraction processes that retrieve specific details such as participant names, discus-sion topics, action items, and follow-up requirements from interaction records, while applying context-based reasoning that considers the user's current project planning activities to provide answers that emphasize relevant aspects such as "Recent interactions focused on Q1 project initiation with key decisions on technical architecture and resource alloca-tion, requiring follow-up on budget approval by December 5th," enabling the question answer model 634 to provide accurate, contextually relevant answers within 400 millisec-onds that support user decision-making and enable the event prediction module 124 to anticipate follow-up questions about related topics and the event generation module 126 to prepare relevant supporting information and action items, demonstrating how the specialized question answer model 634 delivers efficient fact extraction and contextual analysis capabilities that enhance user access to relevant information and support informed decision-making within the event coordination system 100 framework.

In some implementations, a generation model 636 can compose insights and explanations using optimized 1.5B parameter architecture within the model ensemble system 600. The generation model 636 can include content creation implementations (e.g., transformer-based generation sys-tems, controlled text generation engines, template-based composition frameworks, multi-modal content synthesizers, and/or the like) that produce comprehensive textual content including analytical insights, explanatory narratives, recom-mendation reports, and interactive communications that synthesize information from multiple sources and present complex information in accessible, actionable formats. The generation model 636 can implement insight composition algorithms that analyze data patterns, trends, and relation-ships identified through various analytical processes to gen-erate coherent explanations that help users understand com-plex situations, emerging conditions, and potential implications of current events and decisions within their operational contexts. The generation model 636 can execute explanation generation processes that create detailed narra-tives describing analytical results, causal relationships, and consequence chains, implementing natural language genera-tion capabilities that translate technical analysis into clear, understandable explanations that support user comprehen-sion and decision-making without requiring specialized ana-lytical expertise. The generation model 636 can also include recommendation synthesis capabilities that combine analyti-cal insights with contextual understanding to generate actionable recommendations, implementation strategies, and decision support content that guides users toward effec-tive actions and optimal outcomes based on comprehensive analysis of their situations and available options. The gen-eration model 636 can coordinate with the intelligent router 620 to receive content generation tasks and with the conse-quence engine module 254 to access causal analysis results that inform insight composition and explanation generation processes. For example, the generation model 636 can process content generation requests by implementing insight composition algorithms that analyze financial performance data, market conditions, and competitive intelligence to generate comprehensive insights such as "Current market volatility presents both risks and opportunities for portfolio rebalancing, with technology sector showing resilience while energy markets face regulatory pressures that can impact Q1 performance projections," then executing expla-nation generation processes that create detailed narratives explaining complex analytical results such as "The 15% increase in customer acquisition costs reflects market satu-ration in traditional channels, suggesting need for digital marketing expansion and customer retention optimization strategies to maintain growth trajectory," while applying recommendation synthesis that combines multiple analytical inputs to generate actionable guidance such as "Recommend accelerating digital transformation initiatives while imple-menting cost optimization measures in traditional opera-tions, with quarterly review checkpoints to assess progress and adjust strategies based on market response," enabling the generation model 636 to provide comprehensive, well-structured content within 1200 milliseconds that supports user understanding and decision-making, and enabling the event prediction module 124 to anticipate when users can need additional explanatory content about generated insights and the interface module 127 to deliver generated content through appropriate presentation channels, demonstrating how the specialized generation model 636 delivers sophis-ticated content creation capabilities that enhance user com-prehension and support informed decision-making within the event coordination system 100 framework.

In some implementations, a reasoning model 638 can perform causal logic and consequence predictions using optimized 3B parameter architecture within the model ensemble system 600. The reasoning model 638 can include advanced reasoning implementations (e.g., causal inference systems, logical reasoning engines, multi-step reasoning frameworks, counterfactual analysis processors, and/or the like) that analyze complex relationships between events, conditions, and outcomes to generate sophisticated predic-tions about consequences, implications, and downstream effects of current situations and potential actions within user operational environments. The reasoning model 638 can implement causal logic algorithms that identify and analyze cause-effect relationships within contextual information, using advanced reasoning capabilities to trace causal chains through multiple levels of impact and understand how current conditions and decisions can influence future out-comes across various dimensions including business perfor-mance, project success, and stakeholder relationships. The reasoning model 638 can execute consequence prediction processes that evaluate potential outcomes of different actions and decisions, implementing scenario analysis and impact assessment capabilities that consider multiple vari-ables, uncertainty factors, and interaction effects to generate comprehensive predictions about likely consequences and their implications for user objectives and organizational goals. The reasoning model 638 can also include multi-step reasoning capabilities that combine logical inference with contextual understanding to solve complex analytical prob-lems that require sophisticated reasoning across multiple information domains and analytical frameworks, enabling generation of insights that would not be apparent through simpler analytical approaches. The reasoning model 638 can coordinate with the intelligent router 620 to receive complex reasoning tasks and with the causal reasoning module 526 to provide advanced reasoning capabilities that enhance pre-dictive analysis and consequence evaluation processes. For example, the reasoning model 638 can process complex reasoning requests by implementing causal logic algorithms that analyze a project timeline delay situation and trace causal relationships showing how "Resource allocation constraints caused by competing project priorities led to 3-week delay, which can cascade to affect client deliverable schedules, team workload distribution, and Q1 revenue recognition timing," then executing consequence prediction processes that evaluate multiple scenarios such as "Accelerated development approach can recover 1 week but increases quality risk by 15% and team burnout probability by 25%, while scope reduction can eliminate delay but reduces client satisfaction score by estimated 0.3 points," while applying multi-step reasoning that combines project management principles, resource optimization strategies, and stakeholder relationship dynamics to generate comprehensive analysis such as "Optimal strategy involves partial scope deferral combined with targeted resource augmentation, minimizing client impact while preserving team sustainability and maintaining quality standards, with contingency plans for alternative approaches if initial strategy encounters implementation challenges," enabling the reasoning model 638 to provide sophisticated analytical results within 1800 milliseconds that support complex decision-making and enable the event prediction module 124 to anticipate when users can need additional reasoning support for related decisions and the prioritization module 125 to assess the importance of reasoning-based insights for proactive assistance delivery, demonstrating how the specialized reasoning model 638 delivers advanced analytical capabilities that enhance understanding of complex situations and support sophisticated decision-making within the event coordination system 100 framework.

In some implementations, an optimization module 640 can implement comprehensive model optimization techniques to reduce computational requirements while maintaining analytical accuracy within the model ensemble system 600. The optimization module 640 can include model compression implementations (e.g., quantization engines, pruning algorithms, knowledge distillation frameworks, compilation optimizers, and/or the like) that apply various optimization strategies to specialized models including the classification model 630, summarization model 632, question answer model 634, generation model 636, and reasoning model 638 to achieve significant reductions in computational overhead while preserving acceptable performance levels. The optimization module 640 can implement quantization algorithms that reduce numerical precision from 32-bit floating point representations to 8-bit or 4-bit integer formats, achieving 4× reduction in model size and memory requirements while maintaining 95-98% of original model accuracy through careful calibration and quantization-aware training techniques that preserve model performance characteristics. The optimization module 640 can execute pruning processes that identify and remove unnecessary neural network connections, neurons, and parameters that contribute minimally to model performance, implementing structured and unstructured pruning strategies that can eliminate 30-50% of model parameters while maintaining target accuracy levels through iterative pruning and fine-tuning procedures. The optimization module 640 can also include knowledge distillation capabilities that transfer knowledge from large, complex models to smaller, more efficient models through teacher-student training approaches that enable smaller models to achieve performance levels approaching those of much larger models, and compilation optimization mechanisms that generate hardware-specific optimized code for target deployment platforms including CPUs, GPUs, and specialized inference accelerators. The optimization module

640 can coordinate with the deployment module 650 to provide optimized models for different deployment scenarios and with the performance metrics module 660 to monitor optimization effectiveness and performance trade-offs. For example, the optimization module 640 can process model optimization by implementing quantization algorithms that convert the generation model 636 from 32-bit precision to 8-bit integer representation, reducing model size from 6 GB to 1.5 GB while maintaining 94% of original text generation quality as measured by BLEU scores and human evaluation metrics, then executing pruning processes that remove 35% of neural network connections from the reasoning model 638 based on magnitude-based importance scoring, reducing inference time from 2000 ms to 1300 ms while preserving 96% of causal reasoning accuracy, while applying knowledge distillation that trains a 200M parameter student model to achieve 92% of the performance of the original 1.5B parameter generation model 636 through distillation training using teacher model outputs and intermediate representations, and implementing compilation optimization that generates CUDA-optimized inference code for GPU deployment that achieves 2.5× speedup compared to standard PyTorch™ inference, enabling the optimization module 640 to provide comprehensive model optimization that achieves 10× reduction in computational cost while maintaining 90-95% of full-size model performance across all specialized models, demonstrating how sophisticated optimization techniques enable efficient deployment of advanced analytical capabilities within resource-constrained environments while supporting real-time performance requirements of the event coordination system 100 framework.

In some implementations, a deployment module 650 can coordinate multi-tier model deployment across diverse computing environments to optimize performance and resource utilization within the model ensemble system 600. The deployment module 650 can include deployment orchestration implementations (e.g., edge computing frameworks, cloud deployment managers, load balancing mechanisms, and/or the like) that distribute optimized models from the optimization module 640 across multiple deployment tiers including edge devices for minimal latency, regional servers for balanced performance, central servers for comprehensive capabilities, and GPU clusters for maximum computational throughput. The deployment module 650 can implement edge device deployment strategies that place the smallest, most optimized models such as lightweight versions of the classification model 630 directly on client devices and mobile platforms, enabling offline operation and sub-50 millisecond response times for basic analytical tasks while reducing network dependency and improving user experience during connectivity limitations. The deployment module 650 can execute regional server deployment processes that position medium-sized models including optimized versions of the summarization model 632 and question answer model 634 in geographically distributed data centers close to user populations, providing balanced performance with 100-200 millisecond response times while maintaining reasonable computational costs and enabling scalable service delivery across diverse geographic regions. The deployment module 650 can also include central server deployment capabilities that host larger models such as the generation model 636 in primary data centers with high-performance computing infrastructure, enabling comprehensive analytical capabilities with 500-1500 millisecond response times for complex content generation and reasoning tasks, and GPU cluster deployment mechanisms that provide specialized hardware acceleration for the most computationally intensive models such as the reasoning model 638 that require maximum processing power for sophisticated causal analysis and multi-step reasoning operations. The deployment module 650 can coordinate with the intelligent router 620 to provide deployment topology information that informs routing decisions and with the performance metrics module 660 to monitor deployment effectiveness across different tiers. For example, the deployment module 650 can implement multi-tier deployment by placing quantized 25M parameter versions of the classification model 630 on mobile devices and edge computing nodes to provide intent detection capabilities with 30-50 millisecond response times for real-time user interface interactions, while deploying optimized 200M parameter versions of the summarization model 632 on regional servers located within 100 miles of major user populations to provide document summarization with 150-250 millisecond response times that balance performance and cost effectiveness, and positioning the full 1.5B parameter generation model 636 on central servers equipped with high-memory configurations to support comprehensive content generation with 800-1200 millisecond response times for complex analytical reports, while deploying the 3B parameter reasoning model 638 on specialized GPU clusters with NVIDIA A100 accelerators to provide sophisticated causal analysis with 1000-1800 millisecond response times that leverage parallel processing capabilities for complex multi-step reasoning operations, enabling the deployment module 650 to provide comprehensive deployment architecture that optimizes performance, cost, and resource utilization across diverse analytical requirements while supporting the real-time and batch processing needs of the event coordination system 100 framework.

In some implementations, a performance metrics module 660 can monitor comprehensive system performance indicators to ensure optimal operation and continuous improvement within the model ensemble system 600. The performance metrics module 660 can include metrics collection implementations (e.g., latency measurement systems, throughput analyzers, quality assessment frameworks, cost tracking mechanisms, and/or the like) that continuously gather quantitative data about model performance across all specialized models and deployment tiers to provide visibility into system effectiveness and identify optimization opportunities for enhanced analytical capabilities. The performance metrics module 660 can implement latency monitoring algorithms that track inference response times across all models including the classification model 630, summarization model 632, question answer model 634, generation model 636, and reasoning model 638, measuring average response times, 95th percentile latencies, and maximum processing delays to ensure that performance targets are maintained and that user experience requirements are satisfied across diverse analytical tasks. The performance metrics module 660 can execute throughput analysis processes that monitor processing capacity and request handling rates across the model ensemble system 600, tracking metrics such as inferences per second, concurrent request handling capabilities, and system utilization levels to ensure adequate capacity for peak demand periods and identify when scaling adjustments are needed to maintain service quality. The performance metrics module 660 can also include quality assessment mechanisms that evaluate analytical accuracy and output quality across different model types, implementing automated quality scoring systems that compare model outputs against ground truth data, user feedback, and established quality benchmarks to ensure that optimization and deployment strategies maintain acceptable analytical performance levels. The performance metrics module 660 can coordinate with the optimization module 640 to provide performance feedback that guides optimization strategies and with the deployment module 650 to monitor deployment effectiveness across different computing tiers. For example, the performance metrics module 660 can monitor system performance by implementing latency measurement that tracks average response times showing the classification model 630 achieving 85 millisecond average latency with 95th percentile under 150 milliseconds across edge and regional deployments, the summarization model 632 maintaining 220 millisecond average processing time with 95th percentile under 400 milliseconds, the question answer model 634 delivering 350 millisecond average response time with 95th percentile under 600 milliseconds, the generation model 636 achieving 950 millisecond average generation time with 95th percentile under 1500 milliseconds, and the reasoning model 638 maintaining 1400 millisecond average analysis time with 95th percentile under 2200 milliseconds, while executing throughput analysis that demonstrates aggregate system capacity of 1000+ inferences per second across all models with peak capacity scaling to 2500 inferences per second during high-demand periods, and implementing quality assessment that shows classification accuracy of 94.2%, summarization quality scores of 91.8% based on ROUGE metrics, question-answering accuracy of 89.6% on domain-specific queries, content generation quality of 88.4% based on human evaluation, and reasoning accuracy of 86.7% on complex causal analysis tasks, with cost analysis indicating 10× reduction in inference costs compared to large general-purpose models while maintaining 90-95% of full-size model performance, enabling the performance metrics module 660 to provide comprehensive performance visibility that supports continuous optimization and ensures that the model ensemble system 600 delivers efficient, high-quality analytical capabilities that meet the real-time performance requirements and cost effectiveness objectives of the event coordination system 100 framework.

In some implementations, the model ensemble system 600 can support event classification and configuration processes that enable dynamic generation of executable sequences for predicted session events within the event coordination system 100. The model ensemble system 600 can implement event classification algorithms that analyze session events from user runtime sessions and recorded session events from prior user runtime sessions to generate third event classifications for predicted session events based on first event classifications and second event classifications derived from current and historical session data. The model ensemble system 600 can execute event configuration retrieval processes that use third event classifications to access event configurations that define executable sequences of operations executed responsive to invocation of predicted session events, where operations within executable sequences include mutable attribute sets that can be populated with predicted attribute sets generated through specialized model inference. The model ensemble system 600 can also include attribute prediction capabilities that leverage first generative models within the model ensembles 152 to generate predicted attribute sets that populate mutable attribute sets of operations within executable sequences, enabling dynamic customization of event configurations based on current user contexts and predicted user needs. For example, the model ensemble system 600 can process event classification by implementing classification algorithms through the classification model 630 that analyze a current user session event involving financial document review and classify it as "financial_analysis" with first event classification parameters, while analyzing recorded session events from similar historical financial analysis sessions and classifying them with second event classification parameters such as "quarterly_review," "budget_planning," and "performance_assessment," then generating a third event classification of "comprehensive_financial_evaluation" that combines characteristics from current and historical classifications, enabling retrieval of an event configuration that defines an executable sequence including operations for data gathering, analysis execution, report generation, and stakeholder communication, where each operation comprises mutable attribute sets such as data source specifications, analysis parameters, report formats, and communication recipients, with the generation model 636 generating predicted attribute sets that populate these mutable attributes with specific values such as "Q4_financial_data," "variance_analysis_methodology," "executive_summary_format," and "board_members_distribution_list" based on current user context and historical patterns, demonstrating how the model ensemble system 600 supports dynamic event configuration and execution that enables personalized, context-aware proactive assistance within the event coordination system 100 framework.

FIG. 7 is a block diagram that illustrates scoring mechanisms for evaluating temporal relevance and multi-dimensional factors in accordance with some implementations of the present technology. The scoring mechanisms 700 can provide comprehensive temporal weighting and multi-dimensional relevance assessment capabilities that enable the event coordination system 100 to evaluate the importance and applicability of information and insights for specific user contexts while managing the temporal relevance of contextual data over time. The scoring mechanisms 700 can include relevance evaluation implementations (e.g., temporal decay algorithms, multi-factor scoring systems, threshold management frameworks, dynamic weighting calculators, and/or the like) that assess information relevance across multiple criteria including temporal proximity to user activities, semantic similarity to current contexts, causal relationships to user objectives, and historical patterns of user engagement with similar information types. The scoring mechanisms 700 can implement comprehensive scoring workflows that systematically evaluate predicted events 194 and contextual information stored in the unified state structures 151 through temporal decay analysis that reduces the weight of historical information over time, multi-dimensional relevance assessment that considers various factors influencing information value, and dynamic threshold management that determines appropriate delivery mechanisms based on calculated relevance scores. The scoring mechanisms 700 can execute continuous scoring updates that monitor changing user contexts and environmental conditions to maintain current relevance assessments and ensure that scoring decisions reflect evolving user needs and information priorities throughout runtime sessions. The scoring mechanisms 700 can also include scoring optimization processes that learn from user feedback collected through the interface module 127 and historical interaction patterns stored in the runtime session records 150 to refine scoring algorithms and improve the accuracy of relevance predictions over time. The scoring mechanisms 700 can coordinate with the relevance scorer module 256 within the evaluation layer 250 to provide systematic relevance assessment capabilities and with the prioritization module 125 to inform priority rankings for predicted events and proactive assistance strategies. For example, the scoring mechanisms 700 can evaluate information relevance for a financial analyst's current quarterly review activities by implementing temporal decay analysis that reduces the relevance weight of market data from previous quarters while maintaining high relevance for current quarter performance metrics, applying multi-dimensional scoring that considers semantic similarity between current budget analysis tasks and available financial reports, causal relationships between market conditions and portfolio performance, user attention patterns showing historical preference for comparative analysis tools, and source authority rankings that prioritize verified financial databases over general market commentary, then calculating overall relevance scores using weighted formulas that combine these factors to generate quantitative assessments such as 0.87 relevance for current quarter variance reports, 0.72 relevance for competitor analysis data, and 0.45 relevance for historical trend analyses, enabling the scoring mechanisms 700 to provide comprehensive relevance evaluation that guides the prioritization module 125 in ranking predicted events and informs the interface module 127 about optimal timing and presentation methods for delivering proactive insights based on calculated relevance scores and dynamic threshold assessments.

In some implementations, temporal decay functions 710 can implement exponential decay algorithms with different decay rates that systematically reduce the relevance weight of historical information over time while preserving important baseline context within the scoring mechanisms 700. The temporal decay functions 710 can include decay rate implementations (e.g., exponential decay calculators, time-based weighting systems, information lifecycle managers, decay parameter optimizers, and/or the like) that apply different decay rates to various types of information based on their inherent temporal characteristics and expected relevance duration for user activities and decision-making processes. The temporal decay functions 710 can implement fast decay algorithms that rapidly reduce the relevance of time-sensitive information including news updates, market data, and real-time events that lose relevance within hours or days of occurrence, applying exponential decay functions with high decay constants that ensure recent information receives maximum weight while older information quickly becomes less influential in relevance calculations and predictive analysis processes. The temporal decay functions 710 can execute medium decay processes that gradually reduce the relevance of operational information including project updates, communications, and routine activities that maintain relevance over weeks or months, implementing moderate decay rates that balance the value of recent information with the continued relevance of historical context for understanding ongoing activities and relationship dynamics. The temporal decay functions 710 can also include slow decay mechanisms that preserve the relevance of strategic information including decisions, policies, and foundational knowledge that remain relevant for months or years, applying low decay rates that maintain high relevance weights for information that provides essential context for long-term planning and strategic decision-making activities, and no decay preservation processes that maintain constant relevance for permanent facts, relationships, and reference information that do not lose value over time and continue to provide essential contextual foundation for user activities. The temporal decay functions 710 can coordinate with the temporal indexer module 246 to access time-series data and with the unified state structures 151 to apply appropriate decay rates to different types of contextual information based on their temporal characteristics and user interaction patterns. For example, the temporal decay functions 710 can process temporal relevance assessment for a project management context by implementing fast decay algorithms that reduce the relevance weight of daily status updates from 1.0 to 0.3 within 72 hours using exponential decay with a decay constant of 0.5 per day, ensuring that recent status information receives priority while older updates become less influential in current project analysis, while executing medium decay processes that reduce the relevance of weekly project reports from 1.0 to 0.6 over 30 days using a decay constant of 0.02 per day, maintaining moderate relevance for historical project progress while emphasizing recent developments, and applying slow decay mechanisms that reduce the relevance of strategic project decisions from 1.0 to 0.85 over 180 days using a decay constant of 0.001 per day, preserving high relevance for foundational project decisions that continue to influence current activities, while implementing no decay preservation for permanent project information such as client requirements, contractual obligations, and technical specifications that maintain constant relevance throughout the project lifecycle, enabling the temporal decay functions 710 to provide sophisticated temporal weighting that ensures the event prediction module 124 receives appropriately weighted contextual information for generating accurate predictions about user information needs and the prioritization module 125 can assess the temporal relevance of predicted events based on comprehensive understanding of how information value changes over time within different operational contexts.

In some implementations, multi-dimensional relevance scoring 720 can evaluate information importance across multiple assessment criteria that collectively determine the overall relevance of contextual information and predicted events for specific user contexts within the scoring mechanisms 700. The multi-dimensional relevance scoring 720 can include multi-factor assessment implementations (e.g., relevance dimension analyzers, factor weighting systems, score aggregation engines, contextual similarity calculators, and/or the like) that systematically evaluate information across diverse relevance dimensions including temporal proximity, semantic relationships, causal connections, user preferences, and contextual significance to generate comprehensive relevance assessments that inform prioritization and delivery decisions for proactive assistance. The multi-dimensional relevance scoring 720 can implement comprehensive evaluation processes that analyze each relevance dimension independently while considering interdependencies and interaction effects between different factors to create holistic relevance assessments that capture the complex nature of information value within user operational environments. The multi-dimensional relevance scoring 720 can execute adaptive scoring mechanisms that adjust relevance assessments based on changing user contexts, environmental conditions, and observed user interaction patterns to ensure that relevance evaluations remain current and accurate throughout evolving runtime sessions and operational scenarios. The multi-dimensional relevance scoring 720 can also include relevance validation processes that compare calculated relevance scores with user feedback and interaction outcomes to continuously refine scoring algorithms and improve the accuracy of relevance predictions for different types of information and user contexts. The multi-dimensional relevance scoring 720 can coordinate with the state synthesization module 122 to access comprehensive contextual information and with the pattern recognition module 522 to leverage historical user behavior patterns for relevance assessment processes. For example, the multi-dimensional relevance scoring 720 can evaluate the relevance of competitive analysis information for a strategic planning session by implementing comprehensive assessment processes that analyze temporal recency by calculating how recently competitor data was updated and assigning higher scores to information from the current quarter, semantic similarity by measuring the alignment between competitor analysis content and current strategic planning objectives using natural language processing algorithms that identify overlapping concepts and themes, causal relationships by evaluating how competitor activities can influence strategic decisions and market positioning through causal reasoning analysis, user attention patterns by analyzing historical user interaction data showing preference for specific types of competitive intelligence and analytical formats, source authority by assessing the credibility and reliability of information sources based on established authority rankings and verification processes, novelty by determining whether the information provides new insights not previously available to the user, actionability by evaluating whether the information enables specific decisions or actions within the current strategic planning context, and impact potential by assessing the potential consequences of acting or not acting on the competitive intelligence, then combining these individual dimension scores through weighted aggregation algorithms that generate overall relevance scores such as 0.82 for recent competitor pricing analysis, 0.76 for market share trend data, and 0.69 for competitive product feature comparisons, enabling the multi-dimensional relevance scoring 720 to provide comprehensive relevance evaluation that guides the prioritization module 125 in ranking strategic planning information and informs the interface module 127 about optimal presentation strategies for delivering competitive intelligence through appropriate user interface mechanisms based on calculated relevance scores and user context requirements.

In some implementations, scoring factors 722 can represent the individual assessment dimensions that contribute to comprehensive relevance evaluation within the multi-dimensional relevance scoring 720. The scoring factors 722 can include factor-specific implementations (e.g., temporal recency calculators, semantic similarity analyzers, causal relationship assessors, user attention trackers, source authority evaluators, novelty detectors, actionability assessors, impact potential analyzers, and/or the like) that evaluate information across distinct relevance dimensions to provide detailed factor-specific scores that are combined through weighted aggregation processes to generate overall relevance assessments for contextual information and predicted events. The scoring factors 722 can implement temporal recency assessment algorithms that evaluate how recently information was created, modified, or accessed, calculating recency scores based on time elapsed since information generation and applying temporal weighting functions that assign higher scores to more recent information while considering the expected relevance duration for different information types and user contexts. The scoring factors 722 can execute semantic similarity analysis processes that measure the conceptual alignment between information content and current user activities, implementing natural language processing algorithms and semantic embedding techniques that calculate similarity scores based on shared concepts, terminology, and thematic relationships between information elements and user operational contexts. The scoring factors 722 can also include causal relationship evaluation mechanisms that assess how information relates to user objectives and decision-making processes through cause-effect analysis, user attention pattern tracking that analyzes historical user interaction behaviors to identify information types and formats that consistently engage user interest, source authority assessment that evaluates the credibility and reliability of information sources based on established authority metrics and verification processes, novelty detection that determines whether information provides new insights or duplicates previously available knowledge, actionability evaluation that assesses whether information enables specific decisions or actions within current user contexts, and impact potential analysis that evaluates the potential consequences and benefits of acting on specific information elements. The scoring factors 722 can coordinate with various system components including the semantic processor module 244 for semantic analysis, the causal reasoning module 526 for causal relationship assessment, and the runtime session records 150 for user attention pattern analysis. For example, the scoring factors 722 can evaluate individual relevance dimensions for customer relationship management information by implementing temporal recency assessment that assigns a score of 0.92 to customer interaction data from the current week compared to 0.67 for interactions from the previous month, semantic similarity analysis that calculates a score of 0.85 for customer communication content that shares key terminology and concepts with current account management activities, causal relationship evaluation that assigns a score of 0.78 to customer feedback information that directly influences current service improvement initiatives, user attention tracking that generates a score of 0.81 based on historical patterns showing consistent user engagement with customer satisfaction metrics and relationship analytics, source authority assessment that assigns a score of 0.89 to information from verified CRM systems compared to 0.64 for informal communication channels, novelty detection that calculates a score of 0.73 for recently discovered customer preferences not previously documented in relationship records, actionability evaluation that assigns a score of 0.86 to customer information that enables specific account management actions and communication strategies, and impact potential analysis that generates a score of 0.79 based on the potential influence of customer relationship decisions on business outcomes and stakeholder satisfaction, enabling the scoring factors 722 to provide detailed factor-specific assessments that contribute to comprehensive relevance evaluation and inform the weighting formula 724 calculations that generate overall relevance scores for customer relationship information and related predicted events within the event coordination system 100 framework.

In some implementations, a weighting formula 724 can calculate overall relevance scores by combining multiple scoring factors through sophisticated mathematical aggregation processes within the multi-dimensional relevance scoring 720. The weighting formula 724 can include score aggregation implementations (e.g., weighted sum calculators, multiplicative combination algorithms, non-linear aggregation functions, adaptive weighting systems, and/or the like) that systematically combine individual factor scores from the scoring factors 722 using configurable weight parameters that reflect the relative importance of different relevance dimensions for specific user contexts and information types. The weighting formula 724 can implement weighted sum aggregation algorithms that multiply each factor score by its corresponding weight parameter and sum the weighted scores to generate overall relevance assessments, enabling systematic combination of diverse relevance dimensions while allowing customization of factor importance based on user preferences, contextual requirements, and organizational priorities. The weighting formula 724 can execute adaptive weighting processes that dynamically adjust weight parameters based on user feedback, interaction patterns, and contextual changes to optimize relevance calculations for evolving user needs and operational environments, implementing machine learning algorithms that analyze user responses to relevance-based recommendations and adjust weighting parameters to improve future relevance predictions and user satisfaction with proactive assistance. The weighting formula 724 can also include normalization mechanisms that ensure factor scores are properly scaled and comparable before aggregation, implementing score standardization processes that account for different factor score ranges and distributions to prevent any single factor from dominating overall relevance calculations, and validation processes that verify the mathematical consistency and logical coherence of calculated relevance scores across different information types and user contexts. The weighting formula 724 can coordinate with the prioritization module 125 to provide overall relevance scores that inform priority rankings and with the interface module 127 to guide presentation decisions based on calculated relevance assessments. For example, the weighting formula 724 can calculate overall relevance scores for financial analysis information by implementing weighted sum aggregation that combines individual factor scores including temporal recency (0.88) with weight 0.25, semantic similarity (0.82) with weight 0.20, causal relationship (0.79) with weight 0.15, user attention (0.85) with weight 0.15, source authority (0.91) with weight 0.10, novelty (0.73) with weight 0.05, actionability (0.87) with weight 0.05, and impact potential (0.84) with weight 0.05, calculating the overall relevance score as $(0.88\times0.25)+(0.82\times0.20)+(0.79\times0.15)+(0.85\times0.15)+(0.91\times0.10)+(0.73\times0.05)+(0.87\times0.05)+(0.84\times0.05)=0.22+0.164+0.119+0.128+0.091+0.037+0.044+0.042=0.845$, while implementing adaptive weighting processes that monitor user interactions with financial analysis recommendations and adjust weight parameters based on observed user preferences such as increasing the weight for actionability when users consistently act on actionable financial insights and decreasing the weight for novelty when users prefer familiar analytical approaches, and applying normalization mechanisms that ensure all factor scores fall within consistent 0.0 to 1.0 ranges before weighted aggregation to prevent score distortion and maintain mathematical consistency across diverse information types, enabling the weighting formula 724 to provide accurate, contextually appropriate overall relevance scores that guide the prioritization module 125 in ranking financial analysis information and inform the interface module 127 about optimal timing and presentation methods for delivering financial insights based on comprehensive multi-dimensional relevance assessment and user-specific weighting preferences.

In some implementations, dynamic threshold management 730 can define multiple threshold levels with corresponding interface mechanisms that determine appropriate delivery methods and presentation strategies based on calculated relevance scores within the scoring mechanisms 700. The dynamic threshold management 730 can include threshold classification implementations (e.g., threshold level definers, interface routing systems, delivery mechanism selectors, presentation strategy optimizers, and/or the like) that establish multiple relevance score ranges including critical, high, medium, and low threshold categories, each associated with specific interface mechanisms and delivery approaches that optimize user experience while ensuring important information reaches users through appropriate channels and timing. The dynamic threshold management 730 can implement critical threshold management processes that identify information with relevance scores exceeding critical threshold levels, typically ranging from 0.85 to 1.0, and route such information through immediate, high-priority delivery mechanisms including modal overlays, urgent notifications, and workflow interruption systems that ensure critical information receives immediate user attention regardless of current activity state or focus level. The dynamic threshold management 730 can execute high threshold processing that manages information with relevance scores in high threshold ranges, typically from 0.70 to 0.84, and directs such information through prominent but non-disruptive delivery mechanisms including embedded interface elements, contextual tooltips, and priority dashboard displays that surface important information within user workflows without causing significant interruption or distraction from primary activities. The dynamic threshold management 730 can also include medium threshold handling that processes information with relevance scores in medium threshold ranges, typically from 0.50 to 0.69, and routes such information through background delivery mechanisms including notification queues, periodic summaries, and on-demand access interfaces that make potentially useful information available when users actively seek additional context or supporting information, and low threshold management that handles information with relevance scores below 0.50 and stores such information in searchable repositories and archive systems that preserve information availability while preventing low-relevance content from cluttering active user interfaces or consuming attention resources. The dynamic threshold management 730 can coordinate with the interface module 127 to implement appropriate delivery mechanisms and with the notification module 272 to manage timing and presentation strategies based on threshold classifications. For example, the dynamic threshold management 730 can process threshold-based delivery decisions for a project management scenario by implementing critical threshold management that identifies project timeline conflict information with a relevance score of 0.91 and immediately routes it through modal overlay interfaces that interrupt current user activities to display urgent project coordination requirements and stakeholder notification needs, while executing high threshold processing that manages team performance metrics with a relevance score of 0.78 and presents this information through embedded dashboard widgets within project management applications that provide immediate access to performance data without disrupting primary project coordination workflows, and applying medium threshold handling that processes historical project comparison data with a relevance score of 0.62 and queues this information for delivery through periodic project summary reports and on-demand analysis interfaces that make comparative insights available when users actively explore project optimization opportunities, while implementing low threshold management that stores general project methodology information with a relevance score of 0.43 in searchable knowledge repositories that preserve information accessibility without actively presenting low-relevance content through primary user interfaces, enabling the dynamic threshold management 730 to provide sophisticated delivery optimization that ensures critical project information receives immediate attention while managing information flow to prevent cognitive overload and maintain user productivity within the event coordination system 100 framework.

Figure 8:
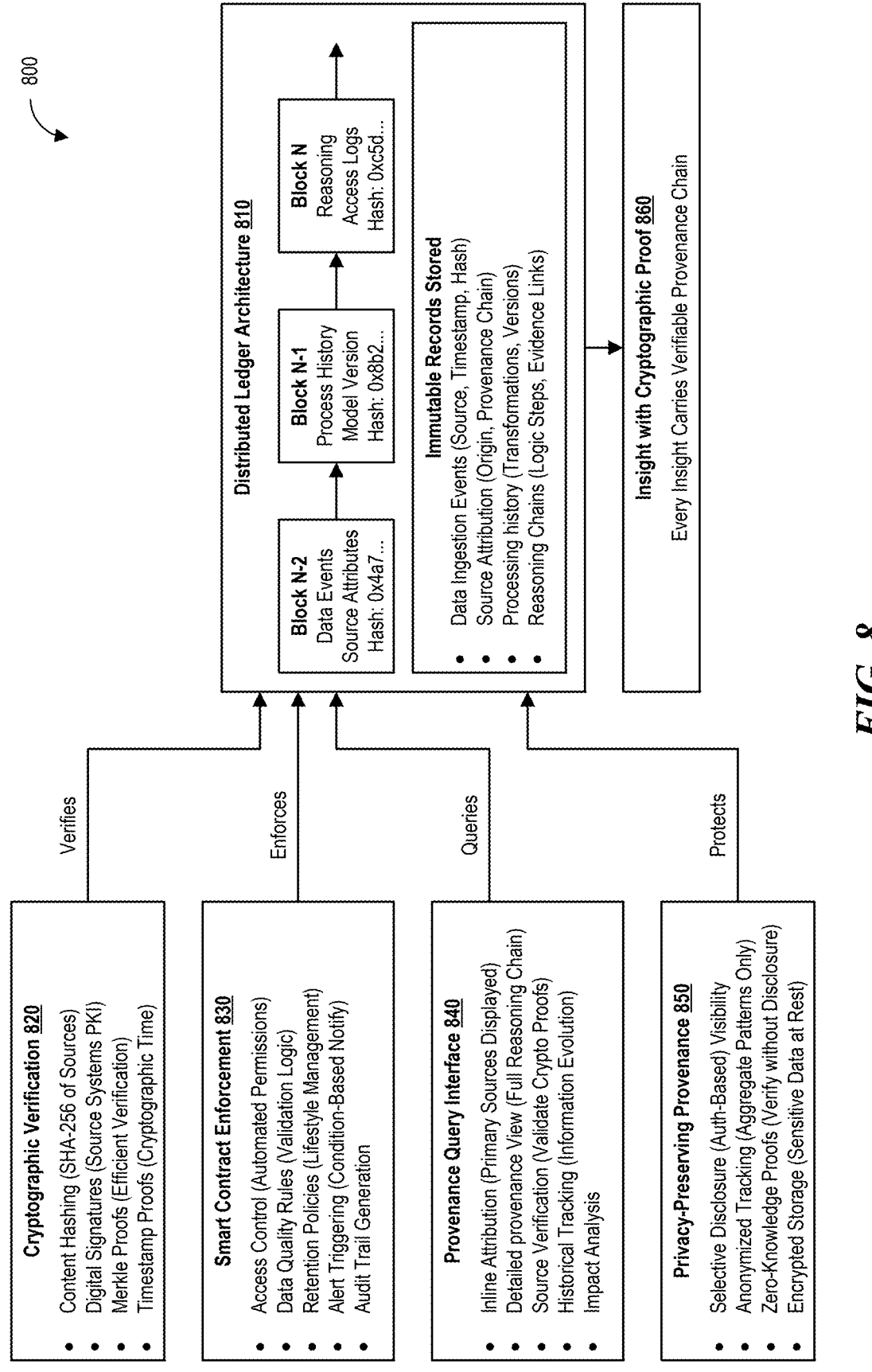
FIG. 8 is a block diagram that illustrates a provenance system in accordance with some implementations of the present technology.

FIG. 8 is a block diagram that illustrates a provenance system in accordance with some implementations of the present technology. In some implementations, the provenance system 800 can provide comprehensive cryptographic verification and immutable record-keeping capabilities that maintain complete accountability and transparency for all insights generated within the event coordination system 100. The provenance system 800 can include blockchain-based implementations (e.g., distributed ledger networks, cryptographic hash chains, immutable data structures, consensus mechanisms, and/or the like) that create tamper-evident records of data sources, processing operations, reasoning chains, and insight derivations to ensure that users can verify the complete lineage and authenticity of all analytical results and recommendations provided by the system. The provenance system 800 can implement comprehensive tracking mechanisms that document every aspect of insight generation including the original data sources accessed by the data retrieval module 121, the processing operations performed by the state synthesization module 122, the analytical computations executed by the event prediction module 124, and the reasoning steps applied by specialized models within the model ensembles 152 to create verifiable audit trails that connect final insights to their foundational evidence and processing history. The provenance system 800 can execute cryptographic verification processes that generate mathematical proofs of data integrity and processing authenticity, implementing digital signature schemes that verify the identity of data sources and processing components while creating hash-based evidence chains that demonstrate the unmodified nature of information throughout the analytical pipeline. The provenance system 800 can also include automated governance mechanisms that enforce organizational policies and regulatory requirements through smart contract implementations that validate data access permissions, ensure compliance with retention policies, and trigger appropriate alerts when sensitive information is accessed or when analytical results depend on potentially unreliable data sources. The provenance system 800 can coordinate with the provenance module 128 to provide systematic provenance tracking capabilities and with the provenance ledger 153 to maintain persistent storage of immutable provenance records that support long-term accountability and regulatory compliance requirements. For example, the provenance system 800 can process comprehensive provenance tracking for a financial analysis scenario where the event prediction module 124 generates investment recommendations by implementing blockchain-based recording that documents the retrieval of market data from external financial APIs at specific timestamps with cryptographic signatures from data providers, the processing of customer portfolio information through the state synthesization module 122 with hash-based verification of data transformations, the application of predictive models from the model ensembles 152 with recorded model versions and parameter configurations, and the reasoning steps that connect market conditions with portfolio optimization recommendations, creating an immutable provenance chain that enables users to verify that investment insights are based on authentic, authorized data sources and have been processed through validated analytical procedures, while smart contract enforcement automatically restricts access to sensitive customer financial data based on user roles and generates compliance alerts when investment recommendations depend on data sources that have been flagged for regulatory review, demonstrating how the provenance system 800 provides comprehensive accountability and transparency that enables users to trust and verify the basis for system-generated insights while ensuring compliance with financial regulations and organizational governance requirements.

In some implementations, a distributed ledger architecture 810 can maintain immutable blockchain records that store comprehensive provenance information across multiple interconnected blocks within the provenance system 800. The distributed ledger architecture 810 can include blockchain implementations (e.g., hash-linked block structures, consensus protocols, distributed storage networks, cryptographic verification chains, and/or the like) that organize provenance information into sequential blocks including Block N–2, Block N–1, and Block N, where each block comprises specific categories of provenance data and cryptographic hash values that ensure data integrity and enable efficient verification of information authenticity and processing history. The distributed ledger architecture 810 can implement block structure management processes that systematically organize different types of provenance information across sequential blocks, with Block N–2 comprising process events and source attributes that document the initial data collection and source identification activities performed by the data retrieval module 121, Block N–1 comprising process history and model version information that records the analytical processing operations and model configurations used during insight generation, and Block N comprising reasoning chains and access logs that document the logical steps connecting evidence to conclusions and track user access to generated insights. The distributed ledger architecture 810 can execute cryptographic hash chaining algorithms that link sequential blocks through hash values calculated from block content, creating tamper-evident chains where any modification to historical blocks would invalidate subsequent hash values and immediately reveal unauthorized changes to provenance records. The distributed ledger architecture 810 can also include distributed consensus mechanisms that coordinate multiple nodes in maintaining consistent copies of the provenance ledger 153, implementing Byzantine fault tolerance protocols that ensure provenance records remain accurate and available even when individual storage nodes experience failures or malicious attacks. The distributed ledger architecture 810 can coordinate with the blockchain module 260 to provide systematic blockchain management capabilities and with the cryptographic verification module 820 to implement hash calculation and verification processes that maintain ledger integrity. For example, the distributed ledger architecture 810 can process comprehensive provenance recording for a customer relationship management scenario by implementing block structure management that stores initial customer data retrieval events in Block N–2 including timestamps showing when customer contact information was accessed from CRM databases at 2024-12-01T09:15:23Z, source attributes identifying the specific database tables and API endpoints used for data collection, and digital signatures from source systems verifying data authenticity, then recording analytical processing operations in Block N–1 including process history showing how customer interaction data was processed through the semantic extraction pipeline 330 to identify relationship patterns and communication trends, model version information documenting that customer sentiment analysis used classification model version 2.3.1 with 94.2% accuracy on customer service communications, and transformation records showing how raw interaction data was converted into structured relationship graphs within the unified state structures 151, followed by storing reasoning chains in Block N comprising logical steps that connected customer interaction patterns with predicted service needs, access logs documenting when users accessed customer relationship insights and which specific recommendations were viewed, and outcome tracking showing whether predicted customer needs were confirmed through subsequent customer interactions, with each block comprising cryptographic hash values calculated using SHA-256 algorithms that create verifiable links between sequential blocks and enable immediate detection of any unauthorized modifications to customer relationship provenance records, demonstrating how the distributed ledger architecture 810 provides comprehensive, tamper-evident storage of provenance information that enables complete verification of customer relationship insights and ensures accountability for all analytical processes within the event coordination system 100 framework.

In some implementations, a cryptographic verification module 820 can implement comprehensive cryptographic proof generation and validation mechanisms that ensure the authenticity and integrity of all provenance information stored within the distributed ledger architecture 810. The cryptographic verification module 820 can include cryptographic implementations (e.g., hash function processors, digital signature generators, Merkle tree constructors, timestamp verification systems, and/or the like) that apply multiple layers of cryptographic protection including content hashing using SHA-256 algorithms, digital signatures using source systems PKI infrastructure, Merkle proofs for efficient verification of large datasets, and timestamp proofs for cryptographic time verification that collectively provide mathematical guarantees of data authenticity and processing integrity. The cryptographic verification module 820 can implement content hashing processes that generate SHA-256 cryptographic hashes of all source documents, data records, and processing outputs to create unique digital fingerprints that enable immediate detection of any modifications or corruption to original information, applying hash calculation algorithms that process data content through secure hash functions to produce 256-bit hash values that serve as tamper-evident identifiers for specific information elements throughout the provenance tracking process. The cryptographic verification module 820 can execute digital signature generation mechanisms that leverage source systems PKI infrastructure to create cryptographically signed attestations of data authenticity, implementing public key cryptography protocols that enable source systems to digitally sign data at the point of origin while allowing verification systems to validate signatures using public key certificates that confirm the identity and authorization of data providers. The cryptographic verification module 820 can also include Merkle proof construction capabilities that organize hash values into binary tree structures where leaf nodes comprise individual data hashes and internal nodes comprise combined hashes of their children, enabling efficient verification of data membership in large datasets without requiring access to complete datasets, and timestamp proof mechanisms that use cryptographic timestamping services to create verifiable evidence of when specific information existed and was processed within the system. The cryptographic verification module 820 can coordinate with the distributed ledger architecture 810 to provide hash values for block chaining and with the smart contract enforcement module 830 to enable cryptographic validation of policy compliance and access control decisions. For example, the cryptographic verification module 820 can process comprehensive cryptographic verification for a financial analysis scenario by implementing content hashing processes that generate SHA-256 hashes such as "a1b2c3d4e5f6 . . . " for quarterly earnings reports retrieved from external financial databases, "f6e5d4c3b2a1 . . . " for market analysis documents processed through the semantic extraction pipeline 330, and "1a2b3c4d5e6f . . . " for predictive model outputs generated by the reasoning model 638, creating unique digital fingerprints that enable immediate verification of document integrity and processing authenticity, while executing digital signature generation that leverages PKI certificates from financial data providers to create cryptographically signed attestations confirming that market data originated from authorized Bloomberg terminals with valid API credentials, implementing RSA-2048 digital signatures that can be verified using public key certificates to confirm data provider identity and authorization status, and applying Merkle proof construction that organizes financial data hashes into tree structures where root hash "9z8y7x6w5v4u . . . " represents the complete financial dataset while individual branch proofs enable verification that specific earnings reports or market indicators are authentic members of the verified dataset without requiring access to complete financial databases, while implementing timestamp proof mechanisms that use RFC 3161 timestamping services to create cryptographic evidence showing that financial analysis insights were generated at 2024-12-01T14:30:45Z with verifiable proof that source data existed at the time of analysis, demonstrating how the cryptographic verification module 820 provides comprehensive mathematical guarantees of data authenticity and processing integrity that enable users to verify the complete cryptographic foundation underlying financial analysis insights and ensure compliance with financial industry regulations requiring verifiable audit trails for investment recommendations and analytical processes.

In some implementations, a smart contract enforcement module 830 can implement automated governance and policy enforcement mechanisms that ensure compliance with organizational policies and regulatory requirements through programmable contract execution within the provenance system 800. The smart contract enforcement module 830 can include smart contract implementations (e.g., automated policy engines, rule-based validation systems, condition monitoring frameworks, compliance enforcement mechanisms, and/or the like) that execute predefined governance rules including access control through automated permissions management, data quality rules through validation logic implementation, retention policies through lifecycle management automation, alert triggering through condition-based notification systems, and audit trail generation through comprehensive logging mechanisms that collectively ensure systematic compliance with organizational governance requirements and regulatory mandates. The smart contract enforcement module 830 can implement access control automation processes that evaluate user credentials, role assignments, and data sensitivity classifications to automatically grant or deny access to specific information and analytical capabilities, executing permission validation algorithms that check user authorization levels against data classification requirements and automatically enforce principle of least privilege by restricting access to only the minimum information necessary for legitimate business purposes. The smart contract enforcement module 830 can execute data quality rule enforcement mechanisms that validate information meets established quality standards before being used in analytical processes, implementing automated validation logic that checks data completeness, accuracy, consistency, and timeliness against predefined quality thresholds and automatically flags or rejects data that fails to meet quality requirements to prevent low-quality information from influencing analytical results and user recommendations. The smart contract enforcement module 830 can also include retention policy automation capabilities that manage information lifecycle according to organizational and regulatory requirements, implementing automated deletion and archival processes that ensure sensitive information is retained for required periods and securely disposed of when retention periods expire, and condition-based alert triggering mechanisms that monitor system conditions and automatically generate notifications when specific events occur such as unauthorized access attempts, data quality violations, or regulatory compliance issues that require immediate attention. The smart contract enforcement module 830 can coordinate with the cryptographic verification module 820 to validate policy compliance through cryptographic proofs and with the provenance query interface 840 to ensure that policy enforcement decisions are properly documented and auditable. For example, the smart contract enforcement module 830 can process comprehensive policy enforcement for a customer data management scenario by implementing access control automation that evaluates user requests to access customer financial information, checking user role assignments against data sensitivity classifications to automatically grant access to customer service representatives for basic contact information while restricting access to detailed financial records to authorized financial advisors with appropriate credentials and training certifications, executing validation algorithms that verify user identity through multi-factor authentication and check current authorization status against active directory systems before granting access to sensitive customer data, while implementing data quality rule enforcement that validates customer information meets established standards including complete contact details, verified identity documentation, and current financial status before allowing the information to be used in investment recommendations or service delivery processes, applying automated validation logic that checks customer data completeness scores above 85%, accuracy verification through external data source cross-referencing, and timeliness requirements ensuring customer information has been updated within the past 90 days, and executing retention policy automation that manages customer data lifecycle according to financial industry regulations requiring 7-year retention for transaction records and 3-year retention for communication logs, implementing automated archival processes that move aged customer data to secure long-term storage while maintaining accessibility for regulatory audits and compliance reporting, while applying condition-based alert triggering that monitors customer data access patterns and automatically generates security alerts when unusual access patterns are detected such as multiple failed authentication attempts or access requests outside normal business hours, and implementing audit trail generation that creates comprehensive logs documenting all customer data access events, policy enforcement decisions, and compliance validation results to support regulatory examinations and internal governance reviews, demonstrating how the smart contract enforcement module 830 provides comprehensive automated governance that ensures customer data management complies with financial industry regulations while maintaining operational efficiency and security throughout the event coordination system 100 framework.

In some implementations, a provenance query interface 840 can provide comprehensive user access mechanisms that enable verification and exploration of insight provenance information through multiple query and presentation modalities within the provenance system 800. The provenance query interface 840 can include query processing implementations (e.g., provenance query engines, attribution display systems, verification interfaces, historical tracking mechanisms, and/or the like) that enable users to access provenance information through inline attribution displays that show primary sources directly within insight presentations, detailed provenance views that reveal complete reasoning chains with all supporting evidence, source verification capabilities that validate cryptographic proofs and data authenticity, historical tracking interfaces that show how information has evolved over time, and impact analysis tools that demonstrate what insights depend on specific information sources and how changes to source data can affect analytical conclusions. The provenance query interface 840 can implement inline attribution mechanisms that automatically display source information directly within insight presentations delivered through the interface module 127, executing attribution rendering processes that show primary data sources, confidence levels, and verification status alongside analytical results to provide immediate transparency about the foundation underlying system recommendations without requiring users to navigate to separate provenance interfaces or interrupt their primary workflows. The provenance query interface 840 can execute detailed provenance view generation processes that create comprehensive displays showing complete reasoning chains from original data sources through all processing steps to final insights, implementing interactive visualization systems that enable users to explore each step of the analytical process including data retrieval operations performed by the data retrieval module 121, semantic processing conducted by the semantic extraction pipeline 330, predictive analysis executed by the event prediction module 124, and reasoning operations applied by specialized models within the model ensembles 152. The provenance query interface 840 can also include source verification capabilities that enable users to validate cryptographic proofs generated by the cryptographic verification module 820, implementing verification interfaces that check digital signatures, validate hash chains, and confirm timestamp authenticity to provide mathematical assurance of data integrity and processing authenticity, and historical tracking mechanisms that show how information and relationships have evolved over time by accessing temporal data maintained by the temporal indexer module 246 and version history stored within the distributed ledger architecture 810. The provenance query interface 840 can coordinate with the display 140 to render provenance information through appropriate visual interfaces and with the conversational interface module 276 to enable natural language queries about provenance information and insight derivation processes. For example, the provenance query interface 840 can process comprehensive provenance access for a strategic planning scenario by implementing inline attribution mechanisms that display source information directly within strategic recommendations presented through the interface module 127, showing attribution labels such as "Based on Q4 market analysis from Bloomberg (verified 2024-12-01)" and "Competitor data from industry reports (confidence: 87%)" alongside strategic insights to provide immediate transparency about recommendation foundations, while executing detailed provenance view generation that creates interactive displays showing the complete analytical chain including initial data retrieval from external market databases at timestamp 2024-12-01T08:30:15Z, semantic processing that extracted competitor positioning information and market trend indicators through the entity recognition module 332 and relationship extraction module 334, predictive analysis that applied the reasoning model 638 to generate strategic scenario forecasts with 82% confidence based on historical pattern matching, and final insight synthesis that combined multiple analytical inputs to generate strategic recommendations with supporting evidence and uncertainty quantification, implementing interactive visualization interfaces that enable users to click on any step in the reasoning chain to explore detailed information about data sources, processing parameters, and analytical methods used at each stage, while providing source verification capabilities that enable users to validate cryptographic signatures from market data providers, verify SHA-256 hash values for processed documents, and confirm timestamp authenticity for all analytical operations through integration with the cryptographic verification module 820, and implementing historical tracking that shows how strategic recommendations have evolved as new market data became available and how changes to competitor analysis data influenced strategic planning insights over time, with impact analysis tools that demonstrate which strategic recommendations depend on specific market intelligence sources and how potential changes to competitor data can affect strategic planning conclusions, demonstrating how the provenance query interface 840 provides comprehensive transparency and verification capabilities that enable users to understand, validate, and trust the complete foundation underlying strategic planning insights while maintaining efficient access to provenance information through intuitive user interfaces integrated within the event coordination system 100 framework.

In some implementations, an insight cryptographic proof 860 can ensure that every insight generated by the event coordination system 100 carries a verifiable provenance chain that provides mathematical guarantees of authenticity and processing integrity within the provenance system 800. The insight cryptographic proof 860 can include proof generation implementations (e.g., cryptographic proof constructors, verification chain builders, authenticity attestation systems, integrity validation mechanisms, and/or the like) that automatically attach comprehensive cryptographic evidence to every insight, recommendation, and analytical result produced by system components including the event prediction module 124, event generation module 126, and specialized models within the model ensembles 152 to create verifiable proof packages that demonstrate the complete lineage and processing history underlying each generated insight. The insight cryptographic proof 860 can implement proof construction algorithms that systematically collect cryptographic evidence from all stages of insight generation including hash values from source data processed by the data retrieval module 121, digital signatures from external data providers accessed through the network service 174, processing verification hashes from analytical operations conducted by the state synthesization module 122, model execution proofs from inference operations performed by specialized models, and reasoning chain hashes that document the logical steps connecting evidence to conclusions within the consequence engine module 254 and causal reasoning module 526. The insight cryptographic proof 860 can execute verification chain assembly processes that organize collected cryptographic evidence into structured proof packages that enable independent verification of insight authenticity, implementing proof packaging algorithms that combine individual cryptographic elements into comprehensive verification chains that can be validated without requiring access to original data sources or processing systems while maintaining complete mathematical assurance of insight integrity and processing authenticity. The insight cryptographic proof 860 can also include proof validation mechanisms that enable users and external systems to independently verify insight authenticity through cryptographic validation processes, implementing verification algorithms that check digital signatures against public key certificates, validate hash chains against original data sources, and confirm processing integrity through cryptographic proof verification that provides mathematical certainty about insight derivation and data authenticity. The insight cryptographic proof 860 can coordinate with the cryptographic verification module 820 to access cryptographic proof generation capabilities and with the distributed ledger architecture 810 to store proof information within immutable blockchain records that ensure long-term proof availability and verification capability. For example, the insight cryptographic proof 860 can process comprehensive proof generation for a financial investment recommendation by implementing proof construction algorithms that collect cryptographic evidence including SHA-256 hash "a1b2c3d4 . . . " for market data retrieved from Bloomberg APIs with RSA-2048 digital signature verification confirming data provider authenticity, hash "f6e5d4c3 . . . " for customer portfolio information processed through the state synthesization module 122 with processing verification confirming data transformation integrity, model execution proof "1a2b3c4d . . . " documenting that investment analysis used reasoning model version 3.1.2 with verified parameter configurations and 89% confidence in generated recommendations, and reasoning chain hash "9z8y7x6w . . . " that documents the logical steps connecting market conditions with portfolio optimization recommendations through causal analysis performed by the causal reasoning module 526, while executing verification chain assembly that combines these cryptographic elements into a comprehensive proof package comprising source data hashes, processing verification codes, model execution attestations, and reasoning chain documentation that enables independent verification of investment recommendation authenticity, implementing proof packaging algorithms that create structured verification chains where each element can be independently validated through cryptographic verification processes without requiring access to sensitive customer data or proprietary analytical models, and providing proof validation mechanisms that enable compliance officers and regulatory auditors to independently verify that investment recommendations are based on authentic market data from authorized sources, have been processed through validated analytical procedures, and include complete documentation of reasoning steps and uncertainty quantification, demonstrating how the insight cryptographic proof 860 provides comprehensive mathematical guarantees of insight authenticity and processing integrity that enable users and regulatory authorities to trust and verify the complete foundation underlying financial investment recommendations while ensuring compliance with financial industry regulations requiring verifiable audit trails and accountability for investment advisory services within the event coordination system 100 framework.

In some implementations, a privacy preserving provenance 850 can balance comprehensive transparency with privacy protection requirements through selective disclosure and advanced cryptographic techniques within the provenance system 800. The privacy preserving provenance 850 can include privacy protection implementations (e.g., selective disclosure systems, anonymization engines, zero-knowledge proof generators, encryption management frameworks, and/or the like) that enable provenance tracking and verification while protecting sensitive information through selective disclosure mechanisms that show provenance information only to authorized users, anonymized tracking that provides aggregate usage patterns without individual identification, zero-knowledge proofs that verify properties without revealing underlying data, and encrypted storage that protects sensitive provenance data at rest while maintaining verification capabilities for authorized access. The privacy preserving provenance 850 can implement selective disclosure mechanisms that control access to provenance information based on user authorization levels and data sensitivity classifications, executing authorization-based visibility controls that show complete provenance chains to data owners and authorized analysts while providing limited provenance information to users with restricted access privileges, ensuring that sensitive customer information, proprietary analytical methods, and confidential business data remain protected while still enabling appropriate transparency and accountability for analytical processes and insight generation. The privacy preserving provenance 850 can execute anonymized tracking processes that maintain comprehensive usage statistics and pattern analysis without exposing individual user identities or sensitive data elements, implementing differential privacy algorithms that add carefully calibrated noise to aggregate statistics to prevent individual identification while preserving the statistical utility of usage patterns for system optimization and compliance reporting purposes. The privacy preserving provenance 850 can also include zero-knowledge proof generation capabilities that enable verification of provenance properties without revealing underlying sensitive data, implementing cryptographic protocols that prove statements such as "this insight is based on data from authorized sources" or "this analysis meets quality standards" without exposing the actual data content or processing details that could compromise privacy or competitive advantage, and encrypted storage mechanisms that protect sensitive provenance data through advanced encryption algorithms while maintaining the ability to perform verification and compliance checking through homomorphic encryption and secure multi-party computation techniques. The privacy preserving provenance 850 can coordinate with the smart contract enforcement module 830 to implement privacy-preserving policy enforcement and with the cryptographic verification module 820 to generate privacy-preserving cryptographic proofs that maintain verification capability while protecting sensitive information. For example, the privacy preserving provenance 850 can process comprehensive privacy protection for a healthcare analytics scenario by implementing selective disclosure mechanisms that provide complete provenance information including patient data sources, analytical processing steps, and clinical reasoning chains to authorized healthcare providers with appropriate medical credentials and patient consent, while showing limited provenance information to healthcare administrators that includes aggregate quality metrics and compliance verification without exposing individual patient identifiers or specific medical conditions, executing authorization-based visibility controls that verify user credentials against healthcare access control systems and patient consent records before revealing sensitive provenance information, while implementing anonymized tracking processes that maintain comprehensive statistics about healthcare analytics usage patterns including frequency of different analysis types, common data source combinations, and analytical accuracy metrics without exposing individual patient identities or specific medical cases, applying differential privacy algorithms that add statistical noise to aggregate healthcare analytics metrics to prevent patient re-identification while preserving the utility of usage patterns for healthcare quality improvement and regulatory compliance reporting, and implementing zero-knowledge proof generation that enables healthcare regulators to verify that clinical analytics meet established quality standards and are based on authorized patient data without requiring access to sensitive medical records or proprietary clinical decision support algorithms, using cryptographic protocols that prove statements such as "clinical recommendations are based on complete patient medical histories" and "diagnostic analytics achieve 94% accuracy on validated test datasets" without revealing underlying patient data or analytical methods, while applying encrypted storage mechanisms that protect sensitive healthcare provenance data through AES-256 encryption with healthcare-specific key management protocols that ensure patient privacy compliance while maintaining verification capabilities for authorized medical professionals and regulatory auditors, demonstrating how the privacy preserving provenance 850 provides comprehensive privacy protection that enables healthcare analytics transparency and accountability while ensuring strict compliance with HIPAA regulations and patient privacy requirements within specialized healthcare applications of the event coordination system 100 framework.

Figure 9:
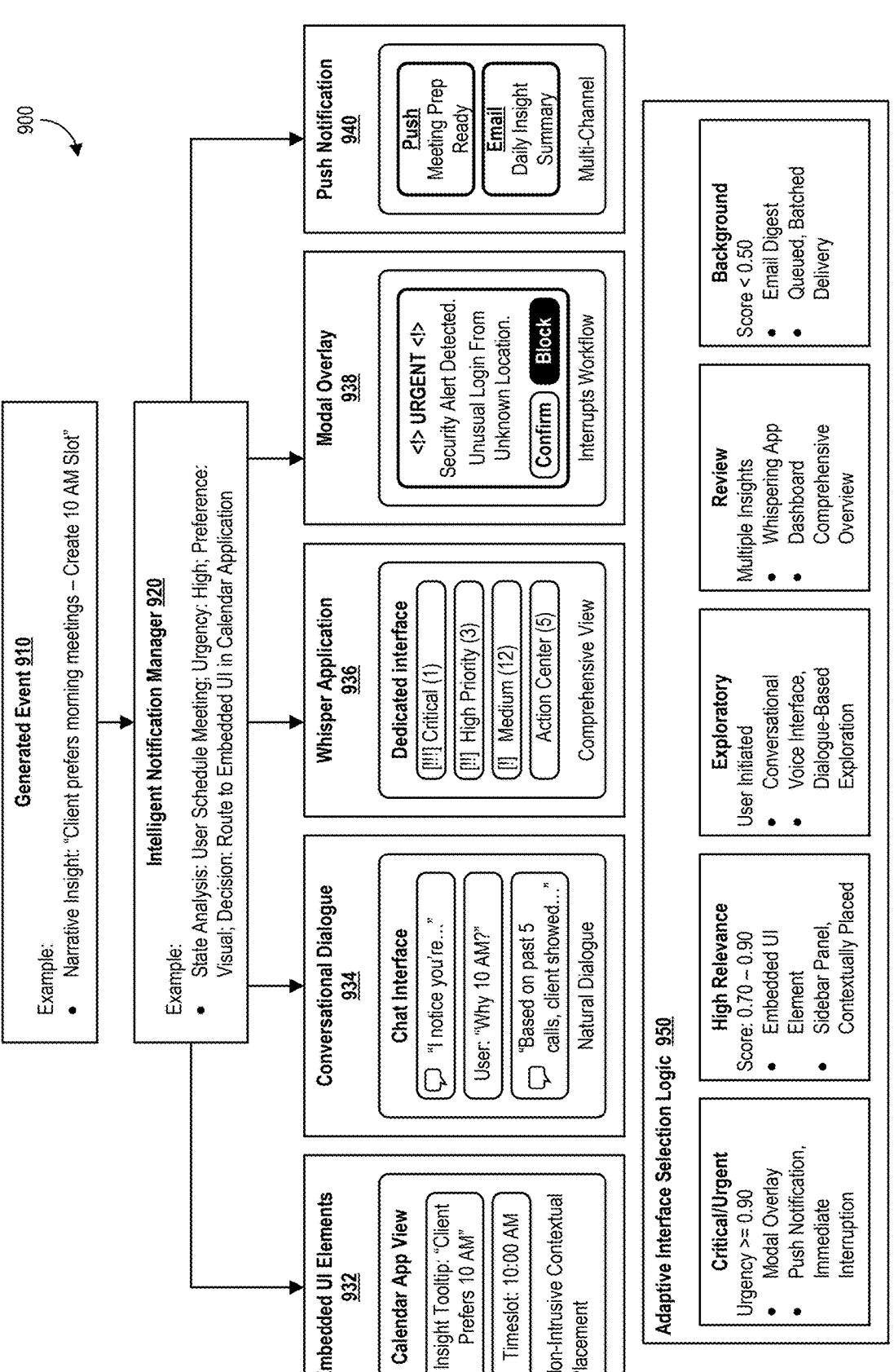
FIG. 9 is a block diagram that illustrates multi-modal delivery mechanisms in accordance with some implementations of the present technology.

FIG. 9 is a block diagram that illustrates an event coordination system comprising multi-modal delivery capabilities in accordance with some implementations of the present technology. In some implementations, an event coordination system 900 can provide comprehensive multi-modal delivery capabilities that coordinate the presentation and distribution of generated insights and recommendations through diverse user interface mechanisms within the broader event coordination system 100 framework. The event coordination system 900 can include delivery orchestration implementations (e.g., notification routing systems, interface selection algorithms, user experience optimization frameworks, multi-channel communication managers, and/or the like) that systematically coordinate the delivery of preliminary session events through appropriate interface channels based on criticality assessments, user context conditions, and optimal timing considerations for maximizing user engagement and productivity. The event coordination system 900 can implement comprehensive delivery workflows that begin with generated events from predictive analysis processes, continue through notification management and interface selection logic, and conclude with targeted delivery through specialized interface modules that are optimized for different types of user interactions and information consumption patterns. The event coordination system 900 can execute adaptive delivery strategies that monitor user responses and interaction patterns to continuously optimize interface selection and presentation timing for enhanced user satisfaction and system effectiveness. The event coordination system 900 can coordinate with the interface module 127 within the memory 120 to provide systematic delivery capabilities and with the display 140 to render visual presentations through appropriate interface mechanisms based on calculated priority levels and user context requirements.

In some implementations, a generated event 910 can serve as the primary input that triggers multi-modal delivery processes within the event coordination system 900 by providing structured information about preliminary session events that require user notification and interface presentation. The generated event 910 can include event data implementations (e.g., preliminary session event descriptors, criticality score indicators, activation criterion specifications, content payload structures, and/or the like) that comprise comprehensive information about predicted user needs, recommended actions, and supporting evidence that has been prepared through predictive analysis processes performed by the event prediction module 124 and preliminary processing conducted by the event generation module 126. The generated event 910 can implement structured data formats that specify event characteristics including event types such as information delivery, action recommendations, or decision support requirements, criticality levels that indicate the urgency and importance of user notification, content payloads that comprise prepared responses to predicted user query requests or interactive artifacts representing sequential execution of causally linked predicted session events, and delivery preferences that guide interface selection and presentation timing based on user context and system optimization algorithms. The generated event 910 can execute event validation processes that verify the completeness and accuracy of event information before triggering delivery workflows, implementing quality assurance mechanisms that ensure generated events comprise all necessary information for effective user notification and interface presentation. The generated event 910 can also include event metadata that provides contextual information about the predictive analysis processes that created the event, enabling downstream delivery components to make informed decisions about presentation strategies and user interaction optimization. For example, the generated event 910 can comprise structured information about a financial analysis scenario where predictive analysis has identified that a user can need quarterly performance comparison data within the next 30 minutes, including a criticality score of 0.78 indicating high priority for user notification, content payload comprising precomputed financial performance charts and variance analysis reports, activation criterions specifying that delivery should occur when the user accesses budget planning applications, and delivery preferences indicating that embedded interface presentation is optimal based on the user's current focus on financial analysis tasks, enabling the generated event 910 to provide comprehensive input information that guides the notification manager 920 in determining appropriate delivery strategies and interface selection for maximizing user productivity and information accessibility.

In some implementations, a notification manager 920 can coordinate the systematic distribution of generated events across multiple specialized interface modules based on comprehensive analysis of event characteristics and user context conditions within the event coordination system 900. The notification manager 920 can include distribution orchestration implementations (e.g., interface routing algorithms, priority assessment engines, context evaluation systems, delivery optimization frameworks, and/or the like) that analyze generated events 910 to determine optimal delivery strategies including interface module selection, presentation timing, and user interaction approaches that maximize information value while minimizing workflow disruption and cognitive overload. The notification manager 920 can implement interface routing algorithms that evaluate generated event characteristics including criticality scores, content types, user context conditions, and delivery preferences to systematically route events to appropriate interface modules including the embedded interface module 932 for contextually integrated presentations, the dialogue interface module 934 for interactive exploration, the whisper interface module 936 for comprehensive review, the overlay interface module 938 for urgent notifications, and the notification interface module 940 for multi-channel delivery across diverse communication platforms. The notification manager 920 can execute priority assessment processes that analyze criticality scores generated for preliminary session events to determine the degree of priority for user notification, implementing threshold-based routing logic that directs high-criticality events to immediate presentation mechanisms while queuing lower-priority events for appropriate delivery timing based on user activity patterns and attention management considerations. The notification manager 920 can also include context evaluation capabilities that assess current user runtime session conditions including active applications, current task focus, cognitive load indicators, and interruption tolerance levels to optimize delivery timing and interface selection for maximum user acceptance and engagement with delivered insights and recommendations. For example, the notification manager 920 can process a generated event 910 comprising budget analysis recommendations with a criticality score of 0.82 by implementing interface routing algorithms that evaluate the high criticality level and current user context showing active engagement with financial planning applications, determining that embedded interface presentation through the embedded interface module 932 is optimal for delivering budget insights without disrupting the user's current workflow, while simultaneously preparing alternative delivery through the whisper interface module 936 for comprehensive review if the user requires additional detail or supporting analysis, and coordinating with the overlay interface module 938 for immediate presentation if the criticality score exceeds the critical threshold of 0.85 that would require workflow interruption to ensure urgent information reaches the user regardless of current activity state.

In some implementations, an embedded interface module 932 can provide contextually integrated presentation capabilities that surface insights and recommendations directly within existing applications and user workflows without requiring context switching or workflow interruption. The embedded interface module 932 can include contextual integration implementations (e.g., tooltip generation systems, sidebar panel controllers, inline annotation engines, banner notification displays, and/or the like) that create interface elements that appear as natural extensions of existing applications rather than external interruptions, maintaining visual consistency and interaction patterns that align with user expectations and established workflow practices. The embedded interface module 932 can implement contextual tooltip mechanisms that generate small information displays that appear near relevant interface elements when users hover over or interact with specific application components, providing immediate access to related insights and recommendations without obscuring primary application functionality or requiring additional screen real estate for information presentation. The embedded interface module 932 can execute sidebar panel generation processes that create collapsible or persistent panel displays alongside primary application interfaces, implementing dynamic content loading that presents relevant insights based on current user activities while enabling users to expand or collapse panels based on their immediate information needs and screen space preferences. The embedded interface module 932 can also include inline annotation capabilities that overlay contextual information directly onto documents, data displays, and application content, implementing annotation positioning algorithms that place insights at optimal locations within existing content while maintaining readability and user interaction capabilities with underlying application functionality. For example, the embedded interface module 932 can process delivery of calendar-related insights by implementing contextual tooltip generation that displays relevant meeting preparation information when users hover over calendar appointments, showing details such as "Client presentation requires Q4 performance data and competitive analysis" with tooltip positioning algorithms that place information displays adjacent to calendar entries without obscuring other scheduled events, while executing sidebar panel generation that creates a collapsible "Meeting Insights" panel within calendar applications that presents comprehensive preparation materials including participant backgrounds, relevant project updates, and suggested discussion topics organized in expandable sections that users can access without leaving their calendar interface, and implementing inline annotation capabilities that overlay timeslot information directly onto calendar grid displays, showing annotations such as "Recommended: Review budget variance report before 2 PM meeting" positioned within appropriate time blocks using annotation positioning algorithms that maintain calendar functionality while providing contextual guidance for optimal meeting preparation and time management.

In some implementations, a dialogue interface module 934 can enable natural language interactions and conversational exploration of insights and contextual information through chat-based interface mechanisms within the event coordination system 900. The dialogue interface module 934 can include conversational processing implementations (e.g., natural language understanding engines, dialogue state management systems, response generation frameworks, conversation context tracking mechanisms, and/or the like) that support multi-turn conversations where users can ask follow-up questions, request clarifications, explore related information, and engage in natural dialogue about delivered insights and recommendations without requiring structured query formulation or navigation through complex interface hierarchies. The dialogue interface module 934 can implement natural language understanding algorithms that process user questions and conversational inputs in the context of current activities and available information, translating natural language queries into structured requests that can be processed by the evaluation layer 250 and synthesization layer 240 to retrieve relevant information and generate appropriate conversational responses. The dialogue interface module 934 can execute dialogue state management processes that maintain conversation history and user intent across multiple interaction turns, implementing context preservation mechanisms that enable coherent dialogue progression and ensure that follow-up questions and clarifications are understood within the appropriate conversational context and user objective framework. The dialogue interface module 934 can also include response personalization capabilities that adapt communication style, technical detail level, and information presentation based on user preferences, expertise levels, and current context requirements, implementing conversational adaptation algorithms that customize dialogue interactions for optimal user comprehension and engagement. For example, the dialogue interface module 934 can process conversational exploration of customer relationship insights by implementing natural language understanding that interprets user questions such as "What were our recent interactions with Acme Corporation?" and translates this query into structured requests that retrieve customer interaction history from the unified state structures 151, then executing response generation that creates conversational replies such as "Your team had three recent interactions with Acme Corporation: a contract renewal discussion on November 15th, a technical requirements meeting on November 20th, and a project kickoff planning session on November 25th. Would you like details about any specific interaction?" while implementing dialogue state management that maintains conversation context so that follow-up questions like "Tell me more about the technical requirements discussion" can be processed with appropriate context awareness, and applying response personalization that adapts the level of technical detail based on the user's role and expertise, providing executive-level summaries for management users while offering detailed technical specifications for engineering personnel, enabling natural dialogue exploration that enhances user understanding and supports informed decision-making through conversational interaction with comprehensive contextual information.

In some implementations, a whisper interface module 936 can provide a dedicated interface environment for comprehensive insight management and prioritized information review through specialized dashboard and organizational capabilities within the event coordination system 900. The whisper interface module 936 can include comprehensive interface implementations (e.g., priority dashboard generators, insight feed organizers, categorized view systems, search and filter mechanisms, and/or the like) that present insights and recommendations in a focused environment specifically designed for information consumption, priority assessment, and decision-making activities that require comprehensive visibility into system-generated insights and proactive assistance opportunities. The whisper interface module 936 can implement priority-based organization systems that arrange insights according to criticality classifications including critical priority displays for insights with criticality scores exceeding 0.85 that require immediate attention, high priority sections for insights with scores between 0.70 and 0.84 that represent important but non-urgent information needs, and medium priority areas for insights with scores between 0.50 and 0.69 that provide potentially valuable context and supporting information for user activities and decision-making processes. The whisper interface module 936 can execute comprehensive view generation processes that enable users to access detailed information about each insight including supporting evidence, confidence assessments, related contextual information, and recommended actions, implementing expandable interface elements that allow users to explore insight details without losing overview perspective of other available insights and recommendations. The whisper interface module 936 can also include insight management capabilities that enable users to categorize, track, and act upon delivered insights, implementing action tracking systems that monitor user responses to insights and maintain records of decision outcomes for continuous system improvement and user satisfaction optimization. For example, the whisper interface module 936 can present a comprehensive project management dashboard by implementing priority-based organization that displays critical priority insights such as "Project Alpha timeline conflict requires immediate stakeholder notification" with red priority indicators and immediate action buttons, high priority sections showing insights like "Team performance metrics indicate potential resource reallocation needs" with orange priority markers and detailed analysis links, and medium priority areas comprising insights such as "Historical project comparison suggests optimization opportunities" with yellow priority indicators and optional exploration interfaces, while executing comprehensive view generation that enables users to expand each insight to reveal supporting evidence including data sources, confidence scores, related project information, and recommended next steps, and implementing insight management capabilities that allow users to mark insights as "reviewed," "acted upon," or "deferred" while tracking outcomes and providing feedback that improves future insight relevance and timing, creating a centralized command center for proactive information management that enhances user decision-making capabilities and organizational effectiveness.

In some implementations, an overlay interface module 938 can provide urgent notification capabilities through workflow interruption mechanisms that ensure critical information reaches users immediately regardless of current activity state or application focus within the event coordination system 900. The overlay interface module 938 can include interruption management implementations (e.g., modal overlay generators, urgent alert systems, security notification frameworks, workflow interruption controllers, and/or the like) that create high-priority interface elements that appear above all other application content and require user acknowledgment before normal workflow activities can continue, ensuring that critical information receives immediate attention when preliminary session events have criticality scores that satisfy critical threshold requirements. The overlay interface module 938 can implement modal overlay generation algorithms that create focused interface displays that temporarily suspend normal application interactions while presenting critical information, implementing overlay positioning and styling systems that ensure maximum visibility and user attention while providing clear interaction mechanisms for acknowledging alerts and accessing detailed information about urgent conditions or security concerns. The overlay interface module 938 can execute urgent alert processing mechanisms that handle time-sensitive notifications including security alerts about unauthorized access attempts, system failures that require immediate response, deadline warnings for critical project milestones, and emergency communications that affect user safety or organizational operations, implementing alert categorization systems that apply appropriate visual styling, interaction requirements, and escalation procedures based on alert severity and organizational response protocols. The overlay interface module 938 can also include workflow interruption management capabilities that balance the need for immediate notification against user productivity considerations, implementing intelligent interruption logic that considers user context, task criticality, and interruption tolerance to determine when workflow interruption is justified and when alternative delivery mechanisms can be more appropriate for user effectiveness and satisfaction. For example, the overlay interface module 938 can process urgent security alert delivery by implementing modal overlay generation that creates a prominent security warning display with red background styling and attention-grabbing visual elements when the system detects unauthorized access attempts to sensitive customer data, presenting overlay content such as "SECURITY ALERT: Unauthorized access detected to customer financial records. Immediate action required. Click here for details and response procedures" with mandatory acknowledgment buttons that prevent users from dismissing the alert without confirming awareness and initiating appropriate security response procedures, while executing urgent alert processing that categorizes the security event as critical priority requiring immediate workflow interruption regardless of current user activities, and implementing workflow interruption management that overrides normal interruption tolerance settings when security threats are detected, ensuring that critical security information reaches users within seconds of threat detection to enable rapid response and minimize potential security impact on organizational data and customer privacy protection.

In some implementations, a notification interface module 940 can coordinate multi-channel notification delivery across diverse communication platforms and devices to ensure comprehensive user awareness of insights and recommendations through multiple communication modalities within the event coordination system 900. The notification interface module 940 can include multi-channel delivery implementations (e.g., push notification systems, email integration frameworks, SMS messaging services, mobile application interfaces, and/or the like) that distribute insights and recommendations through various communication channels including mobile push notifications for immediate awareness, email messages for detailed information delivery, SMS alerts for critical notifications, and integrated application notifications that appear within existing productivity and communication tools used by organizational personnel. The notification interface module 940 can implement meeting preparation notification processes that analyze upcoming calendar events and automatically generate preparation reminders and supporting information delivery through appropriate communication channels, executing preparation timeline algorithms that send initial preparation notifications 24 hours before important meetings, detailed agenda and background information 4 hours before meeting start times, and final preparation reminders 30 minutes before scheduled events to ensure optimal meeting readiness and participant preparation. The notification interface module 940 can execute daily insight summary generation mechanisms that compile and distribute comprehensive summaries of system-generated insights, recommendations, and analytical results through email delivery systems that present organized daily reports including priority insights requiring attention, completed predictions and their accuracy assessments, emerging trends and patterns identified through continuous analysis, and recommended actions for upcoming activities and decision-making opportunities. The notification interface module 940 can also include notification personalization capabilities that customize delivery timing, content format, and communication channel selection based on user preferences, role requirements, and historical interaction patterns, implementing adaptive notification strategies that optimize user engagement and information consumption effectiveness across diverse organizational contexts and individual working styles. For example, the notification interface module 940 can process comprehensive meeting preparation support by implementing multi-channel delivery that sends initial meeting preparation push notifications to mobile devices 24 hours before a client presentation, comprising summary information such as "Client presentation tomorrow: Acme Corporation Q4 review. Preparation materials being compiled," followed by detailed email delivery 4 hours before the meeting that includes comprehensive preparation packages with client background information, recent interaction summaries, relevant project updates, and suggested discussion topics organized in easily accessible formats, while executing SMS alert delivery 30 minutes before meeting start time with final reminders such as "Acme Corp meeting in 30 min. Key topics: Q4 performance, contract renewal. Confidence level: High," and implementing daily insight summary generation that compiles end-of-day email reports comprising organized sections for completed predictions and their outcomes, newly identified opportunities requiring attention, emerging customer relationship trends, and recommended preparation activities for upcoming meetings and project milestones, enabling comprehensive multi-channel communication that ensures users remain informed and prepared across all communication platforms and devices they use for professional activities and organizational coordination.

In some implementations, an adaptive selection logic 950 can determine optimal routing of notifications and interface presentations based on comprehensive analysis of urgency levels, relevance assessments, and user exploration patterns within the event coordination system 900. The adaptive selection logic 950 can include routing decision implementations (e.g., urgency classification algorithms, relevance evaluation systems, user pattern analyzers, interface optimization engines, and/or the like) that systematically evaluate generated events and user contexts to determine the most appropriate interface module and presentation strategy for maximizing user engagement, information consumption effectiveness, and workflow integration while minimizing disruption and cognitive overload that can reduce user productivity and satisfaction. The adaptive selection logic 950 can implement urgency classification processes that analyze criticality scores generated for preliminary session events to categorize notifications into distinct urgency levels including critical/urgent classifications for events with criticality scores exceeding critical thresholds that require immediate workflow interruption through the overlay interface module 938, high relevance classifications for events with scores indicating important but non-urgent information that can be delivered through embedded interface presentations via the embedded interface module 932, and background classifications for lower-priority events that can be queued for periodic delivery through the notification interface module 940 or made available through the whisper interface module 936 for user-initiated access. The adaptive selection logic 950 can execute relevance evaluation algorithms that assess how closely generated events align with current user activities, environmental conditions, and stated objectives, implementing multi-dimensional relevance scoring that considers semantic similarity between predicted needs and current contexts, temporal proximity to user activities, and historical patterns of user engagement with similar information types to determine optimal presentation strategies and interface selection for maximum user value and engagement. The adaptive selection logic 950 can also include user exploration pattern analysis capabilities that monitor historical user interaction behaviors to identify preferences for different interface types and information consumption patterns, implementing adaptive learning algorithms that adjust interface selection based on observed user responses to different presentation approaches and delivery mechanisms to continuously optimize user experience and system effectiveness. For example, the adaptive selection logic 950 can process interface routing decisions for a financial analysis scenario by implementing urgency classification that evaluates a budget variance alert with a criticality score of 0.91 and categorizes it as critical/urgent, automatically routing the alert to the overlay interface module 938 for immediate modal overlay presentation that interrupts current user activities to ensure immediate awareness of budget issues requiring urgent attention, while executing relevance evaluation that analyzes a competitor analysis insight with a criticality score of 0.76 and high semantic similarity to current strategic planning activities, routing this insight to the embedded interface module 932 for contextual tooltip presentation within strategic planning applications that provides immediate access to competitive intelligence without disrupting primary workflow activities, and applying user exploration pattern analysis that recognizes the user's historical preference for detailed analytical exploration and routes comprehensive market trend analysis with medium relevance scores to the dialogue interface module 934 for conversational exploration that enables natural language interaction with complex analytical insights, while implementing adaptive learning that monitors user responses to different interface presentations and adjusts future routing decisions based on observed engagement patterns, click-through rates, and user feedback to continuously optimize interface selection for enhanced user satisfaction and information consumption effectiveness.

FIGS. 10A-10F are block diagrams that illustrate a causal evaluation system and its components in accordance with some implementations of the present technology. The causal evaluation system 1000 can provide comprehensive consequence analysis capabilities that enable the event coordination system 100 to evaluate potential outcomes and downstream effects of predicted session events and user actions within runtime sessions. The causal evaluation system 1000 can include causal analysis implementations (e.g., causal inference engines, consequence evaluation frameworks, impact assessment systems, decision support platforms, and/or the like) that systematically analyze predicted events 194 generated by the event prediction module 124 to determine potential consequences, cascading effects, and decision implications across multiple dimensions of user activities and organizational operations. The causal evaluation system 1000 can implement comprehensive evaluation workflows that process predicted session events through sophisticated causal reasoning models, multi-dimensional impact analysis, cascading effect propagation, uncertainty quantification, and explanation generation to provide users with complete understanding of potential consequences before making decisions or taking actions. The causal evaluation system 1000 can execute continuous learning mechanisms that monitor actual outcomes and user feedback to refine causal models and improve prediction accuracy over time. For example, the causal evaluation system 1000 can analyze a predicted session event involving project timeline modifications by implementing causal analysis workflows that evaluate how timeline changes can affect team workload distribution, stakeholder expectations, budget allocations, and deliverable quality, generating comprehensive consequence assessments that enable users to make informed decisions about project management strategies based on complete understanding of potential impacts and trade-offs.

In some implementations, a predicted event 1010 can serve as the primary input that requires comprehensive consequence analysis within the causal evaluation system 1000 by providing structured information about anticipated user actions or environmental changes that can influence future conditions and outcomes. The predicted event 1010 can include event specification implementations (e.g., predicted action descriptors, environmental change indicators, decision point specifications, outcome probability assessments, and/or the like) that comprise detailed information about anticipated user behaviors, system changes, or external events that have been identified through predictive analysis processes performed by the event prediction module 124 and require evaluation of potential consequences and downstream effects. The predicted event 1010 can implement structured data formats that specify event characteristics including predicted environment states of user runtime sessions that cause execution of predicted session events, temporal parameters indicating when events are likely to occur, confidence assessments indicating the probability of event realization, and contextual metadata that provides background information about the conditions and factors that contribute to event prediction. The predicted event 1010 can execute validation processes that verify the completeness and accuracy of predicted event information before triggering consequence analysis workflows, implementing quality assurance mechanisms that ensure predicted events comprise sufficient detail for meaningful causal analysis and impact assessment. For example, the predicted event 1010 can comprise structured information about a predicted budget reallocation decision including a predicted environment state showing current budget constraints and resource demands, temporal parameters indicating the decision is likely within the next 48 hours based on approaching project deadlines, confidence assessment of 0.84 indicating high probability of realization, and contextual metadata describing the project conditions and stakeholder pressures that contribute to the predicted budget decision, enabling comprehensive consequence analysis that evaluates potential impacts across financial, operational, and strategic dimensions.

In some implementations, causal reasoning models 1020 can process predicted event inputs and generate sophisticated causal analysis through multiple reasoning approaches that identify cause-effect relationships and predict downstream consequences within the causal evaluation system 1000. The causal reasoning models 1020 can include causal inference implementations (e.g., causal graph processors, counterfactual analysis engines, simulation modeling systems, pattern matching frameworks, and/or the like) that apply diverse analytical approaches including historical pattern analysis that learns from past cause-effect examples, counterfactual reasoning that compares potential scenarios, simulation models that run forward projections of possible outcomes, causal graph analysis that maps explicit cause-effect relationships, and domain-specific rule application that incorporates expert knowledge about causal mechanisms within specific operational contexts. The causal reasoning models 1020 can implement pattern recognition algorithms that analyze historical data from the runtime session records 150 to identify recurring cause-effect sequences and behavioral patterns that inform predictions about how similar events can unfold in current contexts. The causal reasoning models 1020 can execute counterfactual analysis processes that evaluate alternative scenarios by comparing what can happen if predicted events occur versus what can happen if they do not occur, enabling assessment of intervention effects and decision consequences. The causal reasoning models 1020 can also include simulation capabilities that model forward progression of events through time to predict how initial changes can propagate through interconnected systems and influence multiple outcome dimensions. For example, the causal reasoning models 1020 can process a predicted project deadline extension by implementing historical pattern analysis that identifies similar past situations where deadline extensions led to specific consequences such as increased costs, stakeholder dissatisfaction, and resource reallocation challenges, while executing counterfactual reasoning that compares scenarios where the deadline extension is approved versus scenarios where alternative approaches such as scope reduction or resource augmentation are implemented, and applying simulation modeling that projects how deadline changes can affect dependent project activities, team schedules, and client deliverable timelines over the following months.

In some implementations, an impact analysis module 1030 can perform multi-dimensional consequence evaluation across multiple factors that collectively determine the comprehensive effects of predicted events within the causal evaluation system 1000. The impact analysis module 1030 can include multi-dimensional assessment implementations (e.g., business metrics analyzers, project timeline evaluators, team dynamics assessors, customer relationship analyzers, and/or the like) that systematically evaluate predicted event consequences across diverse impact dimensions including business performance metrics such as revenue, costs, profitability, and market positioning, project management factors such as timeline adherence, resource utilization, and deliverable quality, organizational dynamics such as team workload distribution, collaboration effectiveness, and employee satisfaction, customer relationship impacts such as satisfaction levels, retention rates, and service quality perceptions, and strategic alignment considerations such as goal achievement, priority alignment, and long-term organizational objectives. The impact analysis module 1030 can implement business metrics evaluation processes that analyze how predicted events can influence financial performance, operational efficiency, and competitive positioning through quantitative modeling and trend analysis. The impact analysis module 1030 can execute project timeline assessment algorithms that evaluate how predicted changes can affect project schedules, milestone achievement, and deliverable completion across interconnected project activities and dependencies. The impact analysis module 1030 can also include team dynamics analysis capabilities that assess how predicted events can influence workload distribution, collaboration patterns, and team performance based on historical patterns and organizational behavior models. For example, the impact analysis module 1030 can evaluate a predicted resource reallocation decision by implementing business metrics analysis that calculates potential cost implications of moving personnel between projects, including salary costs, training expenses, and productivity impacts during transition periods, while executing project timeline assessment that evaluates how resource changes can affect project completion dates, milestone achievements, and client deliverable schedules across multiple concurrent projects, and applying team dynamics analysis that assesses how personnel reassignments can influence team cohesion, knowledge transfer requirements, and collaboration effectiveness based on historical team performance data and organizational behavior patterns.

In some implementations, a cascading propagation module 1040 can trace cascading effects and analyze how initial predicted events can propagate through multiple levels of organizational and operational systems within the causal evaluation system 1000. The cascading propagation module 1040 can include effect propagation implementations (e.g., cascade modeling engines, dependency tracking systems, amplification analyzers, feedback loop detectors, and/or the like) that systematically trace how initial changes can influence subsequent conditions through direct effects that represent immediate first-order consequences, secondary effects that result from direct effects, tertiary effects that emerge from secondary consequences, and higher-order effects that continue propagating through interconnected systems and relationships. The cascading propagation module 1040 can implement direct effect analysis processes that identify immediate consequences of predicted events based on established causal relationships and dependency structures maintained within the unified state structures 151. The cascading propagation module 1040 can execute secondary effect evaluation algorithms that analyze how direct effects can trigger additional changes and consequences through interconnected systems, processes, and relationships that extend beyond immediate impact areas. The cascading propagation module 1040 can also include feedback loop detection capabilities that identify self-reinforcing or self-limiting cycles where consequences can influence the original conditions or create amplification effects where small initial changes can produce disproportionately large outcomes through cascade mechanisms. For example, the cascading propagation module 1040 can analyze a predicted price reduction decision by implementing direct effect analysis that identifies immediate consequences such as reduced profit margins and increased sales volume, then executing secondary effect evaluation that traces how increased sales can lead to higher production demands, supply chain pressures, and customer service workload increases, followed by tertiary effect analysis that evaluates how production increases can affect supplier relationships, inventory management, and quality control processes, while applying feedback loop detection that identifies how increased market share from price reductions can strengthen competitive positioning and enable future pricing flexibility, creating positive reinforcement cycles that amplify the strategic benefits of the initial price reduction decision.

In some implementations, an uncertainty quantification module 1050 can quantify prediction uncertainty and provide comprehensive assessment of confidence levels and reliability estimates for causal analysis results within the causal evaluation system 1000. The uncertainty quantification module 1050 can include uncertainty assessment implementations (e.g., confidence interval calculators, probability distribution generators, scenario analysis engines, sensitivity analyzers, and/or the like) that systematically evaluate the reliability and accuracy of causal predictions through confidence interval estimation that provides range estimates for quantitative predictions, probability distribution analysis that characterizes the likelihood of different outcomes, scenario analysis that evaluates best-case, expected-case, and worst-case projections, sensitivity analysis that assesses how predictions vary with different assumptions and parameter values, and model uncertainty evaluation that quantifies confidence in the causal models themselves. The uncertainty quantification module 1050 can implement confidence interval calculation processes that generate statistical ranges around predicted outcomes based on historical accuracy data and model performance metrics stored within the model ensembles 152. The uncertainty quantification module 1050 can execute probability distribution analysis algorithms that characterize the full range of possible outcomes and their associated likelihoods based on Monte Carlo simulation and statistical modeling techniques. The uncertainty quantification module 1050 can also include scenario analysis capabilities that evaluate multiple potential futures including optimistic scenarios that assume favorable conditions, pessimistic scenarios that consider adverse circumstances, and most likely scenarios based on expected conditions and historical patterns. For example, the uncertainty quantification module 1050 can process uncertainty assessment for a predicted market expansion decision by implementing confidence interval calculation that generates revenue impact estimates ranging from $1.2M to $2.8M with 90% confidence based on historical market expansion data and current market conditions, while executing probability distribution analysis that characterizes the likelihood of different revenue outcomes with peak probability around $2.0M and tail risks extending to both higher and lower performance levels, and applying scenario analysis that evaluates best-case scenarios assuming optimal market conditions and competitive responses generating $3.2M revenue, expected-case scenarios with typical market dynamics producing $2.1M revenue, and worst-case scenarios considering adverse market conditions and competitive pressures resulting in $0.8M revenue, enabling comprehensive uncertainty assessment that supports informed decision-making about market expansion strategies.

In some implementations, an explanation generation module 1060 can produce clear, actionable explanations tailored to user requirements that synthesize causal analysis results into comprehensible narratives and decision support materials within the causal evaluation system 1000. The explanation generation module 1060 can include explanation synthesis implementations (e.g., natural language generators, structured report builders, visual representation creators, comparative analysis engines, and/or the like) that create comprehensive explanations through natural language generation that produces plain language descriptions accessible to non-technical users, structured formatting that organizes information by impact dimensions and time horizons, visual representations that include charts, graphs, and diagrams illustrating causal relationships and consequence flows, comparative analysis that presents side-by-side evaluations of alternative scenarios and decision options, and actionable recommendations that provide specific guidance for responding to predicted consequences and optimizing outcomes. The explanation generation module 1060 can implement natural language processing algorithms that coordinate with the generation model 636 within the model ensemble system 600 to create coherent explanations that translate complex causal analysis into understandable narratives. The explanation generation module 1060 can execute structured formatting processes that organize explanation content according to user roles, decision contexts, and information consumption preferences to optimize comprehension and decision-making effectiveness. The explanation generation module 1060 can also include visual representation capabilities that coordinate with the display 140 to create interactive charts, causal diagrams, and impact visualizations that enhance user understanding of complex consequence relationships and decision trade-offs. For example, the explanation generation module 1060 can process explanation generation for a predicted staffing change decision by implementing natural language generation that creates explanations such as "Reassigning three developers from Project Alpha to Project Beta can accelerate Beta completion by 2 weeks but can delay Alpha delivery by 4 weeks, affecting client satisfaction and revenue recognition timing," while executing structured formatting that organizes consequences by business impact categories including financial effects, timeline implications, and stakeholder relationships, and applying visual representation creation that generates interactive timeline charts showing how staffing changes affect project completion dates, resource utilization graphs illustrating team workload distribution, and risk assessment matrices highlighting potential issues and mitigation strategies, enabling comprehensive explanation delivery that supports informed decision-making about staffing optimization strategies.

In some implementations, a notification module 1070 can provide proactive insights with consequence understanding that deliver causal analysis results to users through appropriate interface mechanisms and timing strategies within the causal evaluation system 1000. The notification module 1070 can include insight delivery implementations (e.g., proactive alert systems, consequence summary generators, decision support notifiers, timing optimization engines, and/or the like) that coordinate with the interface module 127 to deliver causal analysis results through embedded interface presentations, conversational interactions, dedicated dashboard displays, and multi-channel notifications that ensure users receive comprehensive consequence understanding before making decisions or taking actions that can have significant organizational or operational impacts. The notification module 1070 can implement proactive insight delivery processes that analyze the criticality and time-sensitivity of causal analysis results to determine optimal delivery timing and presentation methods based on user context and decision urgency. The notification module 1070 can execute consequence summary generation algorithms that create concise yet comprehensive summaries of causal analysis results that highlight key consequences, uncertainty assessments, and recommended actions in formats optimized for rapid comprehension and decision-making. The notification module 1070 can also include decision support coordination capabilities that ensure causal analysis insights are delivered at optimal moments when users are considering related decisions or actions, leveraging activation criterions that correspond to runtime parameters of target environment states that immediately precede predicted environment states. For example, the notification module 1070 can process proactive insight delivery for a predicted budget approval decision by implementing consequence summary generation that creates notifications such as "Budget approval for Project Gamma can accelerate delivery by 3 weeks and improve client satisfaction but can reduce Q1 profit margins by 8% and require resource reallocation from two other projects," while executing timing optimization that delivers consequence insights when the user accesses budget planning applications or reviews project financial data, indicating the target environment state that immediately precedes the predicted budget decision environment state, and coordinating with the embedded interface module 932 to present consequence summaries through contextual tooltips and sidebar panels that provide immediate access to detailed causal analysis without disrupting primary budget planning workflows.

In some implementations, a data observation module 1080 can track actual business results, user feedback, and model performance metrics to provide comprehensive monitoring of real-world outcomes and system effectiveness within the causal evaluation system 1000. The data observation module 1080 can include outcome monitoring implementations (e.g., business results trackers, user feedback collectors, performance metric analyzers, accuracy assessors, and/or the like) that systematically monitor actual business outcomes compared to causal predictions, user responses to consequence explanations and recommendations, model performance metrics including prediction accuracy and explanation quality, and system effectiveness indicators that measure how well causal analysis supports user decision-making and organizational performance improvement. The data observation module 1080 can implement business results tracking processes that monitor key performance indicators and organizational metrics to compare actual outcomes with predicted consequences generated by the causal reasoning models 1020. The data observation module 1080 can execute user feedback collection mechanisms that capture user responses to causal analysis insights including usefulness ratings, decision influence assessments, and satisfaction levels with explanation quality and timing. The data observation module 1080 can also include performance metric analysis capabilities that evaluate the accuracy of causal predictions, the effectiveness of uncertainty quantification, and the quality of generated explanations based on user interactions and outcome validation. For example, the data observation module 1080 can process comprehensive outcome monitoring for a project resource reallocation decision by implementing business results tracking that monitors actual project completion dates, budget utilization, and client satisfaction scores compared to predicted consequences, recording that predicted 2-week timeline acceleration was achieved but predicted cost increases were 15% higher than actual results, while executing user feedback collection that captures project manager ratings indicating 4.2/5.0 satisfaction with consequence explanation quality and 3.8/5.0 usefulness for decision-making, and applying performance metric analysis that calculates causal prediction accuracy of 87% for timeline impacts and 73% for cost implications, enabling comprehensive assessment of causal analysis effectiveness and identification of improvement opportunities.

In some implementations, a model training module 1090 can perform outcome tracking, prediction evaluation, model refinement, pattern discovery, domain adaptation, and error analysis to create an iterative learning loop that continuously improves causal analysis capabilities within the causal evaluation system 1000. The model training module 1090 can include continuous learning implementations (e.g., outcome tracking systems, prediction evaluators, model refinement engines, pattern discovery algorithms, and/or the like) that systematically analyze data collected by the data observation module 1080 to identify prediction accuracy patterns, model performance trends, and improvement opportunities that inform model updates and parameter adjustments within the causal reasoning models 1020. The model training module 1090 can implement outcome tracking processes that maintain comprehensive records of predicted consequences and actual results to enable systematic evaluation of causal model performance across different decision types, organizational contexts, and temporal periods. The model training module 1090 can execute prediction evaluation algorithms that compare predicted outcomes with observed results to calculate accuracy metrics, identify systematic biases, and assess the reliability of uncertainty quantification across different types of causal analysis scenarios. The model training module 1090 can also include model refinement capabilities that adjust causal model parameters, update relationship weights, and incorporate new causal patterns based on observed outcomes and performance feedback to improve future prediction accuracy and explanation quality. For example, the model training module 1090 can process comprehensive model improvement for budget decision analysis by implementing outcome tracking that records 150 budget decisions over six months with associated predicted and actual consequences, enabling prediction evaluation that identifies 82% accuracy for cost predictions but only 67% accuracy for timeline impacts, leading to model refinement that adjusts temporal relationship weights within the causal reasoning models 1020 and incorporates new patterns discovered through analysis of timeline prediction errors, while executing domain adaptation that customizes causal models for specific project types and organizational contexts based on observed performance variations, creating an iterative learning loop where improved causal models generate more accurate predictions that enhance user decision-making effectiveness and organizational performance optimization.

In some implementations, the causal reasoning models 1020 can provide comprehensive causal analysis capabilities through multiple specialized modeling approaches that enable sophisticated understanding of cause-effect relationships within the causal evaluation system 1000. The causal reasoning models 1020 can include diverse analytical implementations (e.g., pattern analysis engines, counterfactual processors, simulation frameworks, graph modeling systems, and/or the like) that systematically analyze predicted events 1010 through different causal reasoning methodologies to generate comprehensive consequence assessments and impact predictions. The causal reasoning models 1020 can implement multi-modal causal analysis processes that combine insights from historical pattern recognition, hypothetical scenario evaluation, forward simulation modeling, explicit relationship mapping, and domain-specific knowledge application to create robust causal understanding that supports informed decision-making. The causal reasoning models 1020 can coordinate with the model ensembles 152 to access specialized analytical models and with the unified state structures 151 to retrieve comprehensive contextual information that informs causal analysis processes.

In some implementations, historical pattern models 1021 can analyze past cause-effect examples to identify recurring causal relationships and behavioral patterns that inform predictions about how similar events can unfold in current contexts within the causal reasoning models 1020. The historical pattern models 1021 can include pattern analysis implementations (e.g., sequence mining algorithms, causal pattern detectors, temporal correlation analyzers, similarity matching systems, and/or the like) that process historical data from the runtime session records 150 to identify consistent patterns in cause-effect sequences, behavioral tendencies, and outcome relationships that can be applied to current predictive scenarios. The historical pattern models 1021 can implement past cause-effect analysis algorithms that examine historical records to identify situations where specific actions or conditions led to particular consequences, creating causal pattern libraries that document recurring cause-effect relationships across different organizational contexts and decision scenarios. The historical pattern models 1021 can execute pattern recognition machine learning processes that apply statistical learning algorithms and neural network models to identify complex patterns in historical cause-effect data that can not be easily detected through rule-based analysis approaches. For example, the historical pattern models 1021 can analyze historical project management data by implementing sequence mining algorithms that identify patterns such as "budget increases of 15% or more in Q3 typically lead to timeline extensions averaging 3.2 weeks and stakeholder satisfaction decreases of 0.4 points," while executing pattern recognition machine learning that applies recurrent neural networks to identify complex temporal dependencies showing how combinations of resource constraints, timeline pressures, and stakeholder communications interact to influence project outcomes, enabling the causal reasoning models 1020 to predict that a current budget increase scenario can lead to similar timeline and satisfaction consequences based on established historical patterns.

In some implementations, the historical pattern models 1021 can implement temporal sequence analysis capabilities that examine the chronological ordering and timing relationships between causes and effects to understand how causal relationships unfold over time. The historical pattern models 1021 can execute temporal sequence processing algorithms that analyze time-series data to identify lag periods between causal events and their consequences, enabling prediction of when effects can manifest following specific causal triggers. The historical pattern models 1021 can include sequence pattern mining mechanisms that identify common temporal progressions in cause-effect chains, documenting how initial events typically lead to intermediate consequences that subsequently trigger additional effects through predictable temporal sequences. The historical pattern models 1021 can also implement timing correlation analysis processes that quantify the temporal relationships between different types of causal events and their associated outcomes across various organizational and operational contexts. For example, the historical pattern models 1021 can process customer service scenarios by implementing temporal sequence analysis that identifies patterns showing customer complaints typically escalate to management review within 48 hours when initial response times exceed 4 hours, while sequence pattern mining reveals that service quality issues follow predictable progressions from initial customer dissatisfaction through complaint escalation to potential contract cancellation over 2-3 week periods, enabling the causal reasoning models 1020 to predict temporal consequences and optimal intervention timing for current customer service situations.

In some implementations, the historical pattern models 1021 can execute analogical reasoning processes that identify similarities between current situations and historical precedents to predict likely outcomes based on analogous past experiences. The historical pattern models 1021 can implement analogical matching algorithms that compare current contextual conditions with historical scenarios to identify the most relevant precedents for causal analysis and outcome prediction. The historical pattern models 1021 can include similarity assessment mechanisms that evaluate multiple dimensions of similarity including contextual conditions, stakeholder characteristics, resource availability, and environmental factors to identify historical situations that provide the most relevant analogical guidance for current decision-making scenarios. The historical pattern models 1021 can also execute analogical transfer processes that adapt insights from historical precedents to current contexts while accounting for differences in conditions and circumstances that can influence outcome predictions. For example, the historical pattern models 1021 can analyze a current market expansion decision by implementing analogical matching algorithms that identify three historical market expansion scenarios with similar market conditions, competitive landscapes, and resource availability, while executing similarity assessment that evaluates contextual factors such as economic conditions, regulatory environment, and organizational capabilities to determine that the 2019 European expansion provides the most relevant analogical precedent, enabling analogical transfer processes that adapt insights from the 2019 expansion experience to predict that current market expansion can achieve 18% revenue growth within 12 months but can require 25% higher marketing investment than initially projected based on analogical reasoning from the historical precedent.

In some implementations, counterfactual reasoning models 1022 can perform hypothetical scenario comparison to evaluate what can happen under different conditions and decision alternatives within the causal reasoning models 1020. The counterfactual reasoning models 1022 can include scenario analysis implementations (e.g., hypothetical scenario generators, comparative analysis engines, alternative outcome predictors, intervention effect assessors, and/or the like) that systematically evaluate alternative scenarios by comparing predicted outcomes under different conditions, decisions, or interventions to understand the causal impact of specific factors and choices. The counterfactual reasoning models 1022 can implement hypothetical scenario generation algorithms that create alternative versions of current situations where specific variables or decisions are modified to enable comparison of different possible outcomes and their associated consequences. The counterfactual reasoning models 1022 can execute comparative analysis processes that systematically evaluate differences between baseline scenarios and alternative scenarios to isolate the causal effects of specific interventions or changes. For example, the counterfactual reasoning models 1022 can analyze a predicted staffing decision by implementing hypothetical scenario generation that creates alternative scenarios including maintaining current staffing levels, increasing team size by 20%, reducing team size by 15%, and reallocating personnel between projects, while executing comparative analysis that evaluates how each staffing alternative can affect project completion times, budget utilization, team productivity, and stakeholder satisfaction, enabling the causal reasoning models 1020 to predict that increasing team size by 20% can accelerate project completion by 4 weeks compared to baseline scenarios but can increase costs by 18% and require additional management overhead.

In some implementations, the counterfactual reasoning models 1022 can execute baseline versus intervention analysis processes that compare current trajectory predictions with outcomes that can result from specific interventions or policy changes. The counterfactual reasoning models 1022 can implement baseline scenario modeling algorithms that project how current conditions and trends can evolve without additional interventions or changes to existing approaches and strategies. The counterfactual reasoning models 1022 can include intervention scenario generation mechanisms that model how specific actions, policy changes, or strategic interventions can alter predicted outcomes compared to baseline trajectories. The counterfactual reasoning models 1022 can also execute intervention effect quantification processes that calculate the specific impact of proposed interventions by comparing intervention scenarios with baseline projections to isolate the causal effects of proposed actions. For example, the counterfactual reasoning models 1022 can evaluate a proposed customer service improvement initiative by implementing baseline scenario modeling that projects current customer satisfaction trends showing gradual decline from 3.8 to 3.6 over six months without intervention, while intervention scenario generation models how implementing automated response systems and additional training can alter satisfaction trajectories, enabling intervention effect quantification that predicts the customer service initiative can improve satisfaction scores to 4.2 within four months compared to baseline decline, representing a net improvement of 0.6 points attributable to the intervention.

In some implementations, the counterfactual reasoning models 1022 can implement structural causal model analysis that uses formal mathematical frameworks to represent causal relationships and enable rigorous counterfactual reasoning about alternative scenarios. The counterfactual reasoning models 1022 can execute structural equation modeling processes that represent causal relationships through mathematical equations that specify how different variables influence each other within complex systems. The counterfactual reasoning models 1022 can include causal diagram construction mechanisms that create graphical representations of causal relationships using directed acyclic graphs that show how variables influence each other through causal pathways. The counterfactual reasoning models 1022 can also implement counterfactual query processing capabilities that use structural causal models to answer specific questions about what can happen under alternative conditions or interventions. For example, the counterfactual reasoning models 1022 can analyze budget allocation decisions by implementing structural equation modeling that represents relationships between budget allocations, resource availability, project timelines, and outcome quality through mathematical equations such as "Timeline=BaseTime−(0.3×BudgetIncrease)+(0.2×ResourceConstraints)," while causal diagram construction creates graphical models showing how budget decisions influence resource allocation, which affects timeline performance, which impacts stakeholder satisfaction, enabling counterfactual query processing that answers questions such as "What can project timeline be if budget increases by 20% instead of current 10% allocation?" through mathematical calculation using the structural causal model framework.

In some implementations, the counterfactual reasoning models 1022 can execute attribution analysis processes that determine which specific factors or decisions contribute most significantly to predicted outcomes and consequences. The counterfactual reasoning models 1022 can implement causal attribution algorithms that quantify the relative contribution of different causal factors to overall outcome predictions through systematic comparison of scenarios where individual factors are modified. The counterfactual reasoning models 1022 can include factor importance ranking mechanisms that order causal factors according to their influence on predicted outcomes, enabling identification of the most critical decision points and intervention opportunities. The counterfactual reasoning models 1022 can also execute sensitivity analysis processes that evaluate how changes in specific causal factors influence overall outcome predictions to understand which variables have the greatest impact on decision consequences. For example, the counterfactual reasoning models 1022 can perform attribution analysis for a predicted product launch outcome by implementing causal attribution algorithms that evaluate how marketing budget, development timeline, competitive response, and market conditions each contribute to predicted revenue outcomes, determining that marketing budget accounts for 35% of outcome variance, development timeline contributes 28%, competitive response influences 22%, and market conditions affect 15% of predicted results, while factor importance ranking identifies marketing budget as the most critical factor and sensitivity analysis reveals that 10% changes in marketing investment can alter revenue predictions by 12%, enabling the causal reasoning models 1020 to focus decision-making attention on the most influential causal factors.

In some implementations, simulation models 1023 can perform forward time simulation to model how current conditions and decisions can evolve through time to produce specific outcomes and consequences within the causal reasoning models 1020. The simulation models 1023 can include temporal modeling implementations (e.g., discrete event simulators, continuous time processors, stochastic simulation engines, deterministic progression models, and/or the like) that project how initial conditions and decisions can propagate through interconnected systems over specified time periods to generate comprehensive outcome predictions. The simulation models 1023 can implement forward time simulation algorithms that model the temporal evolution of complex systems by advancing simulation time in discrete steps and updating system states based on causal relationships and decision rules. The simulation models 1023 can execute dynamic system modeling processes that represent how different system components interact and influence each other over time through feedback loops, delays, and nonlinear relationships. For example, the simulation models 1023 can analyze a predicted organizational restructuring decision by implementing forward time simulation that models how restructuring can affect team productivity, communication patterns, and project outcomes over a 12-month period, advancing simulation time in weekly increments while updating variables such as team performance metrics, collaboration effectiveness scores, and project completion rates based on established relationships between organizational structure and operational performance, enabling the causal reasoning models 1020 to predict that restructuring can initially reduce productivity by 15% during the first 8 weeks but can improve overall efficiency by 22% after 6 months as teams adapt to new organizational arrangements.

In some implementations, the simulation models 1023 can execute Monte Carlo simulation methods that incorporate uncertainty and variability into forward time projections through probabilistic modeling approaches. The simulation models 1023 can implement Monte Carlo algorithms that run multiple simulation iterations with randomly sampled parameter values to generate probability distributions of possible outcomes rather than single-point predictions. The simulation models 1023 can include random variable generation mechanisms that sample parameter values from specified probability distributions to represent uncertainty in initial conditions, decision outcomes, and environmental factors that influence simulation results. The simulation models 1023 can also execute statistical aggregation processes that combine results from multiple Monte Carlo iterations to generate comprehensive outcome statistics including mean predictions, confidence intervals, and probability assessments for different outcome scenarios. For example, the simulation models 1023 can evaluate a predicted technology implementation project by implementing Monte Carlo algorithms that run 10,000 simulation iterations with randomly sampled values for implementation timeline (normal distribution, mean 6 months, standard deviation 1.2 months), cost overruns (lognormal distribution, mean 15%, standard deviation 8%), and user adoption rates (beta distribution, alpha 3.2, beta 1.8), while statistical aggregation processes combine iteration results to predict 68% probability of project completion within 5.2 to 6.8 months, 85% probability of cost overruns between 8% and 24%, and 90% confidence that user adoption can achieve 72% to 89% within first year, enabling the causal reasoning models 1020 to provide comprehensive uncertainty-aware predictions for technology implementation decisions.

In some implementations, the simulation models 1023 can implement agent-based modeling approaches that represent complex systems through interactions between autonomous agents that follow specified behavioral rules and decision-making processes. The simulation models 1023 can execute agent-based simulation algorithms that model individual entities such as employees, customers, or organizational units as autonomous agents with specific characteristics, goals, and behavioral patterns. The simulation models 1023 can include agent interaction mechanisms that define how different agents communicate, collaborate, compete, or influence each other within the simulated environment to generate emergent system-level behaviors and outcomes. The simulation models 1023 can also implement agent learning capabilities that enable simulated agents to adapt their behaviors based on experience and environmental feedback to create more realistic and dynamic simulation results. For example, the simulation models 1023 can analyze a predicted customer service policy change by implementing agent-based simulation that models individual customers as autonomous agents with varying satisfaction levels, complaint propensities, and loyalty characteristics, while customer service representatives are modeled as agents with different skill levels, workload capacities, and response strategies, enabling agent interaction mechanisms to simulate how policy changes affect customer-representative interactions, queue dynamics, and satisfaction outcomes, with agent learning capabilities allowing customer agents to adjust their expectations and service agents to improve their response strategies over time, providing the causal reasoning models 1020 with comprehensive predictions about how policy changes can influence customer service system performance through complex agent interactions.

In some implementations, the simulation models 1023 can execute scenario generation processes that create multiple alternative future scenarios to explore different possible outcomes and their associated probabilities. The simulation models 1023 can implement scenario construction algorithms that systematically vary key parameters and assumptions to generate diverse scenario sets that span the range of possible future conditions and outcomes. The simulation models 1023 can include scenario probability assessment mechanisms that evaluate the likelihood of different scenarios based on historical data, expert judgment, and statistical analysis of scenario parameters. The simulation models 1023 can also execute scenario comparison processes that analyze differences between scenarios to identify key factors that drive outcome variations and decision sensitivities. For example, the simulation models 1023 can evaluate a predicted market expansion strategy by implementing scenario construction algorithms that generate scenarios including optimistic market conditions with 25% annual growth and minimal competitive response, pessimistic scenarios with 5% market growth and aggressive competitive reactions, and moderate scenarios with 12% growth and typical competitive dynamics, while scenario probability assessment assigns 20% likelihood to optimistic scenarios, 30% to pessimistic scenarios, and 50% to moderate scenarios based on historical market analysis, enabling scenario comparison processes to identify that competitive response intensity is the primary factor driving outcome variations, with revenue predictions ranging from $2.8M in pessimistic scenarios to $4.6M in optimistic scenarios, providing the causal reasoning models 1020 with comprehensive scenario-based predictions for market expansion decision-making.

In some implementations, causal graph models 1024 can represent explicit cause-effect relationships through directed acyclic graph structures that map causal connections between variables and enable systematic causal analysis within the causal reasoning models 1020. The causal graph models 1024 can include graph construction implementations (e.g., directed graph builders, node relationship mappers, edge weight calculators, dependency analyzers, and/or the like) that create mathematical representations of causal relationships using graph theory principles where nodes represent variables or entities and directed edges represent causal influences between them. The causal graph models 1024 can implement directed acyclic graph construction algorithms that ensure causal graphs maintain proper mathematical structure without circular dependencies that can create logical inconsistencies in causal reasoning processes. The causal graph models 1024 can execute explicit cause-effect relationship mapping processes that identify and document direct causal connections between variables based on domain knowledge, statistical analysis, and empirical evidence from historical data. For example, the causal graph models 1024 can construct a project management causal graph by implementing directed acyclic graph algorithms that create nodes representing variables such as "Budget Allocation," "Team Size," "Timeline Pressure," "Quality Standards," and "Stakeholder Satisfaction," while explicit relationship mapping creates directed edges showing how "Budget Allocation" causally influences "Team Size," which affects "Timeline Pressure," which impacts "Quality Standards," which determines "Stakeholder Satisfaction," enabling the causal reasoning models 1020 to trace causal pathways and predict how budget decisions can propagate through the causal chain to ultimately affect stakeholder outcomes.

In some implementations, the causal graph models 1024 can implement node strength weighting systems that quantify the magnitude of causal influences between connected variables in the directed acyclic graph structure. The causal graph models 1024 can execute strength weight calculation algorithms that assign numerical values to causal relationships based on statistical analysis of historical data, expert assessments, and empirical evidence about causal effect magnitudes. The causal graph models 1024 can include weight calibration mechanisms that adjust causal strength values based on observed outcomes and prediction accuracy to improve the reliability of causal graph predictions over time. The causal graph models 1024 can also implement strength-based pathway analysis processes that calculate the cumulative causal influence along multi-step causal pathways by combining individual edge weights through mathematical operations. For example, the causal graph models 1024 can quantify causal relationships in a customer satisfaction scenario by implementing strength weight calculation that assigns values such as 0.7 for the causal influence from "Response Time" to "Customer Satisfaction," 0.5 for "Product Quality" to "Customer Satisfaction," and 0.3 for "Communication Clarity" to "Customer Satisfaction," while weight calibration mechanisms adjust these values based on observed customer feedback data, enabling strength-based pathway analysis to calculate that improving response time by one standard deviation can increase customer satisfaction by 0.7 units, while simultaneous improvements in response time and product quality can produce combined satisfaction increases of 1.2 units through additive causal effects.

In some implementations, the causal graph models 1024 can execute conditional dependency analysis processes that identify how causal relationships between variables depend on the values or states of other variables within the graph structure. The causal graph models 1024 can implement conditional relationship modeling algorithms that represent how causal influences can vary based on contextual conditions and moderating factors that affect the strength or direction of causal connections. The causal graph models 1024 can include dependency condition specification mechanisms that define the specific conditions under which different causal relationships apply, enabling context-sensitive causal reasoning that accounts for situational variations in causal effects. The causal graph models 1024 can also execute conditional inference processes that apply appropriate causal relationships based on current contextual conditions and variable states to generate accurate predictions for specific scenarios. For example, the causal graph models 1024 can model conditional dependencies in a sales performance scenario by implementing conditional relationship modeling that specifies how the causal influence from "Marketing Spend" to "Sales Revenue" depends on "Market Conditions," with strong positive influence (weight 0.8) during favorable market conditions, moderate influence (weight 0.4) during neutral conditions, and weak influence (weight 0.1) during adverse market conditions, while dependency condition specification defines market condition thresholds based on economic indicators and competitive activity levels, enabling conditional inference processes to predict that current marketing investments can generate different revenue outcomes depending on prevailing market conditions, providing the causal reasoning models 1020 with context-sensitive causal predictions that account for environmental moderating factors.

In some implementations, domain rule models 1025 can incorporate expert-encoded knowledge and specialized domain expertise into causal reasoning processes within the causal reasoning models 1020. The domain rule models 1025 can include knowledge encoding implementations (e.g., expert rule systems, domain knowledge bases, professional guideline processors, specialized constraint handlers, and/or the like) that capture and apply specialized knowledge from subject matter experts, industry professionals, and domain specialists to enhance causal analysis with expert insights and professional judgment. The domain rule models 1025 can implement expert-encoded knowledge processing algorithms that translate professional expertise and domain-specific insights into formal rules and constraints that guide causal reasoning and outcome prediction processes. The domain rule models 1025 can execute domain expertise integration processes that combine expert knowledge with data-driven analysis to create comprehensive causal understanding that leverages both empirical evidence and professional judgment. For example, the domain rule models 1025 can incorporate financial analysis expertise by implementing expert-encoded knowledge processing that captures rules such as "Debt-to-equity ratios exceeding 2.0 typically indicate increased financial risk that can affect credit ratings and borrowing costs," while domain expertise integration combines this expert knowledge with quantitative financial data analysis to predict that a proposed acquisition can increase debt-to-equity ratio to 2.3, triggering expert rules that predict potential credit rating downgrades and 1.5-2.0 percentage point increases in borrowing costs, enabling the causal reasoning models 1020 to incorporate professional financial expertise into acquisition decision analysis.

In some implementations, the domain rule models 1025 can implement industry best practices integration mechanisms that incorporate established professional standards and proven methodologies into causal analysis processes. The domain rule models 1025 can execute best practices encoding algorithms that capture industry-standard approaches, proven methodologies, and established professional practices as formal rules that guide causal reasoning and decision evaluation. The domain rule models 1025 can include practice validation mechanisms that verify the applicability and relevance of industry best practices to specific organizational contexts and decision scenarios. The domain rule models 1025 can also implement best practices adaptation processes that modify standard industry approaches based on organizational characteristics and contextual factors to ensure appropriate application of professional standards. For example, the domain rule models 1025 can incorporate project management best practices by implementing best practices encoding that captures rules such as "Projects with scope changes exceeding 20% typically require timeline extensions of 1.5-2.0 times the original schedule impact," while practice validation mechanisms verify that this rule applies to software development projects but can require modification for construction projects, enabling best practices adaptation processes to adjust the rule for construction contexts where scope changes typically require 2.5-3.0 times timeline extensions, providing the causal reasoning models 1020 with industry-appropriate guidance for project timeline predictions across different professional domains.

In some implementations, the domain rule models 1025 can execute regulatory constraint processing that incorporates legal requirements, compliance standards, and regulatory limitations into causal analysis and decision evaluation processes. The domain rule models 1025 can implement regulatory rule encoding algorithms that capture legal requirements, compliance standards, and regulatory constraints as formal rules that limit or guide possible actions and outcomes within causal reasoning processes. The domain rule models 1025 can include compliance validation mechanisms that verify whether predicted actions and outcomes satisfy applicable regulatory requirements and legal constraints. The domain rule models 1025 can also execute regulatory impact assessment processes that evaluate how regulatory constraints can affect decision outcomes and identify compliance-related consequences of different action alternatives. For example, the domain rule models 1025 can incorporate financial services regulations by implementing regulatory rule encoding that captures requirements such as "Customer data retention must comply with GDPR requirements limiting storage to 7 years maximum unless explicit consent is maintained," while compliance validation mechanisms verify that predicted data management decisions satisfy regulatory requirements, enabling regulatory impact assessment processes to predict that extending customer data retention beyond 7 years can require additional consent management processes and potential compliance costs of $50,000-75,000 annually, providing the causal reasoning models 1020 with regulatory-aware predictions for data management decision-making.

In some implementations, the domain rule models 1025 can implement physical laws and scientific principles integration that incorporates fundamental scientific constraints and natural laws into causal reasoning processes for scenarios involving physical systems and engineering applications. The domain rule models 1025 can execute physical constraint encoding algorithms that capture scientific principles, engineering limitations, and natural laws as formal rules that govern possible outcomes and system behaviors within causal analysis frameworks. The domain rule models 1025 can include scientific validation mechanisms that verify whether predicted outcomes comply with fundamental physical principles and engineering constraints. The domain rule models 1025 can also execute physical feasibility assessment processes that evaluate whether proposed actions and predicted consequences are physically possible and scientifically sound within applicable domains. For example, the domain rule models 1025 can incorporate thermodynamic principles by implementing physical constraint encoding that captures laws such as "Energy efficiency improvements are limited by Carnot efficiency constraints based on operating temperature differentials," while scientific validation mechanisms verify that predicted efficiency gains comply with thermodynamic limitations, enabling physical feasibility assessment processes to predict that a proposed manufacturing process optimization can achieve maximum efficiency improvements of 15% based on temperature constraints rather than the initially projected 25% improvement, providing the causal reasoning models 1020 with scientifically accurate predictions for engineering and manufacturing decision-making scenarios.

Figure 10A:
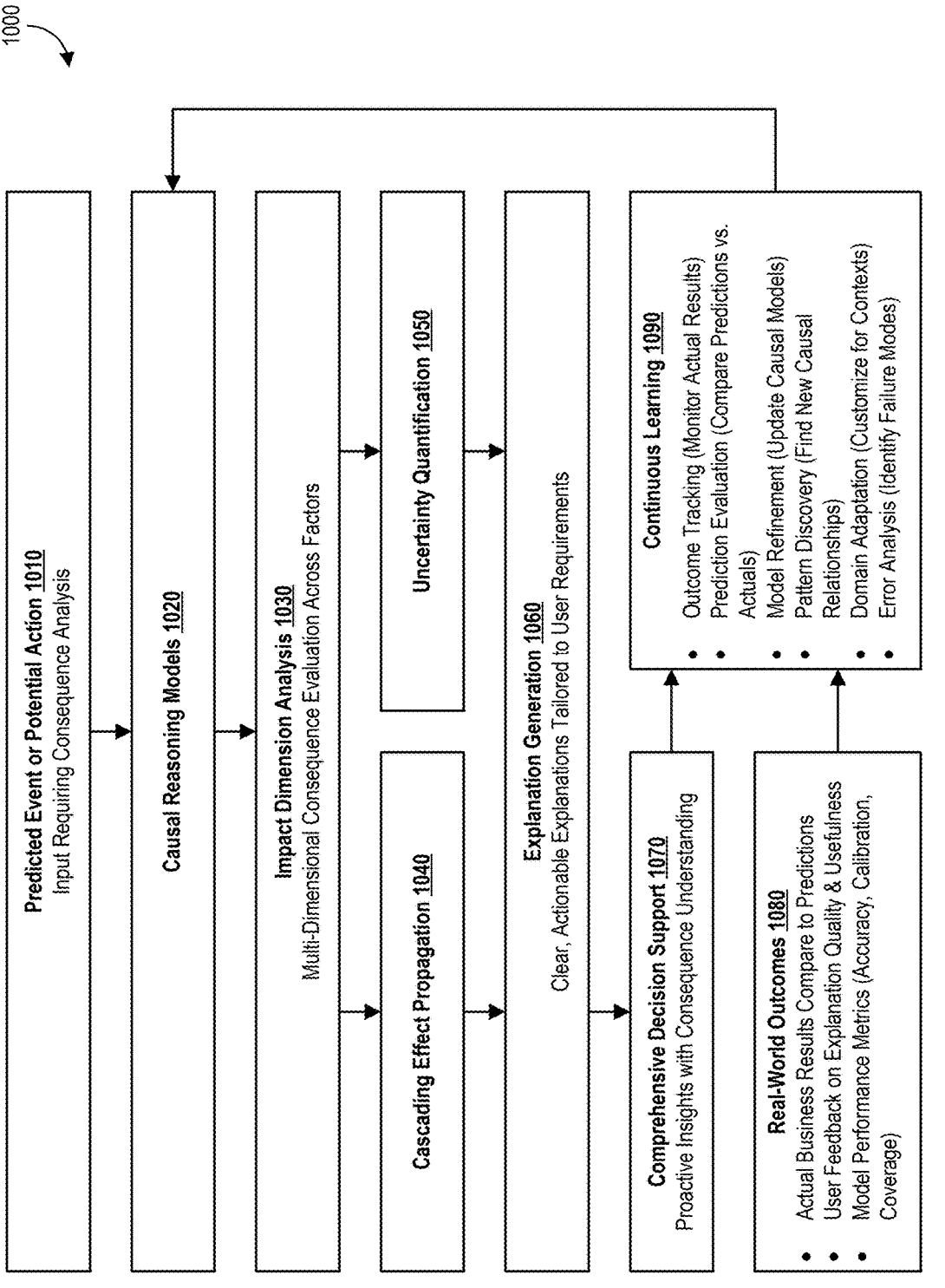
Figure 10C:
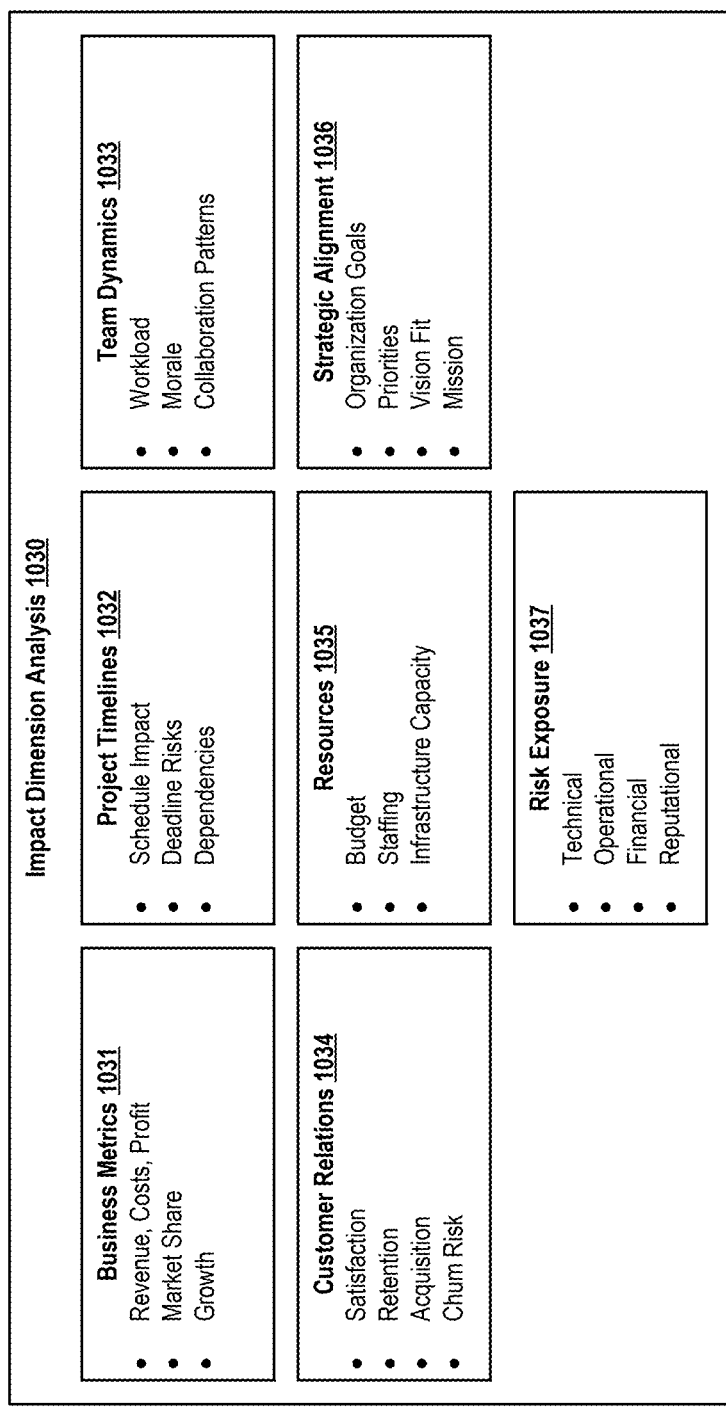
Figure 10D:
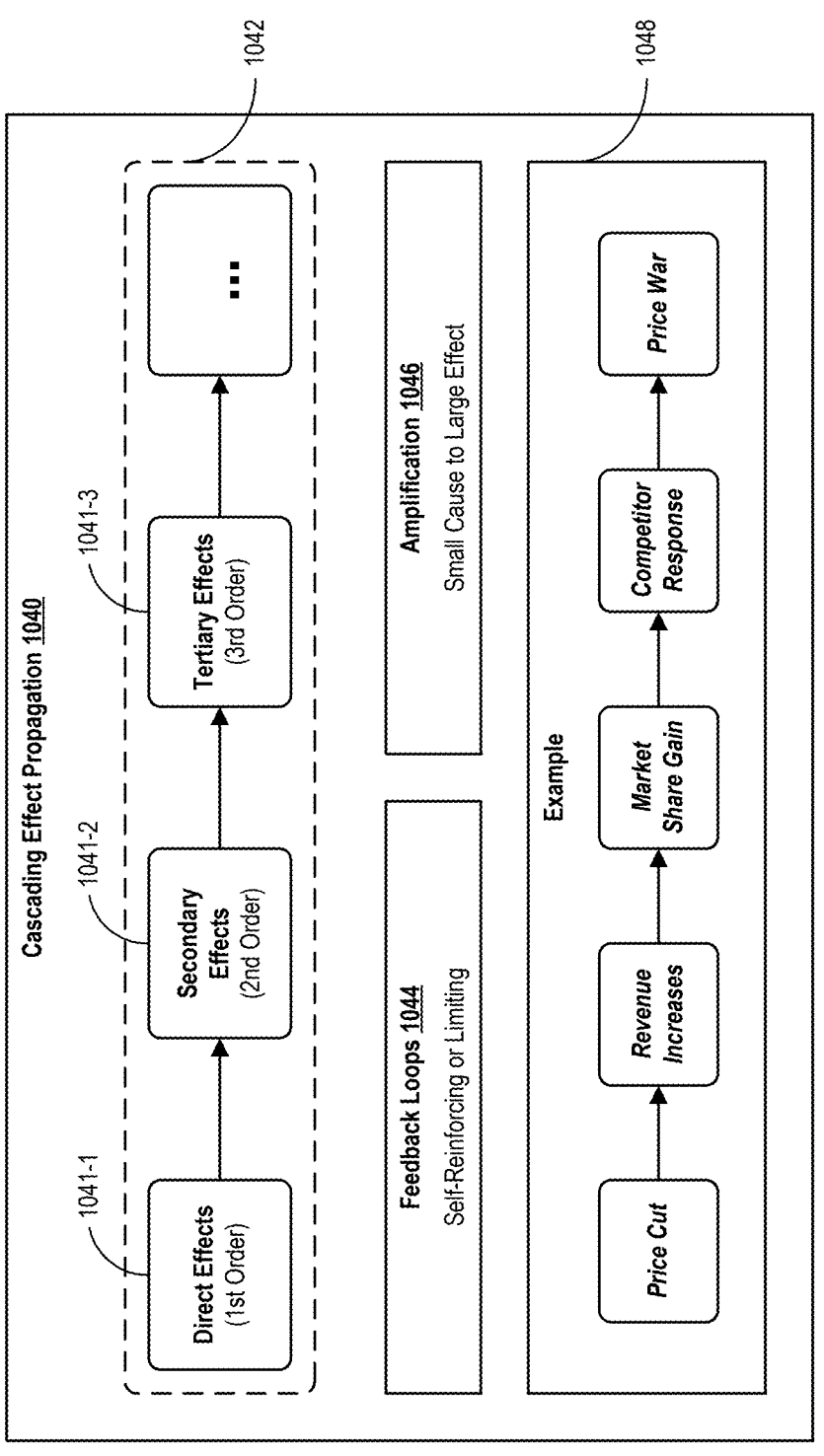

Referring to FIG. 10C, in some implementations, the impact analysis module 1030 can provide comprehensive multi-dimensional consequence evaluation that systematically analyzes predicted events across multiple operational and strategic dimensions within the causal evaluation system 1000. The impact analysis module 1030 can include dimensional assessment implementations (e.g., business performance analyzers, operational impact evaluators, strategic alignment assessors, risk evaluation engines, and/or the like) that coordinate multiple specialized analysis modules to generate holistic understanding of how predicted events can influence organizational performance, operational effectiveness, and strategic objectives. The impact analysis module 1030 can implement systematic evaluation processes that distribute consequence analysis across specialized modules including business metrics evaluation, project timeline assessment, team dynamics analysis, customer relationship impact evaluation, resource management assessment, strategic alignment verification, and risk exposure analysis to provide comprehensive decision support. The impact analysis module 1030 can execute integrated analysis coordination mechanisms that combine insights from multiple dimensional assessments to create unified consequence evaluations that support informed decision-making about predicted events and their potential organizational impacts. For example, the impact analysis module 1030 can process a predicted organizational restructuring decision by implementing dimensional assessment that coordinates business metrics analysis showing potential cost savings of 12-18%, project timeline evaluation indicating 3-4 week delays during transition periods, team dynamics assessment predicting temporary productivity decreases of 15-20%, and strategic alignment verification confirming restructuring supports long-term efficiency objectives, enabling comprehensive consequence evaluation that supports informed decision-making about organizational change initiatives.

In some implementations, a business metrics module 1031 can analyze revenue impacts, cost implications, profit effects, market share changes, and growth factor influences to provide comprehensive financial and business performance assessment within the impact analysis module 1030. The business metrics module 1031 can include financial analysis implementations (e.g., revenue projection engines, cost analysis systems, profitability calculators, market impact assessors, and/or the like) that systematically evaluate how predicted events can influence key business performance indicators including revenue generation, operational costs, profit margins, competitive positioning, and growth trajectory metrics. The business metrics module 1031 can implement revenue analysis algorithms that project how predicted events can affect sales performance, customer acquisition, pricing strategies, and market penetration rates based on historical revenue patterns and market condition analysis. The business metrics module 1031 can execute cost impact evaluation processes that assess how predicted events can influence operational expenses, resource utilization costs, infrastructure investments, and efficiency improvements through detailed cost modeling and expense projection algorithms. For example, the business metrics module 1031 can analyze a predicted product launch decision by implementing revenue analysis that projects potential sales increases of $2.3M to $3.7M based on market research and competitive analysis, while executing cost impact evaluation that calculates launch expenses including $800K marketing investment, $450K production setup costs, and $200K distribution infrastructure, enabling comprehensive financial assessment that predicts net profit contribution of $850K to $2.25M within the first year of product launch.

In some implementations, the business metrics module 1031 can execute profit margin analysis processes that evaluate how predicted events can affect organizational profitability through changes in revenue generation and cost structures. The business metrics module 1031 can implement profitability modeling algorithms that calculate gross margins, operating margins, and net profit impacts based on predicted changes to revenue streams and expense categories. The business metrics module 1031 can include margin sensitivity analysis capabilities that assess how different scenarios and outcome variations can influence profit margins under various market conditions and operational circumstances. The business metrics module 1031 can also execute profitability optimization recommendations that identify opportunities to enhance profit margins through strategic adjustments to predicted event implementation approaches. For example, the business metrics module 1031 can process a predicted pricing strategy modification by implementing profitability modeling that calculates how 8% price increases can improve gross margins from 34% to 41% while potentially reducing sales volume by 12%, enabling margin sensitivity analysis that evaluates profitability outcomes under different demand elasticity scenarios and generates optimization recommendations suggesting selective price increases for premium product segments to maximize overall profit contribution while minimizing volume impact on core market segments.

In some implementations, the business metrics module 1031 can implement market share impact assessment mechanisms that evaluate how predicted events can influence competitive positioning and market presence within relevant industry segments. The business metrics module 1031 can execute competitive analysis algorithms that assess how predicted actions can affect market share relative to competitors through market response modeling and competitive reaction prediction. The business metrics module 1031 can include market positioning evaluation capabilities that analyze how predicted events can influence brand perception, customer preference, and competitive differentiation within target market segments. The business metrics module 1031 can also implement market opportunity assessment processes that identify potential market share gains or losses resulting from predicted event implementation and competitive market dynamics. For example, the business metrics module 1031 can analyze a predicted technology upgrade initiative by implementing competitive analysis that evaluates how advanced capabilities can improve market positioning relative to three primary competitors, while market positioning evaluation predicts potential market share increases of 2.3% to 4.1% based on enhanced product differentiation and customer value proposition improvements, enabling market opportunity assessment that identifies specific customer segments where technology advantages can generate maximum competitive benefit and market share growth potential.

In some implementations, the business metrics module 1031 can execute growth factor analysis processes that evaluate how predicted events can influence long-term business expansion and development opportunities across multiple growth dimensions. The business metrics module 1031 can implement growth trajectory modeling algorithms that project how predicted events can affect customer base expansion, market penetration rates, product portfolio development, and geographic expansion opportunities. The business metrics module 1031 can include growth sustainability assessment capabilities that evaluate whether predicted growth impacts can be maintained over extended time periods and identify potential constraints or limitations that can affect long-term growth sustainability. The business metrics module 1031 can also execute growth investment analysis processes that assess resource requirements and investment needs to support predicted growth opportunities and achieve projected expansion objectives. For example, the business metrics module 1031 can process a predicted market expansion strategy by implementing growth trajectory modeling that projects customer base growth from 12,000 to 18,500 customers within 18 months based on market penetration analysis and customer acquisition projections, while growth sustainability assessment evaluates infrastructure capacity, staffing requirements, and operational scalability needed to support projected growth levels, enabling growth investment analysis that identifies $1.2M infrastructure investment and 15 additional personnel needed to achieve sustainable growth targets while maintaining service quality standards.

In some implementations, a project timeline module 1032 can evaluate schedule impacts, deadline risks, and dependency relationships to provide comprehensive project management consequence assessment within the impact analysis module 1030. The project timeline module 1032 can include schedule analysis implementations (e.g., timeline projection engines, deadline risk assessors, dependency analyzers, resource scheduling systems, and/or the like) that systematically evaluate how predicted events can influence project schedules, milestone achievement, deliverable completion, and overall project success metrics. The project timeline module 1032 can implement schedule impact analysis algorithms that calculate how predicted events can affect project duration, task completion sequences, and critical path activities based on project management methodologies and historical project performance data. The project timeline module 1032 can execute deadline risk assessment processes that evaluate the probability of meeting established deadlines and identify potential schedule conflicts that can arise from predicted event implementation. For example, the project timeline module 1032 can analyze a predicted resource reallocation decision by implementing schedule impact analysis that calculates how moving three developers from Project Alpha to Project Beta can accelerate Beta completion by 2.5 weeks while extending Alpha timeline by 4 weeks, while executing deadline risk assessment that identifies 73% probability of Alpha missing its original deadline and 89% probability of Beta achieving accelerated completion target based on resource capacity analysis and task complexity evaluation.

In some implementations, the project timeline module 1032 can execute dependency analysis processes that evaluate how predicted events can affect interconnected project activities and cross-project relationships within complex project portfolios. The project timeline module 1032 can implement dependency mapping algorithms that identify critical dependencies between project tasks, deliverables, and resource allocations that can be affected by predicted events. The project timeline module 1032 can include dependency risk evaluation capabilities that assess how changes to dependent activities can propagate through project networks and influence overall project portfolio performance. The project timeline module 1032 can also execute dependency optimization recommendations that suggest approaches to minimize negative dependency impacts while maximizing benefits from predicted event implementation. For example, the project timeline module 1032 can process a predicted technology platform upgrade by implementing dependency mapping that identifies 12 dependent projects requiring platform compatibility updates, while dependency risk evaluation calculates that platform changes can delay dependent projects by 1-3 weeks each unless coordination measures are implemented, enabling dependency optimization recommendations that suggest phased upgrade implementation and advance notification protocols to minimize dependency-related delays across the project portfolio.

In some implementations, the project timeline module 1032 can implement milestone achievement analysis mechanisms that evaluate how predicted events can influence critical project milestones and deliverable completion schedules. The project timeline module 1032 can execute milestone impact assessment algorithms that calculate how predicted events can affect milestone timing, deliverable quality, and stakeholder expectations for key project achievements. The project timeline module 1032 can include milestone risk quantification capabilities that assess the probability of achieving planned milestones under different predicted event scenarios and identify potential mitigation strategies for milestone risks. The project timeline module 1032 can also execute milestone recovery planning processes that develop contingency approaches for maintaining milestone achievement despite potential schedule impacts from predicted events. For example, the project timeline module 1032 can analyze a predicted scope expansion decision by implementing milestone impact assessment that evaluates how additional requirements can affect three critical milestones scheduled over the next four months, while milestone risk quantification calculates 45% probability of achieving Milestone 1 on schedule, 62% probability for Milestone 2, and 78% probability for Milestone 3 based on scope complexity analysis, enabling milestone recovery planning that identifies accelerated development approaches and resource augmentation strategies to maintain milestone achievement despite scope expansion challenges.

In some implementations, a team dynamics module 1033 can monitor workload distribution, morale indicators, and collaboration patterns to provide comprehensive team performance and organizational behavior assessment within the impact analysis module 1030. The team dynamics module 1033 can include team analysis implementations (e.g., workload analyzers, morale assessment systems, collaboration pattern detectors, performance evaluators, and/or the like) that systematically evaluate how predicted events can influence team productivity, employee satisfaction, communication effectiveness, and collaborative work relationships. The team dynamics module 1033 can implement workload analysis algorithms that calculate how predicted events can affect individual and team workload distribution, resource utilization patterns, and capacity management across organizational units. The team dynamics module 1033 can execute morale impact assessment processes that evaluate how predicted events can influence employee satisfaction, engagement levels, and organizational commitment based on historical morale data and organizational behavior patterns. For example, the team dynamics module 1033 can analyze a predicted project deadline acceleration by implementing workload analysis that calculates how compressed timelines can increase individual workloads by 25-35% and require overtime work averaging 8-12 hours per week, while executing morale impact assessment that predicts potential morale decreases of 0.6-0.9 points on satisfaction scales based on historical responses to similar deadline pressures and workload increases.

In some implementations, the team dynamics module 1033 can execute collaboration pattern analysis processes that evaluate how predicted events can affect team communication, coordination effectiveness, and collaborative work relationships within organizational structures. The team dynamics module 1033 can implement collaboration assessment algorithms that analyze communication frequency, coordination efficiency, and knowledge sharing patterns that can be influenced by predicted event implementation. The team dynamics module 1033 can include collaboration quality evaluation capabilities that assess how predicted events can affect team cohesion, cross-functional cooperation, and collaborative problem-solving effectiveness. The team dynamics module 1033 can also execute collaboration optimization recommendations that suggest approaches to maintain or enhance collaborative effectiveness despite potential disruptions from predicted events. For example, the team dynamics module 1033 can process a predicted remote work policy implementation by implementing collaboration assessment that analyzes how distributed work arrangements can affect communication frequency, with predictions showing 23% reduction in informal interactions and 15% increase in formal meeting requirements, while collaboration quality evaluation identifies potential challenges in spontaneous problem-solving and knowledge transfer activities, enabling collaboration optimization recommendations that suggest enhanced digital collaboration tools and structured communication protocols to maintain team effectiveness in distributed work environments.

In some implementations, the team dynamics module 1033 can implement performance impact analysis mechanisms that evaluate how predicted events can influence individual and team performance metrics across various productivity and quality dimensions. The team dynamics module 1033 can execute performance projection algorithms that calculate how predicted events can affect task completion rates, quality standards achievement, and overall team productivity based on historical performance data and workload analysis. The team dynamics module 1033 can include performance risk assessment capabilities that identify potential performance degradation risks and evaluate mitigation strategies to maintain performance standards during predicted event implementation. The team dynamics module 1033 can also execute performance optimization planning processes that develop strategies to enhance team performance outcomes despite potential challenges from predicted events. For example, the team dynamics module 1033 can analyze a predicted organizational restructuring by implementing performance projection that calculates potential productivity decreases of 18-25% during the first 6-8 weeks of transition based on historical restructuring data, while performance risk assessment identifies knowledge transfer gaps and communication disruptions as primary performance risks, enabling performance optimization planning that suggests cross-training programs and enhanced documentation processes to minimize performance impact during organizational transition periods.

In some implementations, a customer relations module 1034 can track satisfaction levels, retention rates, acquisition metrics, and churn risk indicators to provide comprehensive customer relationship consequence assessment within the impact analysis module 1030. The customer relations module 1034 can include customer analysis implementations (e.g., satisfaction analyzers, retention predictors, acquisition trackers, churn risk assessors, and/or the like) that systematically evaluate how predicted events can influence customer relationships, service quality perceptions, and long-term customer value metrics. The customer relations module 1034 can implement satisfaction impact analysis algorithms that calculate how predicted events can affect customer satisfaction scores, service quality ratings, and customer experience metrics based on historical customer feedback data and service performance patterns. The customer relations module 1034 can execute retention analysis processes that evaluate how predicted events can influence customer loyalty, contract renewal rates, and long-term customer relationship sustainability. For example, the customer relations module 1034 can analyze a predicted service delivery modification by implementing satisfaction impact analysis that projects customer satisfaction changes ranging from +0.3 to −0.7 points based on service modification characteristics and customer preference data, while executing retention analysis that calculates potential retention rate impacts showing 2-5% decrease in renewal rates for customers most affected by service changes and 1-3% improvement for customers benefiting from enhanced service features.

In some implementations, the customer relations module 1034 can execute customer acquisition impact assessment processes that evaluate how predicted events can affect new customer attraction, conversion rates, and market penetration within target customer segments. The customer relations module 1034 can implement acquisition analysis algorithms that calculate how predicted events can influence customer acquisition costs, conversion funnel performance, and market reach effectiveness based on marketing performance data and customer behavior analysis. The customer relations module 1034 can include acquisition opportunity evaluation capabilities that identify potential improvements or challenges in customer acquisition processes resulting from predicted event implementation. The customer relations module 1034 can also execute acquisition strategy optimization recommendations that suggest approaches to maximize customer acquisition benefits while minimizing potential negative impacts from predicted events. For example, the customer relations module 1034 can process a predicted pricing strategy change by implementing acquisition analysis that evaluates how price modifications can affect customer acquisition rates, with projections showing 15-22% reduction in price-sensitive customer segments but 8-12% increase in value-focused segments, while acquisition opportunity evaluation identifies potential for improved customer quality metrics and higher lifetime value, enabling acquisition strategy optimization recommendations that suggest targeted marketing approaches to emphasize value proposition for premium customer segments while maintaining competitive positioning in price-sensitive markets.

In some implementations, the customer relations module 1034 can implement churn risk analysis mechanisms that evaluate how predicted events can influence customer departure probability and identify early warning indicators for customer relationship deterioration. The customer relations module 1034 can execute churn prediction algorithms that calculate how predicted events can affect customer churn rates across different customer segments and service categories based on historical churn patterns and customer behavior analysis. The customer relations module 1034 can include churn prevention assessment capabilities that evaluate potential interventions and mitigation strategies to reduce churn risks associated with predicted event implementation. The customer relations module 1034 can also execute customer retention optimization processes that develop proactive approaches to maintain customer relationships despite potential challenges from predicted events. For example, the customer relations module 1034 can analyze a predicted technology platform migration by implementing churn prediction that calculates increased churn risk of 12-18% among customers with high platform integration dependencies, while churn prevention assessment identifies communication strategies, migration support services, and incentive programs that can reduce churn risk to 4-7%, enabling customer retention optimization that suggests phased migration approaches with dedicated customer success support to minimize relationship disruption during technology transitions.

In some implementations, a resource management module 1035 can manage budget allocations, staffing requirements, and infrastructure capacity to provide comprehensive resource consequence assessment within the impact analysis module 1030. The resource management module 1035 can include resource analysis implementations (e.g., budget analyzers, staffing planners, capacity assessors, allocation optimizers, and/or the like) that systematically evaluate how predicted events can influence resource availability, utilization efficiency, and allocation strategies across organizational operations. The resource management module 1035 can implement budget impact analysis algorithms that calculate how predicted events can affect financial resource requirements, cost allocations, and budget constraint management based on historical spending patterns and resource utilization data. The resource management module 1035 can execute staffing analysis processes that evaluate how predicted events can influence personnel requirements, skill set needs, and workforce capacity across different organizational functions and project activities. For example, the resource management module 1035 can analyze a predicted market expansion initiative by implementing budget impact analysis that calculates additional resource requirements of $2.1M to $2.8M including marketing investments, infrastructure expansion, and personnel costs, while executing staffing analysis that identifies needs for 12-15 additional personnel including sales representatives, customer support staff, and operations specialists to support expanded market presence and customer base growth.

In some implementations, the resource management module 1035 can execute infrastructure capacity assessment processes that evaluate how predicted events can affect technology systems, physical facilities, and operational infrastructure requirements. The resource management module 1035 can implement capacity analysis algorithms that calculate how predicted events can influence infrastructure utilization, performance requirements, and scalability needs based on operational demand projections and system performance data. The resource management module 1035 can include infrastructure optimization evaluation capabilities that assess opportunities to improve resource efficiency and capacity utilization through predicted event implementation. The resource management module 1035 can also execute infrastructure investment planning processes that identify infrastructure upgrades and capacity expansions needed to support predicted event outcomes and organizational growth objectives. For example, the resource management module 1035 can process a predicted digital transformation initiative by implementing capacity analysis that evaluates current technology infrastructure limitations and calculates requirements for enhanced server capacity, network bandwidth increases, and cloud service expansions totaling $450K to $650K in infrastructure investments, while infrastructure optimization evaluation identifies opportunities to improve system efficiency by 25-30% through modernization efforts, enabling infrastructure investment planning that prioritizes critical capacity upgrades and phased implementation approaches to support digital transformation objectives.

In some implementations, the resource management module 1035 can implement resource allocation optimization mechanisms that evaluate how predicted events can affect resource distribution strategies and utilization efficiency across multiple organizational priorities and project requirements. The resource management module 1035 can execute allocation analysis algorithms that calculate optimal resource distribution approaches that balance competing demands and maximize overall organizational effectiveness under predicted event scenarios. The resource management module 1035 can include resource conflict resolution capabilities that identify potential resource conflicts and develop strategies to manage competing resource demands resulting from predicted event implementation. The resource management module 1035 can also execute resource efficiency optimization processes that suggest approaches to improve resource utilization and minimize waste while supporting predicted event objectives and organizational performance goals. For example, the resource management module 1035 can analyze a predicted product development acceleration by implementing allocation analysis that evaluates how to optimally distribute 25 available developers across four concurrent projects while supporting accelerated development timelines, while resource conflict resolution identifies scheduling conflicts for specialized expertise and suggests cross-training programs to increase resource flexibility, enabling resource efficiency optimization that recommends agile development methodologies and shared resource pools to maximize development capacity utilization and minimize project delays.

In some implementations, a strategic alignment module 1036 can evaluate organization goals, priorities, vision fit, and mission alignment to provide comprehensive strategic consequence assessment within the impact analysis module 1030. The strategic alignment module 1036 can include strategic analysis implementations (e.g., goal alignment assessors, priority evaluators, vision compatibility analyzers, mission alignment validators, and/or the like) that systematically evaluate how predicted events can support or conflict with established organizational strategies, long-term objectives, and fundamental organizational values. The strategic alignment module 1036 can implement goal alignment analysis algorithms that calculate how predicted events can contribute to achievement of specific organizational goals and strategic objectives based on goal tracking data and performance measurement systems. The strategic alignment module 1036 can execute priority assessment processes that evaluate how predicted events can affect organizational priority rankings and resource allocation decisions across competing strategic initiatives. For example, the strategic alignment module 1036 can analyze a predicted acquisition opportunity by implementing goal alignment analysis that evaluates how the acquisition can contribute to strategic growth objectives with projected market share increases of 8-12% and revenue growth acceleration of 15-20%, while executing priority assessment that identifies potential conflicts with current digital transformation priorities and calculates resource reallocation requirements that can delay transformation initiatives by 3-6 months.

In some implementations, the strategic alignment module 1036 can execute vision compatibility evaluation processes that assess how predicted events can support or conflict with organizational vision statements and long-term strategic direction. The strategic alignment module 1036 can implement vision alignment analysis algorithms that evaluate the consistency between predicted event outcomes and established organizational vision elements including market positioning, customer value propositions, and competitive differentiation strategies. The strategic alignment module 1036 can include vision impact assessment capabilities that calculate how predicted events can influence progress toward vision achievement and identify potential vision conflicts that require strategic consideration. The strategic alignment module 1036 can also execute vision optimization recommendations that suggest approaches to maximize vision alignment benefits while minimizing potential conflicts from predicted event implementation. For example, the strategic alignment module 1036 can process a predicted technology platform standardization initiative by implementing vision alignment analysis that evaluates how platform consolidation supports the organizational vision of operational excellence and customer service leadership, while vision impact assessment calculates potential improvements in service delivery consistency and operational efficiency that align with vision objectives, enabling vision optimization recommendations that suggest phased implementation approaches to maximize vision alignment benefits while managing transition risks.

In some implementations, the strategic alignment module 1036 can implement mission alignment validation mechanisms that evaluate how predicted events can support organizational mission fulfillment and core value proposition delivery. The strategic alignment module 1036 can execute mission compatibility analysis algorithms that assess how predicted events can enhance or compromise mission-critical activities and organizational purpose achievement. The strategic alignment module 1036 can include mission impact quantification capabilities that calculate specific contributions of predicted events to mission fulfillment metrics and organizational value creation objectives. The strategic alignment module 1036 can also execute mission optimization planning processes that develop strategies to maximize mission alignment benefits while addressing potential mission conflicts from predicted event implementation. For example, the strategic alignment module 1036 can analyze a predicted service expansion initiative by implementing mission compatibility analysis that evaluates how expanded service offerings can enhance the organizational mission of comprehensive customer solution delivery, while mission impact quantification calculates potential improvements in customer value creation and market coverage that support mission objectives, enabling mission optimization planning that suggests service portfolio integration strategies to maximize mission alignment while maintaining operational efficiency and service quality standards.

In some implementations, a risk exposure module 1037 can analyze technical risks, operational risks, financial risks, and reputational risks to provide comprehensive risk consequence assessment within the impact analysis module 1030. The risk exposure module 1037 can include risk analysis implementations (e.g., technical risk assessors, operational risk analyzers, financial risk evaluators, reputation risk monitors, and/or the like) that systematically evaluate how predicted events can introduce, modify, or mitigate various risk categories that can affect organizational performance and strategic objectives. The risk exposure module 1037 can implement technical risk analysis algorithms that calculate how predicted events can affect technology systems, infrastructure reliability, and technical performance based on system complexity analysis and failure probability assessments. The risk exposure module 1037 can execute operational risk evaluation processes that assess how predicted events can influence business process reliability, operational continuity, and service delivery consistency. For example, the risk exposure module 1037 can analyze a predicted cloud migration initiative by implementing technical risk analysis that identifies potential system downtime risks of 2-4 hours during migration periods and data transfer reliability concerns with 95-98% success probability, while executing operational risk evaluation that calculates potential service disruption impacts affecting 15-25% of customer operations during transition phases and identifies backup system requirements to maintain operational continuity.

In some implementations, the risk exposure module 1037 can execute financial risk assessment processes that evaluate how predicted events can affect financial stability, cash flow patterns, and investment return probabilities across various financial risk categories. The risk exposure module 1037 can implement financial risk analysis algorithms that calculate how predicted events can influence revenue volatility, cost uncertainty, and capital requirement variations based on financial modeling and market analysis. The risk exposure module 1037 can include financial risk quantification capabilities that assess probability distributions for financial outcomes and identify potential financial loss scenarios that require risk mitigation planning. The risk exposure module 1037 can also execute financial risk mitigation recommendations that suggest approaches to minimize financial risk exposure while maintaining predicted event benefits and strategic objectives. For example, the risk exposure module 1037 can process a predicted international expansion by implementing financial risk analysis that calculates currency exchange rate exposure of $200K to $500K annually and regulatory compliance costs ranging from $150K to $300K, while financial risk quantification identifies 15% probability of expansion costs exceeding budget by more than 25% and 8% probability of revenue shortfalls greater than 20%, enabling financial risk mitigation recommendations that suggest currency hedging strategies and phased expansion approaches to minimize financial risk exposure.

In some implementations, the risk exposure module 1037 can implement reputational risk analysis mechanisms that evaluate how predicted events can affect organizational reputation, brand perception, and stakeholder confidence across various stakeholder groups and market segments. The risk exposure module 1037 can execute reputation impact assessment algorithms that calculate how predicted events can influence customer perception, investor confidence, employee satisfaction, and public opinion based on reputation monitoring data and stakeholder feedback analysis. The risk exposure module 1037 can include reputation risk quantification capabilities that assess potential reputation damage scenarios and evaluate recovery timeframes and mitigation costs for reputation-related risks. The risk exposure module 1037 can also execute reputation protection planning processes that develop strategies to minimize reputation risks while achieving predicted event objectives and maintaining stakeholder trust and confidence. For example, the risk exposure module 1037 can analyze a predicted cost reduction initiative by implementing reputation impact assessment that evaluates how workforce reductions can affect employee morale, customer service perception, and market confidence, while reputation risk quantification calculates potential customer satisfaction decreases of 0.3-0.8 points and employee engagement reductions of 12-18%, enabling reputation protection planning that suggests communication strategies, service quality maintenance programs, and employee retention initiatives to minimize reputation damage while achieving cost reduction objectives.

In some implementations, the cascading propagation module 1040 can trace cascading effects and analyze how initial predicted events can propagate through multiple levels of organizational and operational systems within the causal evaluation system 1000. The cascading propagation module 1040 can include effect propagation implementations (e.g., cascade modeling engines, dependency tracking systems, amplification analyzers, feedback loop detectors, and/or the like) that systematically trace how initial changes can influence subsequent conditions through multiple orders of consequences that extend beyond immediate impact areas. The cascading propagation module 1040 can implement comprehensive propagation analysis processes that map causal chains from initial events through successive levels of organizational impact to provide complete understanding of how decisions can affect interconnected business systems. The cascading propagation module 1040 can execute temporal propagation tracking algorithms that monitor how effects develop over time and influence subsequent organizational conditions through predictable cascade sequences. The cascading propagation module 1040 can coordinate with the impact analysis module 1030 to provide detailed consequence mapping and with the causal reasoning models 1020 to access sophisticated causal analysis capabilities that inform cascade prediction processes.

In some implementations, an effect sequence 1042 can represent the systematic progression of consequences through multiple ordered stages that demonstrate how initial predicted events can generate successive waves of organizational impact within the cascading propagation module 1040. The effect sequence 1042 can include sequential progression implementations (e.g., ordered consequence trackers, stage progression analyzers, temporal sequence mappers, cascade flow controllers, and/or the like) that organize cascading effects into distinct temporal and causal stages that enable systematic analysis of how consequences develop and propagate through organizational systems over time. The effect sequence 1042 can implement stage-based analysis algorithms that categorize consequences according to their temporal distance and causal relationship to initial predicted events, creating structured representations of cascade progression that support comprehensive impact assessment. The effect sequence 1042 can execute progression tracking processes that monitor how consequences move through successive stages and influence subsequent organizational conditions through predictable cascade patterns. For example, the effect sequence 1042 can process a predicted budget reallocation decision by implementing stage-based analysis that organizes consequences into first-order financial impacts occurring within days, second-order operational adjustments developing over weeks, and third-order strategic implications emerging over months, enabling systematic tracking of how budget decisions propagate through organizational systems and influence multiple operational dimensions through predictable cascade sequences.

In some implementations, direct effects 1041-1 can represent immediate first-order consequences that result directly from predicted events without intermediate causal steps within the effect sequence 1042. The direct effects 1041-1 can include immediate impact implementations (e.g., first-order consequence calculators, direct relationship analyzers, immediate outcome predictors, primary impact assessors, and/or the like) that identify and quantify consequences that occur as direct results of predicted event implementation without requiring intermediate causal mechanisms or delayed response processes. The direct effects 1041-1 can implement immediate consequence analysis algorithms that calculate direct causal relationships between predicted events and their most proximate outcomes based on established causal connections and historical precedent data. The direct effects 1041-1 can execute primary impact assessment processes that evaluate the magnitude and characteristics of immediate consequences that serve as the foundation for subsequent cascade development through secondary and tertiary effect stages. The direct effects 1041-1 can coordinate with the causal reasoning models 1020 to access direct causal relationship analysis and with the business metrics module 1031 to quantify immediate financial and operational impacts. For example, the direct effects 1041-1 can analyze a predicted price reduction decision by implementing immediate consequence analysis that calculates direct impacts including reduced profit margins of 12-15% per unit, increased sales volume of 18-25% based on price elasticity analysis, and immediate competitive positioning improvements within target market segments, providing the foundation for subsequent cascade analysis through secondary and tertiary effect propagation stages.

In some implementations, the direct effects 1041-1 can execute immediate outcome quantification processes that calculate specific measurable consequences that occur within short time periods following predicted event implementation. The direct effects 1041-1 can implement rapid impact analysis algorithms that identify consequences that manifest within hours, days, or weeks of predicted event execution based on direct causal mechanisms and immediate system responses. The direct effects 1041-1 can include immediate measurement capabilities that quantify direct consequences using established metrics and performance indicators that enable precise assessment of first-order impact magnitude and characteristics. The direct effects 1041-1 can also execute immediate validation processes that verify the accuracy of direct effect predictions through comparison with historical precedents and established causal relationship patterns. For example, the direct effects 1041-1 can process a predicted staffing increase decision by implementing rapid impact analysis that calculates immediate consequences including increased personnel costs of $45,000 monthly, enhanced project capacity enabling 20% faster task completion rates, and improved team workload distribution reducing individual overtime requirements by 8-12 hours weekly, while immediate validation processes confirm these predictions align with historical staffing adjustment outcomes and established productivity relationship patterns.

In some implementations, secondary effects 1041-2 can represent second-order consequences that result from direct effects rather than from initial predicted events within the effect sequence 1042. The secondary effects 1041-2 can include indirect impact implementations (e.g., second-order analyzers, cascade consequence calculators, indirect relationship trackers, derivative impact assessors, and/or the like) that identify and analyze consequences that emerge as results of direct effects through intermediate causal mechanisms and system responses. The secondary effects 1041-2 can implement indirect consequence analysis algorithms that trace causal pathways from direct effects to subsequent organizational impacts that develop through system interactions and stakeholder responses to initial changes. The secondary effects 1041-2 can execute derivative impact assessment processes that evaluate how direct effects influence related organizational systems and create additional consequences that extend beyond immediate impact areas. The secondary effects 1041-2 can coordinate with the team dynamics module 1033 to analyze organizational behavior impacts and with the customer relations module 1034 to assess stakeholder response consequences. For example, the secondary effects 1041-2 can analyze consequences of direct price reduction effects by implementing indirect consequence analysis that traces how increased sales volume leads to higher production demands, supply chain pressures requiring vendor negotiations, and customer service workload increases necessitating additional support staff, while derivative impact assessment evaluates how enhanced competitive positioning influences market dynamics and competitor strategic responses.

In some implementations, the secondary effects 1041-2 can execute intermediate consequence development processes that analyze how direct effects create conditions that generate additional organizational impacts through system interactions and stakeholder adaptations. The secondary effects 1041-2 can implement system response analysis algorithms that evaluate how organizational systems adapt to direct effects and create new conditions that influence subsequent operational performance and strategic positioning. The secondary effects 1041-2 can include stakeholder adaptation assessment capabilities that analyze how internal and external stakeholders respond to direct effects and create additional consequences through behavioral changes and strategic adjustments. The secondary effects 1041-2 can also execute intermediate timing analysis processes that determine when secondary effects typically manifest following direct effect implementation based on system response patterns and stakeholder adaptation timeframes. For example, the secondary effects 1041-2 can process consequences of direct staffing increase effects by implementing system response analysis that evaluates how enhanced project capacity leads to accelerated project timelines, improved client satisfaction scores, and increased business development opportunities, while stakeholder adaptation assessment analyzes how clients respond to improved service delivery with expanded project scopes and enhanced partnership commitments, creating additional revenue opportunities and resource requirements that extend beyond initial staffing decisions.

In some implementations, tertiary effects 1041-3 can represent third-order consequences that emerge from secondary effects through extended causal chains within the effect sequence 1042. The tertiary effects 1041-3 can include extended impact implementations (e.g., third-order consequence analyzers, long-term effect predictors, extended cascade trackers, strategic outcome assessors, and/or the like) that identify and analyze consequences that develop through multiple causal steps and extended temporal periods following initial predicted event implementation. The tertiary effects 1041-3 can implement extended consequence analysis algorithms that trace complex causal pathways through multiple organizational systems and stakeholder interactions to identify long-term strategic and operational implications. The tertiary effects 1041-3 can execute long-term impact assessment processes that evaluate how secondary effects create conditions that influence organizational strategic positioning, market relationships, and competitive dynamics over extended time periods. The tertiary effects 1041-3 can coordinate with the strategic alignment module 1036 to assess strategic implications and with the risk exposure module 1037 to evaluate long-term risk consequences. For example, the tertiary effects 1041-3 can analyze extended consequences of secondary competitive response effects by implementing extended consequence analysis that traces how competitor price matching leads to industry-wide margin compression, market consolidation pressures, and strategic repositioning requirements that influence long-term competitive dynamics and market structure evolution.

In some implementations, the tertiary effects 1041-3 can execute strategic consequence development processes that analyze how secondary effects create long-term strategic implications and competitive positioning changes that influence organizational future performance and market relationships. The tertiary effects 1041-3 can implement strategic impact analysis algorithms that evaluate how extended causal chains influence organizational strategic objectives, competitive advantages, and market positioning over multi-year time horizons. The tertiary effects 1041-3 can include competitive dynamics assessment capabilities that analyze how tertiary effects influence industry competition patterns, market structure evolution, and strategic relationship development among market participants. The tertiary effects 1041-3 can also execute long-term validation processes that assess the reliability of tertiary effect predictions through scenario analysis and sensitivity testing across different market condition assumptions. For example, the tertiary effects 1041-3 can process strategic consequences of secondary market expansion effects by implementing strategic impact analysis that evaluates how successful market penetration leads to enhanced brand recognition, strategic partnership opportunities, and acquisition target attractiveness that position the organization for long-term growth and market leadership, while competitive dynamics assessment analyzes how market success influences competitor strategic responses and industry consolidation trends that can affect future competitive positioning and strategic option availability.

In some implementations, feedback loops 1044 can represent self-reinforcing or self-limiting behavioral patterns that create cyclical causal relationships within the cascading propagation module 1040. The feedback loops 1044 can include cyclical analysis implementations (e.g., reinforcement pattern detectors, limiting behavior analyzers, cycle strength calculators, loop stability assessors, and/or the like) that identify and analyze situations where consequences influence the original conditions or create amplification effects through circular causal mechanisms. The feedback loops 1044 can implement reinforcement analysis algorithms that detect positive feedback mechanisms where consequences strengthen the original causal conditions and create self-amplifying cycles that increase effect magnitude over time. The feedback loops 1044 can execute limiting behavior detection processes that identify negative feedback mechanisms where consequences create conditions that moderate or reduce the original causal effects through selfregulating system responses. The feedback loops 1044 can coordinate with the causal reasoning models 1020 to access sophisticated feedback analysis capabilities and with the model training module 1090 to incorporate feedback learning into predictive model improvement processes. For example, the feedback loops 1044 can analyze a predicted customer service improvement initiative by implementing reinforcement analysis that identifies positive feedback where enhanced service quality leads to increased customer satisfaction, higher retention rates, and expanded customer referrals that generate additional revenue supporting further service quality investments, creating self-reinforcing improvement cycles.

In some implementations, the feedback loops 1044 can execute self-reinforcing pattern analysis processes that identify and quantify positive feedback mechanisms where consequences strengthen original causal conditions and create accelerating improvement or degradation cycles. The feedback loops 1044 can implement positive feedback detection algorithms that recognize situations where effects create conditions that amplify the original causal mechanisms and generate exponential rather than linear consequence development. The feedback loops 1044 can include reinforcement strength assessment capabilities that quantify the magnitude of self-reinforcing effects and predict the acceleration patterns that result from positive feedback mechanisms. The feedback loops 1044 can also execute reinforcement sustainability analysis processes that evaluate whether positive feedback loops can be maintained over extended time periods or whether natural limiting factors can eventually moderate reinforcement effects. For example, the feedback loops 1044 can process self-reinforcing consequences of a predicted innovation investment by implementing positive feedback detection that identifies how successful product innovations lead to increased market share, enhanced revenue generation, and expanded research and development budgets that enable additional innovation investments, while reinforcement strength assessment quantifies how each innovation cycle can generate 15-25% increases in innovation capacity, creating accelerating innovation development patterns that strengthen competitive positioning and market leadership over time.

In some implementations, the feedback loops 1044 can implement self-limiting behavior analysis mechanisms that identify negative feedback patterns where consequences create conditions that moderate original causal effects through natural regulatory mechanisms. The feedback loops 1044 can execute negative feedback detection algorithms that recognize situations where effects generate opposing forces that reduce the magnitude of original causal mechanisms and create stability-seeking system behaviors. The feedback loops 1044 can include limiting factor identification capabilities that analyze specific mechanisms through which consequences create moderating influences that prevent unlimited effect amplification and maintain system equilibrium. The feedback loops 1044 can also execute stability assessment processes that evaluate how negative feedback mechanisms contribute to system stability and predict equilibrium points where opposing forces balance original causal effects. For example, the feedback loops 1044 can analyze self-limiting consequences of a predicted aggressive pricing strategy by implementing negative feedback detection that identifies how price reductions lead to increased market share but also trigger competitor responses, margin pressures, and resource constraints that limit the sustainability of continued price reductions, while limiting factor identification analyzes how competitive responses and profitability requirements create natural boundaries that moderate pricing strategy effectiveness and establish market equilibrium conditions.

In some implementations, amplification 1046 can indicate small cause to large effect relationships where initial predicted events generate disproportionately significant consequences through leverage mechanisms within the cascading propagation module 1040. The amplification 1046 can include leverage analysis implementations (e.g., amplification ratio calculators, leverage mechanism detectors, disproportionate effect analyzers, cascade multiplier assessors, and/or the like) that identify and quantify situations where modest initial changes create substantial organizational impacts through multiplicative rather than additive consequence development. The amplification 1046 can implement leverage detection algorithms that recognize structural conditions and system characteristics that enable small inputs to generate large outputs through mechanical, financial, or strategic leverage mechanisms. The amplification 1046 can execute disproportionate effect analysis processes that calculate amplification ratios and identify the specific mechanisms through which initial events generate magnified consequences across organizational systems. The amplification 1046 can coordinate with the business metrics module 1031 to quantify financial amplification effects and with the strategic alignment module 1036 to assess strategic leverage opportunities. For example, the amplification 1046 can analyze a predicted technology platform standardization decision by implementing leverage detection that identifies how modest initial investments in platform consolidation can generate substantial cost savings through reduced maintenance overhead, simplified training requirements, and enhanced operational efficiency that produce amplification ratios of 8:1 to 12:1 return on standardization investment.

In some implementations, the amplification 1046 can execute leverage mechanism identification processes that analyze specific structural and systemic factors that enable small causes to generate large effects through multiplicative consequence development. The amplification 1046 can implement leverage factor analysis algorithms that identify organizational structures, market conditions, and system characteristics that create amplification opportunities where modest inputs can generate substantial outputs. The amplification 1046 can include amplification pathway mapping capabilities that trace the specific causal mechanisms through which initial events generate magnified consequences across multiple organizational dimensions and operational systems. The amplification 1046 can also execute amplification sustainability assessment processes that evaluate whether leverage mechanisms can be maintained over time or whether natural limiting factors can reduce amplification effectiveness through system adaptations. For example, the amplification 1046 can process leverage mechanisms in a predicted strategic partnership decision by implementing leverage factor analysis that identifies how partnership agreements can provide access to established distribution networks, customer relationships, and market intelligence that amplify market penetration capabilities far beyond internal development capacity, while amplification pathway mapping traces how partnership leverage generates market access worth $2.5M annually through initial partnership investments of $200K, creating 12.5:1 amplification ratios through strategic relationship leverage.

In some implementations, the amplification 1046 can implement cascade multiplier analysis mechanisms that quantify how amplification effects propagate through organizational systems and create compound leverage across multiple operational dimensions. The amplification 1046 can execute multiplier effect calculation algorithms that assess how initial amplification generates additional amplification opportunities through interconnected system responses and stakeholder adaptations. The amplification 1046 can include compound leverage assessment capabilities that analyze how multiple amplification mechanisms can combine to create exponential rather than linear consequence development across organizational systems. The amplification 1046 can also execute amplification optimization processes that identify opportunities to enhance leverage mechanisms and maximize amplification benefits while managing potential risks associated with high-leverage operational strategies. For example, the amplification 1046 can analyze compound leverage in a predicted digital transformation initiative by implementing multiplier effect calculation that evaluates how initial automation investments generate productivity improvements that enable resource reallocation to innovation activities, which create competitive advantages that generate market share gains, producing compound amplification where $500K automation investment generates $2.1M productivity benefits, $800K innovation capacity increases, and $1.4M market share value creation, demonstrating compound leverage ratios exceeding 8.6:1 through interconnected amplification mechanisms.

In some implementations, an example sequence 1048 can demonstrate progression through a specific scenario showing how a price cut leads to revenue increases, followed by market share gain, competitor response, and ultimately a price war within the cascading propagation module 1040. The example sequence 1048 can include scenario demonstration implementations (e.g., concrete example trackers, specific case analyzers, detailed progression mappers, realistic scenario builders, and/or the like) that provide comprehensive illustration of how cascading effects develop through real-world business scenarios with specific quantitative outcomes and temporal progression patterns. The example sequence 1048 can implement detailed scenario analysis algorithms that trace specific causal pathways through multiple effect stages using realistic business parameters and market condition assumptions. The example sequence 1048 can execute comprehensive progression tracking processes that document how initial decisions create specific consequences that influence subsequent market dynamics and competitive responses through predictable cascade patterns. The example sequence 1048 can coordinate with the business metrics module 1031 to provide realistic financial projections and with the customer relations module 1034 to model customer response patterns throughout the cascade sequence. For example, the example sequence 1048 can demonstrate a comprehensive pricing strategy scenario by implementing detailed scenario analysis that begins with a 15% price reduction decision and traces progression through immediate revenue increases of 22% within 60 days, market share gains from 18% to 24% within 120 days, competitor price matching responses within 180 days, and industry-wide margin compression leading to price war conditions within 12 months.

In some implementations, the example sequence 1048 can execute initial decision impact analysis processes that demonstrate how the price cut decision generates immediate direct effects including revenue increases and customer acquisition improvements. The example sequence 1048 can implement price reduction consequence tracking algorithms that calculate specific revenue impacts, customer response patterns, and market penetration improvements that result directly from pricing strategy implementation. The example sequence 1048 can include customer behavior analysis capabilities that model how price reductions influence customer purchasing decisions, brand switching behaviors, and market demand patterns that create immediate business impact. The example sequence 1048 can also execute immediate market response assessment processes that evaluate how price reductions affect competitive positioning and market dynamics within short-term time horizons. For example, the example sequence 1048 can process initial price cut consequences by implementing price reduction consequence tracking that calculates how 15% price reductions generate immediate revenue increases from $2.1M to $2.6M monthly through increased unit sales volume of 28%, customer acquisition improvements adding 1,200 new customers within 45 days, and market penetration gains in price-sensitive customer segments increasing from 12% to 19% market share within the first quarter following price reduction implementation.

In some implementations, the example sequence 1048 can implement market share development analysis mechanisms that demonstrate how initial revenue increases create secondary effects including enhanced competitive positioning and market presence expansion. The example sequence 1048 can execute market share progression tracking algorithms that calculate how initial customer acquisition and revenue improvements translate into sustained market share gains and competitive advantage development over extended time periods. The example sequence 1048 can include competitive positioning assessment capabilities that analyze how market share gains influence brand recognition, customer loyalty, and strategic market position relative to competitor offerings and market alternatives. The example sequence 1048 can also execute market presence consolidation processes that evaluate how sustained market share improvements create strategic advantages and market leadership opportunities that extend beyond initial pricing strategy objectives. For example, the example sequence 1048 can analyze market share development by implementing market share progression tracking that demonstrates how initial revenue increases lead to market share expansion from 18% to 24% within 120 days, enhanced brand recognition improving customer preference scores by 0.8 points, and strategic positioning improvements that establish market leadership in two key customer segments, creating sustainable competitive advantages that extend beyond initial price reduction benefits.

In some implementations, the example sequence 1048 can execute competitor response analysis processes that demonstrate how market share gains create tertiary effects including competitive reactions and industry-wide strategic adjustments. The example sequence 1048 can implement competitive reaction tracking algorithms that model how competitor organizations respond to market share losses through pricing adjustments, strategic repositioning, and competitive countermeasures designed to regain market position. The example sequence 1048 can include industry dynamics assessment capabilities that analyze how individual competitor responses create industry-wide changes in pricing patterns, competitive strategies, and market structure evolution. The example sequence 1048 can also execute competitive escalation prediction processes that evaluate how initial competitive responses can trigger additional competitive actions and create escalating competitive dynamics that influence overall market conditions. For example, the example sequence 1048 can process competitor response development by implementing competitive reaction tracking that demonstrates how market share losses prompt three primary competitors to implement matching price reductions within 180 days, followed by enhanced marketing campaigns increasing industry advertising spending by 35%, and strategic repositioning efforts that create industry-wide competitive intensity increases leading to margin compression across all market participants.

In some implementations, the example sequence 1048 can implement price war development analysis mechanisms that demonstrate how competitive responses create quaternary effects including industry-wide price competition and market structure transformation. The example sequence 1048 can execute price war progression tracking algorithms that model how escalating competitive responses create industry-wide pricing pressures that transform market dynamics and competitive relationships among all market participants. The example sequence 1048 can include market structure evolution assessment capabilities that analyze how sustained price competition influences industry profitability, market consolidation pressures, and long-term competitive sustainability across the entire market ecosystem. The example sequence 1048 can also execute industry outcome prediction processes that evaluate how price war conditions can resolve through market consolidation, strategic partnerships, or industry-wide strategic repositioning that establishes new competitive equilibrium conditions. For example, the example sequence 1048 can analyze price war development by implementing price war progression tracking that demonstrates how competitive price matching escalates into industry-wide price competition reducing average industry margins from 28% to 16% within 12 months, creating market consolidation pressures that eliminate two smaller competitors through acquisition, and establishing new industry competitive equilibrium with three dominant players maintaining 22% average margins through strategic differentiation rather than price competition, illustrating complete cascade progression from initial price reduction through industry transformation.

In some implementations, the uncertainty quantification module 1050 can provide comprehensive assessment of prediction reliability and confidence levels for causal analysis results within the causal evaluation system 1000. The uncertainty quantification module 1050 can include uncertainty assessment implementations (e.g., statistical analysis engines, probability modeling systems, confidence calculation frameworks, reliability evaluation mechanisms, and/or the like) that systematically evaluate the accuracy and dependability of causal predictions through multiple analytical approaches including confidence interval estimation, probability distribution characterization, scenario-based analysis, and sensitivity evaluation processes. The uncertainty quantification module 1050 can implement comprehensive uncertainty evaluation workflows that process causal analysis results from the causal reasoning models 1020 to generate quantitative assessments of prediction reliability and outcome variability. The uncertainty quantification module 1050 can execute continuous uncertainty monitoring processes that track prediction accuracy over time and adjust uncertainty estimates based on observed outcomes and model performance feedback. The uncertainty quantification module 1050 can coordinate with the model training module 1090 to provide uncertainty feedback that improves prediction reliability and with the explanation generation module 1060 to incorporate uncertainty information into user-facing explanations and decision support materials.

In some implementations, a confidence interval module 1052 can provide range estimates for quantitative predictions that enable users to understand the potential variability and reliability of causal analysis outcomes within the uncertainty quantification module 1050. The confidence interval module 1052 can include statistical estimation implementations (e.g., interval calculation engines, range estimation systems, statistical confidence processors, variance analysis frameworks, and/or the like) that generate mathematical ranges around predicted outcomes based on historical accuracy data, model performance metrics, and statistical uncertainty principles. The confidence interval module 1052 can implement confidence interval calculation algorithms that apply statistical methods including bootstrap sampling, parametric estimation, and non-parametric approaches to generate reliable range estimates for different types of quantitative predictions. The confidence interval module 1052 can execute range estimation processes that calculate upper and lower bounds for predicted outcomes with specified confidence levels such as 90%, 95%, or 99% confidence intervals that indicate the probability that actual outcomes can fall within the calculated ranges. The confidence interval module 1052 can coordinate with the business metrics module 1031 to provide financial prediction ranges and with the project timeline module 1032 to generate schedule uncertainty estimates. For example, the confidence interval module 1052 can process revenue impact predictions for a market expansion decision by implementing confidence interval calculation that generates range estimates showing projected revenue increases between $1.8M and $3.2M with 95% confidence based on historical market expansion data and current market condition analysis, enabling users to understand that while the expected revenue impact is $2.5M, actual results can vary within the calculated confidence range due to market uncertainty and implementation variables.

In some implementations, the confidence interval module 1052 can execute probability distribution analysis processes that characterize the full range of possible outcomes and their associated likelihoods rather than providing single-point predictions. The confidence interval module 1052 can implement distribution modeling algorithms that generate probability density functions and cumulative distribution functions that describe the likelihood of different outcome values across the entire range of possible results. The confidence interval module 1052 can include distribution fitting capabilities that select appropriate statistical distributions including normal, lognormal, beta, or gamma distributions based on the characteristics of predicted outcomes and historical data patterns. The confidence interval module 1052 can also execute distribution visualization processes that create graphical representations of probability distributions that enable users to understand outcome likelihood patterns and make informed decisions based on complete uncertainty characterization. For example, the confidence interval module 1052 can analyze cost impact predictions for a technology implementation project by implementing distribution modeling that generates a lognormal probability distribution showing 25% probability of costs below $450K, 50% probability between $450K and $650K, and 25% probability above $650K, while distribution visualization creates graphical displays that show the complete cost uncertainty profile and enable project managers to understand the full range of potential financial outcomes and their associated probabilities.

In some implementations, the confidence interval module 1052 can implement Bayesian uncertainty propagation mechanisms that incorporate prior knowledge and update uncertainty estimates as new information becomes available through systematic Bayesian inference processes. The confidence interval module 1052 can execute Bayesian analysis algorithms that combine prior probability distributions representing existing knowledge with likelihood functions based on observed data to generate posterior probability distributions that reflect updated uncertainty estimates. The confidence interval module 1052 can include prior specification capabilities that define initial uncertainty estimates based on expert judgment, historical data, or established statistical models that provide starting points for Bayesian uncertainty analysis. The confidence interval module 1052 can also execute posterior updating processes that revise uncertainty estimates as new evidence becomes available through ongoing monitoring and outcome observation activities. For example, the confidence interval module 1052 can process customer satisfaction impact predictions by implementing Bayesian analysis that begins with prior distributions based on historical customer response patterns, then updates uncertainty estimates as early customer feedback data becomes available, generating posterior distributions that show refined confidence intervals narrowing from initial ranges of 3.2 to 4.8 satisfaction points to updated ranges of 3.6 to 4.4 satisfaction points as actual customer response data reduces prediction uncertainty through Bayesian learning processes.

In some implementations, a scenario analysis module 1054 can perform comprehensive evaluation of multiple potential future scenarios to explore different possible outcomes and their associated probabilities within the uncertainty quantification module 1050. The scenario analysis module 1054 can include scenario modeling implementations (e.g., scenario generation engines, probability assessment systems, outcome evaluation frameworks, comparative analysis processors, and/or the like) that systematically create and analyze multiple alternative future scenarios that span the range of possible conditions and outcomes that can influence predicted event consequences. The scenario analysis module 1054 can implement scenario construction algorithms that generate diverse scenario sets by varying key parameters, assumptions, and environmental conditions to create comprehensive coverage of possible future states and their implications for causal analysis outcomes. The scenario analysis module 1054 can execute scenario probability assessment processes that evaluate the likelihood of different scenarios based on historical precedents, expert judgment, and statistical analysis of scenario parameter distributions. The scenario analysis module 1054 can coordinate with the causal reasoning models 1020 to access sophisticated scenario modeling capabilities and with the impact analysis module 1030 to evaluate scenario-specific consequences across multiple organizational dimensions. For example, the scenario analysis module 1054 can analyze a predicted product launch decision by implementing scenario construction that generates scenarios including optimistic market conditions with high customer adoption and minimal competitive response, pessimistic scenarios with low market acceptance and aggressive competitor reactions, and moderate scenarios with typical market dynamics and expected competitive behavior, enabling comprehensive evaluation of product launch outcomes across diverse potential future conditions.

In some implementations, the scenario analysis module 1054 can execute best-case scenario evaluation processes that analyze optimistic conditions and favorable outcomes to understand the maximum potential benefits and positive consequences of predicted events. The scenario analysis module 1054 can implement best-case modeling algorithms that assume favorable parameter values, positive environmental conditions, and successful implementation outcomes to generate P90 scenario evaluations that represent outcomes exceeded by only 10% of possible results. The scenario analysis module 1054 can include optimistic assumption specification capabilities that define favorable conditions including strong market demand, minimal competitive interference, successful execution, and positive stakeholder responses that create best-case scenario foundations. The scenario analysis module 1054 can also execute best-case outcome quantification processes that calculate specific metrics and performance indicators under optimistic scenario conditions to provide upper-bound estimates for decision-making purposes. For example, the scenario analysis module 1054 can process best-case evaluation for a strategic partnership decision by implementing best-case modeling that assumes optimal partner cooperation, successful market integration, and favorable regulatory conditions, generating P90 scenario results showing potential revenue increases of $4.2M annually, market share gains of 8.5%, and operational cost reductions of 22% that represent the most favorable 10% of possible partnership outcomes based on optimistic parameter assumptions and favorable environmental conditions.

In some implementations, the scenario analysis module 1054 can implement expected case scenario analysis mechanisms that evaluate most likely outcomes based on typical conditions and standard parameter values to provide realistic baseline predictions. The scenario analysis module 1054 can execute expected case modeling algorithms that use median parameter values, normal environmental conditions, and typical implementation success rates to generate P50 scenario evaluations that represent outcomes exceeded by 50% of possible results. The scenario analysis module 1054 can include realistic assumption specification capabilities that define standard conditions including average market performance, typical competitive responses, normal execution challenges, and expected stakeholder behaviors that create expected case scenario foundations. The scenario analysis module 1054 can also execute expected case validation processes that compare expected scenario outcomes with historical precedents and established performance patterns to ensure realistic prediction accuracy. For example, the scenario analysis module 1054 can analyze expected case outcomes for an organizational restructuring initiative by implementing expected case modeling that assumes typical change management challenges, normal employee adaptation periods, and standard efficiency improvement timelines, generating P50 scenario results showing productivity decreases of 12% during the first 8 weeks followed by efficiency improvements of 18% after 6 months, representing the most likely restructuring outcomes based on median parameter values and typical organizational change patterns.

In some implementations, the scenario analysis module 1054 can execute worst-case scenario evaluation processes that analyze pessimistic conditions and adverse outcomes to understand potential risks and negative consequences of predicted events. The scenario analysis module 1054 can implement worst-case modeling algorithms that assume unfavorable parameter values, challenging environmental conditions, and implementation difficulties to generate P10 scenario evaluations that represent outcomes exceeded by 90% of possible results. The scenario analysis module 1054 can include pessimistic assumption specification capabilities that define adverse conditions including weak market demand, aggressive competitive responses, execution failures, and negative stakeholder reactions that create worst-case scenario foundations. The scenario analysis module 1054 can also execute worst-case risk assessment processes that identify specific failure modes and adverse conditions that can lead to worst-case outcomes, enabling risk mitigation planning and contingency preparation. For example, the scenario analysis module 1054 can process worst-case evaluation for a technology upgrade project by implementing worst-case modeling that assumes significant technical difficulties, extended implementation timelines, and user adoption challenges, generating P10 scenario results showing cost overruns of 45%, schedule delays of 8 months, and productivity decreases of 25% that represent the most adverse 10% of possible technology upgrade outcomes, enabling project managers to prepare contingency plans and risk mitigation strategies for potential worst-case conditions.

In some implementations, a sensitivity analysis module 1056 can conduct comprehensive evaluation of how prediction outcomes vary with changes in input parameters and assumptions to identify critical factors that influence causal analysis results within the uncertainty quantification module 1050. The sensitivity analysis module 1056 can include sensitivity evaluation implementations (e.g., parameter variation engines, assumption testing systems, robustness analysis frameworks, influence assessment processors, and/or the like) that systematically vary input parameters and assumptions to determine their relative influence on predicted outcomes and identify the most critical factors that drive prediction uncertainty. The sensitivity analysis module 1056 can implement parameter variation algorithms that systematically modify individual input parameters across their possible ranges while holding other parameters constant to isolate the specific influence of each parameter on prediction outcomes. The sensitivity analysis module 1056 can execute sensitivity measurement processes that quantify the magnitude of outcome changes resulting from parameter variations to generate sensitivity coefficients and influence rankings that identify the most important factors affecting prediction accuracy. The sensitivity analysis module 1056 can coordinate with the causal reasoning models 1020 to access parameter sensitivity analysis capabilities and with the model training module 1090 to incorporate sensitivity insights into model improvement processes. For example, the sensitivity analysis module 1056 can analyze a predicted market expansion decision by implementing parameter variation that systematically modifies key factors including marketing budget, competitive response intensity, and economic conditions to determine that marketing budget variations of 20% can change revenue predictions by 15%, competitive response variations can alter outcomes by 25%, and economic condition changes can influence results by 12%, enabling identification of competitive response as the most critical sensitivity factor.

In some implementations, the sensitivity analysis module 1056 can execute parameter importance ranking processes that order input parameters according to their influence on prediction outcomes to identify the most critical factors requiring careful consideration and monitoring. The sensitivity analysis module 1056 can implement importance calculation algorithms that quantify the relative contribution of different parameters to overall prediction variance through statistical analysis and sensitivity coefficient comparison. The sensitivity analysis module 1056 can include ranking visualization capabilities that create ordered lists and graphical displays showing parameter importance hierarchies that enable users to focus attention on the most influential factors affecting prediction reliability. The sensitivity analysis module 1056 can also execute importance threshold analysis processes that identify parameters exceeding specified influence thresholds that warrant special attention in decision-making and risk management activities. For example, the sensitivity analysis module 1056 can process parameter importance ranking for a customer service improvement initiative by implementing importance calculation that evaluates how different factors influence customer satisfaction predictions, generating rankings showing staff training quality as the most important factor contributing 35% of prediction variance, followed by technology system reliability at 28%, response time targets at 22%, and communication protocols at 15%, enabling service managers to prioritize improvement efforts on the most influential factors affecting customer satisfaction outcomes.

In some implementations, the sensitivity analysis module 1056 can implement assumption testing mechanisms that evaluate how changes in underlying assumptions affect prediction reliability and identify assumptions that require validation or additional research. The sensitivity analysis module 1056 can execute assumption variation algorithms that systematically modify key assumptions about market conditions, organizational capabilities, and environmental factors to assess their impact on prediction accuracy and outcome reliability. The sensitivity analysis module 1056 can include assumption validation capabilities that compare assumption-based predictions with historical data and empirical evidence to identify assumptions that can require additional verification or research. The sensitivity analysis module 1056 can also execute assumption risk assessment processes that evaluate the consequences of incorrect assumptions and identify assumptions that pose the greatest risks to prediction accuracy and decision-making effectiveness. For example, the sensitivity analysis module 1056 can analyze assumption testing for a product development timeline prediction by implementing assumption variation that modifies assumptions about development team productivity, technical complexity, and resource availability, determining that productivity assumptions contribute 40% of timeline uncertainty while technical complexity assumptions account for 35% of prediction variance, enabling project managers to focus validation efforts on the most critical assumptions affecting timeline accuracy and resource planning decisions.

In some implementations, the sensitivity analysis module 1056 can execute robustness check processes that evaluate prediction stability across different parameter combinations and assumption sets to assess overall prediction reliability and identify conditions where predictions can become unreliable. The sensitivity analysis module 1056 can implement robustness analysis algorithms that test prediction stability by simultaneously varying multiple parameters and assumptions to identify parameter combinations that produce unstable or unrealistic outcomes. The sensitivity analysis module 1056 can include stability assessment capabilities that quantify prediction robustness through statistical measures including coefficient of variation, prediction intervals, and stability indices that indicate how consistently predictions perform across different input conditions. The sensitivity analysis module 1056 can also execute robustness optimization processes that identify parameter ranges and assumption sets that produce the most stable and reliable predictions for decision-making purposes. For example, the sensitivity analysis module 1056 can process robustness checks for a financial investment analysis by implementing robustness analysis that simultaneously varies market volatility, interest rates, and economic growth assumptions, determining that predictions remain stable within 15% variance when market volatility stays below 25% and interest rate changes remain within 2 percentage points, but prediction reliability decreases significantly when both factors exceed these thresholds simultaneously, enabling investment managers to identify robust operating conditions for reliable financial analysis.

In some implementations, the sensitivity analysis module 1056 can implement tornado diagram generation processes that create visual representations of parameter sensitivity rankings and influence magnitudes to enable rapid identification of critical factors affecting prediction outcomes. The sensitivity analysis module 1056 can execute tornado diagram construction algorithms that organize sensitivity analysis results into horizontal bar charts where bar lengths represent the magnitude of parameter influence on prediction outcomes and parameters are ordered by importance from most to least influential. The sensitivity analysis module 1056 can include diagram customization capabilities that enable users to focus on specific parameter subsets, adjust sensitivity ranges, and modify visualization formats to support different analytical needs and decision-making contexts. The sensitivity analysis module 1056 can also execute interactive diagram features that enable users to explore parameter relationships, modify sensitivity assumptions, and update diagrams based on changing conditions or new information. For example, the sensitivity analysis module 1056 can generate tornado diagrams for a supply chain optimization analysis by implementing tornado diagram construction that creates visual displays showing supplier reliability as the longest bar indicating highest influence on cost predictions, followed by transportation costs, demand variability, and inventory policies in decreasing order of influence magnitude, enabling supply chain managers to quickly identify that supplier reliability improvements can provide the greatest impact on cost optimization outcomes and should receive priority attention in supply chain management strategies.

In some implementations, a model uncertainty module 1058 can evaluate confidence in causal models themselves and assess the reliability of the analytical frameworks used to generate predictions within the uncertainty quantification module 1050. The model uncertainty module 1058 can include model assessment implementations (e.g., model validation systems, confidence evaluation engines, reliability analysis frameworks, uncertainty characterization processors, and/or the like) that systematically evaluate the accuracy, reliability, and limitations of causal models used in prediction generation processes. The model uncertainty module 1058 can implement model confidence evaluation algorithms that assess how well causal models perform across different scenarios, data conditions, and prediction tasks to generate confidence scores and reliability metrics for different types of analytical applications. The model uncertainty module 1058 can execute model validation processes that compare model predictions with observed outcomes to identify systematic biases, accuracy patterns, and performance limitations that affect model reliability and prediction quality. The model uncertainty module 1058 can coordinate with the model ensembles 152 to access multiple model types for uncertainty comparison and with the data observation module 1080 to obtain outcome data for model validation processes. For example, the model uncertainty module 1058 can evaluate confidence in customer satisfaction prediction models by implementing model confidence evaluation that analyzes prediction accuracy across 200 historical customer service scenarios, determining that satisfaction prediction models achieve 87% accuracy for routine service interactions but only 64% accuracy for complex technical support cases, enabling identification of model reliability boundaries and appropriate application contexts for different types of customer service predictions.

In some implementations, the model uncertainty module 1058 can execute epistemic versus aleatoric uncertainty assessment processes that distinguish between uncertainty arising from incomplete knowledge and uncertainty inherent in random processes to provide comprehensive uncertainty characterization. The model uncertainty module 1058 can implement epistemic uncertainty analysis algorithms that identify uncertainty components resulting from limited data, incomplete model specification, and insufficient knowledge about causal relationships that can potentially be reduced through additional research and data collection. The model uncertainty module 1058 can include aleatoric uncertainty evaluation capabilities that assess uncertainty components arising from inherent randomness, natural variability, and stochastic processes that cannot be reduced through additional information or model improvements. The model uncertainty module 1058 can also execute uncertainty decomposition processes that separate total prediction uncertainty into epistemic and aleatoric components to guide uncertainty reduction strategies and inform decision-making about additional data collection or model development investments. For example, the model uncertainty module 1058 can analyze uncertainty components in project timeline predictions by implementing epistemic uncertainty analysis that identifies 40% of timeline uncertainty arising from incomplete knowledge about team productivity patterns and task complexity relationships that can be reduced through better data collection, while aleatoric uncertainty evaluation determines that 60% of uncertainty results from inherent variability in individual performance and external factors that cannot be eliminated through improved modeling, enabling project managers to focus uncertainty reduction efforts on data collection and model improvement activities that can address epistemic uncertainty components.

In some implementations, the model uncertainty module 1058 can implement model ensemble disagreement analysis mechanisms that evaluate consistency across multiple analytical models to identify prediction scenarios where model uncertainty is highest and additional validation can be needed. The model uncertainty module 1058 can execute ensemble comparison algorithms that analyze prediction differences across multiple causal models within the model ensembles 152 to identify scenarios where models generate significantly different outcomes or confidence assessments. The model uncertainty module 1058 can include disagreement quantification capabilities that measure the magnitude of prediction differences across ensemble models using statistical measures including standard deviation, coefficient of variation, and consensus indices that indicate model agreement levels. The model uncertainty module 1058 can also execute disagreement interpretation processes that analyze the sources of model disagreement and identify specific factors or conditions that cause models to generate divergent predictions, enabling targeted model improvement and validation efforts. For example, the model uncertainty module 1058 can process model ensemble disagreement for market penetration predictions by implementing ensemble comparison that analyzes predictions from five different market analysis models, identifying high disagreement scenarios where prediction ranges span from 12% to 28% market penetration for technology adoption scenarios but show strong agreement within 2% ranges for traditional product launches, enabling market analysts to recognize that technology adoption predictions require additional validation and uncertainty consideration due to high model disagreement levels.

In some implementations, the model uncertainty module 1058 can execute out-of-distribution detection processes that identify prediction scenarios where input conditions fall outside the training data ranges used to develop causal models, indicating increased model uncertainty and reduced prediction reliability. The model uncertainty module 1058 can implement distribution analysis algorithms that compare current prediction inputs with historical training data distributions to identify parameters or conditions that exceed the experience base of causal models. The model uncertainty module 1058 can include out-of-distribution flagging capabilities that generate warnings when prediction scenarios involve conditions significantly different from model training data, indicating increased uncertainty and potential prediction unreliability. The model uncertainty module 1058 can also execute extrapolation risk assessment processes that evaluate the risks associated with making predictions in out-of-distribution scenarios and provide guidance about appropriate uncertainty adjustments and additional validation requirements. For example, the model uncertainty module 1058 can analyze out-of-distribution conditions for financial performance predictions by implementing distribution analysis that compares current market volatility levels of 35% with historical training data showing maximum volatility of 28%, generating out-of-distribution flags that indicate increased model uncertainty and recommend expanding confidence intervals by 40% to account for extrapolation risks when making financial predictions under unprecedented market volatility conditions that exceed the model's training experience.

Referring to FIG. 10F, in some implementations, an explanation generation module 1060 can generate comprehensive explanations for predicted session events and their downstream consequences. The explanation generation module 1060 can include multiple specialized components that work together to produce clear, actionable explanations tailored to user requirements and technical understanding levels. The explanation generation module 1060 can process complex analytical outputs from causal reasoning models and impact analysis modules to create user-friendly representations of consequence predictions.

In some implementations, the explanation generation module 1060 can include a natural language module 1061 that converts technical analytical results into plain language explanations accessible to non-technical users. The natural language module 1061 can implement natural language generation algorithms (e.g., transformer-based text generation models, template-based generation systems, and/or the like) that transform structured data outputs into coherent narrative explanations. The natural language module 1061 can analyze user context and technical background to select appropriate terminology and explanation depth levels for each generated explanation.

In some implementations, the natural language module 1061 can generate narrative structures that organize consequence explanations in logical sequences that facilitate user comprehension. The natural language module 1061 can implement context-aware terminology selection that adapts technical language based on user role and domain expertise (e.g., using business terminology for executives, technical terminology for engineers, financial terminology for analysts, and/or the like). For example, when explaining budget impact consequences to a financial analyst, the natural language module 1061 can generate explanations using specific financial metrics and accounting terminology, while the same consequence explanation for a project manager can use project timeline and resource allocation terminology.

In some implementations, the explanation generation module 1060 can include a structured format module 1062 that organizes consequence explanations according to standardized formats and hierarchical information structures. The structured format module 1062 can implement impact dimension organization that categorizes consequences according to business domains (e.g., financial impact, operational impact, strategic impact, and/or the like) to enable systematic review of predicted effects. The structured format module 1062 can generate time horizon breakdowns that separate immediate, short-term, and long-term consequences to provide temporal context for decision-making processes.

In some implementations, the structured format module 1062 can implement priority and severity tagging systems that assign importance levels to different consequence categories based on organizational priorities and risk tolerance parameters. The structured format module 1062 can generate hierarchical detail levels that allow users to access summary overviews or detailed technical explanations based on their information needs and available time constraints. For example, the structured format module 1062 can generate executive summary formats with high-level consequence categories and impact scores, while also providing detailed technical breakdowns that include specific causal chains and quantitative impact projections for technical stakeholders.

In some implementations, the explanation generation module 1060 can include a visual representations module 1063 that creates graphical and diagrammatic representations of consequence predictions and causal relationships. The visual representations module 1063 can generate charts and graphs (e.g., bar charts showing impact magnitudes, line graphs displaying temporal consequence evolution, scatter plots illustrating risk-return relationships, and/or the like) that provide quantitative visualizations of predicted outcomes. The visual representations module 1063 can implement causal diagram generation that creates node-and-edge representations of cause-effect relationships between session events and their downstream consequences.

In some implementations, the visual representations module 1063 can generate timeline visualizations that display the temporal sequence of predicted consequences and their interdependencies across different time horizons. The visual representations module 1063 can create impact heatmaps that use color coding and intensity gradients to represent consequence severity across multiple impact dimensions simultaneously. For example, the visual representations module 1063 can generate a comprehensive impact heatmap showing how a proposed budget reduction session event affects different business units over quarterly time periods, with color intensity representing impact severity and different colors representing impact types such as revenue effects, operational disruptions, and strategic alignment changes.

In some implementations, the explanation generation module 1060 can include a comparative analysis module 1064 that generates side-by-side comparisons of alternative session events and their respective consequence profiles. The comparative analysis module 1064 can implement trade-off matrix generation that displays the relative advantages and disadvantages of different predicted session events across multiple evaluation criteria (e.g., cost impact, timeline effects, risk levels, and/or the like). The comparative analysis module 1064 can generate decision tree representations that illustrate the branching consequences of different action choices and their probability-weighted outcomes.

In some implementations, the comparative analysis module 1064 can create pareto frontier visualizations that identify optimal trade-offs between competing objectives and highlight session events that provide superior performance across multiple dimensions. The comparative analysis module 1064 can implement scenario comparison functionality that allows users to evaluate how different environmental conditions affect the consequences of identical session events. For example, the comparative analysis module 1064 can generate a comprehensive comparison showing how implementing a new software system produces different consequence patterns during high-demand periods versus low-demand periods, including detailed analysis of resource utilization, user adoption rates, and operational efficiency impacts.

In some implementations, the explanation generation module 1060 can include a recommendations module 1065 that generates specific, actionable suggestions based on consequence analysis results and organizational objectives. The recommendations module 1065 can implement actionable suggestion generation that converts analytical insights into concrete steps that users can execute to achieve desired outcomes or mitigate predicted negative consequences. The recommendations module 1065 can generate risk mitigation steps that provide specific actions for reducing the probability or impact of identified negative consequences from predicted session events.

In some implementations, the recommendations module 1065 can create contingency plans that outline alternative response strategies for different consequence scenarios and provide decision frameworks for adapting to changing conditions. The recommendations module 1065 can generate next best action recommendations that prioritize immediate steps based on urgency, impact potential, and resource requirements. For example, when analyzing consequences of a proposed product launch session event, the recommendations module 1065 can generate specific recommendations such as increasing customer support staffing by 40% during the first month, implementing additional quality assurance testing protocols for the top three identified risk areas, and establishing weekly cross-functional review meetings to monitor early adoption metrics and adjust marketing strategies based on initial customer feedback patterns.

FIG. 11 is a flow diagram that illustrates an example process 1100 for generating preliminary session events in accordance with some implementations of the disclosed technology. The process 1100 (e.g., a computer-implemented method) can be performed by a computing system (e.g., event coordination system 100) configured to generate and/or execute preliminary session events for predicted session events of a runtime user session. In one example, the system includes at least one hardware processor and at least one non-transitory memory storing instructions, which, when executed by the at least one hardware processor, cause the system to perform the process 1100. In another example, the system includes a non-transitory, computer-readable storage medium comprising instructions recorded thereon, which, when executed by at least one data processor, cause the system to perform the process 1100.

At block 1102, the system can generate a session record that defines an environment state for the user runtime session (e.g., an active period of user interaction with computing systems where the user is performing work activities that are monitored and analyzed in real-time). For example, the system can detect incoming update signals, or events, that comprise information indicating recorded execution of one or more session events during the user runtime session (e.g., discrete, monitorable actions that occur during a user runtime session). In some implementations, the system can use monitored communications channels coupled to the user runtime session to actively monitor update signals originating from the user runtime session. In response to the update signal, the system can generate a session record that stores a runtime parameter set to define the real-time, or near real-time, environment state of the user runtime session when the one or more session events are executed.

At block 1104, the system can retrieve (e.g., from a remote data repository) at least one second session record comprising a second runtime parameter set that defines at least one second environment state for prior user runtime sessions associated with one or more recorded session events. In some implementations, the system can retrieve second session records such that the first runtime parameter set of the first session record and the second runtime parameter set of the at least one second session record satisfy one or more parameter correlation criterions.

In some implementations, the system can obtain at least one recorded session event that was executed during, or prior to, the user runtime session alongside the at least one session event associated with the update signal. For example, the system can obtain at least one recorded session event that corresponds to recorded runtime parameter sets defining prior environment states for the user runtime session. The system can use the at least one recorded session event and the at least one session event associated with the update signal to generate a first time-enumerated sequence of session events for the user runtime session where each session event corresponding to a distinct environment state of the user runtime session. In some implementations, the system can retrieve (e.g., from the remote data repository) one or more second time-enumerated sequences of session events for the prior user runtime sessions. Accordingly, the system can compare the first time-enumerated sequence to the one or more second time-enumerated sequences to selectively determine at least one second time-enumerated sequence of session events from the one or more second time-enumerated sequences that is similar to the first time-enumerated sequence of session events.

In some implementations, the system can access a first relational graph structure comprising interconnected nodes indicating monitored runtime parameters of the user runtime session such that at least one first session event within the first time-enumerated sequence corresponds to a first subgraph of the first relational graph structure that comprises a first node subset indicating monitored runtime parameters for at least one first environment state of the user runtime session. Further, the system can access a second relational graph structure comprising interconnected nodes indicating monitored runtime parameters of the prior user runtime sessions such that at least one second session event within the at least one second time-enumerated sequence corresponds to a second subgraph of the second relational graph structure that comprises a second node subset indicating recorded runtime parameters for at least one second environment state of the prior user runtime sessions. Accordingly, the system can compare the first subgraph of the at least one first session event and the second subgraph of the at least one second session event to generate one or more similarity parameters indicating degree of alignment between the at least one first environment state and the at least one second environment state.

At block 1106, the system can input the first environment state, the at least one session event of the user runtime session, the at least one second environment state, and the one or more recorded session events of the prior user runtime sessions into at least one first generative model to generate a predicted session event set for the user runtime session. In some implementations, the system can generate predicted session events where each predicted session event comprising a realization parameter indicating likelihood of the predicted session event executing during the user runtime session. In some implementations, the system can generate predicted session events where each predicted session event of the user runtime session comprises a transmission of one or more user query requests via the at least one user interface based, in part, on a predicted environment state for the user runtime session and/or a sequential execution of a plurality of causally linked predicted session events during the user runtime session. In other implementations, the system can generate predicted session events where each predicted session event comprises a predicted environment state of the user runtime session that causes execution of the predicted session event.

In some implementations, the first generative model can implement advanced machine learning architectures that enable sophisticated prediction generation through multiple specialized techniques and optimization strategies. It can include retrieval-augmented generation (RAG) capabilities that dynamically retrieve relevant contextual information from the unified state structures 151 and historical records 190 to enhance prediction accuracy by incorporating real-time organizational knowledge and historical precedents into the generation process. The first generative model can implement multi-head attention mechanisms that enable the model to simultaneously focus on different aspects of the input context including temporal patterns, entity relationships, causal dependencies, and user behavioral sequences, allowing the model to generate predictions that account for complex interdependencies between current session characteristics and historical patterns. It can also include domain specialization modules that adapt the generation process based on specific organizational contexts, user roles, and industry-specific patterns, enabling the model to generate predictions that reflect domain-specific knowledge and specialized workflows relevant to particular business environments. The model can process comprehensive prompt and context windows that include structured representations of the first environment state, detailed session event sequences, relevant historical patterns from aligned records 192, temporal context information, entity relationship mappings, and user preference profiles, enabling the model to generate predictions based on complete contextual awareness rather than limited input information. In some implementations, the model implements Low-Rank Adaptation (LoRA) techniques that enable efficient fine-tuning of model parameters for specific organizational contexts and user patterns without requiring complete model retraining, allowing the model to adapt to evolving user behaviors and organizational changes while maintaining computational efficiency. The model can include adaptive layer mechanisms that dynamically adjust model depth and complexity based on prediction task requirements, enabling the model to allocate appropriate computational resources for simple pattern recognition tasks versus complex causal reasoning scenarios, optimizing both prediction accuracy and inference latency for real-time session event generation.

In some implementations, the system can generate an executable sequence of operations that defines, in part, the predicted session event. For example, the at least one session event of the user runtime session can correspond to a first event classification and the one or more recorded session events of the prior user runtime sessions can correspond to at least one second event classification. The system can generate a third event classification for a predicted session event of the predicted session event set based, in part, on the first event classification and the at least one second event classification. Further, the system can use the third event classification to retrieve an event configuration for the predicted session event such that the event configuration defines an executable sequence of operations that is executed responsive to invocation of the predicted session event and the at least one operation within the executable sequence of operations comprises a mutable attribute set. Accordingly, the system can generate (e.g., via the first generative model) a predicted attribute set that populates the mutable attribute set of the at least one operation.

In some implementations, the system can access a relational graph structure comprising interconnected nodes indicating monitored runtime parameters of the user runtime session. For example, the system can access a relational graph where the at least one session event corresponds to a first subgraph of the relational graph structure that comprises a first node subset indicating the first runtime parameter set for the first environment state of the user runtime session. The system can traverse the relational graph structure from the first node subset of the first subgraph to generate a second subgraph that comprises a second node subset indicating a second runtime parameter set for the first environment state. Accordingly, the system can input the first runtime parameter set and the second runtime parameter set into the at least one first generative model to generate one or more predicted session events for the user runtime session.

At block 1108, the system can selectively determine at least one prioritized session event from the predicted session event set based, in part, on comparing the realization parameter of predicted session events within the predicted session event set. The system can implement multi-criteria decision analysis algorithms that evaluate each predicted session event by first extracting the realization parameter from each predicted session event in the predicted session event set, then comparing these realization parameters against each other to identify predicted session events with highest likelihood of execution during the user runtime session.

The system can execute priority scoring mechanisms that rank predicted session events by comparing their respective realization parameters using threshold-based filtering to eliminate predicted session events with realization parameters below a minimum probability threshold, statistical ranking algorithms that order remaining predicted session events from highest to lowest realization parameter values, and tie-breaking procedures that apply secondary scoring criteria when multiple predicted session events have identical or substantially similar realization parameters. The system can calculate composite priority scores by combining the realization parameter comparison results with additional weighted factors including an impact score calculated by analyzing historical user productivity metrics and task completion rates associated with similar predicted events, a time sensitivity score determined by measuring temporal proximity to user deadlines and scheduled activities extracted from calendar data, and a resource cost score representing computational overhead required for preliminary event preparation including model inference time and data retrieval operations.

The system can apply configurable weight coefficients to combine these quantitative metrics with contextual amplification factors extracted from the unified state structures 151, such as user attention pattern matching scores and current workflow disruption risk assessments, generating numerical priority rankings that directly determine resource allocation for preliminary event generation. The system can implement dynamic adjustment processes that recalculate priority scores at regular intervals by processing new environmental state changes captured through the data stream 180, incorporating explicit user feedback ratings collected through the interface module 127 to adjust individual user preference weights, and applying temporal decay functions that reduce priority scores of aging predicted events to maintain relevance in the runtime session records 150.

The system can generate prioritized events 195 as ordered data structures containing predicted session event identifiers ranked by composite priority scores that incorporate the realization parameter comparison results, confidence interval ranges calculated using statistical variance analysis of historical prediction accuracy, execution timing recommendations specifying optimal preliminary event trigger points relative to predicted user actions, and computational resource allocation specifications indicating required CPU cycles, memory usage, and model inference quotas that enable the system to execute the highest-priority preliminary events while maintaining sub-millisecond response latency for real-time user interactions.

At block 1110, the system can input the at least one prioritized session event and the first environment state of the user runtime session into at least one second generative model to generate at least one preliminary session event comprising one or more activation criterions that cause execution of the at least one preliminary session event during the user runtime session when the activation criterions are satisfied by runtime parameters of the user runtime session. In some implementations, the system can generate at least one preliminary session event of the user runtime session comprises a generation of one or more responses to the one or more user query requests of the predicted session event set and/or a generation of one or more user interactive artifacts comprising narrative representations of the sequential execution of the plurality of causally linked prediction session events. In other implementations, the one or more activation criterions of the at least one preliminary session event can correspond to runtime parameters of a target environment state that immediately precedes the corresponding predicted environment state. In some implementations, the at least one first generative model and the at least one second generative model are the same generative models.

In some implementations, the second generative model can implement specialized architectural configurations that enable preliminary event generation through distinct optimization strategies compared to the first generative model. It can utilize various machine learning architectures including neural networks, recurrent neural networks, convolutional neural networks, or transformer-based models while implementing different retrieval-augmented generation (RAG) configurations that access specialized knowledge repositories focused on activation criterion patterns, preliminary event templates, and user interface interaction protocols stored within the interface protocols 155 rather than the broader contextual information used by the first generative model. The second generative model can process modified prompt and context windows that emphasize activation trigger identification and preliminary action specification, incorporating structured representations of prioritized session events, current environment state parameters, historical activation patterns from the runtime session records 150, and user interface capability mappings that enable generation of executable preliminary events with precise activation criterions. The second model can also implement distinct fine-tuning parameters optimized for preliminary event generation tasks including activation criterion formulation, user interface element selection, and timing optimization, enabling the model to specialize in translating predicted session events into actionable preliminary interventions while maintaining computational efficiency through shared base model components with the first generative model where architecturally compatible. In alternative implementations, the second generative model can comprise a completely different generative architecture optimized specifically for preliminary event generation, such as a smaller, faster model from the model ensembles 152 that prioritizes low-latency activation criterion evaluation over comprehensive session prediction, or a specialized rule-based generation system that combines template-driven preliminary event construction with machine learning-based activation parameter optimization to ensure sub-millisecond preliminary event execution timing that enables proactive user assistance before predicted session events occur.

At block 1112, the system can execute the at least one preliminary session event. For example, in response to detecting a third runtime parameter set of a third environment state for the user runtime session satisfying the one or more activation criterions of the at least one preliminary session event, the system can automatically execute (e.g., via at least one user interface coupled to the user runtime session) the at least one preliminary session event prior to execution of the at least one prioritized session event.

In some implementations, the system can generate a criticality score for the at least one preliminary session event that indicates a degree of priority for user notification of the at least one preliminary session event. In response to the criticality score satisfying a criticality threshold, the system can automatically generate for display (e.g., at the at least one user interface) a graphical indicator notifying execution of the at least one preliminary session event. For example, the system can display a graphical indicator that overlays a prior graphical representation of the user runtime session displayed prior to execution of the at least one preliminary session event. In response to the criticality score failing to satisfy the criticality threshold, the system can automatically generate for display (e.g., at the at least one user interface) an interactive graphical indicator that, upon activation via user selection on the at least one user interface, notifies the execution of the at least one preliminary session event. In some implementations, the interactive graphical indicator can be displayed separately from the prior graphical representation of the user runtime session.

Example Computing Environment

Figure 12:
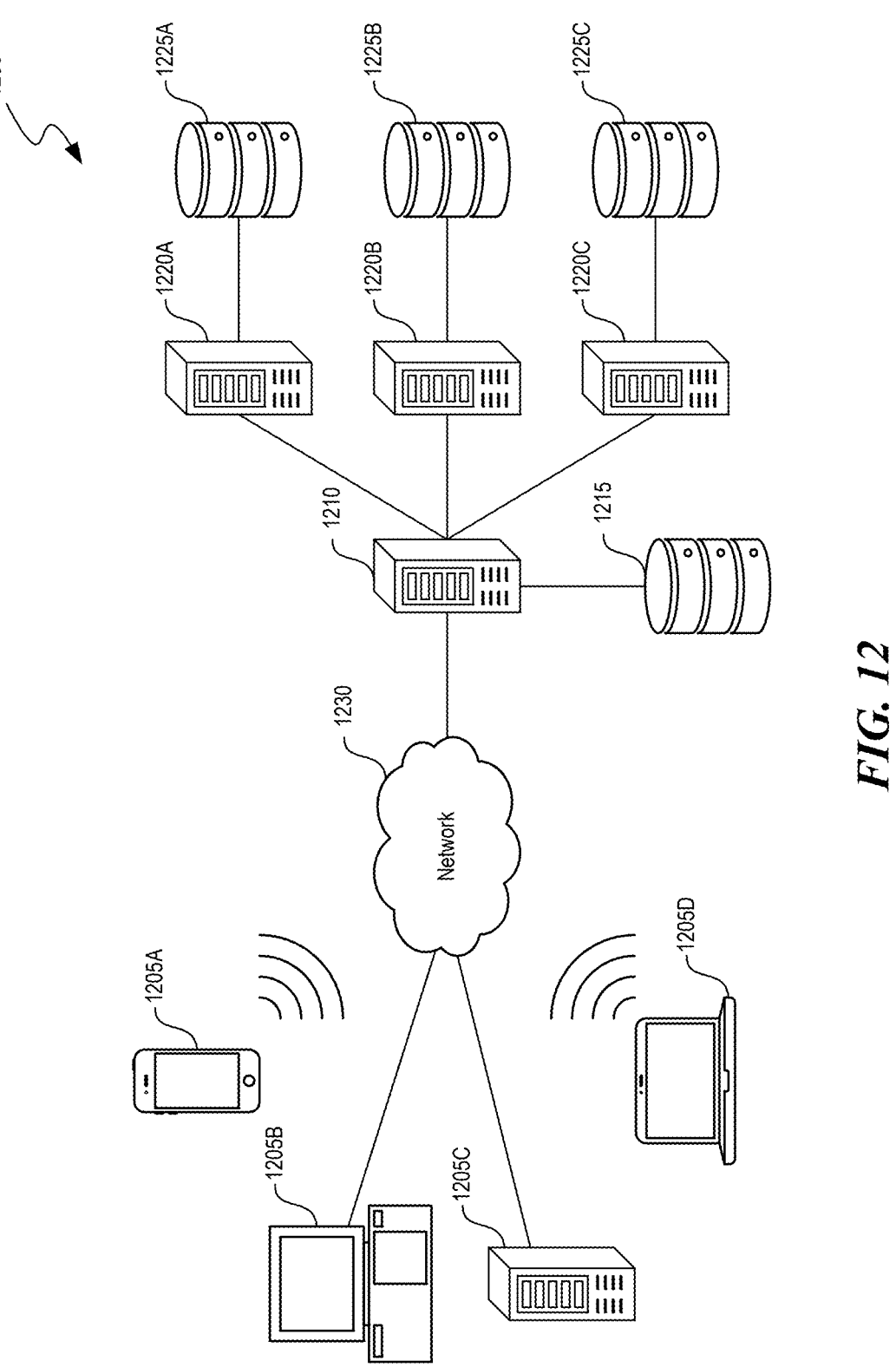
FIG. 12 is a system diagram illustrating an example of a computing environment in which the disclosed system operates in some implementations.

FIG. 12 is a system diagram illustrating an example of a computing environment in which the disclosed system operates in some implementations. In some implementations, environment 1200 includes one or more client computing devices 1205A-D, examples of which can host the event coordination system 100 of FIGS. 1A-1B. Client computing devices 1205 operate in a networked environment using logical connections through network 1230 to one or more remote computers, such as a server computing device.

In some implementations, server 1210 is an edge server which receives client requests and coordinates fulfillment of those requests through other servers, such as servers 1220A-C. In some implementations, servers 1210 and 1220, or associated computing devices, comprise computing systems, such as the event coordination system 100 of FIGS. 1A-1B. Though each server 1210 and 1220, or associated computing device, is displayed logically as a single server, server computing devices can each be a distributed computing environment encompassing multiple computing devices located at the same or at geographically disparate physical locations. In some implementations, each server 1220 corresponds to a group of servers.

Client computing devices 1205 and servers 1210 and 1220, or associated computing devices, can each act as a server or client to other server or client devices. In some implementations, servers (1210, 1220A-C) connect to a corresponding database (1215, 1225A-C). As discussed above, each server 1220 can correspond to a group of servers, and each of these servers can share a database or can have its own database. Databases 1215 and 1225 warehouse (e.g., store) information such as claims data, email data, call transcripts, call logs, policy data and so on. Though databases 1215 and 1225 are displayed logically as single units, databases 1215 and 1225 can each be a distributed computing environment encompassing multiple computing devices, can be located within their corresponding server, or can be located at the same or at geographically disparate physical locations.

Network 1230 can be a local area network (LAN) or a wide area network (WAN) but can also be other wired or wireless networks. In some implementations, network 1230 is the Internet or some other public or private network. Client computing devices 1205 are connected to network 1230 through a network interface, such as by wired or wireless communication. While the connections between server 1210 and servers 1220 are shown as separate connections, these connections can be any kind of local, wide area, wired, or wireless network, including network 1230 or a separate public or private network.

Example Machine Learning Architecture

Figure 13:
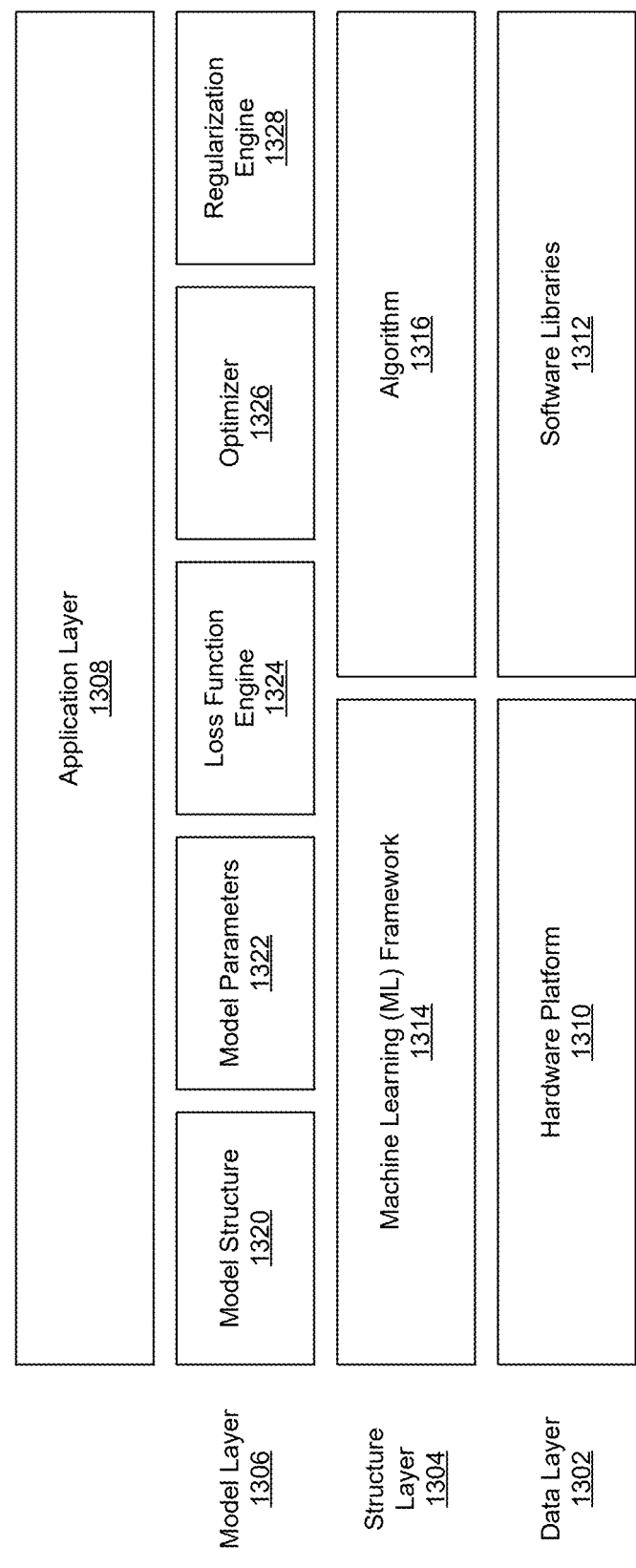
FIG. 13 illustrates a layered architecture of an artificial intelligence (AI) system that can implement the ML models of the event coordination system in accordance with some implementations of the present technology.

FIG. 13 illustrates a layered architecture of an artificial intelligence (AI) system 1300 that can implement the ML models of the event coordination system 100 of FIGS. 1A-1B, in accordance with some implementations of the present technology. Example ML models can include one or more executable statistical inference algorithms stored at computing databases 1215, 1225 and/or retrieved from external service providers (e.g., a third-party cloud host) via the network 1230 of the example computing environment 1200. Accordingly, the computing environment 1200 and/or components thereof (e.g., servers 1210, 1220, databases 1215, 1225, network 1230, and/or the like) can include, or be incorporated within, one or more components of the AI system 1300. The AI system 1300 provides a comprehensive software stack capable of hosting suitable runtime environments for one or more operations of ML models, as further described herein.

As shown, the AI system 1300 can include a set of layers, which conceptually organize elements within an example network topology for the AI system's architecture to implement a particular AI model. Generally, an AI model is a computer-executable program implemented by the AI system 1300 that analyses input data to generate inferential output data (e.g., a classification label for input feature vectors). Information can pass through each layer of the AI system 1300 to generate outputs for the AI model. The layers can include a data layer 1302, a structure layer 1304, a model layer 1306, and an application layer 1308. The algorithm 1316 of the structure layer 1304 and the model structure 1320 and model parameters 1322 of the model layer 1306 together form an example AI model. The optimizer 1326, loss function engine 1324, and regularization engine 1328 work to refine and optimize the AI model, and the data layer 1302 provides resources and support for application of the AI model by the application layer 1308.

The data layer 1302 acts as the foundation of the AI system 1300 by preparing data for the AI model. As shown, the data layer 1302 can include two sub-layers: a hardware platform 1310 and one or more software libraries 1312. The hardware platform 1310 can be designed to perform operations for the AI model and include computing resources for storage, memory, logic and networking, such as the resources described in relation to FIGS. 12 and 15. The hardware platform 1310 can process amounts of data using one or more servers. The servers can perform backend operations such as matrix calculations, parallel calculations, machine learning (ML) training, and the like. Examples of servers used by the hardware platform 1310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1310 can include computing resources, (e.g., servers, memory, etc.) offered by a cloud services provider. The hardware platform 1310 can also include computer memory for storing data about the AI model, application of the AI model, and training data for the AI model. The computer memory can be a form of random-access memory (RAM), such as dynamic RAM, static RAM, and non-volatile RAM.

The software libraries 1312 can be thought of suites of data and programming code, including executables, used to control the computing resources of the hardware platform 1310. The programming code can include low-level primitives (e.g., fundamental language elements) that form the foundation of one or more low-level programming languages, such that servers of the hardware platform 1310 can use the low-level primitives to carry out specific operations. The low-level programming languages do not require much, if any, abstraction from a computing resource's instruction set architecture, allowing them to run quickly with a small memory footprint. Examples of software libraries 1312 that can be included in the AI system 1300 include INTEL Math Kernel Library, NVIDIA cuDNN, EIGEN, and OpenBLAS.

The structure layer 1304 can include an ML framework 1314 and an algorithm 1316. The ML framework 1314 can be thought of as an interface, library, or tool that allows users to build and deploy the AI model. The ML framework 1314 can include an open-source library, an application programming interface (API), a gradient-boosting library, an ensemble method, and/or a deep learning toolkit that work with the layers of the AI system facilitate development of the AI model. For example, the ML framework 1314 can distribute processes for application or training of the AI model across multiple resources in the hardware platform 1310. The ML framework 1314 can also include a set of pre-built components that have the functionality to implement and train the AI model and allow users to use pre-built functions and classes to construct and train the AI model. Thus, the ML framework 1314 can be used to facilitate data engineering, development, hyperparameter tuning, testing, and training for the AI model. Examples of ML frameworks 1314 that can be used in the AI system 1300 include TENSORFLOW, PYTORCH, SCIKIT-LEARN, KERAS, LightGBM, RANDOM FOREST, and AMAZON WEB SERVICES.

The algorithm 1316 can be an organized set of computer-executable operations used to generate output data from a set of input data and can be described using pseudocode. The algorithm 1316 can include complex code that allows the computing resources to learn from new input data and create new/modified outputs based on what was learned. In some implementations, the algorithm 1316 can build the AI model through being trained while running computing resources of the hardware platform 1310. This training allows the algorithm 1316 to make predictions or decisions without being explicitly programmed to do so. Once trained, the algorithm 1316 can run at the computing resources as part of the AI model to make predictions or decisions, improve computing resource performance, or perform tasks. The algorithm 1316 can be trained using supervised learning, unsupervised learning, semi-supervised learning, and/or reinforcement learning.

Using supervised learning, the algorithm 1316 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. Furthermore, training data can include runtime session records 150, unified state structures 151 (e.g., runtime parameters, environment states, or the like), provenance ledgers 153, cache memory 154, and/or interface protocols 155 of the event coordination system 100 described in relation to FIGS. 1A-1B. The user may label the training data based on one or more classes and trains the AI model by inputting the training data into the algorithm 1316. The algorithm determines how to label the new data based on the labeled training data. The user can facilitate collection, labeling, and/or input via the ML framework 1314. In some instances, the user may convert the training data to a set of feature vectors for input to the algorithm 1316. Once trained, the user can test the algorithm 1316 on new data to determine if the algorithm 1316 is predicting accurate labels for the new data. For example, the user can use cross-validation methods to test the accuracy of the algorithm 1316 and retrain the algorithm 1316 on new training data if the results of the cross-validation are below an accuracy threshold.

Supervised learning can involve classification and/or regression. Classification techniques involve teaching the algorithm 1316 to identify a category of new observations based on training data and are used when input data for the algorithm 1316 is discrete. Said differently, when learning through classification techniques, the algorithm 1316 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1316 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1316 is continuous. Regression techniques can be used to train the algorithm 1316 to predict or forecast relationships between variables. To train the algorithm 1316 using regression techniques, a user can select a regression method for estimating the parameters of the model. The user collects and labels training data that is input to the algorithm 1316 such that the algorithm 1316 is trained to understand the relationship between data features and the dependent variable(s). Once trained, the algorithm 1316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1316 learns patterns from unlabeled training data. In particular, the algorithm 1316 is trained to learn hidden patterns and insights of input data, which can be used for data exploration or for generating new data. Here, the algorithm 1316 does not have a predefined output, unlike the labels output when the algorithm 1316 is trained using supervised learning. Said another way, unsupervised learning is used to train the algorithm 1316 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters comprise dissimilar data. For example, during clustering, data with possible similarities remains in a group that has less or no similarities to another group. Examples of clustering techniques density-based methods, hierarchical based methods, partitioning methods, and grid-based methods. In one example, the algorithm 1316 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1316 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 1316 include factor analysis, item response theory, latent profile analysis, and latent class analysis.

The model layer 1306 implements the AI model using data from the data layer and the algorithm 1316 and ML framework 1314 from the structure layer 1304, thus enabling decision-making capabilities of the AI system 1300. The model layer 1306 includes a model structure 1320, model parameters 1322, a loss function engine 1324, an optimizer 1326, and a regularization engine 1328.

The model structure 1320 describes the architecture of the AI model of the AI system 1300. The model structure 1320 defines the complexity of the pattern/relationship that the AI model expresses. Examples of structures that can be used as the model structure 1320 include decision trees, support vector machines, regression analyses, Bayesian networks, Gaussian processes, genetic algorithms, and artificial neural networks (or, simply, neural networks). The model structure 1320 can include a number of structure layers, a number of nodes (or neurons) at each structure layer, and activation functions of each node. Each node's activation function defines how the node converts data received to data output. The structure layers may include an input layer of nodes that receive input data, an output layer of nodes that produce output data. The model structure 1320 may include one or more hidden layers of nodes between the input and output layers. The model structure 1320 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 1322 represent the relationships learned during training and can be used to make predictions and decisions based on input data. The model parameters 1322 can weight and bias the nodes and connections of the model structure 1320. For instance, when the model structure 1320 is a neural network, the model parameters 1322 can weight and bias the nodes in each layer of the neural networks, such that the weights determine the strength of the nodes and the biases determine the thresholds for the activation functions of each node. The model parameters 1322, in conjunction with the activation functions of the nodes, determine how input data is transformed into desired outputs. The model parameters 1322 can be determined and/or altered during training of the algorithm 1316.

The loss function engine 1324 can determine a loss function, which is a metric used to evaluate the AI model's performance during training. For instance, the loss function engine 1324 can measure the difference between a predicted output of the AI model and the actual output of the AI model and is used to guide optimization of the AI model during training to minimize the loss function. The loss function may be presented via the ML framework 1314, such that a user can determine whether to retrain or otherwise alter the algorithm 1316 if the loss function is over a threshold. In some instances, the algorithm 1316 can be retrained automatically if the loss function is over the threshold. Examples of loss functions include a binary-cross entropy function, hinge loss function, regression loss function (e.g., mean square error, quadratic loss, etc.), mean absolute errorfunction, smooth mean absolute error function, log-cosh loss function, and quantile loss function.

The optimizer 1326 adjusts the model parameters 1322 to minimize the loss function during training of the algorithm 1316. In other words, the optimizer 1326 uses the loss function generated by the loss function engine 1324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1326 used may be determined based on the type of model structure 1320 and the size of data and the computing resources available in the data layer 1302.

The regularization engine 1328 executes regularization operations. Regularization is a technique that prevents over- and under-fitting of the AI model. Overfitting occurs when the algorithm 1316 is overly complex and too adapted to the training data, which can result in poor performance of the AI model. Underfitting occurs when the algorithm 1316 is unable to recognize even basic patterns from the training data such that it cannot perform well on training data or on validation data. The optimizer 1326 can apply one or more regularization techniques to fit the algorithm 1316 to the training data properly, which helps constraint the resulting AI model and improves its ability for generalized application. Examples of regularization techniques include lasso (L1) regularization, ridge (L2) regularization, and elastic (L1 and L2 regularization).

The application layer 1308 describes how the AI system 1300 is used to solve problem or perform tasks. In an example implementation, the application layer 1308 can be communicatively coupled (e.g., display application data, receive user input, and/or the like) to an interactable user interface of the event coordination system 100 of FIGS. 1A-1B.

Example Transformer for Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities.

A language model may comprise hundreds of thousands of learned parameters or in the case of a large language model (LLM) may comprise millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 14:
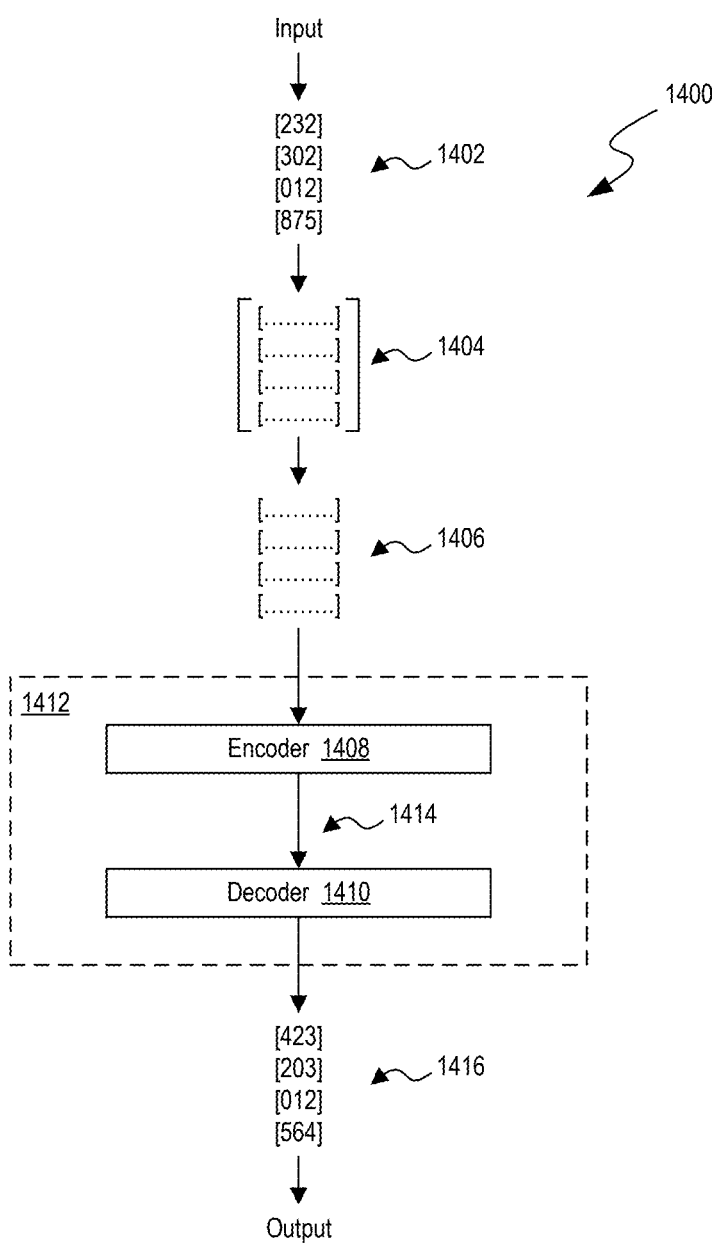
FIG. 14 is a block diagram of an example transformer that can implement aspects of the present technology.

FIG. 14 is a block diagram of an example transformer 1412 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 1412 includes an encoder 1408 (which can comprise one or more encoder layers/blocks connected in series) and a decoder 1410 (which can comprise one or more decoder layers/blocks connected in series). Generally, the encoder 1408 and the decoder 1410 each include a plurality of neural network layers, at least one of which can be a self-attention layer. The parameters of the neural network layers can be referred to as the parameters of the language model.

The transformer 1412 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 1412 is trained to perform certain functions on other input formats than natural language input. For example, the input can include objects, images, audio content, or video content, or a combination thereof.

The transformer 1412 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 14 illustrates an example of how the transformer 1412 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 14, a short sequence of tokens 1402 corresponding to the input text is illustrated as input to the transformer 1412. Tokenization of the text sequence into the tokens 1402 can be performed by some pre-processing tokenization module such as, for example, a byte-pair encoding tokenizer (the "pre" referring to the tokenization occurring prior to the processing of the tokenized input by the LLM), which is not shown in FIG. 14 for simplicity. In general, the token sequence that is inputted to the transformer 1412 can be of any length up to a maximum length defined based on the dimensions of the transformer 1412. Each token 1402 in the token sequence is converted into an embedding vector (also referred to simply as an embedding 1406). An embedding

1406 is a learned numerical representation (such as, for example, a vector) of a token that captures some semantic meaning of the text segment represented by the token 1402. The embedding 1406 represents the text segment corresponding to the token 1402 in a way such that embeddings corresponding to semantically related text are closer to each other in a vector space than embeddings corresponding to semantically unrelated text. For example, assuming that the words "write," "one," and "summary" each correspond to, respectively, a "write" token, an "one" token, and a "summary" token when tokenized, the embedding 1406 corresponding to the "write" token will be closer to another embedding corresponding to the "jot down" token in the vector space as compared to the distance between the embedding 1406 corresponding to the "write" token and another embedding corresponding to the "summary" token.

The vector space can be defined by the dimensions and values of the embedding vectors. Various techniques can be used to convert a token 1402 to an embedding 1406. For example, another trained ML model can be used to convert the token 1402 into an embedding 1406. In particular, another trained ML model can be used to convert the token 1402 into an embedding 1406 in a way that encodes additional information into the embedding 1406 (e.g., a trained ML model can encode positional information about the position of the token 1402 in the text sequence into the embedding 1406). In some examples, the numerical value of the token 1402 can be used to look up the corresponding embedding in an embedding matrix 1404 (which can be learned during training of the transformer 1412).

The generated embeddings 1406 are input into the encoder 1408. The encoder 1408 serves to encode the embeddings 1406 into feature vectors 1414 that represent the latent features of the embeddings 1406. The encoder 1408 can encode positional information (i.e., information about the sequence of the input) in the feature vectors 1414. The feature vectors 1414 can have very high dimensionality (e.g., on the order of thousands or tens of thousands), with each element in a feature vector 1414 corresponding to a respective feature. The numerical weight of each element in a feature vector 1414 represents the importance of the corresponding feature. The space of all possible feature vectors 1414 that can be generated by the encoder 1408 can be referred to as the latent space or feature space.

Conceptually, the decoder 1410 is designed to map the features represented by the feature vectors 1414 into meaningful output, which can depend on the task that was assigned to the transformer 1412. For example, if the transformer 1412 is used for a translation task, the decoder 1410 can map the feature vectors 1414 into text output in a target language different from the language of the original tokens 1402. Generally, in a generative language model, the decoder 1410 serves to decode the feature vectors 1414 into a sequence of tokens. The decoder 1410 can generate output tokens 1416 one by one. Each output token 1416 can be fed back as input to the decoder 1410 in order to generate the next output token 1416. By feeding back the generated output and applying self-attention, the decoder 1410 is able to generate a sequence of output tokens 1416 that has sequential meaning (e.g., the resulting output text sequence is understandable as a sentence and obeys grammatical rules). The decoder 1410 can generate output tokens 1416 until a special [EOT] token (indicating the end of the text) is generated. The resulting sequence of output tokens 1416 can then be converted to a text sequence in post-processing. For example, each output token 1416 can be an integer number that corresponds to a vocabulary index. By looking up the text segment using the vocabulary index, the text segment corresponding to each output token 1416 can be retrieved, the text segments can be concatenated together, and the final output text sequence can be obtained.

In some examples, the input provided to the transformer 1412 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT™ is built on top of a GPT-type LLM and has been fine-tuned with training datasets based on text-based chats (e.g., chatbot conversations). ChatGPT™ is designed for processing natural language, receiving chat-like inputs, and generating chat-like outputs.

A computer system can access a remote language model (e.g., a cloud-based language model), such as ChatGPT™ or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/ cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 15:
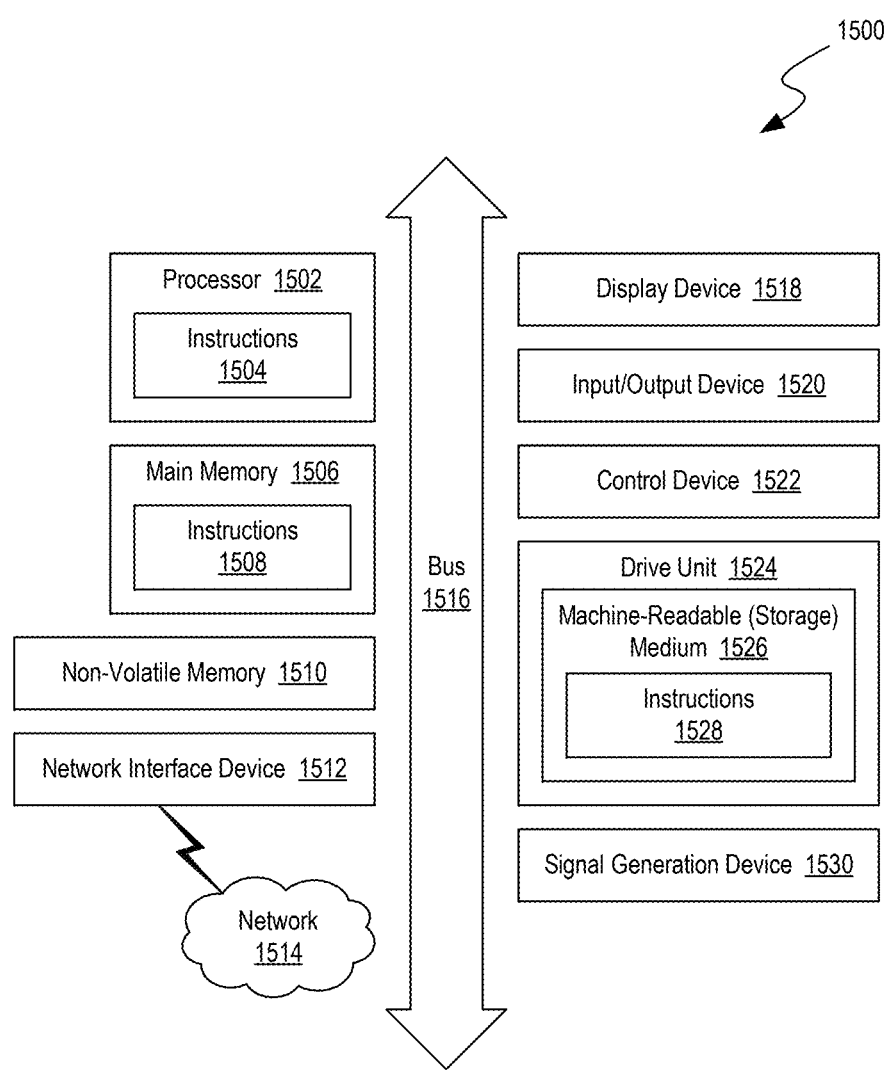
FIG. 15 is a block diagram that illustrates an example of a computer system in which at least some operations described herein can be implemented.

FIG. 15 is a block diagram that illustrates an example of a computer system 1500 in which at least some operations described herein can be implemented. As shown, the computer system 1500 can include: one or more processors 1502, main memory 1506, non-volatile memory 1510, a network interface device 1512, a video display device 1518, an input/output device 1520, a control device 1522 (e.g., keyboard and pointing device), a drive unit 1524 that includes a machine-readable (storage) medium 1526, and a signal generation device 1530 that are communicatively connected to a bus 1516. The bus 1516 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the figures and any other components described in this specification can be implemented.

The computer system 1500 can take any suitable physical form. For example, the computing system 1500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1500. In some implementations, the computer system 1500 can be an embedded computer system, a system-on-chip (SOC), a single-board computer system (SBC), or a distributed system such as a mesh of computer systems, or it can include one or more cloud components in one or more networks. Where appropriate, one or more computer systems 1500 can perform operations in real time, in near real time, or in batch mode.

The network interface device 1512 enables the computing system 1500 to mediate data in a network 1514 with an entity that is external to the computing system 1500 through any communication protocol supported by the computing system 1500 and the external entity. Examples of the network interface device 1512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1506, non-volatile memory 1510, machine-readable medium 1526) can be local, remote, or distributed. Although shown as a single medium, the machine-readable medium 1526 can include multiple media (e.g., a centralized/distributed database and/ or associated caches and servers) that store one or more sets of instructions 1528. The machine-readable medium 1526 can include any medium that is capable of storing, encoding, or carrying a set of instructions for execution by the computing system 1500. The machine-readable medium 1526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in computing device(s). When read and executed by the processor 1502, the instruction(s) cause the computing system 1500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media, comprising instructions recorded thereon, wherein the instructions when executed by at least one data processor of a system, cause the system to:

responsive to detecting, via at least one monitored communications channel that is coupled to a user runtime session, an update signal indicating recorded execution of at least one session event sequence during the user runtime session, generate a first session record comprising a first runtime parameter set that defines a first environment state for the user runtime session;

retrieve, from a persistent memory storage of a remote data repository that is communicatively coupled to the at least one data processor, at least one second session record that tracks a second runtime parameter set defining at least one second environment state recorded during prior user runtime sessions associated with one or more recorded session event sequences, the first runtime parameter set of the first session record and the second runtime parameter set of the at least one second session record satisfying one or more parameter correlation criterions;

input the first environment state, the at least one session event sequence of the user runtime session, the at least one second environment state, and the one or more recorded session event sequences of the prior user runtime sessions into at least one first artificial intelligence (AI) model to generate, for the user runtime session, at least one predicted session event sequence indicating one or more predicted actions that update the environment state of the user runtime session from the first environment state to a predicted environment state, each predicted session event comprising a realization parameter indicating likelihood of the predicted session event executing during the user runtime session, wherein the first AI model is caused to be continuously trained on sample event sequences of user session data retrieved via the at least one monitored communications channel to predict output event sequences, and wherein the output event sequences are determined by (1) generating a causal event chain that maps input event sequences of the user session data to one or more predicted event sequences with relational strength values that satisfy a causal strength threshold and (2) prioritizing, from the causal event chain, a predicted event sequence that matches task execution workflows of prior recorded event sequences that are similar to the input event sequences;

selectively determine, from the at least one predicted session event sequence, at least one prioritized predicted session event sequence based, in part, on comparing the realization parameter of predicted session events within the at least one predicted session event sequence;

input the at least one prioritized predicted session event sequence and the first environment state of the user runtime session into at least one second AI model to generate at least one preliminary session event sequence that corresponds to one or more activation criterions representing target runtime parameters that, when satisfied by runtime parameters of the user runtime session, cause execution of the at least one preliminary session event sequence prior to execution of the at least one prioritized predicted session event sequence during the user runtime session; and responsive to detecting a third runtime parameter set of a third environment state for the user runtime session satisfying the one or more activation criterions of the at least one preliminary session event sequence, automatically execute, via at least one user interface coupled to the user runtime session, the at least one preliminary session event sequence prior to execution of the at least one prioritized predicted session event sequence.

2. The one or more non-transitory, computer-readable storage media of claim 1, wherein the predicted session event of the user runtime session comprises at least one of:

transmission of one or more user query requests via the at least one user interface based, in part, on a predicted environment state for the user runtime session, or sequential execution of a plurality of causally linked predicted session events during the user runtime session.

3. The one or more non-transitory, computer-readable storage media of claim 2, wherein the at least one preliminary session event of the user runtime session comprises at least one of:

generation of one or more responses to the one or more user query requests of the predicted session event set, or generation of one or more user interactive artifacts comprising narrative representations of the sequential execution of the plurality of causally linked prediction session events.

4. The one or more non-transitory, computer-readable storage media of claim 1, wherein the predicted session event comprises a predicted environment state of the user runtime session that causes execution of the predicted session event, and wherein the one or more activation criterions of the at least one preliminary session event correspond to runtime parameters of a target environment state that immediately precedes the predicted environment state.

5. The one or more non-transitory, computer-readable storage media of claim 1, wherein the instructions further cause the system to:

obtain at least one recorded session event executed during the user runtime session, the at least one recorded session event corresponding to recorded runtime parameter sets defining prior environment states for the user runtime session;

generate, using the at least one recorded session event and the at least one session event associated with the update signal, a first time-enumerated sequence of session events for the user runtime session, each session event corresponding to a distinct environment state of the user runtime session;

retrieve, from the remote data repository, one or more second time-enumerated sequences of session events for the prior user runtime sessions; and selectively determine, via comparing the first time-enumerated sequence to the one or more second time-enumerated sequences, at least one second time-enumerated sequence of session events from the one or more second time-enumerated sequences that is similar to the first time-enumerated sequence of session events.

6. The one or more non-transitory, computer-readable storage media of claim 5, wherein the instructions further cause the system to:

access a first relational graph structure comprising interconnected nodes indicating monitored runtime parameters of the user runtime session, wherein at least one first session event within the first time-enumerated sequence corresponds to a first subgraph of the first relational graph structure that comprises a first node subset indicating monitored runtime parameters for at least one first environment state of the user runtime session;

access a second relational graph structure comprising interconnected nodes indicating monitored runtime parameters of the prior user runtime sessions, wherein at least one second session event within the at least one second time-enumerated sequence corresponds to a second subgraph of the second relational graph structure that comprises a second node subset indicating recorded runtime parameters for at least one second environment state of the prior user runtime sessions; and generate, via comparing the first subgraph of the at least one first session event and the second subgraph of the at least one second session event, one or more similarity parameters indicating degree of alignment between the at least one first environment state and the at least one second environment state.

7. The one or more non-transitory, computer-readable storage media of claim 1, wherein the at least one session event of the user runtime session corresponds to a first event classification, wherein the one or more recorded session events of the prior user runtime sessions correspond to at least one second event classification, and wherein the instructions further cause the system to:

generate a third event classification for a predicted session event of the predicted session event set based, in part, on the first event classification and the at least one second event classification;

retrieve, using the third event classification, an event configuration for the predicted session event, wherein the event configuration defines an executable sequence of operations that is executed responsive to invocation of the predicted session event, and wherein at least one operation within the executable sequence of operations comprises a mutable attribute set; and generate, via the first AI model, a predicted attribute set that populates the mutable attribute set of the at least one operation.

8. The one or more non-transitory, computer-readable storage media of claim 1, wherein the instructions further cause the system to:

access a relational graph structure comprising interconnected nodes indicating monitored runtime parameters of the user runtime session, wherein the at least one session event corresponds to a first subgraph of the relational graph structure that comprises a first node subset indicating the first runtime parameter set for the first environment state of the user runtime session;

traverse the relational graph structure from the first node subset of the first subgraph to generate a second subgraph that comprises a second node subset indicating a second runtime parameter set for the first environment state; and input the first runtime parameter set and the second runtime parameter set into the at least one first AI model to generate one or more predicted session events for the user runtime session.

9. The one or more non-transitory, computer-readable storage media of claim 1, wherein the instructions further cause the system to:

generate a criticality score for the at least one preliminary session event that indicates a degree of priority for user notification of the at least one preliminary session event;

responsive to the criticality score satisfying a criticality threshold, automatically generate for display, at the at least one user interface, a graphical indicator notifying execution of the at least one preliminary session event, wherein the graphical indicator overlays a prior graphical representation of the user runtime session displayed prior to execution of the at least one preliminary session event; and responsive to the criticality score failing to satisfy the criticality threshold, automatically generate for display, at the at least one user interface, an interactive graphical indicator that, when activated via user selection on the at least one user interface, notifies the execution of the at least one preliminary session event, wherein the interactive graphical indicator is displayed separately from the prior graphical representation of the user runtime session.

10. The one or more non-transitory, computer-readable storage media of claim 1, wherein the at least one first AI model and the at least one second AI model are the same AI model.

11. A system comprising:

at least one hardware processor; and at least one non-transitory memory storing instructions, which, when executed by the at least one hardware processor, cause the system to:

responsive to detecting, via at least one monitored communications channel that is coupled to a user runtime session, an update signal indicating recorded execution of at least one session event sequence during the user runtime session, generate a first session record comprising a first runtime parameter set that defines a first environment state for the user runtime session;

retrieve, from a persistent memory storage of a remote data repository that is communicatively coupled to the at least one data processor, at least one second session record that tracks a second runtime parameter set defining at least one second environment state recorded during prior user runtime sessions associated with one or more recorded session event sequences, the first runtime parameter set of the first session record and the second runtime parameter set of the at least one second session record satisfying one or more parameter correlation criterions;

input the first environment state, the at least one session event sequence of the user runtime session, the at least one second environment state, and the one or more recorded session event sequences of the prior user runtime sessions into at least one first artificial intelligence (AI) model to generate, for the user runtime session, at least one predicted session event sequence indicating one or more predicted actions that update the environment state of the user runtime session from the first environment state to a predicted environment state, each predicted session event comprising a realization parameter indicating likelihood of the predicted session event executing during the user runtime session, wherein the first AI model is caused to be continuously trained on sample event sequences of user session data retrieved via the at least one monitored communications channel to predict output event sequences, and wherein the output event sequences are determined by (1) generating a causal event chain that maps input event sequences of the user session data to one or more predicted event sequences with relational strength values that satisfy a causal strength threshold and (2) prioritizing, from the causal event chain, a predicted event sequence that matches task execution workflows of prior recorded event sequences that are similar to the input event sequences;

selectively determine, from the at least one predicted session event sequence, at least one prioritized predicted session event sequence based, in part, on comparing the realization parameter of predicted session events within the at least one predicted session event sequence;

input the at least one prioritized predicted session event sequence and the first environment state of the user runtime session into at least one second AI model to generate at least one preliminary session event sequence that corresponds to one or more activation criterions representing target runtime parameters that, when satisfied by runtime parameters of the user runtime session, cause execution of the at least one preliminary session event sequence prior to executing of the at least one prioritized predicted session event sequence during the user runtime session; and responsive to detecting a third runtime parameter set of a third environment state for the user runtime session satisfying the one or more activation criterions of the at least one preliminary session event sequence, automatically execute, via at least one user interface coupled to the user runtime session, the at least one preliminary session event sequence prior to execution of the at least one prioritized predicted session event sequence.

12. The system of claim 11, wherein the predicted session event of the user runtime session comprises at least one of:

transmission of one or more user query requests via the at least one user interface based, in part, on a predicted environment state for the user runtime session, or sequential execution of a plurality of causally linked predicted session events during the user runtime session.

13. The system of claim 12, wherein the at least one preliminary session event of the user runtime session comprises at least one of:

generation of one or more responses to the one or more user query requests of the predicted session event set, or generation of one or more user interactive artifacts comprising narrative representations of the sequential execution of the plurality of causally linked prediction session events.

14. The system of claim 11, wherein the predicted session event comprises a predicted environment state of the user runtime session that causes execution of the predicted session event, and wherein the one or more activation criterions of the at least one preliminary session event correspond to runtime parameters of a target environment state that immediately precedes the predicted environment state.

15. The system of claim 11 further caused to:

obtain at least one recorded session event executed during the user runtime session, the at least one recorded session event corresponding to recorded runtime parameter sets defining prior environment states for the user runtime session;

generate, using the at least one recorded session event and the at least one session event associated with the update signal, a first time-enumerated sequence of session events for the user runtime session, each session event corresponding to a distinct environment state of the user runtime session;

retrieve, from the remote data repository, one or more second time-enumerated sequences of session events for the prior user runtime sessions; and selectively determine, via comparing the first time-enumerated sequence to the one or more second time-enumerated sequences, at least one second time-enumerated sequence of session events from the one or more second time-enumerated sequences that is similar to the first time-enumerated sequence of session events.

16. The system of claim 15 further caused to:

access a first relational graph structure comprising interconnected nodes indicating monitored runtime parameters of the user runtime session, wherein at least one first session event within the first time-enumerated sequence corresponds to a first subgraph of the first relational graph structure that comprises a first node subset indicating monitored runtime parameters for at least one first environment state of the user runtime session;

access a second relational graph structure comprising interconnected nodes indicating monitored runtime parameters of the prior user runtime sessions, wherein at least one second session event within the at least one second time-enumerated sequence corresponds to a second subgraph of the second relational graph structure that comprises a second node subset indicating recorded runtime parameters for at least one second environment state of the prior user runtime sessions; and generate, via comparing the first subgraph of the at least one first session event and the second subgraph of the at least one second session event, one or more similarity parameters indicating degree of alignment between the at least one first environment state and the at least one second environment state.

17. The system of claim 11, wherein the at least one session event of the user runtime session corresponds to a first event classification, wherein the one or more recorded session events of the prior user runtime sessions correspond to at least one second event classification, and wherein the instructions further cause the system to:

generate a third event classification for a predicted session event of the predicted session event set based, in part, on the first event classification and the at least one second event classification;

retrieve, using the third event classification, an event configuration for the predicted session event, wherein the event configuration defines an executable sequence of operations that is executed responsive to invocation of the predicted session event, and wherein at least one operation within the executable sequence of operations comprises a mutable attribute set; and generate, via the first generative model, a predicted attribute set that populates the mutable attribute set of the at least one operation.

18. The system of claim 11 further caused to:

access a relational graph structure comprising interconnected nodes indicating monitored runtime parameters of the user runtime session, wherein the at least one session event corresponds to a first subgraph of the relational graph structure that comprises a first node subset indicating the first runtime parameter set for the first environment state of the user runtime session;

traverse the relational graph structure from the first node subset of the first subgraph to generate a second subgraph that comprises a second node subset indicating a second runtime parameter set for the first environment state; and input the first runtime parameter set and the second runtime parameter set into the at least one first generative model to generate one or more predicted session events for the user runtime session.

19. The system of claim 11 further caused to:

generate a criticality score for the at least one preliminary session event that indicates a degree of priority for user notification of the at least one preliminary session event;

responsive to the criticality score satisfying a criticality threshold, automatically generate for display, at the at least one user interface, a graphical indicator notifying execution of the at least one preliminary session event, wherein the graphical indicator overlays a prior graphical representation of the user runtime session displayed prior to execution of the at least one preliminary session event; and responsive to the criticality score failing to satisfy the criticality threshold, automatically generate for display, at the at least one user interface, an interactive graphical indicator that, when activated via user selection on the at least one user interface, notifies the execution of the at least one preliminary session event, wherein the interactive graphical indicator is displayed separately from the prior graphical representation of the user runtime session.

20. A computer-implemented method comprising:

responsive to detecting, via at least one monitored communications channel that is coupled to a user runtime session, an update signal indicating recorded execution of at least one session event sequence during the user runtime session, generating a first session record comprising a first runtime parameter set that defines a first environment state for the user runtime session;

retrieving, from a persistent memory storage of a remote data repository, at least one second session record that tracks a second runtime parameter set defining at least one second environment state recorded during prior user runtime sessions associated with one or more recorded session event sequences, the first runtime parameter set of the first session record and the second runtime parameter set of the at least one second session record satisfying one or more parameter correlation criterions;

inputting the first environment state, the at least one session event sequence of the user runtime session, the at least one second environment state, and the one or more recorded session event sequences of the prior user runtime sessions into at least one first artificial intelligence (AI) model to generate, for the user runtime session, at least one predicted session event sequence indicating one or more predicted actions that update the environment state of the user runtime session from the first environment state to a predicted environment state set, each predicted session event comprising a realization parameter indicating likelihood of the predicted session event executing during the user runtime session, wherein the first AI model is caused to be continuously trained on sample event sequences of user session data retrieved via the at least one monitored communications channel to predict output event sequences, and wherein the output event sequences are determined by (1) generating a causal event chain that maps input event sequences of the user session data to one or more predicted event sequences with relational strength values that satisfy a causal strength threshold and (2) prioritizing, from the causal event chain, a predicted event sequence that matches task execution workflows of prior recorded event sequences that are similar to the input event sequences;

selectively determining, from the at least one predicted session event sequence, at least one prioritized predicted session event sequence based, in part, on comparing the realization parameter of predicted session events within the at least one predicted session event sequence;

inputting the at least one prioritized predicted session event sequence and the first environment state of the user runtime session into at least one second AI model to generate at least one preliminary session event sequence that corresponds to one or more activation criterions representing target runtime parameters that, when satisfied by runtime parameters of the user runtime session, cause execution of the at least one preliminary session event sequence prior to execution of the at least one prioritized predicted session event sequence during the user runtime session; and responsive to detecting a third runtime parameter set of a third environment state for the user runtime session satisfying the one or more activation criterions of the at least one preliminary session event sequence, automatically executing, via at least one user interface coupled to the user runtime session, the at least one preliminary session event sequence prior to execution of the at least one prioritized predicted session event sequence.

* * * * *